United States Patent
Takenaka et al.

(10) Patent No.: US 7,319,918 B2
(45) Date of Patent: Jan. 15, 2008

(54) GAIT GENERATION DEVICE FOR LEGGED MOBILE ROBOT

(75) Inventors: Toru Takenaka, Wako (JP); Takashi Matsumoto, Wako (JP); Takahide Yoshiike, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 743 days.

(21) Appl. No.: 10/499,935

(22) PCT Filed: Dec. 27, 2002

(86) PCT No.: PCT/JP02/13784

§ 371 (c)(1),
(2), (4) Date: Jun. 23, 2004

(87) PCT Pub. No.: WO03/057427

PCT Pub. Date: Jul. 17, 2003

(65) Prior Publication Data

US 2005/0075755 A1    Apr. 7, 2005

(30) Foreign Application Priority Data

Dec. 28, 2001  (JP)  ............................. 2001-399495

(51) Int. Cl.
*G06F 19/00* (2006.01)

(52) U.S. Cl. .................... 700/245; 700/246; 700/251; 700/253; 700/260; 700/261; 318/568.1; 318/568.12; 318/568.16; 318/568.17; 318/568.2; 901/1; 901/9; 901/46

(58) Field of Classification Search .............. 700/246, 700/251, 253, 260, 261; 318/568.1, 568.12, 318/568.16, 568.17, 568.2; 901/1, 9, 46
See application file for complete search history.

(56) References Cited

U.S. PATENT DOCUMENTS 6,969,965 B2 * 11/2005 Takenaka et al. ...... 318/568.12

(Continued)

FOREIGN PATENT DOCUMENTS

EP    0 572 285 A1    12/1993

(Continued)

OTHER PUBLICATIONS

Zhang et al., A new method of desired gait synthesis in biped robot, 2000, IEEE, p. 1300-1304.*

(Continued)

*Primary Examiner*—Thomas Black
*Assistant Examiner*—McDieunel Marc
(74) *Attorney, Agent, or Firm*—Rankin, Hill, Porter & Clark LLP

(57) ABSTRACT

A gait generation device for setting a translation floor reaction force's horizontal component (component concerning a friction force) applied to a robot 1, a limitation-target quantity, such as a ZMP, and an allowable range, for determining at least a provisional instantaneous value of a desired floor reaction force and a provisional instantaneous value for a desired movement of the robot 1, that receives at least the provisional instantaneous value for the desired movement and determines a model floor reaction force instantaneous value with the aid of a dynamics model. Based on the difference between the model floor reaction force instantaneous value and the provisional instantaneous value of the desired floor reaction force or the allowable range of the limitation-target quantity, the provisional instantaneous value for the desired movement is corrected so that the limitation-target quantity falls within the allowable range and a dynamical equilibrium condition on the dynamics model is satisfied, thereby determining a desired instantaneous value.

48 Claims, 52 Drawing Sheets

U.S. PATENT DOCUMENTS

| | | | |
|---|---|---|---|
| 2005/0110448 A1* | 5/2005 | Takenaka et al. | 318/568.12 |
| 2005/0126833 A1* | 6/2005 | Takenaka et al. | 180/8.1 |
| 2005/0228539 A1* | 10/2005 | Takenaka et al. | 700/245 |
| 2005/0240306 A1* | 10/2005 | Takenaka et al. | 700/245 |
| 2006/0184276 A1* | 8/2006 | Takenaka et al. | 700/245 |

FOREIGN PATENT DOCUMENTS

| | | |
|---|---|---|
| EP | 0 856 457 A2 | 8/1998 |
| EP | 1 018 467 A1 | 7/2000 |
| EP | 1018467 | 7/2000 |
| EP | 1120203 | 8/2001 |
| EP | 1361027 | 11/2003 |
| EP | 1398121 | 3/2004 |
| JP | 05-305584 | 11/1993 |
| JP | 05-324115 | 12/1993 |
| JP | 10-086080 | 4/1998 |
| JP | 10-086081 | 4/1998 |
| JP | 2002-326173 | 11/2002 |

OTHER PUBLICATIONS

WO 02/40224 A1, Gait Pattern Generating Device for Legged Mobile Robot, Publication Date: May 23, 2002.

* cited by examiner (RUNNING GAIT)

(DESIRED FLOOR REACTION FORCE'S VERTICAL COMPONENT)

(DESIRED ZMP)

(FUNCTIONAL BLOCK DIAGRAM OF FULL MODEL-CORRECTING GAIT GENERATION DEVICE)

(BODY TRANSLATION MODE)

(BODY ROTATION MODE)

(SIMPLIFIED MODEL WITH FLYWHEEL)

(FULL MODEL)

( DIVERGENCE STATE OF BODY POSITION )

(PROCESS OF DETERMINING NORMAL GAIT PARAMETER)

(RELATIONSHIP AMONG FOOT LANDING POSITIONS/POSTURES FOR NORMAL GAIT)

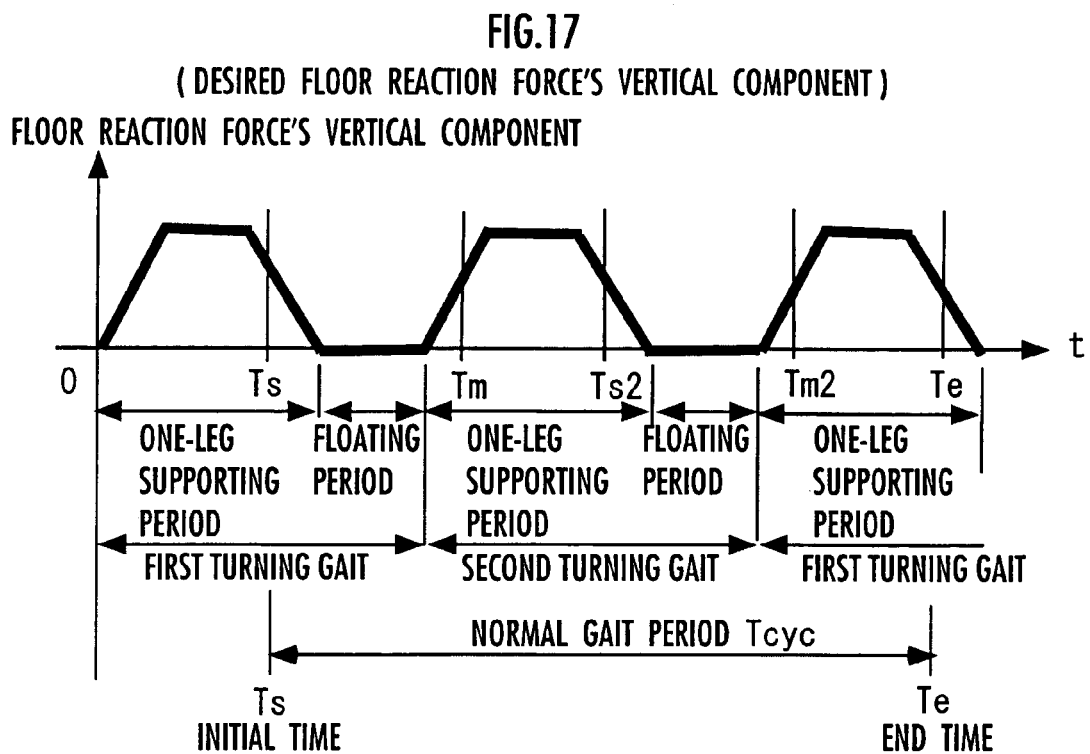
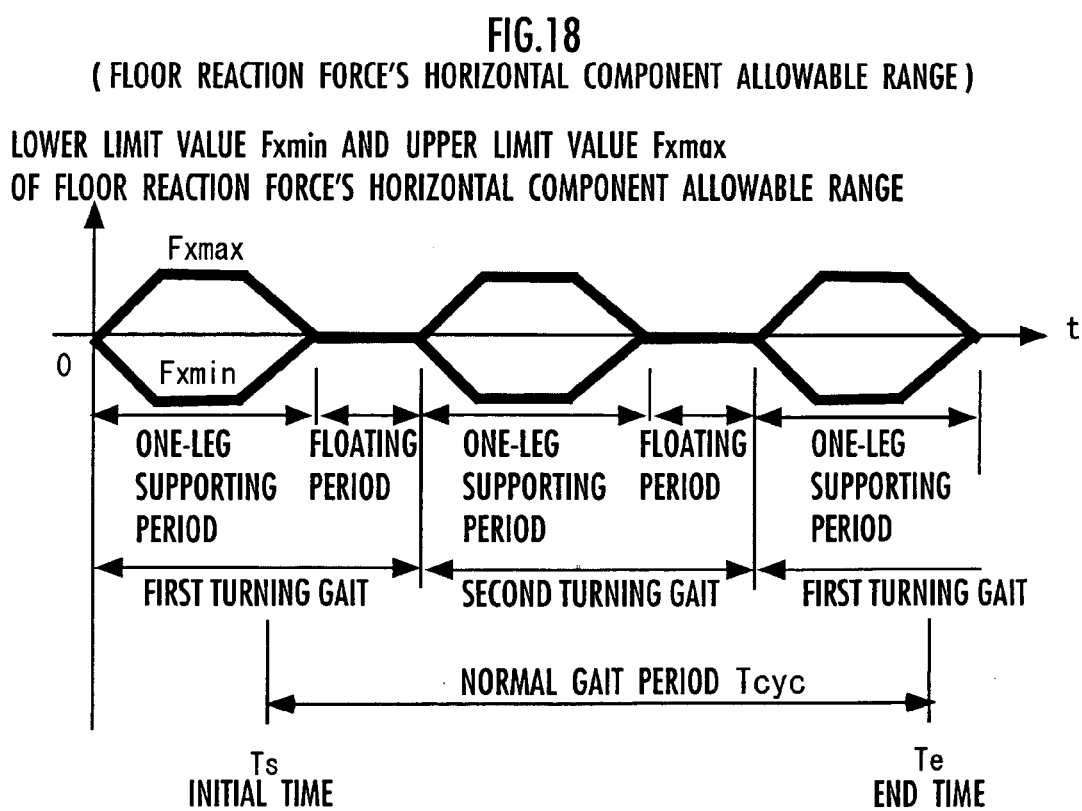

(DESIRED ZMP)

(PROCESS OF SEARCHING FOR INITIAL DIVERGENCE COMPONENT FOR NORMAL GAIT)

(PROVISIONAL GAIT GENERATION PROCESS FOR NORMAL GAIT)

FLOOR REACTION FORCE'S HORIZONTAL COMPONENT
DETERMINED WITHOUT TAKING ALLOWABLE RANGE INTO CONSIDERATION Fxtmp FLOOR REACTION FORCE'S HORIZONTAL COMPONENT
DETERMINED TAKING FLOOR REACTION FORCE'S HORIZONTAL
COMPONENT ALLOWABLE RANGE INTO CONSIDERATION Fx BODY INCLINATION ANGULAR ACCELERATION $\beta$ BODY INCLINATION RESTORING MOMENT ZMP-CONVERTED VALUE (ZMPrec)

BODY INCLINATION ANGULAR ACCELERATION $\beta$
(FOR RETURNING BODY INCLINATION VELOCITY TO INITIAL VALUE)

FLOOR REACTION FORCE HORIZONTAL COMPONENT Fx
DETERMINED TAKING FLOOR REACTION FORCE HORIZONTAL
COMPONENT ALLOWABLE RANGE INTO CONSIDERATION (RELATIONSHIP AMONG BODY POSITIONS AT THE TIME OF LANDING FOR NORMAL GAIT)

(PROCESS OF PROVISIONALLY DETERMINING CURRENT TIME GAIT PARAMETER)

(FLOOR REACTION FORCE'S HORIZONTAL COMPONENT ALLOWABLE RANGE)

(PROCESS OF CORRECTING CURRENT TIME GAIT PARAMETER IN SEARCHING MANNER)

(PROCESS OF GENERATING PROVISIONAL CURRENT TIME GAIT)

(PROCESS OF DETERMINING CURRENT TIME PROVISIONAL GAIT INSTANTANEOUS VALUE)

(PROCESS OF DETERMINING BODY HORIZONTAL ACCELERATION AND BODY POSTURE ANGULAR ACCELERATION FOR CURRENT TIME GAIT)

( DESIRE FLOOR REACTION FORCE'S VERTICAL COMPONENT DURING WALKING )

FIG.41 (CATEGORIZATION TABLE OF FULL MODEL CORRECTION METHODS)

(PERTURBATION MODEL FOR CORRECTING BODY HORIZONTAL POSITIONS)

(PERTURBATION MODEL FOR CORRECTING BODY POSTURE ANGLES)

(BODY INCLINATION ABOUT WAIST)

GAIT GENERATION DEVICE FOR LEGGED MOBILE ROBOT

TECHNICAL FIELD

The present invention relates to a gait generation device for a legged mobile robot.

BACKGROUND ART

In Japanese Patent Application No. 2000-352011, the applicants have proposed a technique of using a relatively simple robot dynamics model to generate in real time a flexible gait (referred to as an approximate gait, hereinafter) with which a robot can continuously move while approximately satisfying its dynamical equilibrium condition (i.e., without divergence).

Furthermore, in Japanese Patent Application No. 2001-133621, there is proposed a technique of generating a gait that is corrected so as to precisely satisfy the dynamical equilibrium condition and substantially follow the approximate gait without divergence. A desired gait corrected is referred to as a corrected desired gait or a corrected gait, hereinafter.

However, in Japanese Patent Application No. 2001-133621, a desired floor reaction force, which has been appropriately determined, is shifted to prevent divergence of the corrected gait. That is, the floor reaction force is modified so that a floor reaction force moment is produced (acted) about a desired ZMP, which has been appropriately determined, or the desired ZMP itself is modified.

In the following, the appropriately determined desired floor reaction force is referred to as an ideal desired floor reaction force, and the appropriately determined desired ZMP is referred to as an ideal desired ZMP.

As shown in the following formula, a shift of the desired ZMP from the ideal desired ZMP is equivalent to production of a horizontal component of a floor reaction force moment about the ideal desired ZMP which is expressed as (shift of the desired ZMP)*(vertical component of the translation floor reaction force).

(horizontal component of the floor reaction force moment about the ideal desired ZMP)

=(shift of the desired ZMP)*(vertical component of the translation force of the floor reaction force)    formula b01

In the following, the vertical component of the translation floor reaction force is sometimes abbreviated as a floor reaction force vertical component as far as it is not misconstrued as the floor reaction force moment about the vertical axis.

To what extent the divergence of the corrected gait can be prevented and the corrected gait can be stabilized depends on the maximum value (minimum value) of the floor reaction force moment that can be produced about the ideal desired ZMP.

When a robot walks, the floor reaction force vertical component is always substantially equal to the weight of the robot, and the possible area of the desired ZMP (a minimum polygon surrounding the contact surface, referred also to as a supporting polygon) is wide. Thus, divergence of the corrected gait can be prevented by shifting the desired ZMP within the possible area and thereby producing a horizontal component of the floor reaction force moment about the ideal desired ZMP.

On the other hand, when a robot runs, all the legs of the robot may often float in the air, and in such a state, the floor reaction force vertical component is 0. In this state, all the components of the floor reaction force (the components of the translation force and the moment) are typically 0. Therefore, when all the legs float in the air, divergence of the corrected gait cannot be prevented by producing a floor reaction force moment about the ideal desired ZMP.

Even if any of the legs is in contact with the floor, if the floor reaction force vertical component is close to 0, only a slight horizontal component of the floor reaction force moment about the ideal desired ZMP can be produced by shifting the desired ZMP within the possible area of the desired ZMP. This is because the horizontal component of the moment about the ideal desired ZMP is a product of the amount of the modification of the desired ZMP and the floor reaction force vertical component, as described above. Therefore, in this case also, divergence of the corrected gait cannot be prevented.

As described above, when the floor reaction force vertical component is 0 or close to 0, the absolute value of the floor reaction force moment that can be produced about the ideal desired ZMP is small, and therefore, divergence of the corrected gait cannot be prevented. Thus, the corrected gait has to be brought close to the approximate gait when the floor reaction force vertical component has an adequate value.

Besides, if a foot sole of the robot is in contact with the floor and an adhesion force (attraction force) can be produced between the sole and the floor, a floor reaction force moment can be produced even if the floor reaction force vertical component is 0. However, in general, legged mobile robots are controlled on the assumption that there is no adhesion force (attraction force). In addition, in usual operating environments of such robots, substantially no adhesion force occurs between the floor and the foot soles.

In addition, if the floor reaction force vertical component is 0, the desired ZMP is not settled and can be set at any point. However, all the components of the floor reaction force are 0, and therefore, if the desired ZMP is shifted, any horizontal component of floor reaction force moment cannot be produced about the ideal desired ZMP.

Another important problem which is not specifically described in Japanese Patent Application No. 2001-133621 is of slipping.

In the embodiments described in Japanese Patent Application No. 2001-133621, the body horizontal acceleration for the corrected gait is adjusted (changed) in such a manner that the moment produced about the original desired ZMP by the resultant of gravity and the inertial force produced by the movement of the robot is reduced to 0 or made to agree with the floor reaction force moment for preventing divergence of the corrected gait (full-model corrected moment about the desired ZMP described in Japanese Patent Application No. 2001-133621) as described above. In other words, the total center-of-gravity horizontal acceleration is adjusted (changed). As a result, the floor reaction force horizontal component in balance with the total center-of-gravity horizontal acceleration changes.

In the case where the robot moves on a horizontal floor surface, the floor reaction force horizontal component is caused by friction.

When the robot walks on a floor surface having a high friction coefficient, the floor reaction force vertical component is always substantially equal to the weight thereof, and therefore, the friction force (that is, the floor reaction force horizontal component) has a high limit value. Thus, the robot hardly slips even if the body horizontal acceleration for the corrected gait is changed as described above.

On the other hand, when the robot walks on a floor surface having a low friction coefficient, the limit value of the friction force (the floor reaction force horizontal component) is low. Therefore, when the body horizontal acceleration for the corrected gait is changed as described above, a floor reaction force horizontal component that is in balance therewith cannot be produced, and thus, the robot may slip.

During running, the floor reaction force vertical component sometimes becomes approximately 0. When this occurs, even if the floor surface has a high friction coefficient, the limit value of the friction force (the floor reaction force horizontal component) is substantially 0. Thus, during running also, the robot may slip if the body horizontal acceleration for the corrected gait is changed as described above.

In addition, during running, the floor reaction force vertical component sometimes becomes 0 (when both the legs float in the air). When this occurs, the friction force (the floor reaction force horizontal component) also becomes 0, so that the total center-of-gravity horizontal acceleration is naturally 0 (uniform motion). In other words, the gait of the robot has to be one in which the total center-of-gravity horizontal acceleration is 0.

As described above, in the cases where the robot runs and where the robot walks on a floor surface of a low friction coefficient, it is difficult or possibly impossible that the body horizontal acceleration for the corrected gait (or the total center-of-gravity horizontal acceleration) is adjusted (changed) in such a manner that the moment produced about the ideal desired ZMP by the resultant of gravity and the inertial force is reduced to 0 or made to agree with the floor reaction force moment for preventing divergence of the corrected gait as described above.

In consideration of cases where a robot runs or walks on a floor surface of a low friction coefficient, the applicants have proposed a technique of explicitly setting a desired ZMP trajectory, a desired floor reaction force vertical component trajectory and an allowable range for the floor reaction force horizontal component and generating a movement of a gait (foot position/posture trajectory and body position/posture trajectory) in which the desired floor reaction force ZMP trajectory and the desired floor reaction force vertical component trajectory are satisfied, and the floor reaction force horizontal component falls within the allowable range for the floor reaction force horizontal component.

According to this technique, with a precise dynamics model, the dynamical equilibrium condition (the moment produced about the desired ZMP by the resultant of gravity and the inertial force is 0) can be precisely satisfied and the floor reaction force horizontal component can be made to always fall within allowable range for the floor reaction force horizontal component. However, such a precise dynamics model requires more calculation for solving equations of motion. In addition, such a precise dynamics model has a strong nonlinearity. Therefore, when searching for a gait parameter that satisfies a normal gait boundary requirement (that equal body position/velocity is provided at the start and end of the gait, for example) described in Japanese Patent Application No. 2000-352011 previously proposed by the applicants, that is, a gait parameter that enables the robot to continuously move stably, the convergence coefficient is reduced and the number of searchings increases. Thus, the total calculation amount is enormous, so that a high-speed computer or a dedicated IC for dynamics model calculation is required. In addition, it is difficult to generate a gait in real time when the robot is moving.

However, with a simple approximate dynamics model, there arise problems that the dynamical equilibrium condition cannot be satisfied with an adequate precision although the amount of calculation is reduced, the ZMP of the actually generated gait is out of the possible area thereof, or the floor reaction force horizontal component is out of the allowable range of the floor reaction force horizontal component (friction force limit), for example. Thus, there is a high possibility that an actual robot moves unstably or slips when it is made to move by following the generated gait.

Therefore, an object of the present invention is to overcome the disadvantages of the techniques previously proposed and provide a gait generation device that can generate various desired gaits for normal walking as well as running, walking on a floor surface of a low friction coefficient and the like with a relatively small amount of calculation. In addition, an object of the present invention is to provide a gait generation device that can generate a gait that precisely satisfies the dynamical equilibrium condition with the ZMP, the floor reaction force horizontal component or the like falling within appropriate allowable ranges.

DISCLOSURE OF THE INVENTION

According to a first implementation of the present invention, there is provided a gait generation device for generating a desired gait for a legged mobile robot that moves by operating a plurality of legs extending from a body, comprising: allowable range setting means for setting an allowable range of a limitation-target quantity, the limitation-target quantity being at least any of a horizontal component of a translation floor reaction force or a floor-surface-parallel component of a translation floor reaction force applied to the robot or a horizontal component of a total center-of-gravity acceleration or a floor-surface-parallel component of a total center-of-gravity acceleration of the robot and a horizontal component of a floor reaction force moment or a ZMP; provisional instantaneous value determining means for determining provisional instantaneous values of a desired movement and a desired floor reaction force of the desired gait; model calculating means that inputs at least the provisional instantaneous value of the desired movement to a dynamics model to determine a model floor reaction force instantaneous value as an output of the dynamics model, the dynamics model representing a relationship between a movement and a floor reaction force of the robot; and desired instantaneous value determining means for correcting the provisional instantaneous value of the desired movement to determine a desired instantaneous value of the desired movement based on at least the difference between the model floor reaction force instantaneous value and the provisional instantaneous value of the desired floor reaction force and the allowable range, wherein the desired instantaneous value determining means corrects the provisional instantaneous value of the desired movement in such a manner that the limitation-target quantity which corresponds to the instantaneous value of the floor reaction force substantially in balance with, in the dynamics model, the resultant force of an inertial force and gravity applied to the robot caused by the desired instantaneous value of the desired movement falls within the allowable range.

In the present invention (including the implementations other than the first implementation), the horizontal component of the translation floor reaction force or the floor-surface-parallel component of the translation floor reaction force (specifically, the component parallel to the floor surface) and the horizontal component of the total center-of-gravity acceleration or the floor-surface-parallel component of the total center-of-gravity acceleration of the robot are exactly or approximately proportional to the friction force. Thus, in the following description, these are sometimes collectively referred to as a friction force component, for convenience.

According to the first implementation, the model calculating means only determines the model floor reaction force instantaneous value (instantaneous value of the floor reaction force which corresponds to the provisional instantaneous value of the desired movement and is in balance with the resultant force of the inertial force and gravity on the dynamics model) from at least the input provisional instantaneous value of the desired movement (instantaneous value of the position/posture or the like of an end portion of a leg). Therefore, even if the dynamics model is a relatively precise one, the model floor reaction force instantaneous value can be calculated with a relatively small amount of calculation. In this case, the difference between the model floor reaction force instantaneous value and the provisional instantaneous value of the desired floor reaction force represents an error of a provisional instantaneous value for the desired movement and the desired floor reaction force input to the dynamics model with respect to dynamical equilibrium conditions thereof (conditions concerning a balance between the resultant force of the inertial force and gravity caused by the movement and the floor reaction force) (this error is referred to as a provisional instantaneous value error, hereinafter). However, in sixteenth to twenty-second implementations which are based essentially on the first implementation, the desired movement input to the dynamics model is one for which the provisional instantaneous value for the desired movement has been corrected, and therefore, the error is not an error in a strict sense. However, it is referred to as an error for the sake of convenience. In the first implementation, based on at least the provisional instantaneous value error and the allowable range of the limitation-target quantity, the provisional instantaneous value of the desired movement is corrected, and the desired instantaneous value of the desired movement is determined. The provisional instantaneous value of the desired movement is corrected in such a manner that the limitation-target quantity which corresponds to the instantaneous value of the floor reaction force substantially in balance with, on the dynamics model, the resultant force of the inertial force and gravity applied to the robot caused by the desired instantaneous value of the desired movement falls within the allowable range. Thus, the desired instantaneous value of the desired gait that allows the limitation-target quantity (the friction force component, the ZMP or the horizontal component of the floor reaction force's moment) to fall within the allowable range can be calculated with a small amount of calculation without a calculation in a searching manner or the like. In addition, since the desired instantaneous value of the desired gait which allows the limitation-target quantity, such as the friction force component, to fall within the allowable range can be determined, a variety of desired gaits not only for normal walking but also for running, walking on a floor of a low friction coefficient or the like can be adequately generated.

In principle, the dynamics model used is preferably a one with a high approximation precision. This allows a desired gait that precisely satisfies the dynamical equilibrium condition to be generated.

In principle, in the first implementation, the provisional instantaneous value is preferably corrected in such a manner that the provisional instantaneous value error is stabilized as highly as possible or brought close to 0 as precisely as possible (the variation of the error is reduced to a minimum) while keeping the limitation-target quantity falling within the allowable range.

In the first implementation, preferably, model floor reaction force instantaneous values determined by the model calculating means include at least a model value of the horizontal component of the floor reaction force moment or the ZMP, provisional instantaneous values of the desired floor reaction force determined by the provisional instantaneous value determining means include at least a provisional desired instantaneous value of the horizontal component of the floor reaction force moment or the ZMP, and the difference used by the desired instantaneous value determining means is the difference between the model value of the horizontal component of the floor reaction force moment or the ZMP and the provisional desired instantaneous value of the horizontal component of the floor reaction force moment or the ZMP (second implementation). This increases the reliability of the provisional instantaneous value error as an indicator of the error with respect to the dynamical equilibrium condition. This allows the provisional desired instantaneous value to be adequately corrected and a desired gait that precisely satisfies the dynamical equilibrium condition to be generated.

In addition, in the first and second implementations, preferably, the desired instantaneous value determining means determines, as the desired instantaneous value of the desired floor reaction force, the instantaneous value of the floor reaction force substantially in balance with, in the dynamics model, the resultant force of an inertial force and gravity applied to the robot caused by the desired instantaneous value of the desired movement (third implementation). This allows a desired instantaneous value of the desired floor reaction force that precisely satisfies the dynamical equilibrium condition to be determined for the desired instantaneous value of the desired movement.

In the first to third implementations, preferably, the desired instantaneous value determining means comprises: a perturbation model that represents a relationship between a perturbation movement and a perturbation floor reaction force of the robot; means for determining a perturbation model manipulating quantity for manipulating the perturbation floor reaction force of the perturbation model based on at least the difference and the allowable range; means for determining a correction quantity for the desired movement by inputting the determined perturbation model manipulating quantity to the perturbation model; and means for determining a desired instantaneous value of the desired movement by correcting the provisional instantaneous value of the desired movement by the correction quantity (fourth implementation).

Since the linearity of the relationship between the perturbation movement of the robot and the perturbation floor reaction force is high, using the perturbation model allows an adequate correction quantity for the desired movement to be readily calculated and the provisional instantaneous value to be readily corrected by the correction quantity. In addition, since a quantity for manipulating the perturbation floor reaction force of the perturbation model is determined as the perturbation model manipulating quantity, an adequate perturbation manipulating quantity for limiting the limitation-target quantity intimately associated with the floor reaction force within the allowable range can be determined.

Furthermore, in the fourth implementation using the perturbation model, preferably, the gait generation device further comprises means for determining a required value of the perturbation model manipulating quantity in accordance with at least a state quantity of the perturbation model, wherein the means for determining a perturbation model manipulating quantity determines the perturbation model manipulating quantity to be input to the perturbation model based on the difference (provisional instantaneous value error), the allowable range and the required value (fifth implementation).

This allows the perturbation model manipulating quantity to be determined taking into consideration not only the provisional instantaneous value error and the allowable range but also a required value of a state quantity of the perturbation model (such as position or rotation angle of a material particle or rotatable body, which is an element of the perturbation model, or variation rate thereof). Thus, the stability of the behavior of the perturbation model is enhanced, and therefore, an inadequate correction quantity for the desired movement is prevented from being determined.

In this case, in particular, preferably, the gait generation device further comprises means for successively determining the required value of the perturbation model manipulating quantity according to a feedback control law in accordance with a deviation of the state quantity of the perturbation model from a desired value of the state quantity (sixth implementation).

This allows the perturbation model manipulating quantity to be determined so as to generally keep the state quantity of the perturbation model in the vicinity of a certain desired value. Thus, the stability of the behavior of the perturbation model can be enhanced with a higher reliability.

In the fourth to sixth implementations, preferably, the perturbation model is a model that involves a plurality of perturbation movements having different perturbation ratios between the horizontal component of the translation floor reaction force and the horizontal component of the floor reaction force moment to the perturbation movement, the perturbation model manipulating quantity comprises a plurality of kinds of manipulating quantity associated with the respective perturbation movements, and the correction quantity for the desired movement comprises a plurality of kinds of correction quantity associated with the respective perturbation movements (seventh implementation).

In this case, a plurality of kinds of perturbation movement of the robot can be manipulated to correct the provisional instantaneous value of the desired movement. Thus, even when manipulating only one perturbation model cannot make the limitation-target quantity fall within the allowable range, a correction quantity for the desired movement that can produce a floor reaction force that allows the limitation-target quantity to fall within the allowable range can be determined by manipulating another perturbation model or manipulating a plurality of perturbation models in a synthesized manner. Thus, the provisional instantaneous value of the desired movement that allows the limitation-target quantity to fall within the allowable range can be determined regardless of the width of the allowable range of the limitation-target quantity or the like.

Furthermore, in the seventh implementation, preferably, for example, the plurality of perturbation movements comprise a translation movement of the body of the robot and a posture varying movement in which the posture of a predetermined part of the robot is varied while keeping the center of gravity of the robot substantially unchanged (eighth implementation). In this case, since the translation floor reaction force can be manipulated by the body translation movement and the floor reaction force's moment can be manipulated by the posture varying movement, a desired instantaneous value of the desired movement that can produce a desired floor reaction force (a floor reaction force that allows the limitation-target quantity to fall within the allowable range) can be determined by synthesizing the movements.

Alternatively, in the seventh implementation, preferably, the plurality of perturbation movements comprise a translation horizontal movement of the body of the robot and a posture varying movement of the body of the robot (ninth implementation). Since the body of the robot generally has a larger mass than other parts including a leg, the variation of the floor reaction force is more sensitive to the perturbation movements of the body. Therefore, the correction quantities of the provisional instantaneous values of the desired movement of the robot for the perturbation movements can be reduced, and the stability of the posture of the robot moving with the desired gait can be improved.

In addition, in the seventh to ninth implementations, the limitation-target quantity is preferably composed of a friction force component applied to the robot and a horizontal component of a floor reaction force moment or ZMP (tenth implementation).

In the seventh to ninth implementations, since a plurality of perturbation models are used, even when both of the friction force component and the horizontal component of the floor reaction force's moment or ZMP are limitation-target quantities, the correction quantity of the provisional instantaneous value of the desired movement that allows the limitation-target quantities to fall within the allowable ranges can be determined with reliability. As a result, the desired gait for a wide variety of conditions, such as running, walking on a floor of a low friction coefficient or the like, can be adequately generated.

More specifically, in the fourth implementation using the perturbation model, for example, the perturbation model manipulating quantity comprises a first manipulating quantity component that is determined according to at least the difference (provisional instantaneous value error) and a second manipulating quantity component that is determined based on at least the allowable range, and the means for determining a perturbation model manipulating quantity comprises: means for determining an estimated value of the limitation-target quantity corresponding to the desired instantaneous value of the desired movement that is determined if only the first manipulating quantity component is input to the perturbation model; means for determining a limited limitation-target quantity by comparing the determined estimated value of the limitation-target quantity with the allowable range and limiting the limitation-target quantity within the allowable range based on the result of comparison; and means for determining the second manipulating quantity component based on at least the limited limitation-target quantity (eleventh implementation).

That is, in the eleventh implementation, when determining the perturbation model manipulating quantity, first, there is determined an estimated value of the limitation-target quantity corresponding to the desired instantaneous value of the desired movement that is determined if only the first manipulating quantity component which takes into consideration only the provisional instantaneous value error without considering the allowable range (assuming that there is no allowable range of the limitation-target quantity) is input to the perturbation model (such a first manipulating quantity component is determined, in principle, so as to stabilize the provisional instantaneous value error or bring the same close to 0). Then, after the limited limitation-target quantity, which is obtained by limiting the estimated value of the limitation-target quantity within the allowable range, is determined, the second manipulating quantity component is determined based on at least the limited limitation-target quantity. Thus, the second manipulating quantity component required for making the limitation-target quantity fall within the allowable range is adequately determined. Since the second manipulating quantity component thus determined and the first manipulating quantity component are input to the perturbation model, a correction quantity of the provisional instantaneous value of the desired movement that allows the limitation-target quantity to fall within the allowable range while stabilizing the provisional instantaneous value error or bringing the same to 0, that is, an adequate correction quantity, can be output from the perturbation model.

In the case of determining the limited limitation-target quantity, in principle, a value which is as close to the estimated value of the limitation-target quantity as possible and falls within the allowable range is preferably determined as the limited limitation-target quantity.

In particular, in the fifth and sixth implementations using the required value for the perturbation model, the perturbation model manipulating quantity comprises a first manipulating quantity component that is determined according to at least the difference and a second manipulating quantity component that is determined based on at least the required value and the allowable range, and the means for determining a perturbation model manipulating quantity comprises: means for determining an estimated value of the limitation-target quantity corresponding to the desired instantaneous value of the desired movement that is determined if the second manipulating quantity component which is made to agree with the required value and the first manipulating quantity component are input to the perturbation model; means for determining a limited limitation-target quantity by comparing the determined estimated value of the limitation-target quantity with the allowable range and limiting the limitation-target quantity within the allowable range based on the result of comparison; and means for determining the second manipulating quantity component based on at least the limited limitation-target quantity (twelfth implementation).

That is, in the twelfth implementation, when determining the perturbation model manipulating quantity, first, there is determined an estimated value of the limitation-target quantity corresponding to the desired instantaneous value of the desired movement that is determined assuming that the first manipulating quantity component which takes into consideration only the provisional instantaneous value error (the first manipulating quantity component is determined, in principle, so as to stabilize the provisional instantaneous value error or bring the same close to 0) and the second manipulating quantity component which is made to agree with the required value without considering the allowable range (assuming that there is no allowable range of the limitation-target quantity) are input to the perturbation model. Then, after the limited limitation-target quantity, which is obtained by limiting the estimated value of the limitation-target quantity within the allowable range, is determined, the second manipulating quantity component is determined based on at least the limited limitation-target quantity. Thus, the second manipulating quantity component required for making the limitation-target quantity fall within the allowable range and stabilizing the perturbation model is adequately determined. Since the second manipulating quantity component thus determined and the first manipulating quantity component are input to the perturbation model, a correction quantity of the provisional instantaneous value of the desired movement that allows the limitation-target quantity to fall within the allowable range while stabilizing the provisional instantaneous value error and assuring the stability of the perturbation model, that is, an adequate correction quantity, can be output from the perturbation model.

In the eleventh or twelfth implementation, preferably, when the limitation-target quantity comprises the friction force component, the means for determining a perturbation model manipulating quantity determines the estimated value of the limitation-target quantity using, as the model floor reaction force instantaneous value, the instantaneous value of the horizontal component of the translation floor reaction force or the instantaneous value of the floor-surface-parallel component of the translation floor reaction force determined by the dynamics model (thirteenth implementation). In this case, an estimated value of the friction force component as the limitation-target quantity (limitation-target quantity which takes into consideration only the provisional instantaneous value error or the required value neglecting the allowable range) can be adequately determined, and thus, a reliable limited limitation-target quantity (the friction force component limited to the allowable range) can be determined.

In the twelfth implementation or the thirteenth implementation based essentially thereon, preferably, the perturbation model is a model that involves a translation movement of the body of the robot and a posture varying movement of the body of the robot, and when the limitation-target quantity comprises the friction force component applied to the robot and the horizontal component of the floor reaction force moment or the ZMP, the means for determining a limited limitation-target quantity determines each limited limitation-target quantity in such a manner that the variation of a manipulation quantity component of the second manipulating quantity components which is associated with the body posture varying movement from the required value is reduced to a minimum, and the variation of the limited limitation-target quantity from the estimated value is reduced to a minimum (fourteenth implementation).

As described above concerning the tenth implementation, when the limitation-target quantity comprises the friction force component and the horizontal component of the floor reaction force's moment or the ZMP, it is preferable that a perturbation model involving a plurality of perturbation movements, such as a model involving a body translation movement and a body posture varying movement, is used. However, as the perturbation of the body posture varying movement is increased to allow the limitation-target quantity to fall within the allowable range, the body posture tends to vary more significantly. Therefore, it is preferable that, of the second manipulating quantity components, a manipulating quantity component associated with the body posture varying movement is as close to the required value as possible. Therefore, in the fourteenth implementation, each limited limitation-target quantity is determined in such a manner that the variation of a manipulation quantity component of the second manipulating quantity components which is associated with the body posture varying movement from the required value is reduced to a minimum, and the variation of the limited limitation-target quantity from the estimated value is reduced to a minimum. Thus, the desired instantaneous value of the desired movement that can make the limitation-target quantity fall within the allowable range can be determined while reducing the variation of the body posture varying movement to a minimum and assuring the highest possible stability of the perturbation model.

In the eleventh to fourteenth implementations, the desired instantaneous value determining means determines the floor reaction force associated with the limited limitation-target quantity as the desired instantaneous value of the desired floor reaction force (fifteenth implementation). This allows a desired instantaneous value of the desired floor reaction force that is in balance with the resultant force of the inertial force and gravity produced on the dynamics model to be determined for the desired instantaneous value of the desired movement.

In the first to tenth implementations, the desired instantaneous value determining means comprises: means for additionally inputting a correction quantity for correcting the provisional instantaneous value of the desired movement to the dynamics model; and means for determining the correction quantity in such a manner that the limitation-target quantity associated with the model floor reaction force instantaneous value is substantially kept at a value within the allowable range and the difference is stabilized (sixteenth implementation).

In this case, besides the provisional instantaneous value of the desired movement, the correction quantity for correcting the provisional value is additionally input to the dynamics model. Therefore, the model floor reaction force instantaneous value, which is output from the dynamics model, satisfies the dynamical equilibrium condition for the corrected desired movement on the dynamics model. Thus, since the correction quantity is determined in such a manner that the limitation-target quantity associated with the model floor reaction force instantaneous value is substantially kept at a value within the allowable range and the difference is stabilized, the desired instantaneous value of the desired movement which can precisely satisfy the dynamical equilibrium condition and allow the limitation-target quantity to fall within the allowable range can be determined. In this case, the provisional instantaneous value of the desired movement which is corrected by the correction quantity, that is, the desired instantaneous value of the desired movement may be input to the dynamics model.

In the fourth implementation using the perturbation model, as in the sixteenth implementation, when the desired instantaneous value determining means comprises means for additionally inputting a correction quantity for the desired movement to the dynamics model, the perturbation model manipulating quantity comprises a first manipulating quantity component that is determined according to at least the difference (provisional instantaneous value error) and a second manipulating quantity component that is determined based on at least the allowable range. In addition, the means for determining a perturbation model manipulating quantity comprises: means for determining an estimated value of the limitation-target quantity corresponding to the model floor reaction force instantaneous value that is output from the dynamics model if only the first manipulating quantity component is input to the perturbation model; means for determining a limited limitation-target quantity by comparing the determined estimated value of the limitation-target quantity with the allowable range and limiting the limitation-target quantity within the allowable range based on the result of comparison; and means for determining the second manipulating quantity component based on at least the limited limitation-target quantity (seventeenth implementation).

Thus, as in the eleventh implementation, the second manipulating quantity component required for making the limitation-target quantity fall within the allowable range is adequately determined. Since the second manipulating quantity component thus determined and the first manipulating quantity component are input to the perturbation model, a correction quantity of the provisional instantaneous value of the desired movement that allows the limitation-target quantity, which corresponds to the model floor reaction force instantaneous value that is output from the dynamics model, to fall within the allowable range while stabilizing the provisional instantaneous value error, that is, an adequate correction quantity can be output from the perturbation model.

In particular, in the fifth and sixth implementations using the required value for the perturbation model, as in the sixteenth implementation, when the desired instantaneous value determining means comprises means for additionally inputting a correction quantity for the desired movement to the dynamics model, the perturbation model manipulating quantity comprises a first manipulating quantity component that is determined according to at least the difference and a second manipulating quantity component that is determined based on at least the required value and the allowable range. In addition, the means for determining a perturbation model manipulating quantity comprises: means for determining an estimated value of the limitation-target quantity corresponding to the model floor reaction force instantaneous value that is output from the dynamics model if the second manipulating quantity component which is made to agree with the required value and the first manipulating quantity component are input to the perturbation model; means for determining a limited limitation-target quantity by comparing the determined estimated value of the limitation-target quantity with the allowable range and limiting the limitation-target quantity within the allowable range based on the result of comparison; and means for determining the second manipulating quantity component based on at least the limited limitation-target quantity. (eighteenth implementation).

Thus, as in the twelfth implementation, the second manipulating quantity component required for making the limitation-target quantity fall within the allowable range and stabilizing the perturbation model is adequately determined. Since the second manipulating quantity component thus determined and the first manipulating quantity component are input to the perturbation model, a correction quantity of the provisional instantaneous value of the desired movement that allows the limitation-target quantity to fall within the allowable range while stabilizing the provisional instantaneous value error and assuring the stability of the perturbation model, that is, an adequate correction quantity, can be output from the perturbation model.

In the seventeenth or eighteenth implementation, preferably, when the second manipulating quantity components include the horizontal component of the floor reaction force's moment or the ZMP and the differences (provisional instantaneous value errors) include at least the difference concerning the horizontal component of the floor reaction force moment or ZMP, the means for determining a perturbation model manipulating quantity comprises means for determining the first manipulating quantity component in such a manner that the horizontal component of the floor reaction force moment or ZMP concerning the difference is substantially equal to the horizontal component of the floor reaction force moment or ZMP of the second manipulating quantity components (nineteenth implementation).

This allows a desired instantaneous value for the desired movement that suitably stabilizes the provisional instantaneous value error of the horizontal component of the floor reaction force's moment or ZMP to be determined.

In the seventeenth to nineteenth implementations, preferably, as in the thirteenth implementation, when the limitation-target quantity comprises the friction force component, the means for determining a perturbation model manipulating quantity determines the estimated value of the limitation-target quantity using, as the model floor reaction force instantaneous value, the instantaneous value of the horizontal component of the translation floor reaction force or the instantaneous value of the floor-surface-parallel component of the translation floor reaction force determined by the dynamics model (twentieth implementation). In this case, as in the thirteenth implementation, an estimated value of the friction force component as the limitation-target quantity (limitation-target quantity which takes into consideration only the provisional instantaneous value error or the required value neglecting the allowable range) can be adequately determined, and thus, a reliable limited limitation-target quantity (the friction force component limited to the allowable range) can be determined.

In the eighteenth implementation or the nineteenth to twentieth implementations based essentially thereon, preferably, as in the fourteenth implementation, when the perturbation model is a model that involves a translation movement of the body of the robot and a posture varying movement of the body of the robot, and the limitation-target quantity comprises the friction force component and the horizontal component of the floor reaction force moment or the ZMP, the means for determining a limited limitation-target quantity determines each limited limitation-target quantity in such a manner that the variation of a manipulation quantity component of the second manipulating quantity components which is associated with the body posture varying movement from the required value is reduced to a minimum, and the variation of the limited limitation-target quantity from the estimated value is reduced to a minimum (twenty-first implementation).

Thus, as in the fourteenth implementation, the desired instantaneous value of the desired movement that can make the limitation-target quantity fall within the allowable range can be determined while reducing the variation of the body posture varying movement to a minimum and assuring the highest possible stability of the perturbation model.

In the sixteenth to twenty-first implementations, the desired instantaneous value determining means determines the model floor reaction force instantaneous value as the desired instantaneous value of the desired floor reaction force (twenty-second implementation). That is, as described above, in the sixteenth to twenty-first implementations, besides the provisional instantaneous value of the desired movement, the correction quantity for correcting the instantaneous provisional value is additionally input to the dynamics model. Therefore, the model floor reaction force instantaneous value, which is output from the dynamics model, satisfies the dynamical equilibrium condition for the corrected desired movement on the dynamics model. Therefore, since the model floor reaction force instantaneous value is determined as the desired instantaneous value of the desired floor reaction force, a desired instantaneous value of the desired floor reaction force that is in balance with the resultant force of the inertial force and gravity produced on the dynamics model can be determined for the desired instantaneous value of the desired movement.

According to a twenty-third implementation of the present invention, there is provided a gait generation device for generating a desired gait for a legged mobile robot that moves by operating a plurality of legs extending from a body, characterized in that the gait generation device comprises: allowable range setting means for setting an allowable range of a limitation-target quantity, the limitation-target quantity being at least any of a friction force component applied to the robot and a horizontal component of a floor reaction force's moment or a ZMP; provisional instantaneous value of the desired floor reaction force determining means for successively determining, of a desired movement and a desired floor reaction force of the desired gait, at least a provisional instantaneous value of the desired floor reaction force; first model calculating means that inputs at least the provisional instantaneous value of the desired floor reaction force to a first dynamics model to determine a provisional instantaneous value of the desired movement as an output of the first dynamics model, the first dynamics model representing a relationship between a movement and a floor reaction force of the robot; and second model calculating means that inputs at least the provisional instantaneous value of the desired movement to a second dynamics model to determine a model floor reaction force instantaneous value as an output of the second dynamics model, the second dynamics model representing a relationship between a movement and a floor reaction force of the robot; and first model input correcting means that determines a correction quantity of the desired floor reaction force based on at least the difference between the model floor reaction force instantaneous value and the provisional instantaneous value of the desired floor reaction force and the allowable range in such a manner that the limitation-target quantity corresponding to the model floor reaction force instantaneous value that is output from the second dynamics model falls within the allowable range and additionally inputs the determined correction quantity to the first dynamics model, wherein the desired instantaneous value of the desired movement is determined based on at least the input to the second dynamics model.

In the twenty-third implementation, two dynamics models, that is, the first dynamics model which receives the provisional instantaneous value of the desired floor reaction force and outputs the provisional instantaneous value for the desired movement and the second dynamics model which receives the output of the first dynamics model (provisional instantaneous value for the desired movement) and outputs the model floor reaction force instantaneous value are used. As described above concerning the first implementation, the difference between the model floor reaction force instantaneous value output from the second dynamics model and the provisional instantaneous value of the desired floor reaction force input to the first dynamics model is determined as a provisional instantaneous value error that represents a deviation of a provisional instantaneous value for the desired movement and the desired floor reaction force input to the second model from the dynamical equilibrium conditions. However, in twenty-seventh to thirty-ninth implementations which are based essentially on the twenty-third implementation, the desired movement input to the second model is one for which the provisional instantaneous value for the desired movement has been corrected, and therefore, the error is not an error in a strict sense. However, it is referred to as an error for the sake of convenience. Since a correction quantity of the desired floor reaction force is determined based on at least the provisional instantaneous value error and the allowable range of the limitation-target quantity in such a manner that the limitation-target quantity (the friction force component or the ZMP or the horizontal component of the floor reaction force's moment) corresponding to the model floor reaction force instantaneous value that is output from the second dynamics model falls within the allowable range, and the determined correction quantity is additionally input to the first dynamics model, an instantaneous value for the desired movement that stabilizes the provisional instantaneous value error and allows the limitation-target quantity to fall within the allowable range can be output from the first dynamics model. Thus, by determining the desired instantaneous value for the desired movement based on the input to the second dynamics model, the desired instantaneous value of the desired gait that allows the limitation-target quantity to fall within the allowable range can be obtained. In this case, since the output of the first dynamics model is manipulated by the correction quantity of the desired floor reaction force, the first dynamics model is not required to have a quite high approximation precision. Thus, the amount of calculation of the first model calculation means that performs calculation for the first dynamics model can be reduced. As with the model calculating means in the first implementation, the second model calculating means for performing calculation for the second dynamics model only determines the model floor reaction force instantaneous value (instantaneous value of the floor reaction force which corresponds to the provisional instantaneous value of the desired movement and is in balance with the resultant force of the inertial force and gravity on the dynamics model) from at least the input provisional instantaneous value of the desired movement (instantaneous value of the position/posture or the like of an end portion of a leg). Therefore, even if the second dynamics model is a relatively precise one, the model floor reaction force instantaneous value can be calculated with a relatively small amount of calculation. As a result, according to the twenty-third implementation, as in the first implementation, the desired instantaneous value of the desired gait that allows the limitation-target quantity to fall within the allowable range can be determined with a relatively small amount of calculation. In addition, since the desired instantaneous value of the desired gait which allows the limitation-target quantity, such as the friction force component, to fall within the allowable range can be determined, a variety of desired gaits not only for normal walking but also for running, walking on a floor of a low friction coefficient or the like can be adequately generated.

While, in principle, the first dynamics model may be one with a relatively low approximation precision, the second dynamics model is preferably one with a relatively high approximation precision. This allows a desired gait that precisely satisfies the dynamical equilibrium condition to be generated.

In the twenty-third implementation, preferably, model floor reaction force instantaneous values determined by the second model calculating means include at least a model value of the horizontal component of the floor reaction force moment or the ZMP, provisional instantaneous values of the desired floor reaction force determined by the provisional instantaneous value determining means include at least a provisional desired instantaneous value of the horizontal component of the floor reaction force moment or the ZMP, and the difference used by the first model input correcting means is the difference between the model value of the horizontal component of the floor reaction force's moment or the ZMP and the provisional desired instantaneous value of the horizontal component of the floor reaction force moment or the ZMP (twenty-fourth implementation). As in the second implementation, this increases the reliability of the provisional instantaneous value error as an indicator of the error with respect to the dynamical equilibrium condition, and therefore, a desired gait that precisely satisfies the dynamical equilibrium condition can be generated.

In the twenty-third and twenty-fourth implementations, the desired instantaneous value determining means determines the model floor reaction force instantaneous value output from the second dynamics model as the desired instantaneous value of the desired floor reaction force (twenty-fifth implementation). That is, since an adequate desired instantaneous value for the desired movement that allows the limitation-target quantity to fall within the allowable range is input to the second dynamics model, as in the twenty-second implementation, the model floor reaction force instantaneous value, which is output from the second dynamics model, satisfies the dynamical equilibrium condition for the desired instantaneous value for the desired movement on the second dynamics model. Therefore, since the model floor reaction force instantaneous value is determined as the desired instantaneous value of the desired floor reaction force, a desired instantaneous value of the desired floor reaction force that is in balance with the resultant force of the inertial force and gravity produced on the second dynamics model can be determined for the desired instantaneous value of the desired movement.

In the twenty-third to twenty-fifth implementations, preferably, the gait generation device further comprises means for determining a required value of the correction quantity of the desired floor reaction force, wherein the correction quantity of the desired floor reaction force determined by the first model input correcting means comprises a first correction quantity component that is determined according to at least the difference and a second correction quantity component that is determined based on at least the required value and the allowable range; the first model input correcting means comprises: means for determining an estimated value of the limitation-target quantity corresponding to the model floor reaction force instantaneous value that is output from the second dynamics model if the second correction quantity component which is made to agree with the required value and the first correction quantity component are additionally input to the first dynamics model; means for determining a limited limitation-target quantity by comparing the determined estimated value of the limitation-target quantity with the allowable range and limiting the limitation-target quantity within the allowable range based on the result of comparison; and means for determining the second correction quantity component based on at least the limited limitation-target quantity (twenty-sixth implementation).

That is, in the twenty-sixth implementation, when determining the correction quantity of the desired floor reaction force input to the first dynamics model, first, there is determined an estimated value of the limitation-target quantity corresponding to the desired instantaneous value for the desired movement that is determined assuming that the first manipulating quantity component which takes into consideration only the provisional instantaneous value error (the first manipulating quantity component is determined, in principle, so as to stabilize the provisional instantaneous value error) and the second manipulating quantity component which is made to agree with the required value without considering the allowable range (assuming that there is no allowable range of the limitation-target quantity) are additionally input to the first dynamics model. Then, after the limited limitation-target quantity, which is obtained by limiting the estimated value of the limitation-target quantity within the allowable range, is determined, the second correction quantity component is determined based on at least the limited limitation-target quantity. Thus, the second correction quantity component required for making the limitation-target quantity fall within the allowable range is adequately determined. Since the second correction quantity component thus determined and the first correction quantity component are additionally input to the first dynamics model, an instantaneous value for the desired movement that stabilizes the provisional instantaneous value error and allows the limitation-target quantity to fall within the allowable range can be input from the first dynamics model to the second dynamics model.

In the twenty-third to twenty-fifth implementations, the gait generation device further comprises second model input correcting means that determines a correction quantity for the desired movement based on at least the difference (provisional instantaneous value error) and the allowable range, and additionally inputs the determined correction quantity to the second dynamics model (twenty-seventh implementation). In this case, a desired gait with a higher dynamical precision can be generated with an enhanced stability of the first dynamics model.

In the twenty-seventh implementation, preferably, the gait generation device further comprises: a perturbation model that represents a relationship between a perturbation movement and a perturbation floor reaction force of the robot; means for determining a floor reaction force manipulating quantity based on at least the difference and the allowable range; and distributor means for separating the determined floor reaction force manipulating quantity into a correction quantity of the desired floor reaction force that is to be input to the first dynamics model and a perturbation model manipulating quantity that is to be input to the perturbation model, and the second model input correcting means determines the correction quantity for the desired movement by inputting the perturbation model manipulating quantity to the perturbation model (twenty-eighth implementation).

In this case, since the floor reaction force manipulating quantity is separated into the correction quantity of the desired floor reaction force that is to be input to the first dynamics model and the perturbation model manipulating quantity that is to be input to the perturbation model, the first dynamics model and the perturbation model can receive inputs suitable for their respective characteristics. Thus, a desired instantaneous value for the desired movement that stabilizes the provisional instantaneous value error and allows the limitation-target quantity to fall within the allowable range can be determined while preventing the first dynamics model and the perturbation model from being unstable. In addition, using the perturbation model facilitates calculation of the correction quantity for the desired movement that is additionally input to the second dynamics model.

When the floor reaction force manipulating quantity is separated into the correction quantity of the desired floor reaction force to be input to the first dynamics model and the perturbation model manipulating quantity to be input to the perturbation model, in principle, it is preferable that a general variation of the floor reaction force manipulating quantity (variation approximate to a direct current or the like) is distributed to the first dynamics model, and a local variation (minor variation or the like) is distributed to the perturbation model.

Thus, in the twenty-eighth implementation using the perturbation model, preferably, the gait generation device further comprises means for determining a required value of the floor reaction force manipulating quantity in accordance with at least a state quantity of the perturbation model, wherein the means for determining a floor reaction force manipulating quantity determines the floor reaction force manipulating quantity to be supplied to the distributor means based on the difference (provisional instantaneous value error), the allowable range and the required value (twenty-ninth implementation).

In this case, as in the fifth implementation, the floor reaction force manipulating quantity to be input to the distributor means is determined taking into consideration not only the provisional instantaneous value error and the allowable range but also a required value of a state quantity of the perturbation model (such as position or rotation angle of a material particle or rotatable body, which is an element of the perturbation model, or variation rate thereof). Therefore, the stability of the behavior of the perturbation model is enhanced, and thus, an inadequate correction quantity for the desired movement can be prevented from being determined by the perturbation model.

Furthermore, in the twenty-ninth implementation, preferably, the gait generation device further comprises means for successively determining the required value of the floor reaction force manipulating quantity according to a feedback control law in accordance with a deviation of the state quantity of the perturbation model from a desired value of the state quantity (thirtieth implementation). In this case, as in the sixth implementation, the stability of the behavior of the perturbation model can be enhanced with a higher reliability.

In the twenty-eighth to thirtieth implementations, preferably, the perturbation model is a model that involves a plurality of perturbation movements having different perturbation ratios between the horizontal component of the translation floor reaction force and the horizontal component of the floor reaction force moment to the perturbation movement, the floor reaction force manipulating quantity comprises a plurality of kinds of manipulating quantity associated with the respective perturbation movements, and the correction quantity for the desired movement determined by the second model input correcting means comprises a plurality of kinds of correction quantity associated with the respective perturbation movements (thirty-first implementation).

In this case, as in the seventh implementation, since a plurality of kinds of perturbation movements of the robot can be manipulated to correct the provisional instantaneous value for the desired movement, the provisional instantaneous value for the desired movement that allows the limitation-target quantity to fall within the allowable range can be determined regardless of the width of the allowable range of the limitation-target quantity or the like.

Furthermore, in the thirty-first implementation, preferably, the plurality of perturbation movements comprise a translation movement of the body of the robot and a posture varying movement in which the posture of a predetermined part of the robot is varied while keeping the center of gravity of the robot substantially unchanged (thirty-second implementation). In this case, as in the eighth implementation, a desired instantaneous value for the desired movement that allows a preferred floor reaction force (a floor reaction force for which the limitation-target quantity falls within the allowable range) to be produced by combining the body translation movement and the posture varying movement can be determined.

Alternatively, in the thirty-first implementation, preferably, the plurality of perturbation movements comprise a translation horizontal movement of the body of the robot and a posture varying movement of the body of the robot (thirty-third implementation).

In this case, as in the ninth implementation, the correction quantities of the provisional instantaneous values for the desired movement can be reduced, and the stability of the posture of the robot moving with the desired gait can be improved.

In addition, the thirty-first to thirty-third implementations are suitable for a case where the limitation-target quantity is composed of a friction force component applied to the robot and a horizontal component of a floor reaction force moment or ZMP (thirty-fourth implementation).

In this case, as in the tenth implementation, the desired gait for a wide variety of conditions, such as running, walking on a floor of a low friction coefficient or the like, can be adequately generated.

More specifically, in the twenty-eighth implementation using the perturbation model, for example, the floor reaction force manipulating quantity comprises a first manipulating quantity component that is determined according to at least the difference and a second manipulating quantity component that is determined based on at least the allowable range, and the means for determining a floor reaction force manipulating quantity comprises: means for determining an estimated value of the limitation-target quantity corresponding to the model floor reaction force instantaneous value that is output from the second dynamics model if only the first manipulating quantity component is input to the distributor means; means for determining a limited limitation-target quantity by comparing the determined estimated value of the limitation-target quantity with the allowable range and limiting the limitation-target quantity within the allowable range based on the result of comparison; and means for determining the second manipulating quantity component based on at least the limited limitation-target quantity (thirty-fifth implementation).

That is, in the thirty-fifth implementation, when determining the floor reaction force manipulating quantity, first, there is determined an estimated value of the limitation-target quantity corresponding to the model floor reaction force instantaneous value that is output from the second dynamics model assuming that only the first manipulating quantity component which takes into consideration only the provisional instantaneous value error without considering the allowable range (assuming that there is no allowable range of the limitation-target quantity) is input to the distributor means (such a first manipulating quantity component is determined, in principle, so as to stabilize the provisional instantaneous value error). Then, after the limited limitation-target quantity, which is obtained by limiting the estimated value of the limitation-target quantity within the allowable range, is determined, the second manipulating quantity component is determined based on at least the limited limitation-target quantity. Thus, the second manipulating quantity component required for making the limitation-target quantity fall within the allowable range is adequately determined. Since the second manipulating quantity component thus determined and the floor reaction force manipulating quantity including the first manipulating quantity component are input to the distributor means and separated into the correction quantity of the desired floor reaction force to be input to the first dynamics model and the perturbation model manipulating quantity to be input to the perturbation model, a desired instantaneous value for the desired movement that allows the limitation-target quantity to fall within the allowable range while enhancing stability of the first dynamics model and the perturbation model and stabilizing the provisional instantaneous value error can be input to the second dynamics model.

In the case of determining the limited limitation-target quantity, in principle, a value which is as close to the estimated value of the limitation-target quantity as possible and falls within the allowable range is preferably determined as the limited limitation-target quantity.

In particular, in the twenty-ninth and thirtieth implementations using the required value for the perturbation model, the floor reaction force manipulating quantity comprises a first manipulating quantity component that is determined according to at least the difference and a second manipulating quantity component that is determined based on at least the required value and the allowable range, and the means for determining a floor reaction force manipulating quantity comprises: means for determining an estimated value of the limitation-target quantity corresponding to the model floor reaction force instantaneous value that is output from the second dynamics model if the second manipulating quantity component which is made to agree with the required value and the first manipulating quantity component are input to the distributor means; means for determining a limited limitation-target quantity by comparing the determined estimated value of the limitation-target quantity with the allowable range and limiting the limitation-target quantity within the allowable range based on the result of comparison; and means for determining the second manipulating quantity component based on at least the limited limitation-target quantity (thirty-sixth implementation).

That is, in the thirty-sixth implementation, when determining the floor reaction force manipulating quantity, first, there is determined an estimated value of the limitation-target quantity corresponding to the model floor reaction force instantaneous value that is output from the second dynamics model assuming that the first manipulating quantity component which takes into consideration only the provisional instantaneous value error (the first manipulating quantity component is determined, in principle, so as to stabilize the provisional instantaneous value error) and the second manipulating quantity component which is made to agree with the required value without considering the allowable range (assuming that there is no allowable range of the limitation-target quantity) are input to the distributor means. Then, after the limited limitation-target quantity, which is obtained by limiting the estimated value of the limitation-target quantity within the allowable range, is determined, the second manipulating quantity component is determined based on at least the limited limitation-target quantity. Thus, the second manipulating quantity component required for making the limitation-target quantity fall within the allowable range and stabilizing the perturbation model with reliability is adequately determined. Since the second manipulating quantity component thus determined and the floor reaction force manipulating quantity including the first manipulating quantity component are input to the distributor means and separated into the correction quantity of the desired floor reaction force to be input to the first dynamics model and the perturbation model manipulating quantity to be input to the perturbation model, a desired instantaneous value for the desired movement that allows the limitation-target quantity to fall within the allowable range while enhancing stability of the first dynamics model and the perturbation model and stabilizing the provisional instantaneous value error can be input to the second dynamics model.

In the thirty-fifth or thirty-sixth implementation, preferably, when the second manipulating quantity include the horizontal component of the floor reaction force moment or the ZMP and the differences (provisional instantaneous value errors) include at least the difference concerning the horizontal component of the floor reaction force moment or ZMP, and the means for determining a perturbation model manipulating quantity comprises means for determining the first manipulating quantity component in such a manner that the horizontal component of the floor reaction force moment or ZMP concerning the differences (provisional instantaneous value errors) is substantially equal to the horizontal component of the floor reaction force moment or ZMP of the second manipulating quantity (thirty-seventh implementation).

In this case, as in the nineteenth implementation, a desired instantaneous value for the desired movement that suitably stabilizes the provisional instantaneous value error of the horizontal component of the floor reaction force's moment or ZMP can be determined.

Furthermore, in the thirty-fifth to thirty-seventh implementations, preferably, when the limitation-target quantity comprises the friction force component, the means for determining a floor reaction force manipulating means determines the estimated value of the limitation-target quantity using, as the model floor reaction force instantaneous value, the instantaneous value of the horizontal component of the translation floor reaction force or the instantaneous value of the floor-surface-parallel component of the translation floor reaction force determined by the dynamics model (thirty-eighth implementation). In this case, as in the twentieth implementation, an estimated value of the friction force component as the limitation-target quantity (limitation-target quantity which takes into consideration only the provisional instantaneous value error or the required value neglecting the allowable range) can be adequately determined, and thus, a reliable limited limitation-target quantity (the friction force component limited to the allowable range) can be determined.

In the thirty-sixth implementation or the thirty-seventh or thirty-eighth implementation based essentially thereon, preferably, when the perturbation model is a model that involves a translation movement of the body of the robot and a posture varying movement of the body of the robot, and the limitation-target quantity comprises the friction force component and the horizontal component of the floor reaction force moment or the ZMP, the means for determining a limited limitation-target quantity determines each limited limitation-target quantity in such a manner that the variation of a manipulation quantity component of the second manipulating quantity components which is associated with the body posture varying movement from the required value is reduced to a minimum, and the variation of the limited limitation-target quantity from the estimated value is reduced to a minimum (thirty-ninth implementation). In this case, as in the fourteenth or twenty-first implementation, the desired instantaneous value of the desired movement that can make the limitation-target quantity fall within the allowable range can be determined while reducing the variation of the body posture varying movement to a minimum and assuring the highest possible stability of the perturbation model.

According to a fortieth implementation of the present invention, there is provided a gait generation device for generating a desired gait for a legged mobile robot that moves by operating a plurality of legs extending from a body, characterized in that the gait generation device comprises: allowable range setting means for setting an allowable range of a limitation-target quantity, the limitation-target quantity being at least any of a friction force component applied to the robot and a horizontal component of a floor reaction force moment or a ZMP; desired floor reaction force's provisional instantaneous value determining means for successively determining, of a desired movement and a desired floor reaction force of the desired gait, at least a provisional instantaneous value of the desired floor reaction force; first model calculating means that inputs at least the provisional instantaneous value of the desired floor reaction force to a first dynamics model to determine a first provisional instantaneous value of the desired movement as an output of the first dynamics model, the first dynamics model representing a relationship between a movement and a floor reaction force of the robot; second model calculating means that inputs at least the provisional instantaneous value of the desired floor reaction force to a second dynamics model, which represents a relationship between a movement and a floor reaction force of the robot, to determine a second provisional instantaneous value of the desired movement as an output of the second dynamics model in such a manner that the limitation-target quantity corresponding to the floor reaction force instantaneous value that is, in the second dynamics model, substantially in balance with the resultant force of the inertial force and center-of-gravity applied to the robot caused by the second provisional instantaneous value of the desired movement falls within the allowable range; manipulating quantity calculating means for determining the floor reaction force manipulating quantity based on at least the difference between the first provisional instantaneous value and the second provisional instantaneous value of the desired movement in such a manner that the difference is close to 0; and model input correcting means for additionally inputting the floor reaction force manipulating quantity to at least any one of the first dynamics model and the second dynamics model, wherein the second provisional instantaneous value of the desired movement is determined as the desired instantaneous value of the desired movement.

According to the fortieth implementation, the first dynamics model and the second dynamics model which receive the provisional instantaneous value of the desired floor reaction force and output the provisional instantaneous values for the desired movement (the first provisional instantaneous value and the second provisional instantaneous value, respectively) are used. In this case, the calculation for the second dynamics model takes into consideration the allowable range of the limitation-target quantity, and the second provisional instantaneous value for the desired movement is determined in such a manner that the limitation-target quantity which corresponds to the instantaneous value of the floor reaction force substantially in balance with, on the second dynamics model, the resultant force of the inertial force and gravity applied to the robot caused by the second provisional instantaneous value of the desired movement falls within the allowable range. And, the floor reaction force manipulating quantity is determined based at least on the difference between the first provisional instantaneous value and the second provisional instantaneous value for the desired movement in such a manner that the difference is close to 0, and the determined floor reaction force manipulating quantity is additionally input to at least any one of the first dynamics model and the second dynamics model. Furthermore, the second provisional instantaneous value for the desired movement is determined as the desired instantaneous value for the desired movement.

In this case, in principle, the first dynamics model may be one with a relatively low dynamical approximation precision, and any dynamics model may be used as the second dynamics model as far as it has a higher dynamical approximation precision than the first dynamics model. Thus, the first model calculating means and the second model calculating means for performing calculations for their respective dynamics models can calculate the outputs of their respective dynamics models with a relatively small amount of calculation. And, since the floor reaction force manipulating quantity determined in such a manner that the difference between the first provisional instantaneous value and the second provisional instantaneous value for the desired movement is close to 0 is additionally input to at least any one of the first dynamics model and the second dynamics model, the second provisional instantaneous value for the desired movement output from the second dynamics model allows the limitation-target quantity to fall within the allowable range and is highly stable, and therefore, is suitable as the desired instantaneous value for the desired movement. As a result, besides a desired gait for normal walking, wide variety of desired gaits for running, walking on a floor of a low friction coefficient or the like, can be adequately generated with a relatively small amount of calculation.

In the fortieth implementation, preferably, differences between the first provisional instantaneous value and the second provisional instantaneous value of the desired movement include a difference of the position of a predetermined part of the robot, or include a difference of the position of the center of gravity of the robot and a difference of the posture of a predetermined part of the robot (forty-first implementation). In this case, a position/posture of the predetermined part and a position of the center of gravity of the robot which compromise the stability of the robot can be avoided, and thus, the stability of the robot for the desired instantaneous value for the desired movement can be improved. As the predetermined part, the body of the robot is preferable.

The fortieth implementation described above can be readily realized using the twenty-sixth implementation, for example. That is, the twenty-sixth implementation without the means for determining a required value of the correction quantity of the desired floor reaction force corresponds to the processing performed by the second model calculating means in the fortieth implementation. Thus, in the twenty-sixth implementation, the gait generation device further comprises third model calculating means that inputs at least the provisional instantaneous value of the desired floor reaction force to a third dynamics model, which represents a relationship between a movement and a floor reaction force of the robot, to determine a third provisional instantaneous value of the desired movement as an output of the third dynamics model, and the means for determining a required value of the correction quantity of the desired floor reaction force determines the required value based on the difference between the determined desired instantaneous value of the desired movement and the third provisional instantaneous value of the desired movement in such a manner that the difference is close to 0 (forty-second implementation).

The third dynamics model and the third model calculating means in the forty-second implementation are equivalent to the first dynamics model and the first model calculating means in the fortieth implementation, respectively. Therefore, the forty-second implementation is equivalent to the fortieth implementation and can provide the same advantages as the fortieth implementation.

BRIEF DESCRIPTION OF THE DRAWINGS

FIG. 17 is a graph showing an example of setting of a desired floor reaction force's vertical component for the normal gait;

FIG. 18 is a graph showing an example of setting of a floor reaction force's horizontal component allowable range for the normal gait;

BEST MODE FOR CARRYING OUT THE INVENTION

In the following, embodiments of a gait generation device and a control device for a legged mobile robot according to the present invention will be described with reference to the drawings. In the embodiments of the present invention, a two-legged mobile robot is taken as an example of the legged mobile robot.

Figure 1:
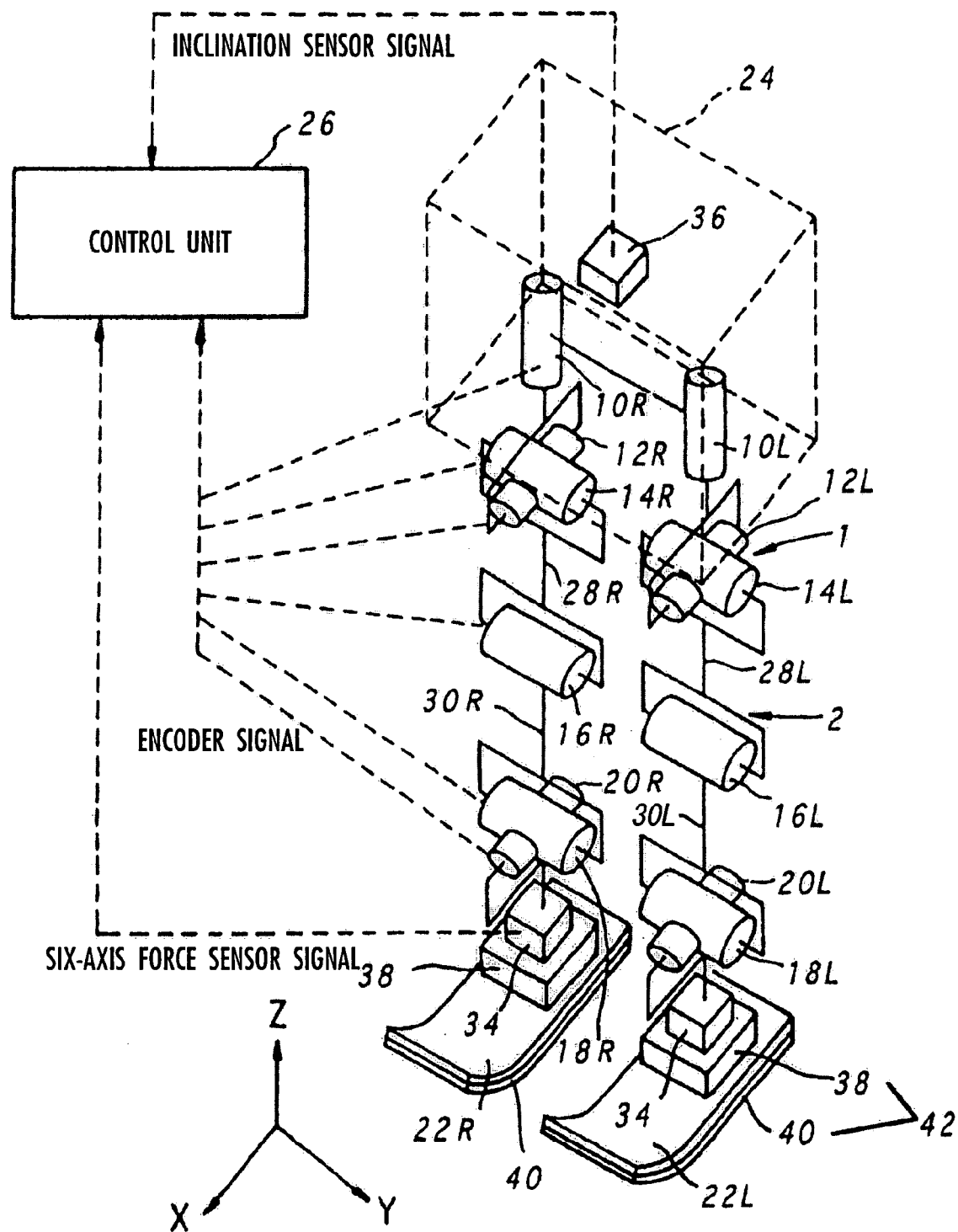
FIG. 1 is a schematic diagram showing a whole arrangement of a two-legged mobile robot, which is a legged mobile robot according to an embodiment of the present invention.

FIG. 1 is a schematic diagram showing a whole arrangement of a two-legged mobile robot, which is a legged mobile robot which uses a gait generation device and a control device according to an embodiment of the present invention.

As shown in the drawing, a two-legged mobile robot (referred to as a robot, hereinafter) 1 comprises a pair of left and right legs (leg links) 2, 2 extending downward from a body 24. The legs 2, 2 have the same construction and each have six joints. In the order of increasing distance from the body 24, the six joints include a hip (waist) joint 10R (10L) for convolution (rotation) (rotation in the yaw direction with respect to the body 24), a hip (waist) joint 12R (12L) for rotation in the roll direction (about the X axis), a hip (waist) joint 14R (14L) for rotation in the pitch direction (about the Y axis), a knee joint 16R (16L) for rotation in the pitch direction, an ankle joint 18R (18L) for rotation in the pitch direction, and an ankle joint 20R (20L) for rotation in the roll direction. Reference symbols R and L indicate the right leg and the left leg, respectively.

Under the two ankle joints 18R(L) and 20R(L) of each leg 2, a foot (foot portion) 22R(L) which constitutes the end portion of the leg 2 is attached. The body (base body) 24 is mounted on the top of the two legs 2, 2 via the hip joints 10R, 10L, 12R, 12L, 14R and 14L (three joints for each leg 2). The body 24 houses a control unit 26 and the like, which will be described in detail later. In FIG. 1, for the convenience of illustration, the control unit 26 is shown as being external to the body 24.

In each leg 2 configured as described above, the hip joint (or waist joint) is composed of the joints 10R(L), 12R(L) and 14R(L), and the knee joint is composed of the joint 16R(L), and the foot joint (ankle joint) is composed of the joints 18R(L) and 20R(L). The hip joint and the knee joint are connected to each other by a thigh link 28R(L), and the knee joint and the foot joint are connected to each other by a crus link 30R(L).

Although not shown, a pair of left and right arms are attached to the upper part of the body 24 on either side thereof, and a head is mounted on the top of the body 24. Detailed description of the arms and the head is omitted in this specification, because they have no direct concern with the essence of the present invention. However, each arm has a plurality of joints and can make movements, such as back and forth swing with respect to the body 24, by the action the joints.

Configuring each leg 2 as described above provides the foot 22R(L) of the leg 2 with six degrees of freedom with respect to the body 24. When the robot 1 moves, desired movements of the feet 22R and 22L can be realized by driving the twelve joints of the two legs 2, 2 (6*2=12) to appropriate angles (in this specification, the symbol "*" represents multiplication of scalar operation or outer product of vector operation). Thus, the robot 1 can move arbitrarily in a three-dimensional space.

The "position" and "velocity" of the body 24 described later in this specification refer to the position of a predetermined part of the body 24, specifically, a predetermined representative point of the body 24 (for example, a midpoint between the left and right hip joints) and the movement velocity of the point. Similarly, the "position" and "velocity" of each foot 22R(22L) refer to the position of a predetermined representative point of the foot 22R (22L) and the movement velocity of the point. In this embodiment, for example, the representative point of each foot 22R (22L) is set in the sole surface of the foot 22R (22L) (more specifically, a point at which a perpendicular line extending from the center of the ankle joints of each leg 2 to the sole surface of the foot 22R (22L) intersects with the sole surface, for example).

As shown in FIG. 1, each leg 2 has a well-known six-axis force sensor 34 disposed below the ankle joints 18R(L) and 20R(L) and interposed between the ankle joints and the foot 22R(L). The six-axis force sensor 34 detects the presence of landing of the foot 22R (22L) of the leg 2, the floor reaction force (floor-contact load) applied to the leg 2, and the like. The six axis force sensor outputs, to the control unit 26, detection signals of three directional components Fx, Fy and Fz of the translation force of the floor reaction force and three directional components Mx, My and Mz of the moment thereof. In addition, the body 24 has an inclination sensor 36 for detecting the inclination (posture angle) of the body 24 with respect to the Z axis (vertical direction (direction of gravity)) and the angular velocity thereof, and the inclination sensor 36 outputs the detection signals to the control unit 26. In addition, although not shown in detail, each joint in the robot 1 has an electric motor 32 for driving it (see FIG. 3) and an encoder (rotary encoder) 33 (see FIG. 3) for detecting the rotation amount of the electric motor 32 (rotation angle of the joint). The encoder 33 outputs the detection signal to the control unit 26.

Figure 2:
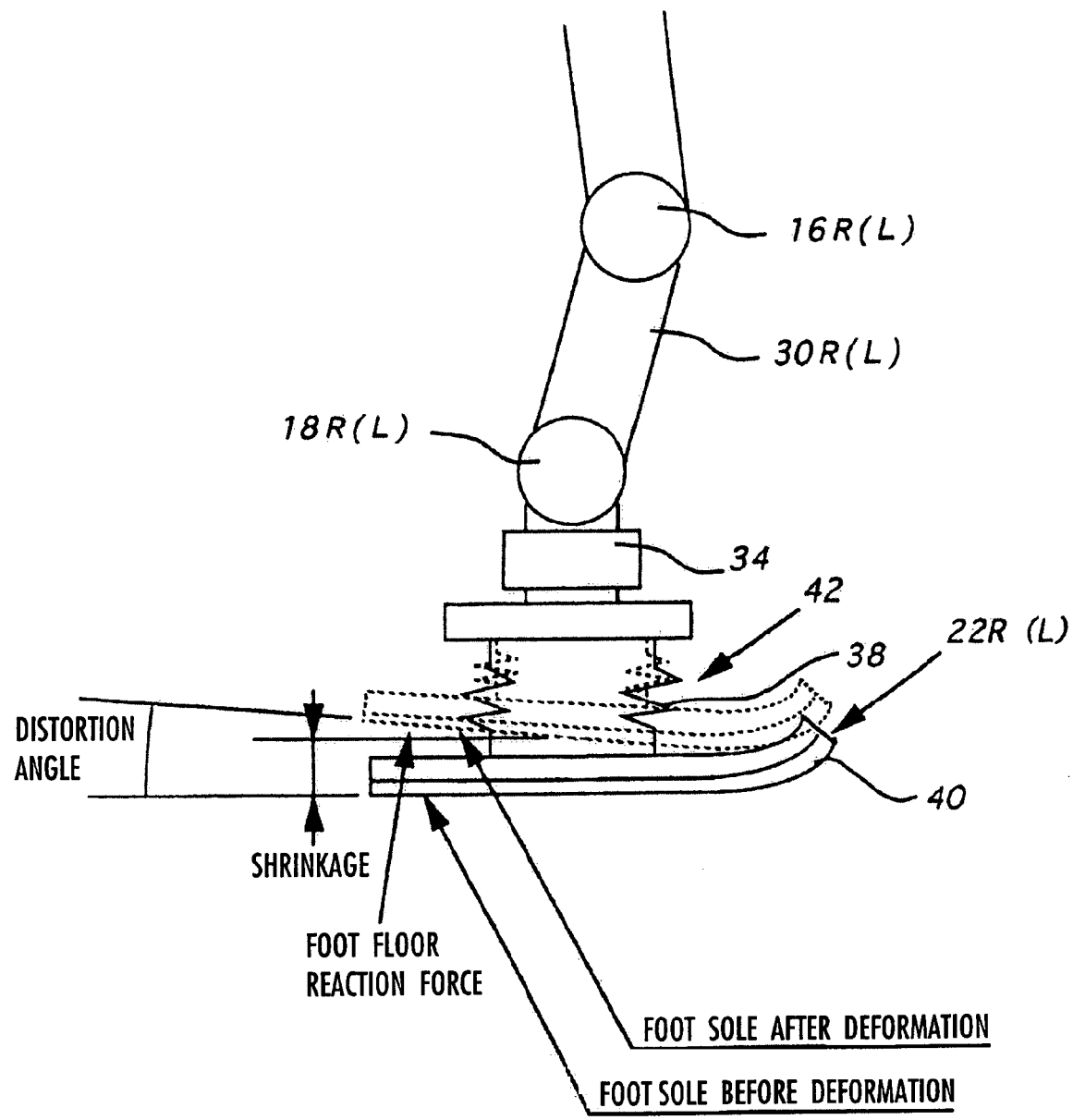
FIG. 2 is a side view of a configuration of a foot portion of each leg of the robot shown in FIG. 1.

As shown in FIG. 2, a spring mechanism 38 is provided above each foot 22R(L) and between the foot 22R(L) and the six-axis force sensor 34, and a foot sole elastic member 40 made of a rubber or the like is attached to the foot sole (bottom surface) of each foot 22R(L). The spring mechanism 38 and the foot sole elastic member 40 constitute a compliance mechanism 42. Specifically, the spring mechanism 38 comprises a rectangular guide member (not shown) mounted on the upper surface of the foot 22R(L) and a piston member (not shown) mounted on the same side as the ankle joint 18R(L) (the ankle joint 20R(L) is not shown in FIG. 2) and the six-axis force sensor 34 and housed in the guide member in such a manner that the piston member can slightly move in the guide member due to an elastic member (such as a rubber or spring).

The foot 22R(L) shown by the solid line in FIG. 2 is in a state where no floor reaction force is applied to the foot. When a floor reaction force is applied to the leg 2, the spring mechanism 38 and the foot sole elastic member 40 of the compliance mechanism 42 are distorted, thereby shifting the foot 22R(L) to a position/posture as indicated by the dotted line in FIG. 2. This configuration of the compliance mechanism 42 is important not only for reducing the landing impact but also for increasing the controllability of the robot 1. Detailed description of the compliance mechanism is omitted herein, because it is described in detail in Japanese Patent Laid-Open No. 5-305584 previously proposed by the applicants.

Furthermore, although not shown in FIG. 1, a joystick (manipulator) 44 (see FIG. 3) for manipulating the robot 1 is provided external to the robot 1. A request concerning the gait of the robot 1, such as a request to turn the robot 1 moving straight ahead, can be entered to the control unit 26 as required by manipulating the joystick 44. In this case, requests that can be entered include those concerning the gait modes (walking gait, running gait or the like) of the robot 1 in motion, the landing position/posture or landing time of a free leg, and command data for prescribing the landing position/posture and landing time (for example, the movement direction of the robot 1, the movement velocity thereof).

Figure 3:
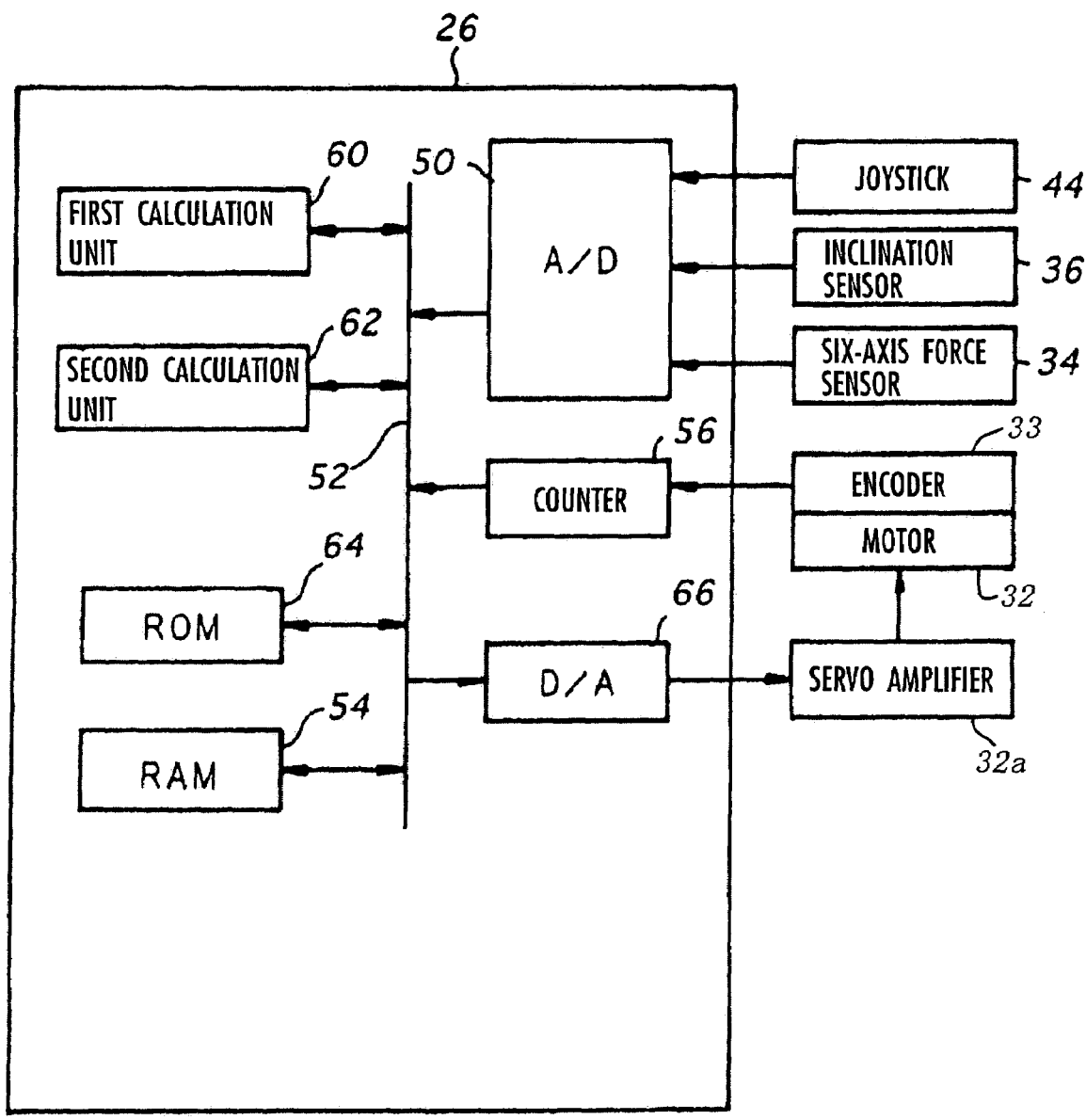
FIG. 3 is a block diagram showing a configuration of a control unit provided in the robot shown in FIG. 1.

FIG. 3 is a block diagram showing an arrangement of the control unit 26. The control unit 26 is constituted by a microcomputer and comprises a first calculation unit 60 and a second calculation unit 62 (which constitute a CPU), an A/D converter 50, a counter 56, a D/A converter 66, a RAM 54, a ROM 64 and a bus line 52 for data transmission among these components. In the control unit 26, the output signals from the six-axis force sensors 34 of the legs 2, the inclination sensor 36, the joystick 44 and the like are converted into digital values in the A/D converter 50 and then input to the RAM 54 via the bus line 52. Besides, the outputs from the encoders 33 (rotary encoders) at the joints of the robot 1 are input to the RAM 54 via the counter 56.

As described later, the first calculation unit 60 generates a desired gait, calculates a joint angle displacement command (command value of the displacement angle of each joint or the rotation angle of each electric motor 32) and transmits the command to the RAM 54. The second calculation unit 62 reads, from the RAM 54, the joint angle displacement command and the measurement value of the joint angle indicated by the output signal of each encoder 33, calculates the operating amount of each joint to be driven and outputs the operating amount data to the electric motor 32 that drives the joint via the D/A converter 66 and a servo amplifier 32a.

Figure 4:
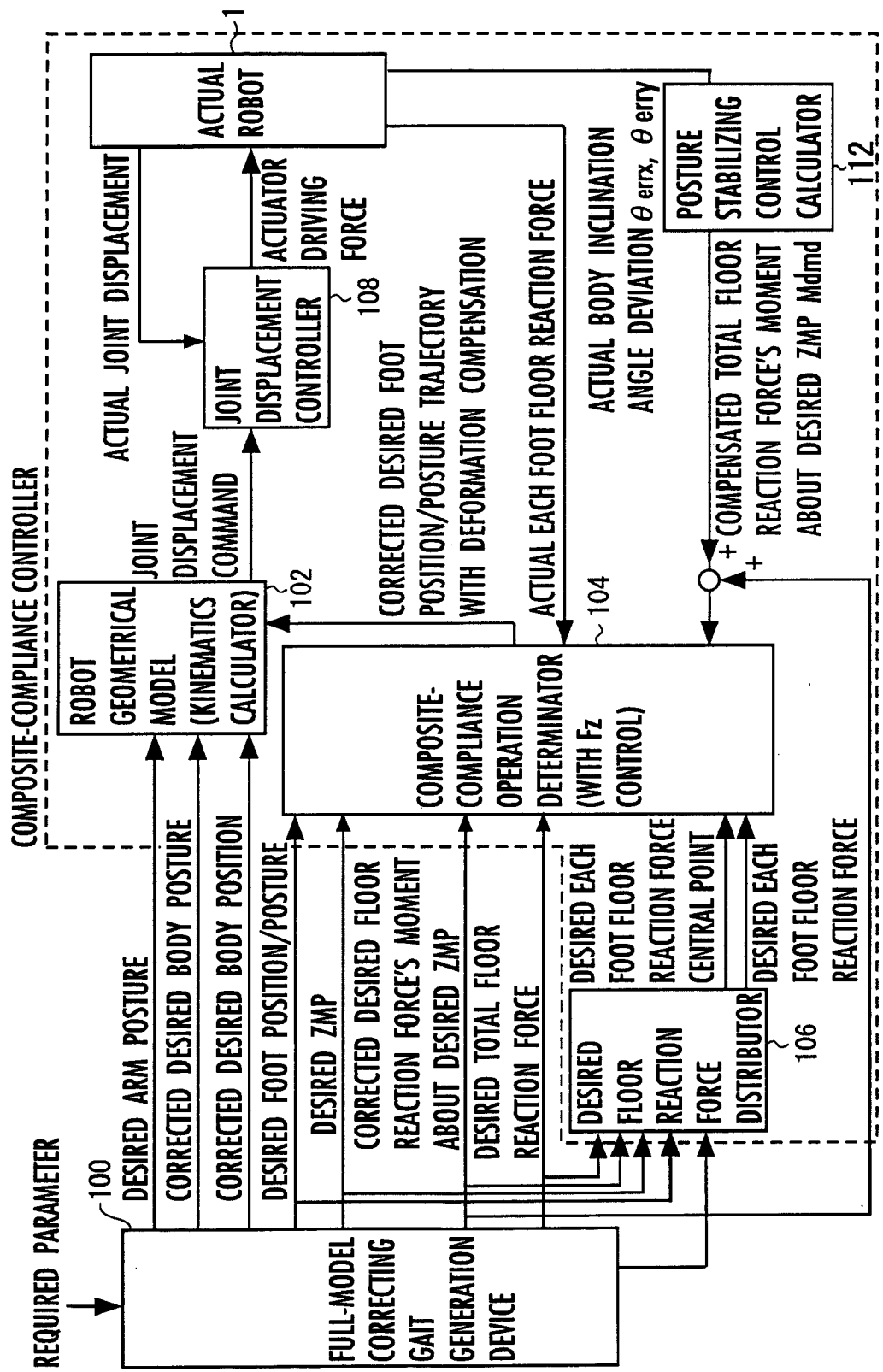
FIG. 4 is a block diagram showing a functional arrangement of the control unit shown in FIG. 3.

FIG. 4 is a block diagram showing a whole functional arrangement of the gait generation device and the control device of the robot 1 according to this embodiment. All the parts in FIG. 4 except for the part designated as an "actual robot" are implemented by the functions performed by the control unit 26 (functions performed mainly by the first calculation unit 60 and the second calculation unit 62). In the following description, the reference symbols R and L will be omitted if there is no need to discriminate between the left and right legs 2.

The control unit 26 has a full-model-correcting gait generation device 100 that generates and outputs a desired gait flexibly and in real time as described later (hereinafter, abbreviated as a gait generation device 100). The gait generation device 100 has functions that implement means according to the present invention. The desired gait output from the gait generation device 100 comprises a corrected desired body posture trajectory (a trajectory of a desired posture of the body 24), a corrected desired body position trajectory (a trajectory of a desired position of the body 24), a desired foot position/posture trajectory (a trajectory of a desired position and a desired posture of each foot 22), a desired arm posture trajectory (a trajectory of a desired posture of each arm), a desired ZMP (desired total floor reaction force central point) trajectory, a trajectory of a corrected desired floor reaction force's moment about a desired ZMP, and a desired total floor reaction force trajectory. If the body 24 has a movable member other than the legs 2 and the arms, a desired position/posture trajectory of the movable member is added to the desired gait.

Here, the term "trajectory" means a time-varying pattern (time-series pattern), and is sometimes referred to also as a "pattern" in the following description. In addition, the term "posture" means a spatial orientation of each component. Specifically, for example, the body posture is represented by the inclination angle (posture angle) of the body 24 with respect to the Z axis (vertical axis) in the roll direction (about the X axis) and the inclination angle (posture angle) of the body 24 with respect to the Z axis in the pitch direction (about the Y axis), and the foot posture is represented by the spatial azimuth angles of two axes set fixedly to each foot 22. In this specification, the body posture is sometimes referred to also as a body posture angle.

The corrected desired body posture and the corrected desired body position, details of which will be described later, are obtained by correcting, by full-model correction, a provisional desired body posture and a provisional desired body position generated by a simplified model, respectively.

In the following description, the term "desired" will often be omitted as far as it causes no misunderstanding. The components of the gait other than those related to the floor reaction force, that is, the components related to the movement of the robot 1, such as the foot position/posture and the body position/posture, are collectively referred to as a "movement". Furthermore, the floor reaction force applied to each foot 22 (the floor reaction force composed of the translation force and the moment) is referred to as an "each-foot floor reaction force", and the resultant force of the "each-foot floor reaction forces" applied to all (two) the feet 22R and 22L of the robot 1 is referred to as a "total floor reaction force". However, in the following description, there is made little mention of the each-foot floor reaction force, and therefore, the "floor reaction force" means the same as the "total floor reaction force" unless otherwise specified.

In general, the desired floor reaction force is represented by the point of application, and the translation force and the moment applied to the point. The point of application can be set arbitrarily, so that one desired floor reaction force can be represented in an infinite number of ways. However, if the desired floor reaction force is represented by taking the desired floor reaction force central point (desired position of the central point of the total floor reaction force) as the point of application, the moment components of the desired floor reaction force are 0 except for the vertical component (the moment about the vertical axis (Z axis)). In other words, the horizontal moment components of the desired floor reaction force about the desired floor reaction force central point (the moments about the horizontal axes (X axis and Y axis)) are 0.

Here, in a gait which satisfies the dynamical equilibrium condition, the ZMP (the point where the moments applied by the resultant force of the inertial force and gravity applied to the point are 0 except for the vertical moment) calculated from the desired movement trajectory of the robot 1 agrees with the desired floor reaction force central point. Therefore, providing the desired floor reaction force central point trajectory means the same as providing the desired ZMP trajectory (for more information, see Japanese Patent Application No. 2000-352011 filed by the applicants).

Based on such a background, in the specification of Japanese Patent Application No. 2000-352011 described above, the desired gait is defined as follows.

(a) In a broad sense, the desired gait is a set of a desired movement trajectory and a desired floor reaction force trajectory for a period of one or more steps.

(b) In a narrow sense, the desired gait is a set of a desired movement trajectory and a ZMP trajectory for a period of one step.

(c) A gait series is a connection of several gaits.

In walking, when the vertical position of the body 24 (body height) of the robot 1 is determined by the body height determination method previously proposed in Japanese Patent Laid-open No. 10-86080 by the applicants, the translation floor reaction force's vertical component is determined accordingly. Furthermore, if the body horizontal position trajectory of the robot 1 is determined in such a manner that the horizontal component of the moment produced about the desired ZMP by the resultant force of the inertial force due to the movement with the desired gait and gravity is 0, the translation floor reaction force's horizontal component is also determined. Therefore, in the specification of the Japanese Patent Application No. 2000-352011, the physical value concerning the floor reaction force of the desired gait which has to be explicitly set is only the desired ZMP. Therefore, as the definition of the desired gait in a narrow sense, the definition (b) described above is sufficient. On the other hand, in a running gait of the robot 1 mainly described in this embodiment (details thereof will be described later), the floor reaction force's vertical component (the translation floor reaction force's vertical component) is also essential in controlling the robot. Therefore, in this embodiment, a desired trajectory of the floor reaction force's vertical component is explicitly set, and then, trajectories of the desired body's vertical position and the like of the robot 1 are determined.

In addition, according to the present invention, a corrected desired floor reaction force's moment about the desired ZMP is produced. Thus, in this specification, the desired gait in a narrow sense is defined as follows.

(b") The desired gait in a narrow sense is a set of a desired movement trajectory, a desired ZMP trajectory, a corrected desired floor reaction force's moment about the desired ZMP and a floor reaction force's vertical component trajectory for a period of one step.

In this specification, the "desired gait" means the desired gait in the narrow sense according to the definition (b"), unless otherwise specified. However, as described in detail later, in the embodiments described in this specification, as for a provisional desired gait generated in the process of generating a final desired gait, the corrected desired horizontal component of the floor reaction force's moment about the desired ZMP is sometimes assumed to be 0 according to the original definition of the desired ZMP. Thus, for the provisional desired gait other than the desired gait finally determined (for example, as implified model's gait described later), the desired gait in the narrow sense according to the definition (b") described above minus the corrected desired floor reaction force's moment, that is, the gait according to the following definition (b') is sometimes used to mean the "desired gait". (b') The desired gait in a narrow sense is a set of a desired movement trajectory, a desired ZMP trajectory and a floor reaction force's vertical component trajectory for a period of one step.

In this specification, the term "one step" in the desired gait is used to mean a leg operation starting with landing of one leg 2 of the robot 1 and ending with landing of the other leg 2. In addition, in the following description, the "floor reaction force's vertical component" means the "translation floor reaction force's vertical component", and the vertical component of the moment of the floor reaction force (the component about the vertical axis) is discriminated from the "floor reaction force's vertical component" by using the term "moment". Similarly, the "floor reaction force's horizontal component" means the "translation floor reaction force's horizontal component".

Furthermore, of course, a "two-leg supporting period" refers to a period in which the two legs 2, 2 support the weight of the robot 1, a "one-leg supporting period" refers to a period in which either one of the legs 2, 2 supports the weight of the robot 1, a "floating period" refers to a period in which both the legs 2, 2 are away from the floor (floating in the air). The leg 2 that doesn't support the weight of the robot 1 during the one-leg supporting period is referred to as a "free leg". In the running gait mainly described in this embodiment, there is no two-leg supporting period, and the one-leg supporting periods and the floating periods are repeated alternately. In this case, during the floating period, both the two legs 2, 2 don't support the weight of the robot 1. However, the leg 2 that has been a free leg during the one-leg supporting period immediately preceding the floating period is referred to as a free leg during the floating period, and the leg 2 that has been a supporting leg during the one-leg supporting period immediately preceding the floating period is referred to as a supporting leg during the floating period.

Now, taking as an example a running gait shown in FIG. 5, a desired gait (in particular, movements of the legs 2, 2) generated by the gait generation device 100 will be described schematically. Here, other definitions and details concerning the gait are described in Japanese Patent Laid-Open No. 10-86081 previously proposed by the applicants, and therefore, the following is descriptions that are not made in Japanese Patent Laid-Open No. 10-86081.

First, the running gait shown in FIG. 5 will be described. This running gait is one similar to a typical running gait of a human being. In this running gait, the one-leg supporting periods in which the foot 22 of only one of the left and right legs 2 of the robot 1 (supporting leg) lands (is in contact with the floor) and the floating periods in which both the legs 2, 2 float in the air are repeated alternately. The first state in FIG. 5 is a state (initial state) of the robot 1 at the start of a one-leg supporting period, the second state is a state thereof at the middle of the one-leg supporting period, the third state is a state thereof at the start of a floating period following the one-leg supporting period (the end of the one-leg supporting period), the fourth state is a state thereof at the middle of the floating period, and the fifth state is a state thereof at the end of the floating period (the start of the next one-leg supporting period).

Figure 5:
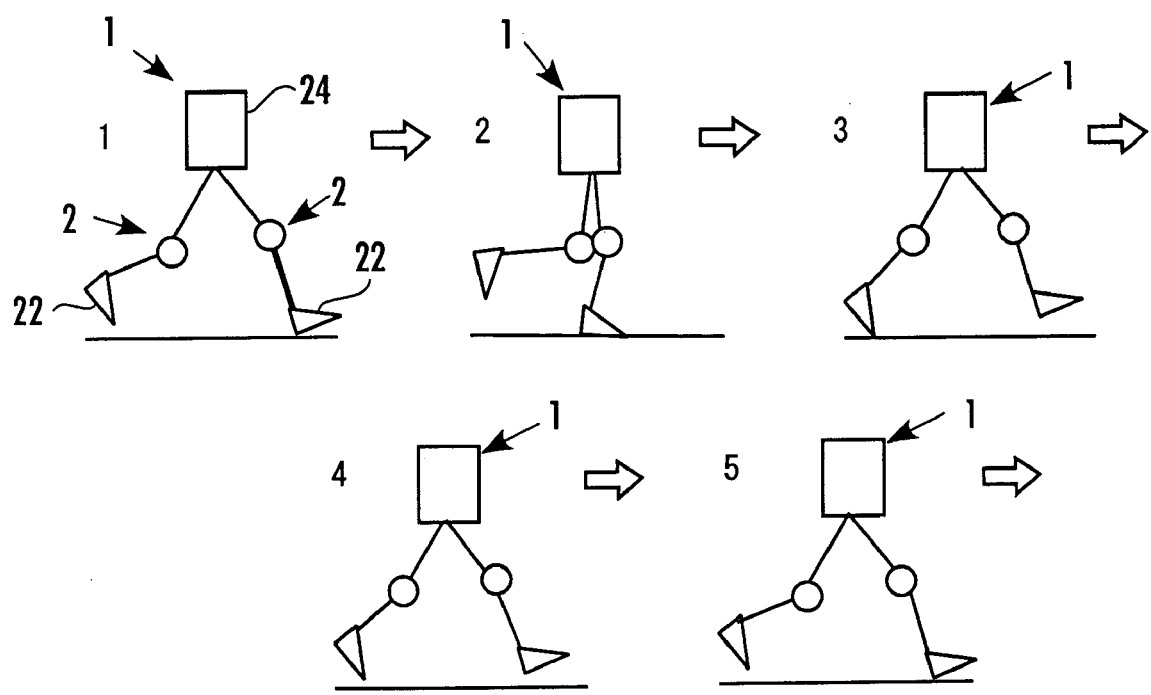
FIG. 5 is a diagram for illustrating a running gait for the robot shown in FIG. 1.

In this running gait, as shown in the first state in FIG. 5, the robot 1 lands on the heel of the foot 22 of the supporting leg (the leading leg 2 of the robot 1 in the movement direction) at the start of the one-leg supporting period. Then, as shown in the second state in FIG. 5, substantially the whole surface of the sole of the landing foot 22 (foot 22 of the supporting leg) of the robot 1 comes into contact with the floor, and then, as shown in the third state in FIG. 5, the robot 1 jumps into the air by kicking the floor on the toe of the foot 22 of the supporting leg (foot 22 of the trailing leg 2 in the movement direction of the robot 1 in the third state shown in FIG. 5). This is the time when the one-leg supporting period ends and the floating period starts. During the one-leg supporting period, the free leg, which is located rearward of the supporting leg at the start of the one-leg supporting period as shown in the first state in FIG. 5, is swung forward of the supporting leg toward a next expected landing position, as shown in the second and third states in FIG. 5. Then, after the floating period shown as the fourth state in FIG. 5, the robot 1 lands on the heel of the foot 22 of the free leg (leg 2 that has been the free leg during the one-leg supporting period immediately preceding the floating period), and then, the next one-leg supporting period starts.

With reference to the running gait in FIG. 5, a desired gait generated by the gait generation device 100 will be described schematically. As described in detail later, when the gait generation device 100 generates a desired gait, basic required values (required parameters) for desired gait generation, such as landing position/posture (expected landing position/posture) and landing time (expected landing time) of the foot 22 of the free leg, are supplied to the gait generation device 100 via a required operation of the joystick 44 or the like. The gait generation device 100 generates the desired gait using the required parameters. More specifically, based on the required parameters, the gait generation device 100 determines parameters (referred to as gait parameters) that define some of the components of the desired gait, such as the desired foot position/posture trajectory and the desired floor reaction force's vertical component trajectory for the desired gait, and then successively determines instantaneous values of the desired gait using the gait parameters, thereby generating a time-series pattern (trajectory) of the desired gait.

In this case, the desired foot position/posture trajectory (more specifically, desired trajectories of spatial components (such as X axis component) of the position and posture of the foot) is generated for each foot 22 using the finite duration settling filter proposed by the applicants in Japanese Patent No. 3233450, for example. The finite duration settling filter is a series connection of plural (three or more, in this embodiment) stages of first-order delay filters of a variable time constant, that is, filters having a transmission function represented as $1/(1+\tau s)$ where $\tau$ is a variable time constant (this filter is referred to as a unit filter, hereinafter). And, the finite duration settling filter can generate and output a trajectory that reaches to a specified value at a desired specified time. In this case, the time constant $\tau$ of the unit filter of each stage is successively set in a variable manner based on the remaining time before the specified time after the definite duration settling filter starts generating the output. More specifically, as the remaining time decreases, the value of $\tau$ decreases from a predetermined initial value (>0), and finally, at the specified time when the remaining time is 0, the value of $\tau$ becomes 0. And, a step input having a height depending on the specified value (more specifically, the amount of variation of the output of the definite duration settling filter from the initial value to the specified value) is given to the definite duration settling filter. Such a definite duration settling filter can not only generate such an output that reaches to the specified value at the specified time but also have the variation rate of the output thereof being 0 or substantially 0 at the specified time. In particular, if the unit filters are interconnected in three or more stages (three stages are enough), the variation acceleration (the differential value of the variation rate) of the output of the definite duration settling filter can be 0 or substantially 0.

The generation of the foot position/posture trajectory (the position/posture trajectory of the foot 22 from a landing thereof to the next landing thereof) using such a definite duration settling filter is conducted in the following manner, for example. For example, the desired foot position trajectory in the X axis direction (back-and-forth direction) is generated as follows. That is, the height of the step input to the definite duration settling filter is determined depending on the X-axis directional position of the next expected landing position of each foot 22 (more specifically, the amount of variation (displacement) in the X axis direction of the next expected landing position with respect to the preceding landing position, this being equivalent to the specified value) which is determined by the required parameters, and the time constant $\tau$ is initialized to a predetermined initial value. Then, the determined step input is given to the definite duration settling filter, and generation of the trajectory of the X-axis directional position of the foot 22 is started. During the trajectory generation, the time constant $\tau$ is successively set in a variable manner so as to decrease from the initial value to 0 by the expected landing time of the foot 22 (which is equivalent to the specified time). In this way, the trajectory of the position of the foot 22 in the X axis direction that reaches to the expected landing position at the expected landing time is generated.

Besides, the desired foot position trajectory in the Z axis direction (vertical direction) is generated in the following manner, for example. Specifically, first, based on the next expected landing position and expected landing time of the foot 22, the Z-axis directional position of the foot 22 at the time when the foot 22 reaches the maximum height (vertical position) (referred to as a highest position, hereinafter) and the time required to reach the highest position are determined. Then, according to the highest position (which is equivalent to the specified value), the height of the step input to the definite duration settling filter is determined, and the time constant $\tau$ is initialized. And then, the determined step input is given to the definite duration settling filter, and the foot position trajectory to the highest position in the Z axis direction is successively generated. In this regard, the time constant τ is successively set in a variable manner so as to decrease from the initial value to 0 by the time when the highest position is reached (this time being equivalent to the specified time). Furthermore, when the generation of the trajectory to the highest position in the Z axis direction is completed, the time constant τ is initialized, a step input of the polarity opposite to that of the step input having been used (more specifically, a step input of the opposite polarity having a height depending on the amount of variation in the Z axis direction from the highest position to the next expected landing position (this being equivalent to the specified value)) is input to the definite duration settling filter, and the foot position trajectory in the Z axis direction from the highest position to the expected landing position is successively generated. In this regard, the time constant τ is successively set in a variable manner so as to decrease from the initial value to 0 by the expected landing time of the foot 22.

When generating the foot position trajectory in the Z axis direction, the time constant τ may be set in a variable manner so as to decrease from the initial value to 0 in a period from the start of the trajectory generation to the expected landing time of the foot 22, and the polarity of the step input may be switched to the opposite one at the time when the highest position is reached or the time in the vicinity thereof. In this case, although the foot 22 cannot reach to a desired highest position with a high precision, the foot 22 can reach the expected landing position at the expected landing time without problems.

The foot posture trajectory can be generated using the definite duration settling filter, as with the foot position trajectory described above. In this case, as for a spatial component of the foot posture whose posture angle variation is monotonic (monotonically increasing or monotonically decreasing), the foot posture trajectory can be generated in the same manner as the foot position trajectory in the X axis direction described above. Besides, as for a spatial component of the foot posture whose posture angle variation has a maximum value or minimum value, the foot posture trajectory can be generated in the same manner as the foot position trajectory in the Z axis direction described above.

Here, the desired foot position/posture trajectory generated using the definite duration settling filter as described above is the desired position/posture trajectory of each foot 22 in a supporting leg coordinate system fixed on the floor surface described later.

The desired foot position/posture trajectory generated as described above is configured so that the position of each foot 22 starts moving by gradually accelerating from the initial floor-contact state (the state at the start time in the desired gait) toward the expected landing position. In addition, the desired foot position/posture trajectory is configured so that the variation rate of the foot position is gradually reduced and finally reaches to 0 or substantially 0 at the expected landing time, and the foot reaches to the expected landing position at the expected landing time and stops moving. Thus, at the instant when each foot 22 lands, the velocity thereof with respect to the floor (the variation rate of the position of the foot 22 in the supporting leg coordinate system fixed on the floor) is 0 or substantially 0. Therefore, if the foot lands from a state where both the legs 2, 2 float in the air (state during the floating period) in the running gait, it is subject to a reduced landing impact.

In the running gait, the vertical velocity of the body 24 is downward in the later half of the floating period because of gravity applied to the robot 1, and the vertical velocity remains downward at the time of landing. Therefore, if the desired foot position/posture trajectory is generated in such a manner that the velocity of the foot 22 with respect to the floor at the instant of landing is 0 or substantially 0, and the desired position/posture trajectory of the body 24 is generated so as to satisfy the dynamical equilibrium condition as described later, the relative velocity of the foot 22 of the free leg with respect to the body 24 is upward at the time immediately before landing. That is, at the instant of landing in the running gait, the desired gait of the robot 1 is one in which the robot 1 lands at the floor while retracting the free leg 2 to the body 24. In other words, in the desired gait in this embodiment, the robot 1 lands by retracting the foot 22 of the free leg toward the body 24 so that the foot 22 has a velocity with respect to the floor of 0 or substantially 0 at the instant of landing. Thus, the landing impact is reduced and prevented from being excessive.

In this embodiment, since the definite duration settling filter is a series connection of three or more (three, for example) stages of unit filters, the velocity of each foot 22 (variation rate of the position of the foot) is reduced to 0 or substantially 0 by the expected landing time, and the acceleration of each foot 22 is also reduced to 0 or substantially 0 at the expected landing time, so that the foot 22 stops moving. That is, the acceleration with respect to the floor is also 0 or substantially 0 at the instant of landing. Thus, the landing impact is further reduced. In particular, even if the actual landing time of the robot 1 varies from the desired landing time, the impact doesn't increase significantly. Incidentally, in order to simply make the velocity of each foot 22 with respect to the floor 0 or substantially 0 at the expected landing time, the definite duration settling filter may be composed of two stages of unit filters. However, in this case, the acceleration of each foot 22 is not 0 at the expected landing time typically.

Here, the foot posture continues to change after the foot 22 lands on the heel at the expected landing time until substantially the whole surface of the sole of the foot 22 comes into contact with the floor. Therefore, the foot posture trajectory is generated using the definite duration settling filter by setting the time when substantially the whole surface of the sole of the foot 22 comes into contact with the floor as the specified time.

Furthermore, while the definite duration settling filter is used to generate the foot position trajectory in this embodiment, the desired foot position trajectory may be generated using a function, such as a polynomial that is defined so that the variation rate of the foot position is 0 or substantially 0 (the time differential value of the foot position is 0) at the expected landing time, and the variation acceleration of the foot position (the time differential value of the variation rate) is 0 or substantially at the expected landing time. This holds true for the generation of the desired foot posture trajectory. However, for generation of the desired foot posture trajectory, the function, such as a polynomial, is defined so that the variation rate of the posture of each foot 22 and the variation acceleration thereof are 0 or substantially 0 at the time when substantially the whole surface of the sole of the foot 22 comes into contact with the floor as described above.

Figure 6:
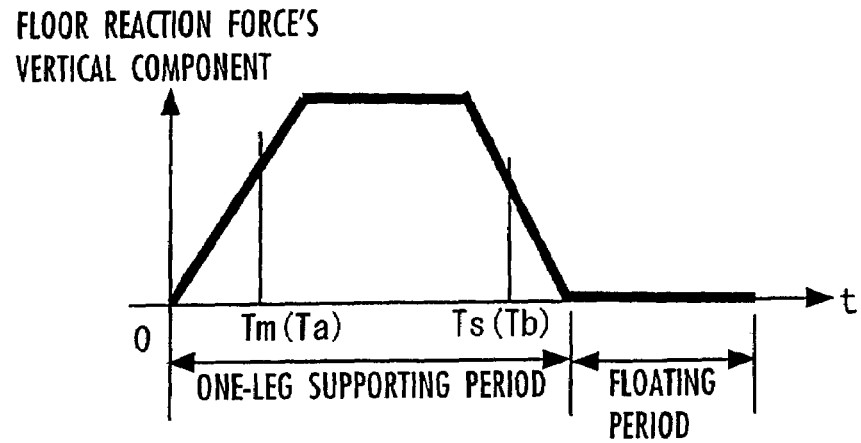
FIG. 6 is a graph showing an example of setting of a desired floor reaction force's vertical component.

The desired floor reaction force's vertical component trajectory is set as shown in FIG. 6, for example. In this embodiment, the shape of the desired floor reaction force's vertical component trajectory in the running gait (specifically, the shape thereof in the one-leg supporting period) is prescribed to be trapezoidal (protruding in the direction of the floor reaction force's vertical component increasing).

The height of the trapezoid and the times of the apexes of the trapezoid are determined as gait parameters (floor reaction force's vertical component trajectory parameters) for defining the desired floor reaction force's vertical component trajectory. Here, during the floating period in the running gait, the desired floor reaction force's vertical component is constantly set to 0. As in this example, the desired floor reaction force's vertical component trajectory is preferably set to be substantially continuous (i.e. not to have discontinuous values). This is intended to make the joints of the robot 1 move smoothly when controlling the floor reaction force. Here, the words "substantially continuous" imply that a trajectory doesn't lose its continuity because of discrete values that inevitably occur when a continuous analog trajectory (continuous trajectory in the true sense) is converted into a digital trajectory in a discrete-time system.

Figure 7:
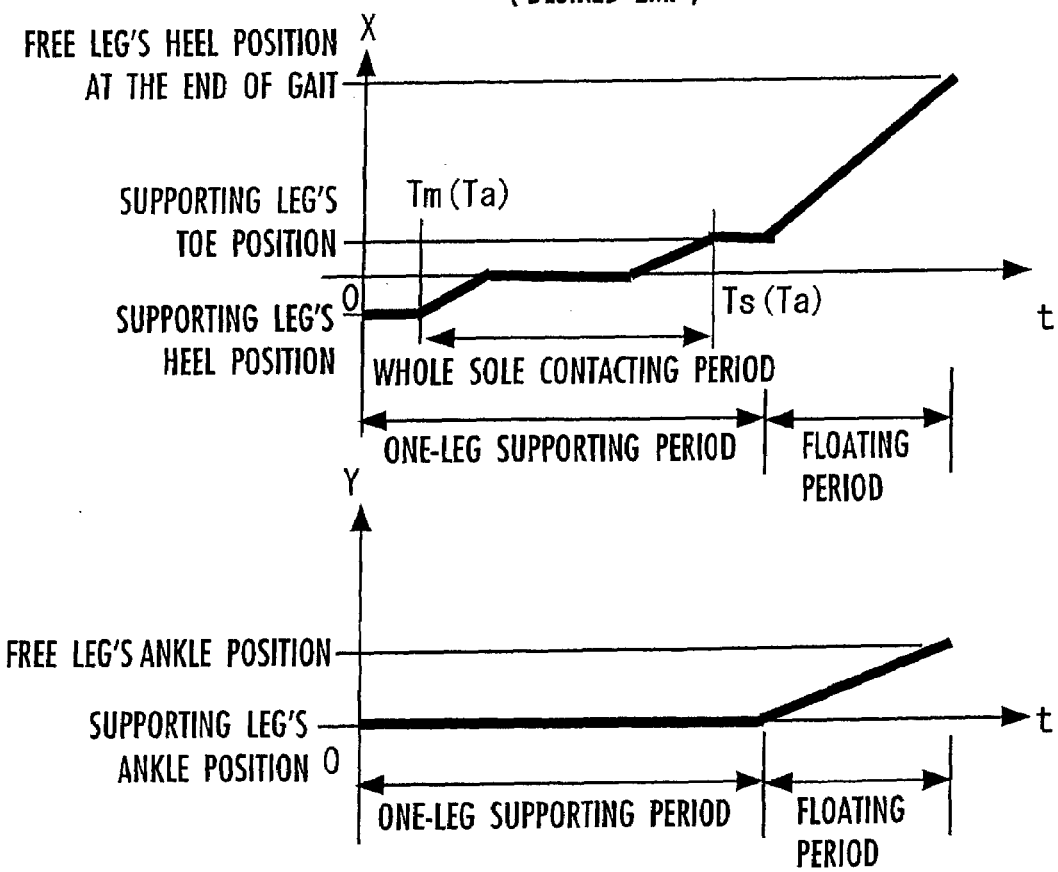
FIG. 7 is a graph showing an example of setting of a desired ZMP.

Basically, the desired ZMP trajectory is set as follows. In the running gait shown in FIG. 5, the robot 1 lands on the heel of the foot 22 of the supporting leg, then jumps into the air by kicking the floor on the toe of the foot 22 of the supporting leg, and finally lands on the heel of the foot 22 of the free leg, as described above. Therefore, the desired ZMP trajectory during the one-leg supporting period is set so that the desired ZMP is initially positioned at the heel of the foot 22 of the supporting leg 2, shifted to the longitudinal middle point of the foot 22 in the period in which substantially the whole surface of the sole of the foot 22 of the supporting leg is in contact with the floor, and then shifted to the toe of the foot 22 of the supporting leg by the time when the foot takes off the floor, as shown in the upper part of FIG. 7. Here, the upper part of FIG. 7 shows the desired ZMP trajectory in the X axis direction (back and forth direction), and the lower part of FIG. 7 shows the desired ZMP trajectory in the Y axis direction (sideward direction). As shown in the lower part of FIG. 7, the desired ZMP trajectory in the Y axis direction during the one-leg supporting period is set in such a manner that the desired ZMP is at the same position as the central point of the ankle joints of the supporting leg 2 in the Y axis direction.

As shown in the upper part of FIG. 7, the X axis-directional position of the desired ZMP trajectory during the floating period is adapted to continuously shift from the toe of the foot 22 of the supporting leg to the landing position of the heel of the foot 22 of the free leg by the time of the next landing of the free leg 2. Furthermore, as shown in the lower part of FIG. 7, the Y axis-directional position of the desired ZMP trajectory during the floating period is adapted to continuously shift from the Y axis-directional position of the center of the ankle joints of the supporting leg 2 to the Y axis-directional position of the center of the ankle joints of the free leg 2 by the time of the next landing of the free leg 2. That is, the desired ZMP trajectory is made continuous (substantially continuous) for the whole period of the gait. Here, the words "substantially continuous" used for representing the ZMP trajectory have the same meaning as in the floor reaction force's vertical component trajectory described above.

Taking into consideration the approximation precision of the dynamics model used for generating the desired gait, in order to make the desired movement with the desired gait as continuous as possible, the desired ZMP trajectory is preferably substantially continuous even during the floating period as described above. However, the dynamics model used in this embodiment, which will be described later, the desired ZMP trajectory is not necessarily required to be continuous. In addition, in this embodiment, the positions and times of the apexes of the desired ZMP trajectory such as shown in FIG. 7 are set as ZMP trajectory parameters (parameters defining the desired ZMP trajectory).

The desired arm posture is represented as a relative posture with respect to the body 24.

The desired body position/posture, the desired foot position/posture and a reference body posture described later are described in a global coordinate system. The global coordinate system is a coordinate system that is fixed to the floor. More specifically, a supporting leg coordinate system described later is used as the global coordinate system.

In this embodiment, the gait generation device 100 generates not only the desired body posture but also a reference body posture. The reference body posture is a body posture that is generated complying with a gait request (request to the gait generation device 100 from another device, such as a behavior planning unit, or from the outside (via the joystick 44 or the like)).

The desired body posture (hereinafter, the "body posture" without the word "reference" refer to the desired body posture) is generated so as to follow or agree with the reference body posture in the long term.

Figure 8:
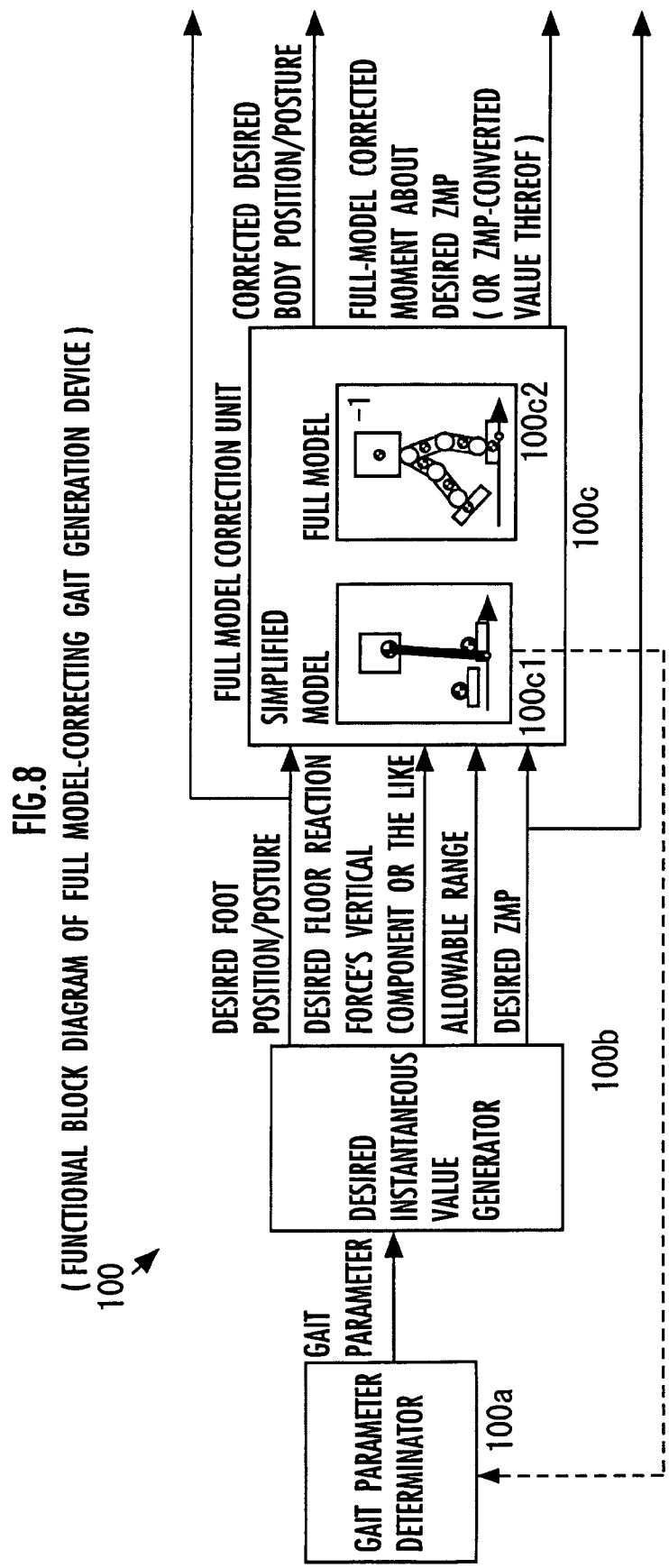
FIG. 8 is a functional block diagram of essential parts of a gait generation device.

FIG. 8 is a block diagram for illustrating details of the gait generation device 100. With reference to FIG. 8, a process performed by the gait generation device 100 will be schematically described below.

As shown, the gait generation device 100 has a gait parameter determinator 100a. The gait parameter determinator 100a determines the values of parameters of a desired gait (parameters defining a desired gait) or a time-series table thereof. This process corresponds to steps S018 to S030 in the flowchart shown in FIG. 13, which will be described later.

As described in detail later, parameters determined by the gait parameter determinator 100a include parameters that define the desired foot position/posture trajectory, the desired arm posture trajectory, the reference body posture trajectory, the desired ZMP trajectory, the desired floor reaction force's vertical component trajectory and the like, as well as a parameter that defines the floor reaction force's horizontal component allowable range and a parameter that defines a ZMP allowable range. In this case, according to this embodiment, two types of floor reaction force's horizontal component allowable ranges are set, one of which is for the simplified model gait and set in the processing in step S026, and the other of which is for gait correction and set in the processing in step S030. On the other hand, there is only one ZMP allowable range which is for gait correction and set in the processing in step S030.

Now, the ZMP allowable range will be described briefly.

As described later, the desired gait is corrected so as to produce a corrected desired horizontal component of a floor reaction force's moment about the desired ZMP. Therefore, the desired ZMP is different from the point according to the original definition (i.e., the definition that the ZMP is a point where the floor reaction force's moment horizontal component is 0). The ZMP that satisfies the original definition is displaced from the desired ZMP by a distance derived from dividing the corrected desired horizontal component of the floor reaction force's moment by the desired floor reaction force's vertical component. In the following description, the ZMP that satisfies the original definition will be referred to as a "true ZMP".

The true ZMP of the corrected gait has to lie at least within the ZMP possible range (that is, the so-called supporting polygon, the possible range of the point of application of the floor reaction force (ZMP) in the case where it is assumed that there is no adhesion force between the floor and the sole of the foot 22). Furthermore, in order to allow an adequate stability margin for the robot 1, the true ZMP of the corrected gait preferably lies in the vicinity of the center of the ZMP possible range. Thus, in this embodiment, an allowable range within which the true ZMP of the corrected gait can lie is set. This range is referred to as a ZMP allowable range.

The ZMP allowable range is set so as to agree with or be contained in the ZMP possible range. A manner of setting the ZMP allowable range will be described in detail later.

The gait parameters determined by the gait parameter determinator 100a are input to a desired instantaneous value generator 100b. Based on the input gait parameters, the desired instantaneous value generator 100b successively calculates (generates) the instantaneous values, at the present time t, of the desired foot position/posture, the desired ZMP, the desired floor reaction force's vertical component, the desired arm posture, the desired total center-of-gravity vertical position, the desired body vertical position, the floor reaction force's horizontal component allowable range, the ZMP allowable range and the reference body posture angle (FIG. 8 shows only some of the desired instantaneous values). This process in the desired instantaneous value generator 100b corresponds to steps S900 to S910 in FIG. 37 that are performed in the procedure of step S032 in the flowchart shown in FIG. 13 described later and to steps S034 and S036 in FIG. 13. In this embodiment, some of the desired instantaneous values calculated by the desired instantaneous value generator 100b (specifically, the instantaneous value of the desired body vertical position) are provisional ones, which are to be corrected at a later time. Furthermore, the desired instantaneous value generator 100b calculates two instantaneous values for the floor reaction force's horizontal component allowable range, one of which is for the simplified model gait, and the other of which is for gait correction.

The desired instantaneous values (some of which are provisional ones) calculated (generated) by the desired instantaneous value generator 100b are input to a full model correction unit 100c. The full model correction unit 100c has a simplified model 100c1 and a full model 100c2 as dynamics models. The full model correction unit 100c uses the simplified model 100c1 to determine the provisional instantaneous value of the desired body position/posture and the like from the input values and then corrects the determined provisional instantaneous value of the body position/posture and the like using the full model 100c2.

The full model correction unit 100c may have no simplified model 100c1. The full model 100c2 is either of an inverse full model (inverse dynamics full model) or forward full model (forward dynamics full model), as described later.

More specifically, the full model correction unit 100c performs a processing B1 or B2 so as to satisfy the following conditions A1 to A3. That is, in order to satisfy the conditions that:

(A1) the dynamical equilibrium condition is satisfied with a higher precision than the gait generated based simply on the simplified model (hereinafter, referred to as a simplified model gait);

(A2) the true ZMP (ZMP satisfying the original definition that is corrected by producing the corrected desired horizontal component of the floor reaction force's moment about the desired ZMP) lies within the ZMP allowable range (allowable range that allows the stability margin to be adequately maintained); and (A3) the floor reaction force's horizontal component falls within the floor reaction force's horizontal component allowable range for gait correction, the full model correction unit 100c:

(B1) corrects the body position/posture of the simplified model gait determined using the simplified model; or (B2) corrects the body position/posture of the simplified model gait determined using the simplified model and outputs the corrected desired horizontal component of the floor reaction force's moment about the desired ZMP (corrects the desired floor reaction force).

The corrected desired floor reaction force's moment about the desired ZMP may be converted into a ZMP converted value according to the formula b01 described above. In addition, the ZMP allowable range may be converted into a corrected desired horizontal component of the floor reaction force's moment allowable range according to the formula b01.

Since the legs 2, 2 of the robot 1 have twelve joints as shown in FIG. 1, a desired joint displacement is uniquely determined from the positions/postures of the feet 22R and 22L and the body position/posture by an inverse kinematics calculation as described later. That is, a current time's desired posture of the robot 1 (a desired posture of the robot 1 at the present time t) is uniquely determined.

The instantaneous values (instantaneous posture) of the corrected desired gait are input to a composite-compliance controller (the part indicated by the dashed line in FIG. 4), and the controller controls the joint actuators (electric motors 32) so that the actual robot 1 follows the desired gait while keeping its balance.

The foregoing is schematic description of the configuration and operation of the device according to this embodiment.

Now, body movement modes used for gait generation in this embodiment and the simplified model will be described.

In the case of gaits having a floating period, such as a running gait, or gaits of walking on a floor of a low friction coefficient, the technique of simply adjusting the body's horizontal acceleration, such as one previously proposed by the applicants in Japanese Patent Application No. 2000-352011, may not adequately satisfy the dynamical equilibrium condition while keeping the floor reaction force's horizontal component of the desired gait falling within the allowable range (or friction limit). Thus, in this embodiment, two movement modes of the body 24 (a body translation mode and a body rotation mode), which are described below, are generated in a composite manner, thereby satisfying the dynamical equilibrium condition while keeping the floor reaction force's horizontal component of the desired gait falling within the allowable range (or friction limit).

Figure 9:
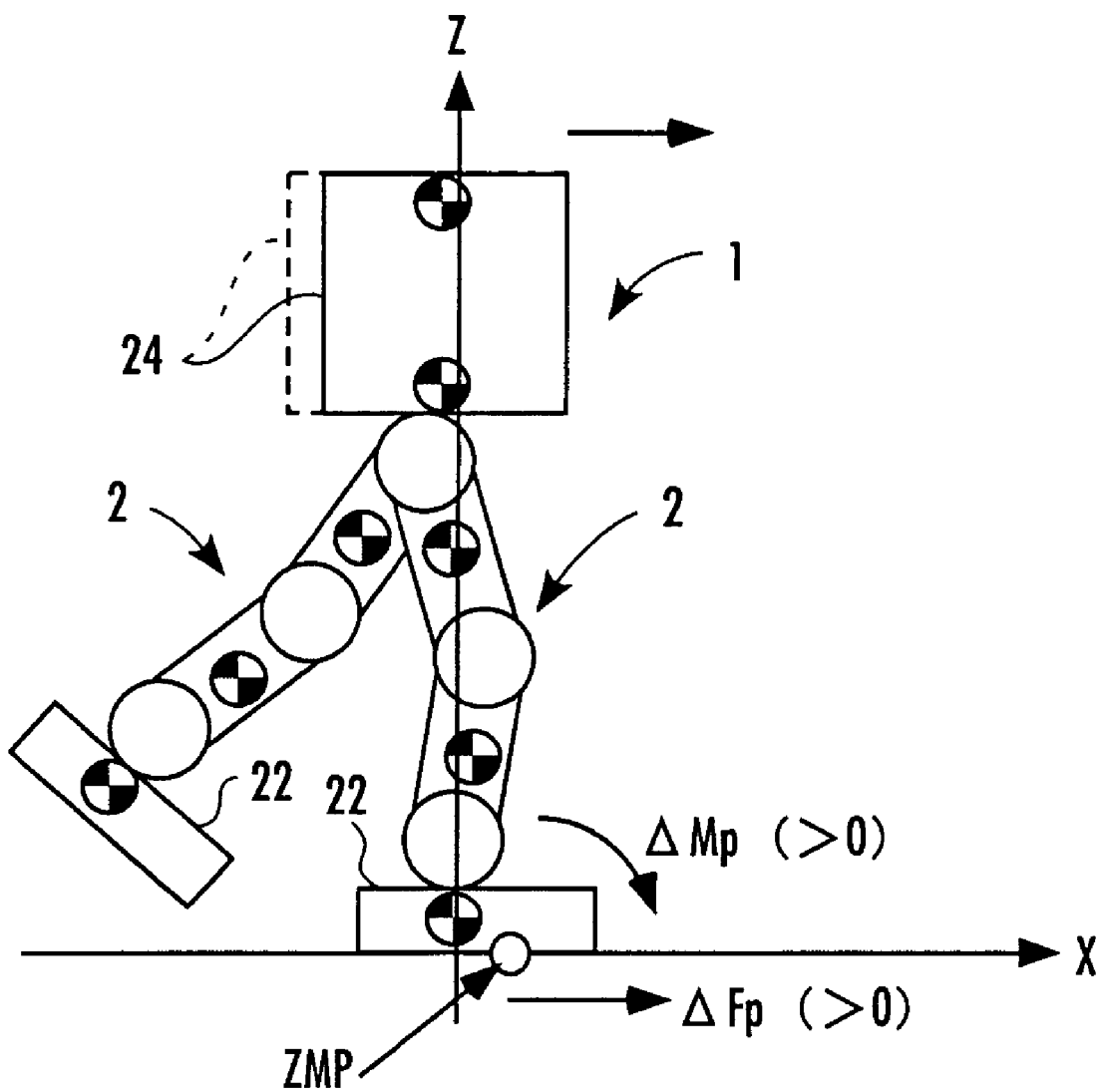
FIGS. 9 and 10 are diagrams for illustrating movement modes (body translation mode and body rotation mode, respectively) of the robot.

As shown in FIG. 9, if only the body's horizontal acceleration is brought into perturbation from a certain movement state, the total center-of-gravity horizontal acceleration and the angular momentum about the total center of gravity are brought into perturbation. That is, the perturbation of the body's horizontal acceleration causes perturbation of the floor reaction force's moment about the desired ZMP (excluding the component about the vertical axis) and the floor reaction force's horizontal component (strictly, the translation floor reaction force's horizontal component) without causing perturbation of the floor reaction force's vertical component (which is in balance with the resultant force of the inertial force and gravity caused by the perturbation of the body's horizontal acceleration in a dynamical sense). This movement mode is referred to as a body translation mode.

In other words, referred to as a body translation mode is such a movement that causes changes of the horizontal component of the floor reaction force's moment about the desired ZMP and the floor reaction force's horizontal component (translation floor reaction force's horizontal component) without causing any change of the floor reaction force's vertical component.

A variation of the horizontal component of the floor reaction force moment's component per unit acceleration is denoted by ΔMp, and a variation of the floor reaction force's horizontal component per unit acceleration is denoted by ΔFp. If the body 24 is horizontally accelerated in the forward direction in the situation shown in FIG. 9, ΔMP and ΔFp are applied in the directions indicated by the arrows in FIG. 9, respectively.

While, in order to be perceptually more readily understood, the body translation mode is represented using the floor reaction force balanced with the resultant force of the inertial force and gravity caused by the movement, representing the same using the resultant force of the inertial force and gravity is more accurate theoretically. Here, the resultant force and the floor reaction force have the same magnitude and the opposite directions.

The ratio of ΔMp to ΔFp is referred to as a body translation mode floor reaction force ratio h. That is, the body translation mode floor reaction force h is defined by the following formula.

$$h = \Delta Mp / Fp \qquad \text{formula a7}$$

Figure 10:
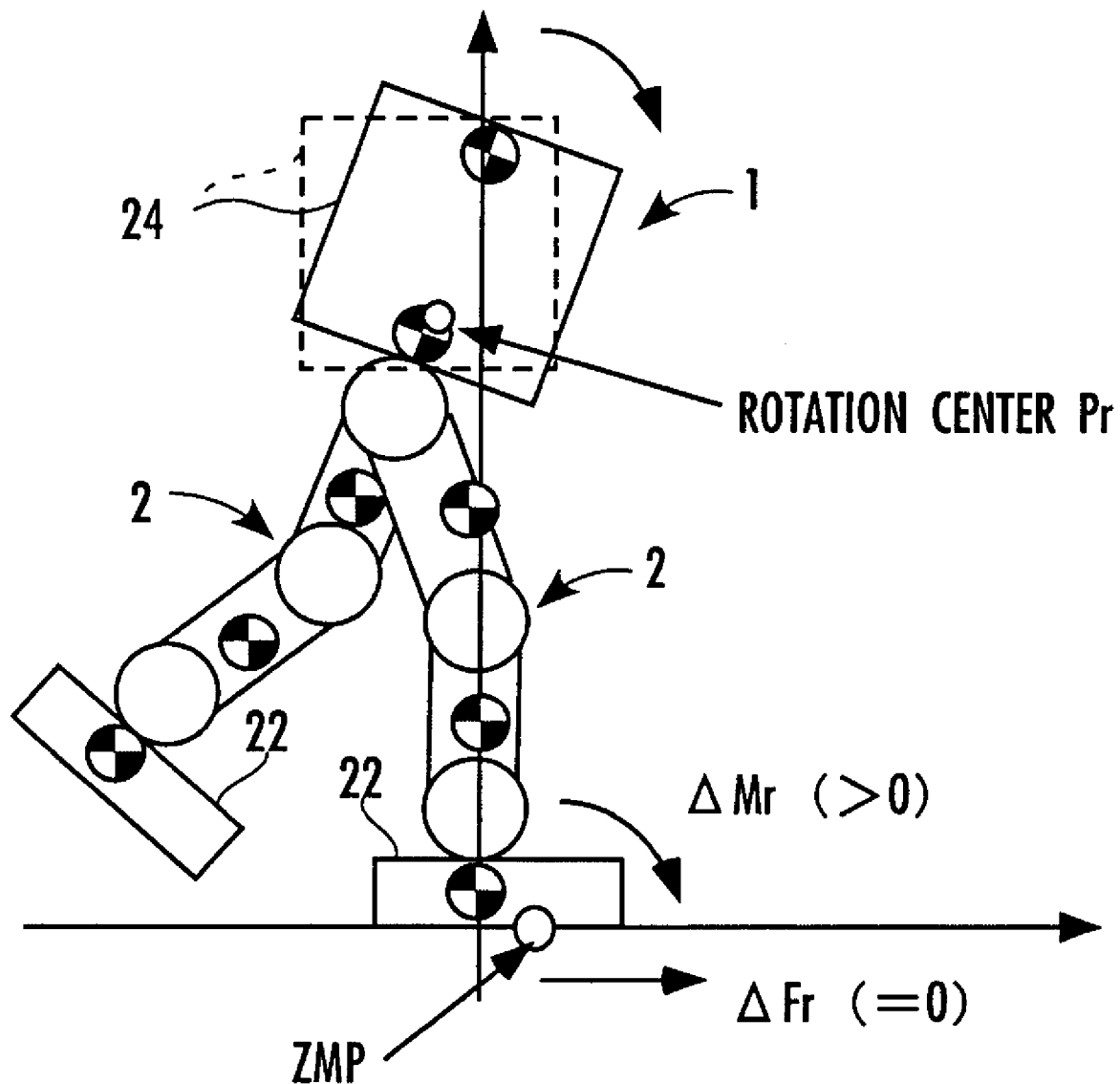

On the other hand, as shown in FIG. 10, if the body posture angular acceleration is brought into perturbation about a certain point Pr from a certain movement state, the total center of gravity is not brought into perturbation, but the angular momentum about the total center of gravity is brought into perturbation. That is, the perturbation of the body posture angular acceleration about the point Pr causes perturbation of the horizontal component of the floor reaction force's moment about the desired ZMP, without causing perturbations of the floor reaction force's vertical component and the floor reaction force's horizontal component (strictly, the translation floor reaction force's vertical component and the translation floor reaction force's horizontal component). This movement mode is referred to as a body rotation mode.

In other words, referred to as a body rotation mode is such a movement that causes a change of the horizontal component of the floor reaction force's moment about the desired ZMP without causing any changes of the floor reaction force's vertical component and the floor reaction force's horizontal component.

A variation of the horizontal component of the floor reaction force moment's component per unit acceleration is denoted by ΔMr, and a variation of the floor reaction force's horizontal component per unit acceleration is denoted by ΔFr. ΔFr is 0. If an angular acceleration is applied to the body to cause the body to incline forward in the situation shown in FIG. 10, ΔMr is applied in the direction indicated by the arrow in FIG. 10.

Besides the body translation mode and the body rotation mode, the movement of the body 24 includes a body vertical movement mode. This mode makes the body 24 move in the vertical direction.

The desired instantaneous value generator 100b generates a gait using the simplified (dynamics) model described below. The simplified model is a dynamics model that gives priority to reduction of the calculation amount and easiness of behavior analysis rather than dynamical precision. It may neglect some dynamical considerations (a variation of the angular momentum about the center of gravity, for example) or may contain some contradiction (inaccuracy).

Figure 11:
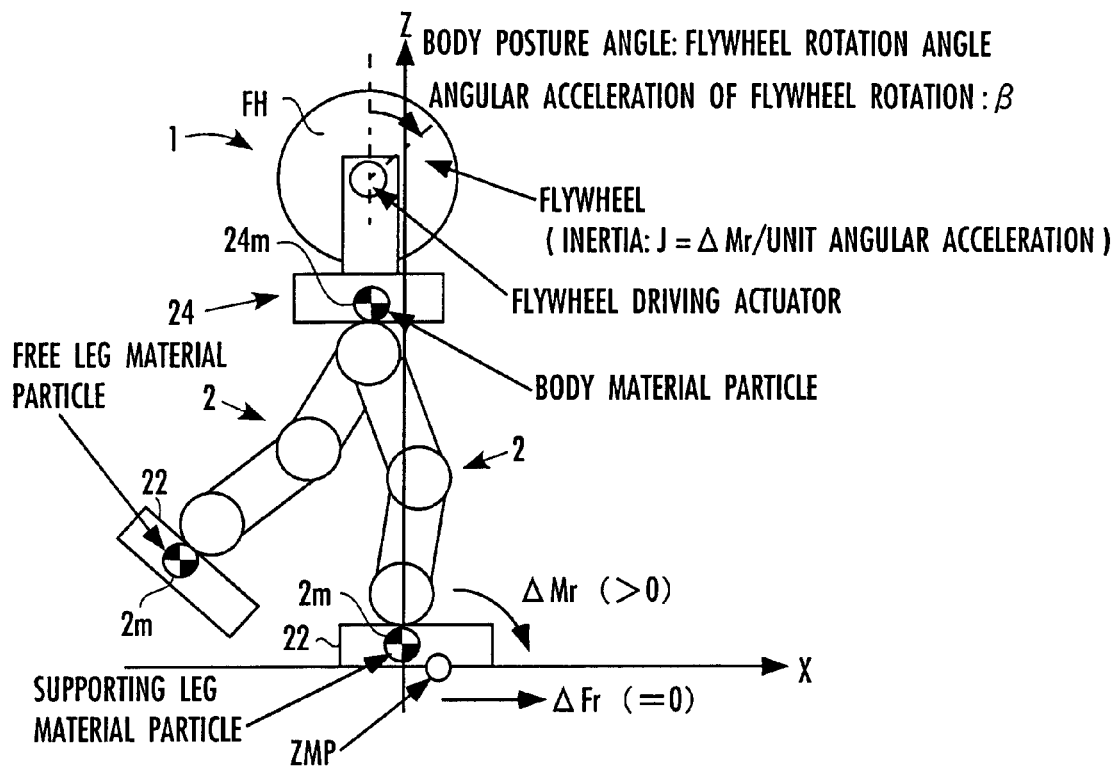
FIGS. 11 and 12 are diagrams for illustrating dynamics models of the robot.

FIG. 11 shows an example of the simplified dynamics model (simplified model). As shown, this dynamics model has three material particles in total, including two material particles $2m$, $2m$ corresponding to the legs 2, 2 of the robot 1, respectively, and a material particle $24m$ corresponding to the body 24, and a flywheel FH having a certain inertia and no mass. This dynamics model is a decoupled one, that is, the dynamics of the legs 2, 2 (dynamics of the material particles $2m$, $2m$) and the dynamics of the body 24 (dynamics of the material particle $24m$ and the flywheel FH) don't interfere with each other, and the dynamics of the whole robot 1 is represented by a linear coupling of these dynamics. In addition, the relationship between the movement of the body 24 and the floor reaction force is separated into the relationship between the translation movement of the body 24 (in the body translation mode) and the floor reaction force and the relationship between the rotation movement of the body 24 (in the body rotation mode) and the floor reaction force. Specifically, the floor reaction force caused by horizontal movement of the body material particle $24m$ corresponds to the floor reaction force caused by horizontal translation movement of the body 24 (in the body translation mode), and the floor reaction force caused by rotation movement of the flywheel corresponds to the floor reaction force caused by rotation of the posture angle of the body 24 (in the body rotation mode).

Here, the mass of the arms of the robot 1 is included in the mass of the body 24, and the body material particle $24m$ has a mass including the mass of the arms. In this embodiment, the movement (swing movement) of the arms of the robot 1 in the desired gait is attained in such a manner that it cancels the inertial force's moment about the vertical axis produced in the robot 1 by the movements other than the swing movement and keeps fixed the relative position of the center of gravity of the both arms with respect to the body 24. Thus, effects of the swing movement of the arms on the floor reaction force moment (except for the component thereof about the vertical axis) and the floor reaction force's horizontal component are neglected.

In the following, the simplified model will be formulated. In this regard, for the sake of simplicity of explanation, only the equation of motion in the sagittal plane (the plane containing the back-and-forth axis (X axis) and the vertical axis (Z axis)) is described, and the equation of motion in the lateral plane (the plane containing the sideward axis (Y axis) and the vertical axis (Z axis)) is omitted.

For convenience of explanation, variables and parameters concerning the dynamics model are defined as follows. Each of the material particles $2m$, $2m$ and $24m$ is a representative point of its corresponding part or a point geometrically uniquely determined from the position/posture of the part. For example, the position of the material particle $2m$ for the supporting leg 2 is located above the representative point of the sole of the foot 22 of the leg 2 by a predetermined distance.

$Zsup$: supporting leg material particle's vertical position $Zswg$: free leg material particle's vertical position $Zb$: body material particle's vertical position (typically different from the body's vertical position)

ZGtotal: total center-of-gravity vertical position

Xsup: supporting leg material particle's horizontal position

Xswg: free leg material particle's horizontal position

Xb: body material particle's horizontal position (this is a point which is shifted from the point Pr in the back-and-forth direction by a predetermined distance. The shift is determined so that the center of gravity in a strict model and the center of gravity in this dynamics model agree with each other as precisely as possible when the robot stands upright, for example. The body material particle's horizontal position is typically different from the body horizontal position.)

XGtotal: total center-of-gravity horizontal position $\theta by$: body posture angle about the Y axis with respect to the vertical direction (inclination angle)

mb: body material particle's mass msup: supporting leg material particle's mass mswg: free leg material particle's mass mtotal: total robot mass (=mtotal+msup+mswg)

J: body's moment of inertia (This is an equivalent moment of inertia in the body rotation mode.) Typically, this doesn't agree with the moment of inertia of the body 24 of the actual robot 1.)

Fx: floor reaction force's horizontal component (specifically, the back-and-forth (X axis) component of the translation floor reaction force)

Fz: floor reaction force's vertical component (specifically, the vertical (Z axis) component of the translation floor reaction force. In this embodiment, this equals to the desired translation floor reaction force's vertical component)

My: floor reaction force moment about the desired ZMP (specifically, the component of the floor reaction force moment about the sideward axis (Y axis))

In this embodiment, the relationship between the position of the material particle 2m of each leg 2 and the position of the foot 22 of the leg 2 (position of a predetermined representative point of the foot 22) is previously prescribed, and thus, if the position of either one of them is determined, the position of the other is uniquely determined. In addition, the relationship between the position of the body material particle 24m and the position of the body 24 (position of a predetermined representative point of the body 24) is previously prescribed in accordance with the posture angle of the body 24, and thus, if one of the positions and the posture angle are determined, the position of the other is uniquely determined.

In addition, for an arbitrary variable X, dX/dt represents the first order differential of X, and d2X/dt2 represents the second order differential of X. Thus, if the variable X represents a displacement, dX/dt represents the velocity, and d2X/dt2 represents the acceleration. The character g denotes the coefficient of the acceleration of gravity. Herein, g is a positive value.

The equations of motion for the dynamics model (formulas representing the dynamical equilibrium condition) are represented by the formulas a8, a9 and a10.

$$Fz=mb*(g+d2Zb/dt2)+msup*(g+d2Zsup/dt2)$$
$$+mswg*(g+d2Zswg/dt2) \quad \text{formula a8}$$

$$Fx=mb*d2Xb/dt2+msup*d2Xsup/dt2+mswg*d2Xswg/dt2 \quad \text{formula a9}$$

$$My=-mb*(Xb-Xzmp)*(g+d2Zb/dt2)+mb*(Zb-Zzmp)*(d2Xb/dt2)$$
$$-msup*(Xsup-Xzmp)*(g+d2Zsup/dt2)$$
$$+msup*(Zsup-Zzmp)*(d2Xsup/dt2)$$
$$-mswg*(Xswg-Xzmp)*(g+d2Zswg/dt2)$$
$$+mswg*(Zswg-Zzmp)*(d2Xswg/dt2)+J*d2\theta by/dt2 \quad \text{formula a10}$$

In addition, as for the center of gravity of the whole robot, the following relational formulas hold.

$$ZGtotal=(mb*Zb+msup*Zsup+mswg*Zswg)/mtotal \quad \text{formula b11}$$

$$XGtotal=(mb*Xb+msup*Xsup+mswg*Xswg)/mtotal \quad \text{formula b12}$$

The following are relationships between the dynamics model and $\Delta Fp$, $\Delta Mp$, $\Delta Fr$ and $\Delta Mr$.

$\Delta Fp$ is a perturbation amount of Fx provided when d2Xb/dt2 is brought into perturbation by a unit amount in the formula a9 and, thus, can be determined by the following formula.

$$\Delta Fp=mb \quad \text{formula c06}$$

That is, the variation $\Delta Fp$ of the horizontal component of the floor reaction force per unit acceleration in the body translation mode is equivalent to the mass of the body material particle 24m in the dynamics model.

$\Delta Mp$ is a perturbation amount of My provided when d2Xb/dt2 is brought into perturbation by a unit amount in the formula a10 and, thus, can be determined by the following formula.

$$\Delta Mp=mb*(Zb-Zzmp) \quad \text{formula c07}$$

That is, the variation $\Delta Mp$ of the horizontal component of the floor reaction force moment's component per unit acceleration in the body translation mode is the product of the body material particle mass in the dynamics model and the height (vertical position) of the body material particle 24m from the desired ZMP. The relationship between the positions of the body material particle 24m and the desired ZMP and the movement of the body material particle 24m is equivalent to the behavior of an inverted pendulum, the body material particle 24m being assumed to be the material particle of the inverted pendulum and the desired ZMP being assumed to be the fulcrum of the inverted pendulum.

$\Delta Fr$ is a perturbation amount of Fx provided when d2$\theta$by/dt2 is brought into perturbation by a unit amount in the formula a9 and, thus, can be determined by the following formula.

$$\Delta Fr=0 \quad \text{formula c08}$$

That is, the variation $\Delta Fr$ of the translation floor reaction force's horizontal component per unit acceleration in the body rotation mode is 0.

$\Delta Mr$ is a perturbation amount of My provided when d2$\theta$by/dt2 is brought into perturbation by a unit amount in the formula a10 and, thus, can be determined by the following formula.

$$\Delta Mr=J \quad \text{formula c09}$$

That is, the variation $\Delta Mr$ of the horizontal component of the floor reaction force moment component per unit acceleration in the body rotation mode is equivalent to the moment of inertia of the flywheel.

As described in detail later, generation of a gait using the simplified dynamics model in the above-mentioned example (a simplified model gait) is conduced under the following procedure.

First, based on the feet position/posture trajectory and the desired floor reaction force's vertical component calculated from the gait parameters, the body vertical acceleration is determined using the formula a8. In addition, the body vertical acceleration is integrated two times to find the body's vertical position Zb in the body vertical movement mode.

Finally, using the formulas a9 and a10, the body horizontal acceleration $d2(Xb)/dt2$ and the body posture angular acceleration $d2(\theta b)/dt2$ are determined in such a manner that the floor reaction force's horizontal component falls within the allowable range (the floor reaction force's horizontal component allowable range for the simplified model gait). Furthermore, these accelerations are integrated two times to determine the body horizontal position Xb in the body translation mode and the body posture angle θb in the body rotation mode (specifically, provisional instantaneous values thereof).

Generally speaking, the gait obtained using the simplified dynamics model (simplified model gait) is generated by calculating the body position trajectory and the body posture angle trajectory, based on the feet position/posture trajectory, the desired ZMP and the desired floor reaction force's vertical component which are determined from the gait parameters, in such a manner that the horizontal component of the moment about the desired ZMP applied by the resultant force of gravity and the inertial force is 0, the sum of the translation force's vertical component of the resultant force of gravity and the inertial force and the desired floor reaction force's vertical component is 0, and the desired floor reaction force's horizontal component (that is, the translation force's horizontal component of the resultant force of gravity and the inertial force which is inverse in sign) falls within the floor reaction force horizontal component allowable range.

In the embodiments described in this specification, the word "full model" means a robot dynamics model different from that used for determining the current time gait parameters. The full model is preferably a robot dynamics model that has a higher approximation precision than the model used for determining the current time gait parameters. In the example shown in the drawings, in this embodiment, the simplified model shown in FIG. 11 is used to determine the current time gait parameters. Therefore, it is preferable that a robot dynamics model having a higher approximation precision, such as a multi-mass model shown in FIG. 12 (a model having a material particle at each of the links in the robot 1), is used as the full model. In this case, the full model may be one in which a moment of inertia is set about a material particle.

However, the simplified model and the full model are not necessarily required to have different approximation precisions. The simplified model and the full model may use the same dynamics equations as far as they use different floor reaction force horizontal component allowable ranges. That is, only needed is that the allowable range for the simplified model gait and the allowable range for gait correction are different from each other. For example, it may be enough to set wide the floor reaction force horizontal component allowable range in generating a gait using the simplified model (it may exceed the friction limit) and set narrow the floor reaction force horizontal component allowable range in correcting the gait using the full model to prevent the robot from slipping.

In this specification, the model used for calculating (outputting) the body position/posture based on (by receiving) the desired foot position/posture and the desired floor reaction force (in particular, the desired ZMP and the desired floor reaction force's vertical component) is referred to as a "forward dynamics model", and the model used for calculating (outputting) the floor reaction force (in particular, the desired ZMP or the floor reaction force moment about the desired ZMP and the floor reaction force's horizontal component) based on (by receiving) the desired foot position/posture, the desired body posture and the desired body position is referred to as an "inverse dynamics model". Inputs to the forward dynamics model include at least the desired floor reaction force, and inputs to the inverse dynamics model include at least the desired movement.

The full model correction unit 100c has the inverse dynamics full model (of ten abbreviated as "inverse full model") or the forward dynamics full model (often abbreviated as "forward full model") Typically, the forward dynamics model tends to require more calculation than the inverse dynamics model.

Now, details of the processings performed by the gait generation device 100 according to a first embodiment of the present invention will be described more specifically.

The gait generation device 100 according to this embodiment generates sequentially a desired gait for one step from the landing of one leg 2 of the robot 1 to the landing of the other leg 2, (desired gait according to the definition (b")). For example, in the case of generating the desired running gait shown in FIG. 5, the desired gait is generated sequentially from the start of a one-leg supporting period to the end of the following floating period (that is, the start of the next one-leg supporting period). Here, the desired gait to be newly generated is referred to as a "current time gait", the next gait is referred to as a "next time gait", and the desired gait after next is referred to as a "next but one gait". In addition, the desired gait generated immediately before the current time gait is referred to as a "last time gait".

When the gait generation device 100 newly generates a current time gait, the required values (requests) of the expected landing position/posture and expected landing time of the foot 22 of the free leg for the next two steps of the robot 1 are input to the gait generation device 100 as required gait parameters (or the gait generation device 100 reads the required parameters from a storage device). Then, based on the required parameters, the gait generation device 100 generates the corrected desired body position/posture trajectory, the desired foot position/posture trajectory, the desired ZMP trajectory, the desired floor reaction force's vertical component trajectory, the desired arm posture trajectory, the corrected desired floor reaction force moment trajectory and the like.

Figure 13:
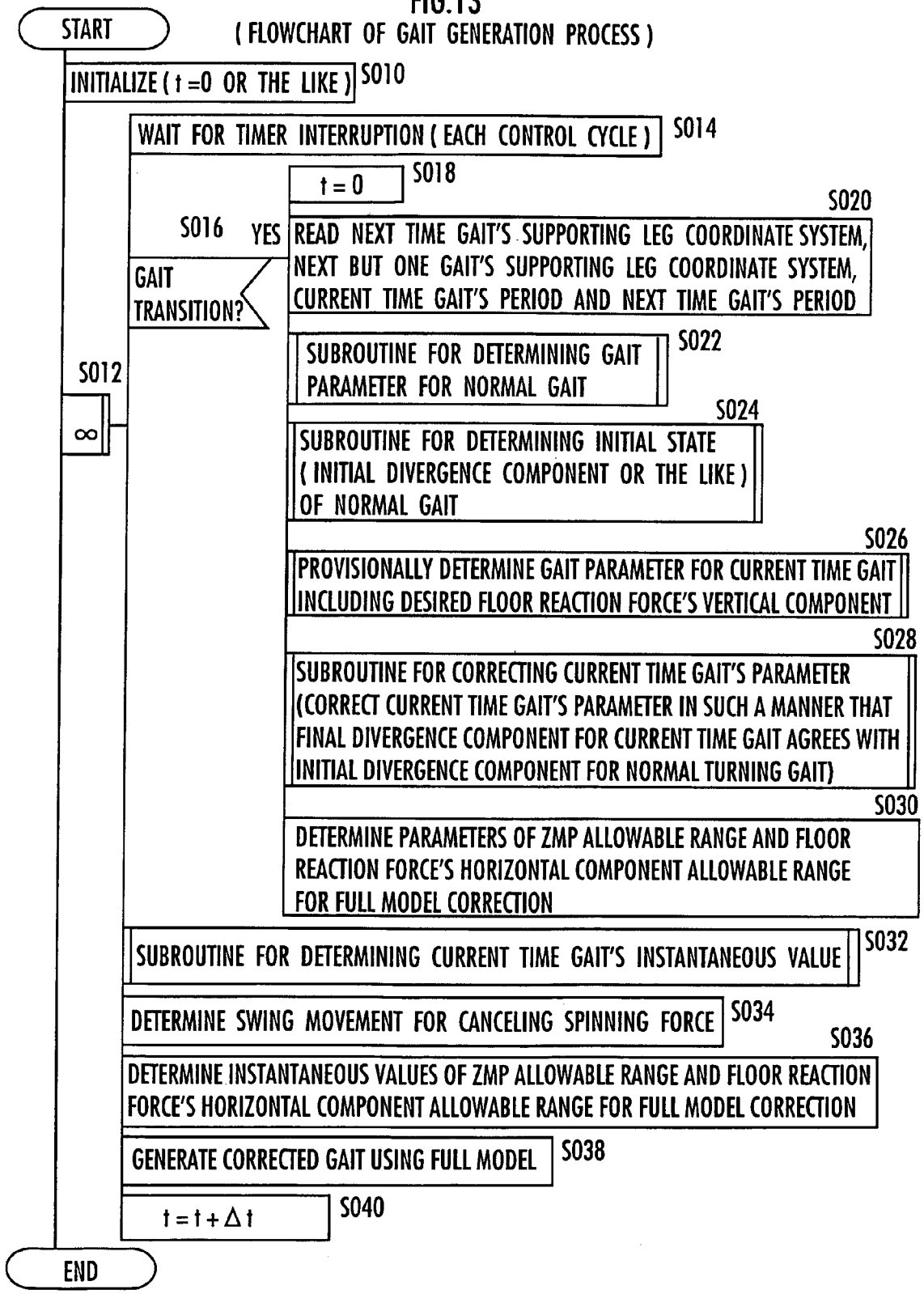
FIG. 13 is a flowchart showing a main routine process performed by the gait generation device provided in the control unit shown in FIG. 3.

Now, taking the generation of the running gait shown in FIG. 5 as an example, details of a gait generation process performed by the gait generation device 100 will be described with reference to FIGS. 13 to 39. FIG. 13 is a flowchart (structured flowchart) showing a gait generation process performed by the gait generation device 100.

First, in step S010, various initialization operations, such as an operation of initializing the time t to 0, are conducted. This processing is conducted when activating the gait generation device 100, for example. Then, the process proceeds to step S014 through step S012, where the gait generation device 100 waits for a timer interruption for each control cycle (calculation process cycle of the flowchart in FIG. 13). The control cycle is Δt.

Then, the process proceeds to step S016, where it is determined whether a gait transition is detected or not. If a gait transition is detected, the process proceeds to step S018, or otherwise, the process proceeds to step S030. Here, the "gait transition" means a timing at which generation of the last time gait is completed and generation of the current time gait is started. For example, the transition from the control cycle having completed generation of the last time gait to the next control cycle is a gait transition.

When the process proceeds to step S018, the time t is initialized to 0. Then, the process proceeds to step S020, where a next time gait's supporting leg coordinate system, a next but one time gait's supporting leg coordinate system, a current time gait's period and a next time gait's period are read in. These supporting leg coordinate systems and gait periods are determined by the required parameters described above. That is, in this embodiment, the required parameters given to the gait generation device 100 via the joystick 44 or the like include the required values of the expected landing positions/postures of the foot 22 of the free leg (position/posture of the foot 22 which is, once landing, rotated without slipping to come into contact with the floor at substantially the whole surface of the sole) and expected landing times for the next two steps. And, the required parameters are given to the gait generation device 100 before starting generation of the current time gait (before the gait transition detected in step S016) with the required values for the first step and the required values for the second step being associated with the current time gait and the next time gait, respectively. These required values can be changed in the process of generating the current time gait.

The next time gait's supporting leg coordinate system is determined depending on the required value of the expected landing position/posture of the foot 22 of the free leg for the first step (foot 22 of the free leg in the current time gait) included in the required parameters.

Figure 16:
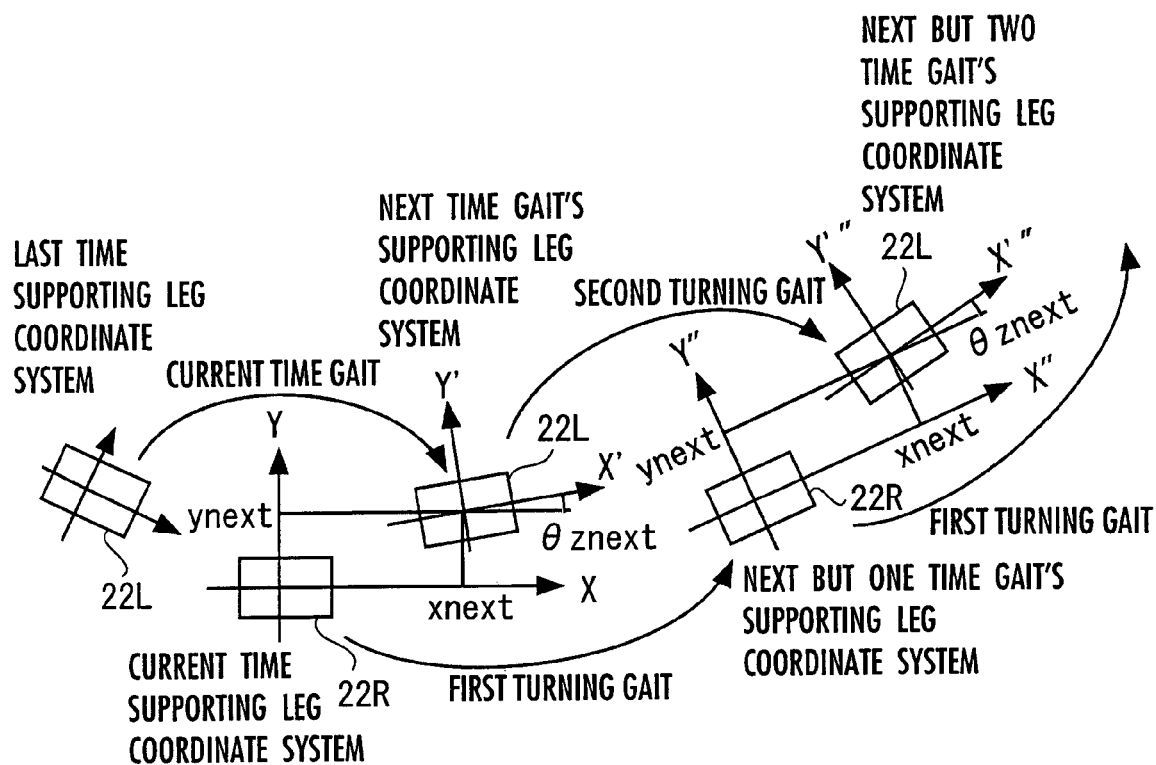
FIG. 16 is a diagram illustrating a relationship between foot landing positions/postures in a normal gait and coordinate systems.

For example, referring to FIG. 16, the required value of the expected landing position/posture of the foot 22 of the free leg in the current time gait (first step) (foot 22L in the drawing) is shifted in the X axis direction (back-and-forth direction of the foot 22R of the supporting leg in the current gait) and the Y axis direction (sideward direction of the foot 22R of the supporting leg in the current gait) in the current time gait supporting leg coordinate system by xnext and ynext, respectively, and rotated by θz next about the Z axis with respect to the landing position/posture of the foot 22 of the supporting leg in the current time gait (foot 22R in the drawing). Here, the supporting leg coordinate system is a global coordinate system (coordinate system fixed to the floor) whose origin is set at a point where a perpendicular line, which is drawn from the center of the ankle of the supporting leg 2 to the floor surface in a state where the foot 22 of the supporting leg is in a horizontal posture (more generally, parallel to the floor surface) and substantially the whole surface of the sole of the foot 22 of the supporting leg is in (intimate) contact with the floor surface, intersects with the floor surface and whose XY plane is the horizontal plane passing through the origin (in this embodiment, the point agrees with the representative point of the foot 22 in the state where substantially the whole surface of the sole of the foot 22 of the supporting leg is in contact with the floor surface). In this case, the X axis and Y axis directions are the back-and-forth and sideward directions of the foot 22 of the supporting leg, respectively. Here, the origin of the supporting leg coordinate system is not necessarily required to agree with the representative point of the foot 22 (point representative of the position of the foot 22) in the state where substantially the whole surface of the sole of the foot 22 of the supporting leg is in contact with the floor surface, and may be set at a point other than the representative point.

Here, the next time gait's supporting leg coordinate system is a coordinate system whose origin is set at the representative point (or, more specifically, a point matched to the representative point on the floor) of the foot 22L of the free leg in the current time gait in the case where the foot 22L lands according to the required value of the expected landing position/posture of the foot 22L (where the representative point of the foot 22 agrees with the required value of the expected landing position and the posture (orientation) of the foot 22 agrees with the required value of the expected landing posture) as shown in the drawing, and whose X' axis and Y' axis directions are the back-and-forth and sideward directions of the foot 22L, respectively, in the horizontal plane passing through the origin.

Similarly, the next but one time gait's supporting leg coordinate system (see the X"Y" coordinate in FIG. 15) is determined depending on the required value of the expected landing position/posture of the foot 22 of the free leg in the second step. The current time gait's period is a time period from the expected landing time (required value) of the foot 22 of the supporting leg in the current time gait to the expected landing time (required value) of the foot 22 of the free leg in the first step (current time gait). The next time gait's period is a time period from the expected landing time (required value) of the foot 22 of the free leg in the first step to the expected landing time (required value) of the foot 22 of the free leg in the second step.

In this embodiment, the required parameters are input to the gait generation device 100 by operating the joystick 44 as required. Alternatively, the required parameters or the positions/postures and gait periods corresponding thereto may be previously stored as a movement schedule of the robot 1. Alternatively, the next time gait's supporting leg coordinate, the next but one time gait's supporting leg coordinate, the current time gait's period and the next time gait's period may be determined based on an instruction (request) input via a manipulator, such as the joystick 44, and the movement history of the robot 1 up to that moment.

Then, the process proceeds to step S022, where the gait generation device 100 determines gait parameters for a normal turning gait, which is a virtual cyclic gait following the current time gait. The gait parameters include a foot trajectory parameter for defining a desired foot position/posture trajectory in the normal turning gait, a reference body posture trajectory parameter for defining a reference body posture trajectory, and an arm trajectory parameter for defining a desired arm posture trajectory, a ZMP trajectory parameter for defining a desired ZMP trajectory and a floor reaction force's vertical component trajectory parameter for defining a desired floor reaction force's vertical component trajectory. Furthermore, the gait parameters include a parameter for defining a desired floor reaction force's horizontal component allowable range.

The term "normal turning gait" in this specification is used to refer to a cyclic gait that, when repeated, results in no discontinuity in the movement states (states of the foot position/posture, body position/posture and the like) of the robot 1 at the boundaries between the gaits (boundaries between the successive gaits for different steps, in this embodiment). In the following, the "normal turning gait" is sometimes abbreviated as a "normal gait".

In this embodiment, the normal turning gait is a cyclic gait comprising two steps of the robot 1, and one cycle of the normal turning gait comprises a first turning gait following the current time gait and a second turning gait following the first turning gait. The word "turning" is used herein because "turning" can include "straight advance" in a broad sense since a turning ratio of 0 results in straight advance. Furthermore, if the desired gait to be generated is the running gait shown in FIG. 5, the current time gait of the desired gait is a running gait having a one-leg supporting period and a floating period. Therefore, both of the first turning gait and second turning gait of the normal turning gait are gaits having a one-leg supporting period and a floating period as with the current time gait. That is, the first and second turning gaits are basically the same as the current time gait.

More specifically, one cycle of the normal turning gait of the two-legged mobile robot requires at least two steps of gait in the narrow sense described above. A complicated normal turning gait having a cycle of three or more steps of gait can be set. However, as described later, the normal turning gait is used exclusively to determine a divergence component (described in detail later) at the end (end time) of the current time gait. Therefore, using the normal turning gait comprising a cycle of three or more steps is not very effective in spite of the increasing complexity of the gait generating process. Thus, in this embodiment, one cycle of the normal turning gait is composed of two steps of gait (first and second turning gaits). For a legged mobile robot having three or more legs, the number of gaits required to define the normal turning gait increases accordingly. In the following, for the convenience of explanation, the normal turning gait comprising a plurality of gaits in the narrow sense (two steps of gait in this embodiment) is regarded as one step of gait.

The normal turning gait is a provisional gait created in the gait generation device 100 for determining movement states of the robot 1 including the divergence component at the end of the current time gait, the body's vertical positional velocity, the body's posture angle and the angular velocity, and is not output directly from the gait generation device 100.

Figure 14:
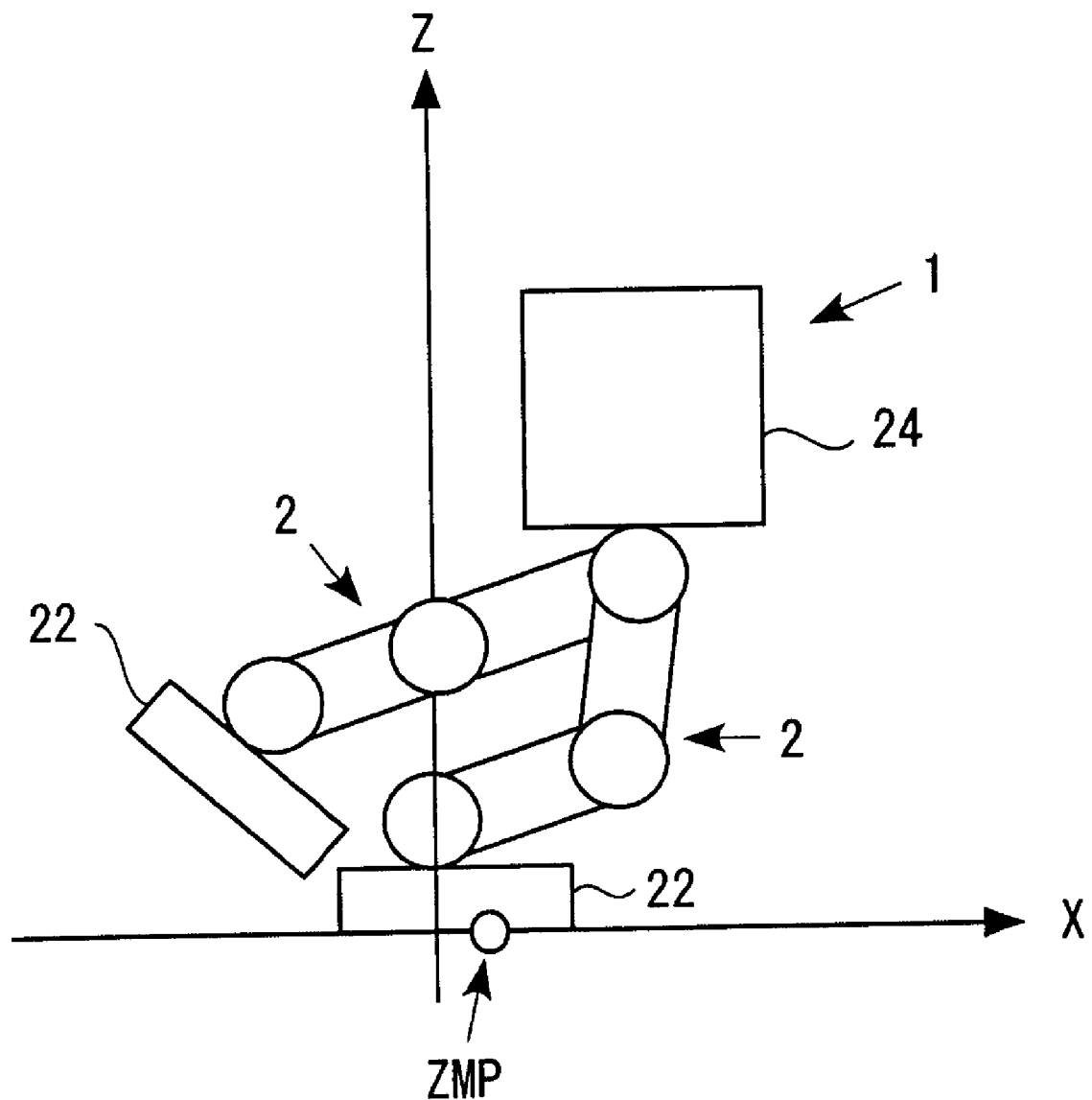
FIG. 14 is a diagram illustrating a divergence state of the body position of the robot.

Here, the word "divergence" means that the position of the body 24 of the two-legged mobile robot 1 is displaced far from the positions of the feet 22, 22, as shown in FIG. 14. The value of the divergence component is a numerical value that represents the degree of displacement of the position of the body 24 of the two-legged mobile robot 1 from the positions of the feet 22, 22 (more specifically, the origin of the global coordinate system (supporting leg coordinate system) set on the surface with which the foot 22 of the supporting leg is in contact).

In this embodiment, the desired gait is generated by using the divergence component as a reference index in order to allow the gait to be continuous without a divergence occurring in the gait. However, even an initial divergence component of a normal gait (a divergence component of a normal gait at the initial time thereof), which is a representative example of continuous gaits, is not always simply 0 and varies with a parameter of the normal gait (the normal gait is a cyclic gait that has no discontinuity in the trajectory and can be repeated with the same pattern or, in theory, can be infinitely repeated without divergence even if repeated infinitely in theory). That is, the appropriate divergence component varies with the gait configuration, for example, the manner of walking or running. Thus, in this embodiment, the current time gait is generated in such a manner that the normal gait to be generated following the current time gait is set in accordance with the required parameters of the current time gait, the initial divergence component of the normal gait is determined, and then the final divergence component of the current gait is made to agree with the initial divergence component of the normal gait (more generally, the current gait is made to be continuous with or close to the normal gait). The basic principle of such gait generation is the same as that described in Japanese Patent Application No. 2000-352011 previously proposed by the applicants.

In the embodiments of the present invention, the linear three-material-particle dynamics model used in the first embodiment describe in Japanese Patent Application No. 2000-352011 is not used. However, the concept of the divergence component and convergence component defined by the following formulas can be applied, in an approximation manner with an adequate precision, to a perturbation of the behavior of the nonlinear dynamics model, such as the simplified model shown in FIG. 11.

divergence component=body material particle's horizontal position

+body material particle's horizontal velocity/$\omega 0$     formula cd10 convergence component=body material particle's horizontal position−body material particle's horizontal velocity/$\omega 0$     formula c11

However, the body material particle's horizontal position is the body material particle's horizontal position Xb in the simplified model (dynamics model) shown in FIG. 11.

Furthermore, $\omega 0$ is a predetermined value, and the value during running has to be slightly varied from the value during walking gait generation described in Japanese Patent Application No. 2000-352011.

Other details concerning the divergence and convergence components are described in Japanese Patent Application No. 2000-352011, and thus, further description thereof is omitted herein.

In this embodiment, in addition to the method described in Japanese patent application no. 2000-352011, as described later, a gait parameter that defines the desired floor reaction force's vertical component trajectory is set, and the total center-of-gravity vertical position of the robot 1 is determined so as to satisfy, in terms of dynamics, the desired floor reaction force's vertical component. In this case, the second-order integral of the floor reaction force's vertical component defines the total center-of-gravity vertical position of the robot 1. Therefore, if the desired floor reaction force's vertical component is set inadequately, the total center-of-gravity vertical position or body's vertical position of the robot 1 becomes too high or too low. Therefore, how to set the desired floor reaction force's vertical component is also an important problem.

Returning to the main subject, in step S022, a process described below is conducted in accordance with the flowchart shown in FIG. 15.

First, in step S100, foot trajectory parameters of the gait parameters for the normal gait are determined in such a manner that the foot position/posture trajectories of the current time gait, the first turning gait and the second turning gait are connected to each other in this order. A specific setting manner will be described below with reference to FIG. 16. In the following description, the foot 22 of the supporting leg 2 is referred to as a supporting leg's foot, and the foot 22 of the free leg 2 is referred to as a free leg's foot. Furthermore, the terms "initial (start)" and "final (end)" concerning the "gait" mean the start time and end time of the gait, respectively, or instantaneous gaits at the start time and end time of the gait, respectively.

The foot trajectory parameters include supporting leg's foot positions/postures and free leg's foot positions/postures at the start and end of the first turning gait and the second turning gait, and gait periods of the turning gaits. Of the foot trajectory parameters, the free leg's foot position/posture at the start of the first turning gait is regarded as the supporting leg's foot position/posture at the end of the current time gait seen from the next time's gait supporting leg coordinate system. In this case, in the running gait, the supporting leg's foot 22 at the end of the current time gait has floated in the air. The supporting leg's foot position/posture at the end of the current time is determined by using the finite duration settling filter to generate, until the end of the current gait, the foot position/posture trajectory (specifically, trajectory seen from the next time gait's supporting leg coordinate system) that leads from the supporting leg's foot position/posture at the start of the current time gait (=the free leg's foot position/posture at the end of the last time gait) to the free leg's foot position/posture at the end of the next time gait that is determined depending on the required value of the expected landing position/posture of the free leg's foot 22 for the second step (required value of the expected landing position/posture in the next time gait of the supporting leg's foot 22 in the current time gait) of the required parameters or the next but one time gait's supporting leg coordinate system associated with the required value.

Here, the free leg's foot position/posture at the end of the next time gait is determined in such a manner that the position/posture of the foot 22 rotated from the position/posture by a predetermined angle to the horizontal posture in the pitch direction by lowering the toe while keeping the foot 22 in contact with the floor agrees with the position/posture thereof in the next but one time gait's supporting leg coordinate system. In other words, the free leg's foot position/posture at the end of the next time gait is the position/posture of the foot 22 that is rotated by a predetermined angle in the pitch direction by raising the toe while keeping the foot 22 in contact with the floor without slipping (a state where the foot 22 has the toe raised and the heel in contact with the floor) from the required value of the landing position/posture of the free leg's foot 22 in the second step of the required parameters.

In addition, the supporting leg's foot position/posture at the start of the first turning gait is regarded as the free leg's foot position/posture at the end of the current time gait seen from the next time gait's supporting leg coordinate system. In this case, as with the free leg's foot position/posture at the end of the next time gait, the free leg's foot position/posture at the end of the current time gait is determined depending on the next time gait's supporting leg coordinate system or the required value of the expected landing position/posture of the free leg for the first step (current time gait) of the required parameters associated with the next time gait's supporting leg coordinate system. That is, the free leg's foot position/posture at the end of the current time gait is determined in such a manner that the representative point of the foot 22 rotated from the position/posture by lowering the toe while keeping the foot 22 in contact with the floor to bring substantially the whole of the sole of the foot 22 into contact with the floor agrees with the origin of the next gait's supporting leg coordinate system.

As with the free leg's foot position/posture at the end of the current time gait and the free leg's foot position/posture at the end of the next time gait, the free leg's position/posture at the end of the first turning gait is determined based on the position/posture in the next but one time gait's supporting leg coordinate system seen from the next time gait's supporting leg coordinate system. More specifically, the free leg's foot position/posture at the end of the first turning gait is set in such a manner that the position/posture of the foot 22 that is rotated from the position/posture by a predetermined angle to the horizontal posture while keeping the foot 22 in contact with the floor without slipping agrees with the position/posture in the next but one time gait's supporting leg coordinate system seen from the next time gait's supporting leg coordinate system.

At the end of the first turning gait, the supporting leg's foot 22 is away from the floor and floats in the air. To determine the trajectory after the supporting leg's foot 22 takes off the floor, an expected landing position/posture of the first turning gait's supporting leg's foot is set. The expected landing position/posture of the first turning gait's supporting leg's foot is set based on the position/posture in a next but two gait's supporting leg coordinate system seen from the next time gait's supporting leg coordinate system. More specifically, the expected landing position/posture of the first turning gait's supporting leg's foot is the position/posture in the next but two gait's supporting leg coordinate system seen from the next time gait's supporting leg coordinate system. Here, the next but two gait's supporting leg coordinate system is set in such a manner that the relative position/posture relationship between the next but one time gait's supporting leg coordinate system and the next but two gait's supporting leg coordinate system agrees with the relative position/posture relationship between the current time gait's supporting leg coordinate system and the next time gait's supporting leg coordinate system.

As with the supporting leg's foot position/posture at the start of the first turning gait, the supporting leg's foot position/posture at the end of the first turning gait is determined by using the finite duration settling filter to generate the foot position/posture trajectory leading from the supporting leg's foot position/posture at the start of the first turning gait to the expected landing position/posture of the first turning gait's supporting leg's foot (more specifically, trajectory seen from the next time gait's supporting leg coordinate system) until the end of the first turning gait.

The free leg's foot position/posture at the start of the second turning gait is the supporting leg's foot position/posture at the end of the first turning gait seen from the next but one time gait's supporting leg coordinate system. The supporting leg's foot position/posture at the start of the second turning gait is the free leg's foot position/posture at the end of the first turning gait seen from the next but one time gait's supporting leg coordinate system.

The free leg's foot position/posture at the end of the second turning gait is the free leg's foot position/posture at the end of the current time gait seen from the current time gait's supporting leg coordinate system. The supporting leg's foot position/posture at the end of the second turning gait is the supporting leg's foot position/posture at the end of the current time gait seen from the current time gait's supporting leg coordinate system.

The gait periods of the first and second turning gaits are set to be the same as the period of the next time gait. The gait periods of the first and second turning gaits are not necessarily required to be the same. However, both the periods are preferably determined in accordance with the period of the next time gait. Movement parameters of the current time gait, the first turning gait and the second turning gait other than those described above (including time parameters including the two leg supporting period duration) are appropriately determined so as to satisfy the gait requirements (for example, that the velocity of an actuator falls within an allowable range, that an allowable angle of the actuator is not surpassed and that a foot is not in contact with the floor or the like) in accordance with the parameters determined as described above.

Then, the process proceeds to step S102, where the reference body position/posture trajectory parameter for defining the reference body position/posture trajectory to be followed by the desired body posture is determined. The reference body posture is not necessarily required to be constant, as far as the reference body posture is the same at the start of the normal gait (start of the first turning gait) and the end thereof (end of the second turning gait) (the posture angle of the reference body posture and the angular velocity thereof are the same at the start and the end of the normal gait). However, in this embodiment, to be readily understood, the reference body posture is the upright posture (vertical posture). That is, in this embodiment, the reference body posture is the upright posture throughout the duration of the normal gait. Therefore, in this embodiment, the angular velocity and angular acceleration of the posture angle of the reference body posture are 0.

Then, the process proceeds to step S104, where arm posture trajectory parameters, more specifically, the arm posture trajectory parameters other than those concerning the angular momentums of the arms about the vertical axis (or body trunk axis) are determined. For example, arm posture trajectory parameters, such as the relative height of the tip of the arm with respect to the body 24 or the relative position of the center of gravity of the entire arm with respect to the body 24, are determined. In this embodiment, the relative position of the center of gravity of the entire arm is kept constant with respect to the body.

Then, the process proceeds to step S106, where floor reaction force's vertical component trajectory parameters are set. In this case, the floor reaction force's vertical component trajectory parameters are set in such a manner that the floor reaction force's vertical component trajectory defined by the parameters is substantially continuous (i.e., has no step-wise discrete values) in the first and second turning gaits as shown in FIG. 6. That is, the desired floor reaction force's vertical component trajectory of the normal turning gait is set to be the pattern shown in FIG. 17. According to this pattern, both for the first and second turning gaits, the floor reaction force's vertical component varies in a trapezoidal shape during the one leg supporting period and is kept at 0 during the floating period. And, the times of the apexes of the pattern and the heights (peak values) of the trapezoids are set as the floor reaction force's vertical component trajectory parameters.

In setting the floor reaction force's vertical component trajectory parameters, the average value of the floor reaction force's vertical component for the whole gait duration (period of one cycle of the normal gait, which is a sum of the periods of the first and second turning gaits) is made to agree with the weight of the robot 1. That is, the average value of the floor reaction force's vertical component is made equal in magnitude and opposite in direction to gravity applied to the robot 1.

Setting the floor reaction force's vertical component trajectory as described above is required to satisfy the normal gait requirement. The normal gait requirement is that the initial states of all the state variables (positions, postures and velocities of the parts of the robot 1) of the gait seen from the supporting leg coordinate system (coordinate system set on the surface at which the supporting leg's foot 22 is in contact) agree with the final states of the gait (final states of the second turning gait) seen from the next supporting leg coordinate system (supporting leg coordinate system of the next first turning gait) (hereinafter, this requirement is sometimes referred to as a boundary requirement of the normal gait). Therefore, the difference between the total center-of-gravity vertical velocity of the robot 1 at the end of the normal gait and the total center-of-gravity vertical velocity at the start of the normal gait (more specifically, difference between the total center-of-gravity vertical velocity at the end of the second turning gait and the total center-of-gravity vertical velocity at the start of the first turning gait) has to be 0. Since the difference described above is an integral (first order integral) of the difference between the floor reaction force's vertical component and gravity, the floor reaction force's vertical component trajectory has to be set as described above in order for the difference to be 0.

In this embodiment, the average values of the floor reaction force's vertical component for the periods of the first and second turning gaits are made to agree with the weight of the robot 1. More specifically, for example, after the times of the apexes of the trapezoidal line of the floor reaction force's vertical component trajectory in the first and second turning gaits are determined in accordance with the periods of the gaits, the heights of the trapezoids are determined in such a manner that the average values of the floor reaction force's vertical component for the first and second turning gaits agree with the weight of the robot 1 (the height of the trapezoids is determined by solving an equation representing agreement between the average values and the weight with the height of the trapezoid being assumed to be an unknown quantity).

This results in a difference of 0 between the total center-of-gravity vertical velocity at the end of the first turning gait and the total center-of-gravity vertical velocity at the start of the first turning gait and a difference of 0 between the total center-of-gravity vertical component at the end of the second turning gait and the total center-of-gravity vertical velocity at the start of the second turning gait. However, this is not essential. Alternatively, for example, the body's vertical position becomes too high or too low and, thus, the robot takes an unreasonable posture in the vicinity of the boundary between the first and second turning gaits, the height of the trapezoid of the floor reaction force's vertical component trajectory for the turning gaits may be modified from the state where the average values for the turning gaits agree with the weight.

Then, the process proceeds to step S108, where an allowable range [Fxmin, Fxmax] (more specifically, a parameter that defines the allowable range) of the floor reaction force's horizontal component for the simplified model gait (more specifically, for the normal gait of the simplified model gait) is determined, as shown in FIG. 18, in accordance with the floor reaction force's vertical component trajectory determined as described above as shown in FIG. 17. The polygonal line on the negative side in FIG. 18 represents the floor reaction force's horizontal component's allowable lower limit value Fxmin, and the polygonal line on the positive side represents the floor reaction force's horizontal component's allowable upper limit value Fxmax. The following is a supplementary description of a method of setting these values. In the following, a case where the floor surface is horizontal will be described.

The floor reaction force's horizontal component occurs due to friction between the floor and the foot 22. However, friction cannot be produced infinitely. Therefore, in order to prevent the actual robot 1 from slipping when it moves in accordance with the desired gait generated, the floor reaction force's horizontal component of the desired gait has to always fall within the friction limit. Thus, in order to satisfy this requirement, the floor reaction force's horizontal component allowable range is set, and, as described later, the desired gait is generated in such a manner that the floor reaction force's horizontal component of the desired gait falls within the allowable range.

Assuming that the friction coefficient between the floor and the foot 22 is $\mu$, the value of Fxmin has to be always equal to or higher than $-\mu^*$(floor reaction force's vertical component), and the value of Fxmax has to be always equal to or lower than $\mu^*$(floor reaction force's vertical component). The simplest settings are as follows. Herein, ka is a positive constant smaller than 1.

$Fxmin = -ka^*\mu^*$(floor reaction force's vertical component)

$Fxmax = ka^*\mu^*$(floor reaction force's vertical component)   formula c12

The floor reaction force's horizontal component allowable range shown in FIG. 18 is an exemplary range set in accordance with the formula c12. As parameters for defining the floor reaction force's horizontal component allowable range, the times of the apexes of trapezoidal waveform and the values of the waveform at the times in FIG. 18 may be set. However, in the case where the floor reaction force's horizontal component allowable range is determined by the formula c12, the parameter to be set may be only the value of $(ka^*\mu)$ in the formula c12.

As far as the requirement (that the floor reaction force's horizontal component of the desired gait always falls within the friction limit) is satisfied, the floor reaction force's horizontal component allowable range may be set in any other setting method. Since the floor reaction force's horizontal component allowable range for the simplified model gait is used to generate a provisional gait (simplified model gait), it is not necessarily required to determine the range based on a strict friction limit, and the floor reaction force's horizontal component allowable range for the one leg supporting period may be set to exceed the friction limit, for example. The same holds true for the floating period.

Then, the process proceeds to step S110, where a ZMP trajectory parameter that define the ZMP trajectory for the normal gait, which is a sum of the first and second turning gaits, is determined. In this case, the desired ZMP trajectory is determined to have a high stability margin and not to change abruptly, as described above.

Figure 19:
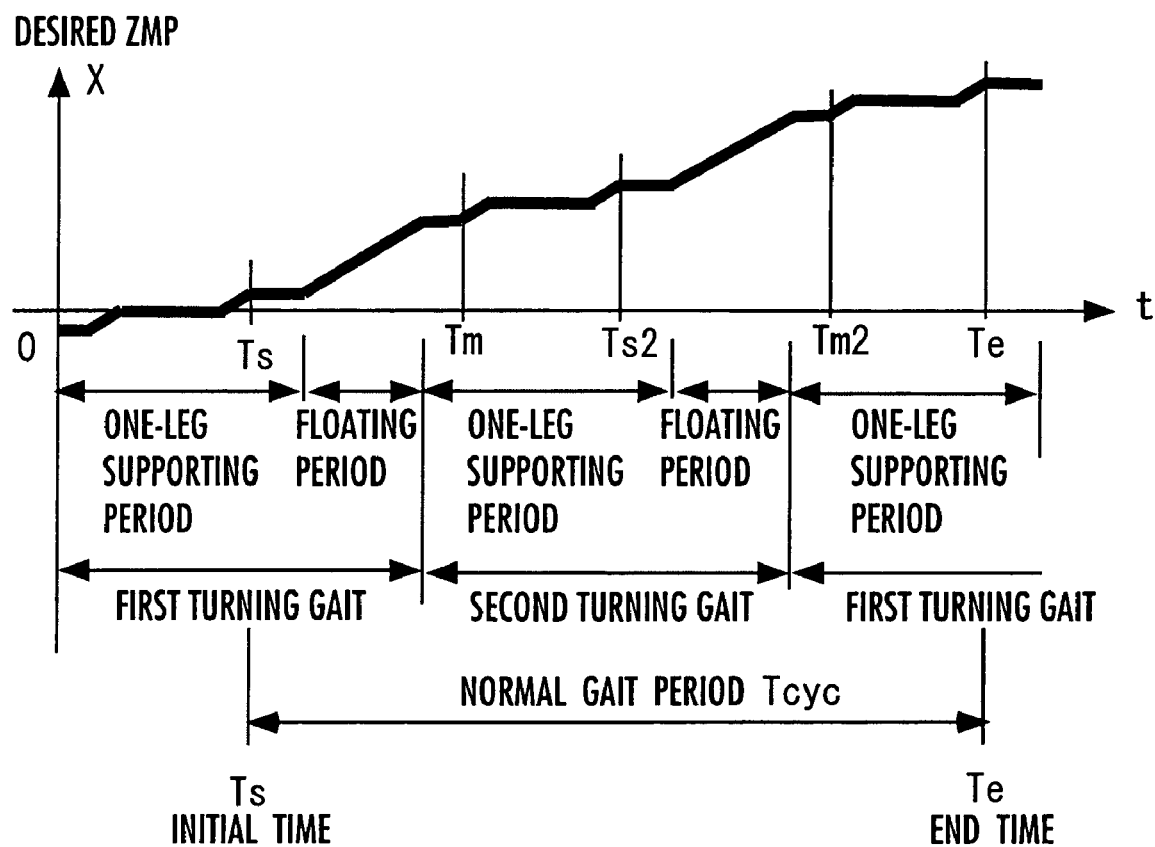
FIG. 19 is a graph showing an example of setting of a desired ZMP for the normal gait.

More specifically, in the running gait shown in FIG. 5, the heel of the supporting leg's foot 22 first lands, and some time after that, substantially the whole surface of the sole of the supporting leg's foot 22 comes into contact with the floor. Then, only the toe of the supporting leg's foot 22 comes into contact with the floor. Then, the robot jumps into the air by kicking the floor on the toe of the supporting leg's foot 22, and finally, the heel of the free leg's foot 22 lands. Besides, the desired ZMP has to lie within the contact surface. Thus, in this embodiment, as shown in the upper part of FIG. 7, both for the first and second turning gaits of the normal gait, the x-axis directional position of the desired ZMP is set to remain at the initial position, which is the position of the heel of the supporting leg's foot 22, until substantially the whole surface of the sole of the foot 22 comes into contact with the floor. Then, the desired ZMP is shifted to the middle of the supporting leg's foot 22 and then to the toe, making the foot 22 in contact with the floor only at the toe. Then, the desired ZMP remains at the position of the toe of the supporting leg's foot 22 until the foot takes off the floor. After that, as described above, the desired ZMP is shifted continuously from the toe of the supporting leg's foot 22 to the landing position of the heel of the free leg's foot 22 by the time of the next landing of the free leg's foot 22. Thus, the desired ZMP trajectory (X-axis directional trajectory) for the normal gait comprising the first and second turning gaits is as shown in FIG. 19. The times and positions of the apexes of the desired ZMP trajectory are set as ZMP trajectory parameters. In this case, the times of the apexes of the trajectory are determined based on the gait periods of the first and second turning gaits determined based on the required parameters, and the positions of the apexes of the trajectory are determined based on the positions/postures in the next time gait's supporting leg coordinate system and the next but one time gait's supporting leg coordinate system, or based on the required values of the expected landing positions/postures of the free leg's foot for the first and second steps of the required parameters that define these coordinate systems. The Y-axis directional position of the ZMP trajectory is determined as shown in the lower part of FIG. 7. More specifically, the trajectory of the Y-axis directional position of the desired ZMP for the first turning gait is set in the same pattern as that shown in the lower part of FIG. 7, and the trajectory of the Y-axis directional position of the desired ZMP for the second turning gait is set to have the same shape as that for the first turning gait and to be connected to the end of the trajectory for the first turning gait.

Finally, the process proceeds to step S112, where the initial time, the end time and the period of one step (one cycle) of the normal gait are redefined as follows.

The normal gait has to be a gait having state variables that are continuous at the start and the end thereof. For convenience of determination of such a gait, in this embodiment, until the normal gait is determined, unlike the definition of the gait in the narrow sense, the initial time, the end time and the period of one step of the normal gait are defined as shown in FIG. 17. That is, the time at which the floor reaction force's vertical component is decreased to some degree in the latter half of the one leg supporting period of the first turning gait is set as the initial time Ts of the normal gait. As shown in FIG. 7, the initial time Ts is preferably set to the instant when the supporting leg's foot 22 having been in contact with the floor at substantially the whole surface of the sole thereof comes into contact with the floor only at the toe thereof or a time immediately before the instant (the end time of the period in which whole the sole of the foot is in contact with the floor or a time immediately before the end time in FIG. 7). In addition, as for the relationship between the desired ZMP and the time Ts determined in step S110 and shown in FIG. 19 (or FIG. 7), it is preferable that the time Ts is the instant when the supporting leg's foot is in contact with the floor only at the toe after the desired ZMP has been completely shifted to the toe of the supporting leg's foot 22 through the middle thereof after substantially the whole surface of the sole of the supporting leg's foot 22 had come into contact with the floor in the first turning gait. Such an initial time Ts is determined in accordance with the desired ZMP trajectory parameter previously determined, for example. The reason why the initial time Ts is determined as described above will be described later.

Furthermore, as shown in FIG. 17, the period Tcyc of the normal gait is a sum of the gait periods of the first and second turning gaits. The end time of the normal gait is Te. Te is the time Ts plus Tcyc.

From the point in time when the normal gait is determined (when the loop of step S204 in FIG. 20 described later exits), the definitions of the initial time, the end time and the like of the gait in the narrow sense described above are adopted again. In the following description, the initial time according to the definition of the gait in the narrow sense described above (the time of the landing of the supporting leg's foot 22) is assumed to be 0, and reference symbol Ts is used to discriminate this original initial time 0 from the above-described initial time Ts used until the normal gait is determined (sometimes simply abbreviated as "Ts").

After the processings from steps S010 to S022 in FIG. 13 is conducted, the process proceeds to step S204, where initial states of the normal gait are calculated. The initial states calculated in this step include the initial body horizontal position/velocity (initial body position and initial body velocity in the horizontal direction), the initial body vertical position/velocity (initial body vertical position and initial body velocity in the vertical direction), the initial divergence component, the initial body posture angle and the angular velocity thereof for the normal gait. These initial states are calculated in a searching manner according to the flowchart in FIG. 20.

Figure 20:
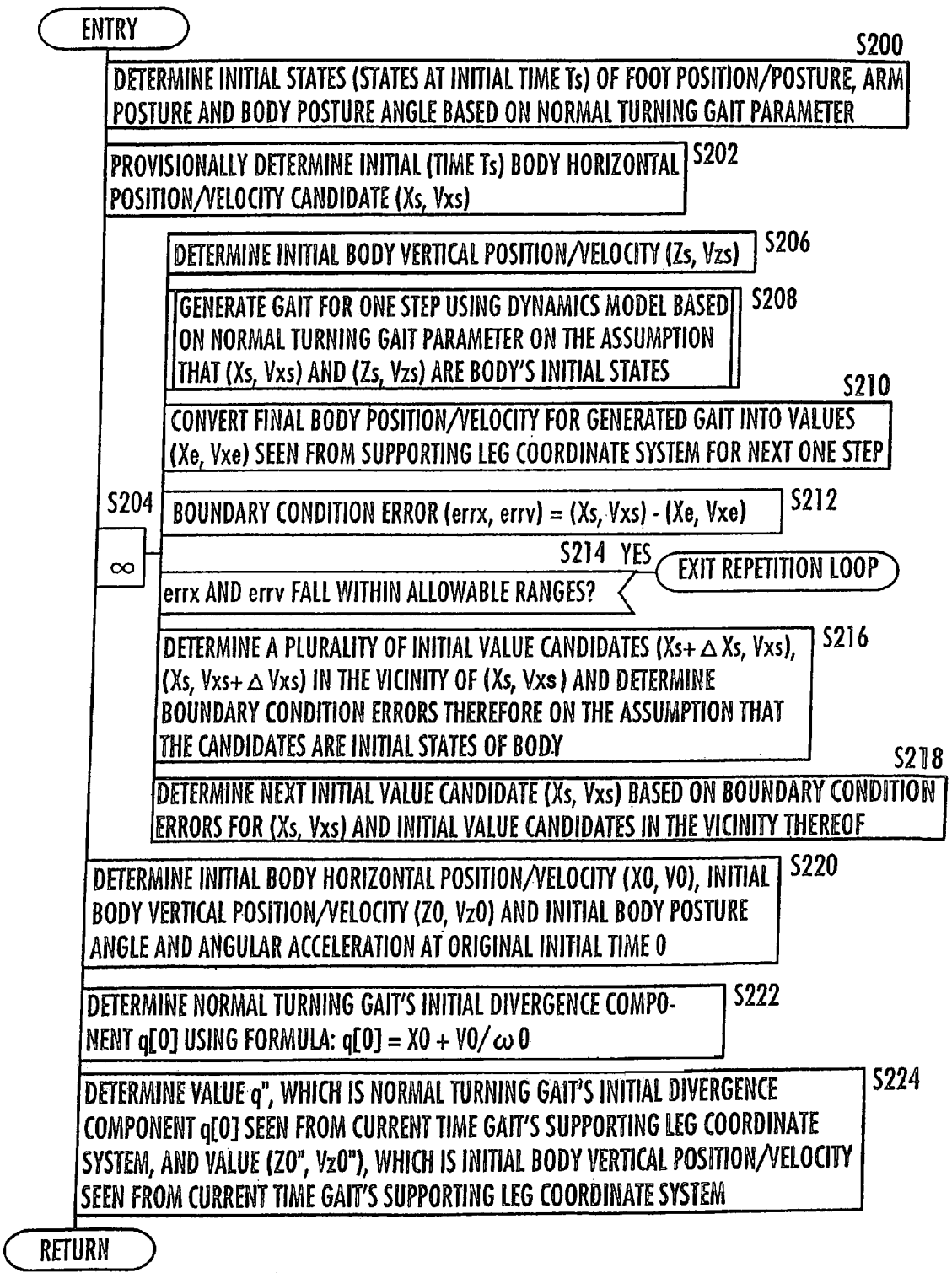
FIG. 20 is a flowchart showing a subroutine process in the flowchart shown in FIG. 13.

In the flowchart in FIG. 20, first, in step S200, the initial states (states at the initial time Ts) of the desired foot position/posture, the desired arm posture and the desired body posture angle (posture angle and direction) are determined based on the gait parameters for the normal gait (parameters determined in step S022 in FIG. 13). The term "state" refers to a position, a posture angle and variation rates (time differentials) thereof.

Figure 15:
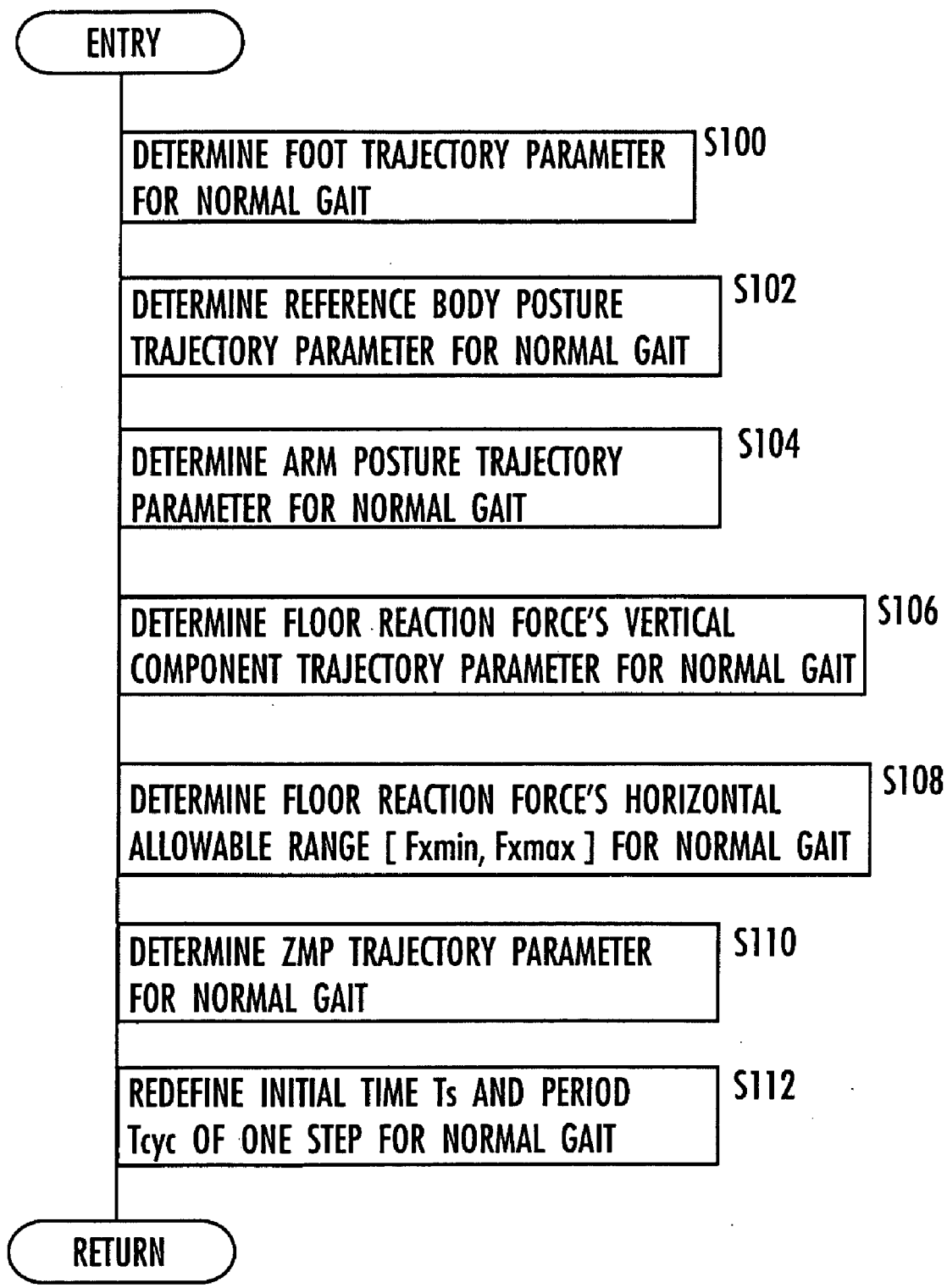
FIG. 15 is a flowchart for illustrating a subroutine process in the flowchart shown in FIG. 13.

In this case, the initial state of the desired foot position/posture of the supporting leg is determined by using the finite duration settling filter to generate the foot position/posture trajectory (trajectory seen from the next time gait's supporting leg coordinate system) leading from the supporting leg's foot position/posture at the start of the first turning gait of the foot trajectory parameters determined in step S100 in FIG. 15 to the free leg's foot position/posture at the end of the second turning gait until the time Ts. The initial state of the desired foot position/posture for the free leg is determined by using the finite duration settling filter to generate the foot position/posture trajectory leading from the supporting leg's foot position/posture at the start of the current time gait seen from the next time gait's supporting leg coordinate system to the free leg's foot position/posture at the end of the first turning gait until the time Ts. Besides, the initial state of the desired arm posture is determined by determining the arm posture (total center-of-gravity position of the arms with respect to the body 24, for example) at the time Ts based on the arm posture trajectory parameters determined in step S104 in FIG. 15. Besides, as the initial state of the desired body posture angle, the reference body posture (posture angle) and the angular velocity thereof at the time Ts, which are determined based on the reference body posture trajectory parameters determined in step S102 in FIG. 15, are determined. In this embodiment, since the reference state posture angle is the vertical posture, the initial state of the desired body posture angle is 0 (the posture angle and the angular velocity thereof are 0). Furthermore, in this embodiment, the desired foot position/posture trajectory, the floor reaction force's vertical component trajectory and the desired ZMP trajectory for the normal gait are independently determined from the foot trajectory parameters, the floor reaction force's vertical component trajectory parameters and the ZMP trajectory parameters determined in the flowchart in FIG. 15, respectively. For example, the instantaneous desired foot position/posture for the normal gait is determined based on the foot trajectory parameters, independently of the instantaneous value of the floor reaction force's vertical component.

Then, in step S202, (Xs, Vxs), which are candidates for the initial body horizontal position/velocity (that is, body horizontal position/posture candidates at the initial time Ts), are provisionally determined, where Xs is the horizontal position and Vxs is the horizontal velocity. The candidates (Xs, Vxs) provisionally determined in this step may be arbitrary ones and, for example, may be the body horizontal position/velocity of the initial states of the normal gait determined when the last time gait is generated.

For the simplicity of explanation, a case where the initial states for the normal gait in the X direction (back and forth direction) in the sagittal plane are searched for is taken as an example. Actually, however, both for the position and velocity, the initial states for the normal gait (initial states that satisfy the boundary requirement of the normal gait) for the X direction (back and forth direction) and the Y direction (sideward direction) have to be searched for separately or concurrently.

As the determination method in a searching manner, the simplex method or a method of determining an affine Jacobian (sensitivity matrix) and determining a next candidate by the steepest descent method may be used. In this embodiment, the steepest descent method is used.

Then, in step S206 after step S204, the initial (time Ts) body vertical position/velocity (Zs, Vzs) is determined, where Zs is the vertical position and Vzs is the vertical velocity.

In this embodiment, the initial body vertical velocity Vzs is determined as follows in an analytical manner.

For the robot 1, the following dynamical relationship holds.

$$\begin{aligned}&\text{(final total center-of-gravity vertical position)}- \\ &\quad\text{(initial total center-of-gravity vertical position)} \\ &=\text{second order integral of (floor reaction force's} \\ &\quad\text{vertical component/total mass of the robot)} \\ &+\text{second order integral of the gravitational} \\ &\quad\text{acceleration} \\ &+\text{(initial total center-of-gravity vertical velocity)}* \\ &\quad\text{(duration of one step)} \quad\quad\text{formula c13}\end{aligned}$$

(The Gravitational Acceleration is a Negative Value.)

In the normal gait, since the final total center-of-gravity vertical position agrees with the initial total center-of-gravity vertical position, the right side in the formula c13 has to be 0. Thus, the initial total center-of-gravity vertical velocity can be determined from these relationships. Specifically, a value obtained by dividing the floor reaction force's vertical component, which is calculated from the floor reaction force's vertical component parameters set in step S104 in FIG. 15, by the total mass of the robot 1 is integrated two times with respect to the period of one step (from the time Ts to the time Te), thereby determining the displacement of the total center of gravity due to the floor reaction force's vertical component (first term in the right side of the formula c13). Furthermore, the gravitational acceleration is integrated two times with respect to the period of one step, thereby determining the displacement of the total center of gravity due to gravity (second term in the right side of the formula c13). Then, the sum of the displacement of the total center of gravity due to the floor reaction force and the displacement of the total center of gravity due to gravity is inverted in sign, and the resulting value is divided by the duration of one step (duration of one cycle Tcycl of the normal gait), thereby determining the initial total center-of-gravity vertical velocity.

Then, in order to determine the initial body vertical position Zs, the total center-of-gravity vertical velocity at the time 0 is determined using the following formula. In this process, the value determined from the formula c13 as described above is substituted for the total center-of-gravity vertical velocity at the time Ts in the following formula, and the integral time is from the time 0 to the time Ts.

(total center-of-gravity vertical velocity at the time Ts)−(total center-of-gravity vertical velocity at the time 0)

=first order integral of (floor reaction force's vertical component/total mass of the robot)

+first order integral of the gravitational acceleration   formula c14

(The gravitational acceleration is a negative value.))

Then, the body height determination method proposed in Japanese Patent Laid-Open No. 10-86080 by the applicants is used to determine the body height (body vertical position) at the time 0 (that is, at the instant of landing). In this process, the body vertical position (body height) that allows the knees of the legs 2, 2 not to be fully stretched at the time 0 is determined based on the foot position/posture at the time 0 (the supporting leg's foot position/posture at the start of the first turning gait (at the time 0) and the free leg's foot position/posture at the start of the first turning gait (at the time 0) determined in step S100 in FIG. 15) and a predetermined geometrical condition concerning the bending angle of the knees of the legs 2. Specifically, assuming that the bending angle of the knee of the supporting leg 2 is θsup and the bending angle the knee of the free leg 2 is θswg, the body vertical position is determined in such a manner that the sum of the inverse numbers of the sinusoidal values of the knee bending angles θsup and θswg equals to a predetermined value (finite value), for example. Here, the knee bending angles θsup and θswg are the angles of the center axis of the crus part with respect to the center axis of the thigh part of each leg 2 and increase from 0 as the knee is bent from a state where each leg 2 is fully stretched. Such a method of determining the vertical position of the body 24 is described in detail in Japanese Patent Laid-Open No. 10-86080, and thus, further description thereof is omitted herein.

Then, from the body vertical position and the foot position/posture at the time 0 thus determined, the total center-of-gravity vertical position at the time 0 is determined using the simplified model. For example, the kinematics model represented by the formula b11, which corresponds to the simplified model shown in FIG. 11, may be used to determine the total center-of-gravity vertical position at the time 0. Specifically, the vertical position of the body material particle 24m is determined from the body vertical position and the body posture angle (0 in this embodiment) at the time 0, and the vertical positions of the supporting leg material particle 2m and the free leg material particle 2m are determined from the supporting leg's foot position/posture and the free leg's foot position/posture at the time 0 (the supporting leg's foot position/posture at the start of the first turning gait and the free leg's foot position/posture at the start of the first turning gait determined in step S100 in FIG. 15), respectively. Then, these vertical positions of the body material particle 24m, the supporting leg material particle

2m and the free leg material particle 2m are substituted for Zb, Zsup and Zswg in the formula b11, respectively, thereby determining the total center-of-gravity vertical position (ZG-total in the formula b11). Alternatively, a more precise model of the robot 1 (for example, the full model (multi-mass model) such as shown in FIG. 12) may be used to take into consideration the body horizontal position and the arm posture at the time 0 to determine the total center-of-gravity vertical position at the time 0.

Then, in the formula c13, the total center-of-gravity vertical position at the time 0 determined as described above is substituted for the initial total center-of-gravity vertical position in the left side of the formula c13, the total center-of-gravity vertical velocity at the time 0 determined as described above is substituted for the initial total center-of-gravity vertical velocity in the right side of the formula c13, Ts is substituted for the duration of one step in the formula c13, and a period from the time 0 to the time Ts is defined as the integral period, thereby calculating the value of the final total center-of-gravity vertical position in the left side of the formula c13, which is regarded as the initial (time Ts) total center-of-gravity vertical position. Furthermore, from the initial (time Ts) total center-of-gravity vertical position, the foot position/posture at the time Ts (determined in step S200) and the like, the initial (time Ts) body vertical position Zs is determined using a model of the robot 1 (the kinematics model represented by the formula b11, for example). Specifically, from the horizontal positions/postures of the supporting leg and the free leg at the time Ts, the vertical positions of the supporting leg material particle 2m and the free leg material particle 2m in the model shown in FIG. 11 are determined, and the vertical positions and the initial (time Ts) total center-of-gravity position determined as described above are applied to the formula b11, thereby determining the vertical position of the body material particle 24m (Zb in the formula b11). Then, from the vertical position of the body material particle 24m and the body posture at the time Ts (0 in this embodiment), the initial (time Ts) body vertical position Zs can be determined in an inverse operation manner. In this case also, a more precise model (for example, the full model shown in FIG. 12) may be used to take into consideration the body horizontal position and the arm posture to determine the initial body vertical position Zs.

Finally, from the initial state of the foot position/posture determined in step S200, the initial total center-of-gravity vertical velocity determined in step S206 and the like, the initial body vertical velocity is determined using a model of the robot 1 (for example, the kinematics model represented by the formula b11). Specifically, the initial total center-of-gravity vertical velocity determined based on the formula c13 and the vertical velocities of the supporting leg material particle 2m and the free leg material particle 2m determined by the initial states of the foot positions/postures of the supporting leg and free leg are applied to a formula obtained by time-differentiating the both sides of the formula b11, thereby determining the vertical velocity of the body material particle 24m. Then, from the vertical velocity of the body material particle 24m and the initial state of the body posture angle (determined in step S200 or S208 described later), the body vertical velocity is determined. Alternatively, such an initial body vertical velocity that provides the initial total center-of-gravity vertical velocity determined as described above may be determined using a more precise model of the robot 1 by taking into consideration the initial state of the arm posture (determined in step S200), the initial state of the body horizontal position provisionally determined (the latest ones provisionally determined in step S202 or step S216 or S218 described later) and the initial body vertical position determined as described above in addition to the initial state of the foot position/posture and the initial total center-of-gravity vertical velocity.

Figure 12:
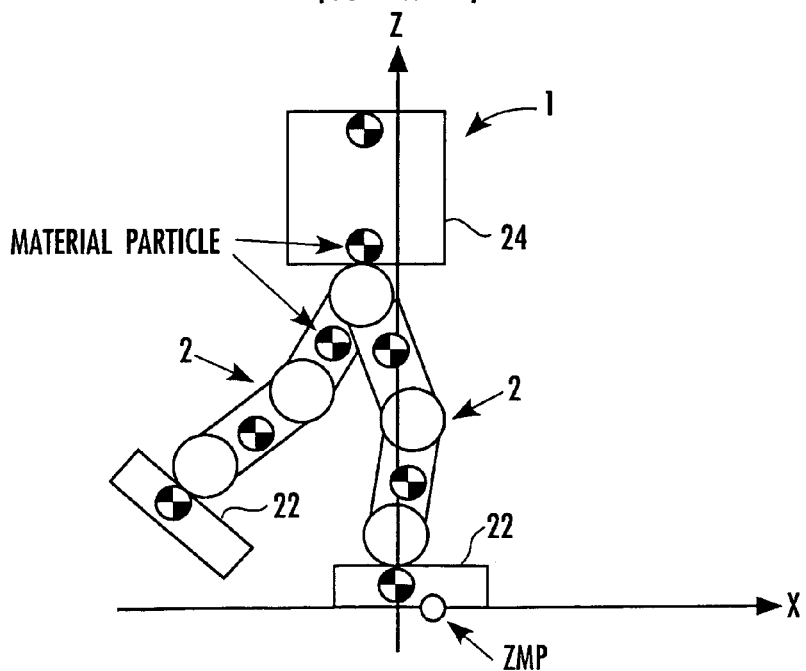

More specifically, even if the model of the robot 1 is a complicated (precise) one such as shown in FIG. 12, since the robot 1 has six degrees of freedom for each leg, all the initial states of the robot are determined uniquely if the initial states of the foot position/posture trajectory and the body position/posture trajectory (position/posture and the variation rates thereof) are given. Therefore, the initial total center-of-gravity vertical velocity can be determined uniquely if the same are given. Inversely, since the robot has six degrees of freedom for each leg, even if one, concerning velocity, of the initial states of the foot position/posture trajectory and the body position/posture trajectory (for example, the initial body vertical velocity) is undetermined, the undetermined initial state is determined uniquely if the initial total center-of-gravity vertical velocity is given.

After the processing of step S206, the process proceeds to step S208, where a provisional normal turning gait is generated. More specifically, based on the gait parameters of the normal gait determined in step S022 in FIG. 13, the desired ZMP, the desired floor reaction force's vertical component, the desired foot position/posture, the reference body posture, the desired arm posture and the floor reaction force's horizontal component allowable range at instants between the initial time Ts and the end time Te are determined successively. Then, in such a manner that the dynamical equilibrium conditions concerning the desired ZMP and the desired floor reaction force's vertical component and the condition concerning the floor reaction force's horizontal component allowable range are satisfied, the body position/posture is determined using the simplified model (dynamics model) shown in FIG. 11 assuming that the body horizontal position/velocity (Xs, Vxs) and the body vertical position/velocity (Zs, Vzs) are the initial (time Ts) states of the body 24, thereby generating the gait from the time Ts to the end time Te (provisional gait for the normal gait). In this process, the body posture is generated so as to agree with the reference body posture as closely as possible.

The generation of the normal gait is performed only in the gait generation device 100, and the result is not output to the composite-compliance determinator 104, described later, as a desired value for driving the actual robot 1.

Details of a normal gait generation process using successive calculation, which is the processing in step S208, will be described below.

Figure 21:
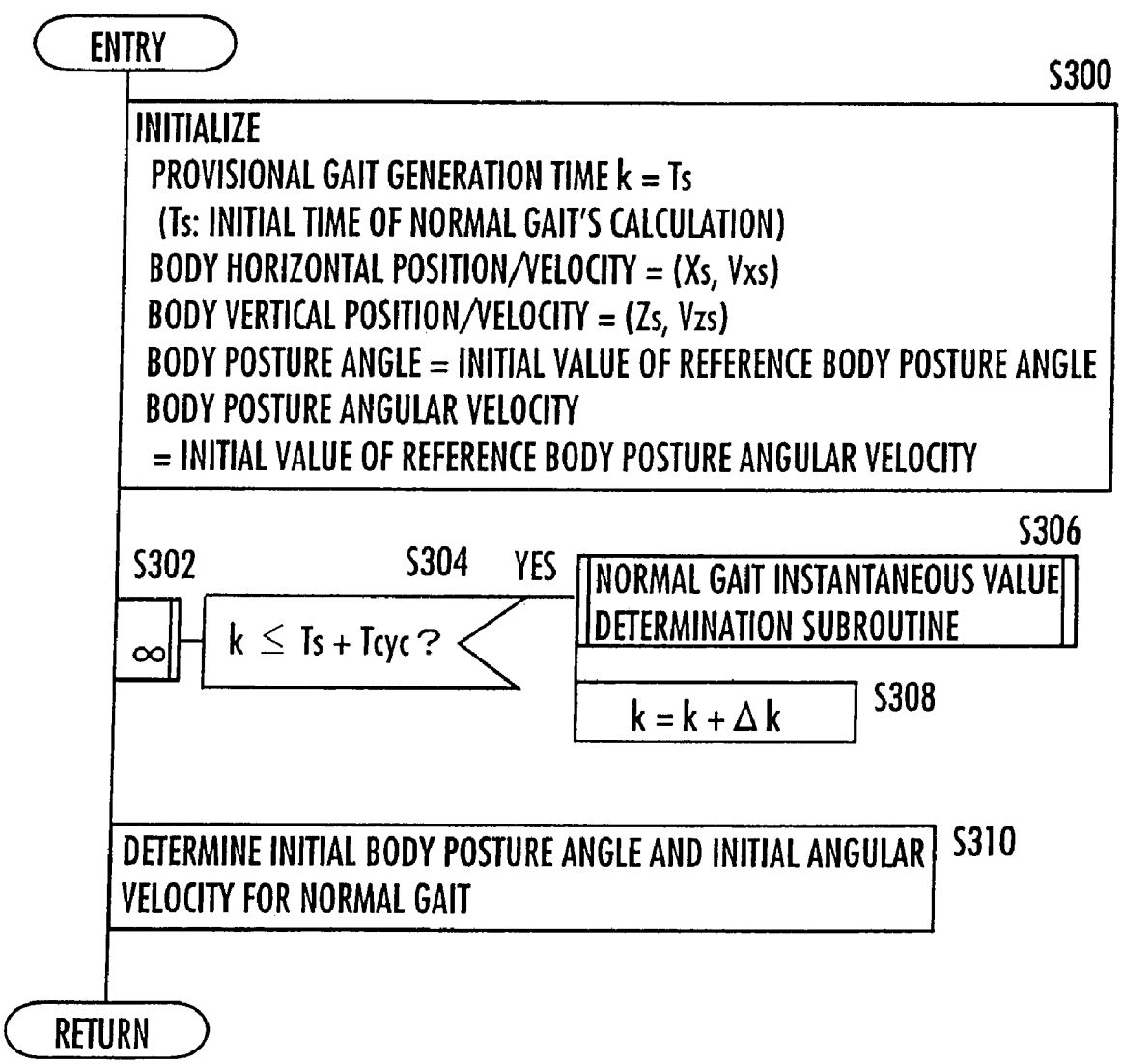
FIG. 21 is a flowchart showing a subroutine process in the flowchart shown in FIG. 20.

FIG. 21 is a subroutine flowchart showing the process.

In step S300, various initializations are performed. Specifically, the initial time Ts is substituted for the provisional gait generation time k. Furthermore, the currently determined provisional values (Xs, Vxs) (determined in step S202 in FIG. 20 or steps S216 or S218 described later) are substituted for the body horizontal position/velocity, and the latest values (Zs, Vzs) determined in step S206 are substituted for the body vertical position/velocity. In addition, the reference body posture angle's initial value (reference body posture angle at the time Ts) is substituted for the desired body posture angle, and the reference body posture angular velocity's initial value (reference body posture angular velocity at the time Ts) is substituted for the desired body posture angular velocity. In addition, the initial desired body posture angular velocity is eventually changed as described later, and therefore, a value different from the reference body posture angular velocity's initial value may be substituted for the desired body posture angular velocity.

Then, in step S304 after step S302, it is determined whether the provisional gait generation time k proceeds the end time of the gait or not (whether k≦Ts+Tcyc). If the result of the determination is YES, the process proceeds to a gait instantaneous value determination subroutine of step S306, where gait instantaneous values are determined. Then, the process of the gait generation device 100 proceeds to step S308, where the provisional gait generation time k is incremented by Δk, and then, the process returns to step S304.

Here, Δk is an interval between provisional gait generations and may generally be the same as the control cycle Δt. If the dynamical precision of the provisional gait can be lowered, Δk may be set longer than Δt for reducing the calculation amount.

If the result of the determination in step S304 is NO, the process proceeds to step S310. By the process described above, the normal gait is generated from the start to the end thereof before the process proceeds to step S310.

Details of the gait instantaneous value determination subroutine of step S306 will be described with reference to FIG. 22.

Figure 22:
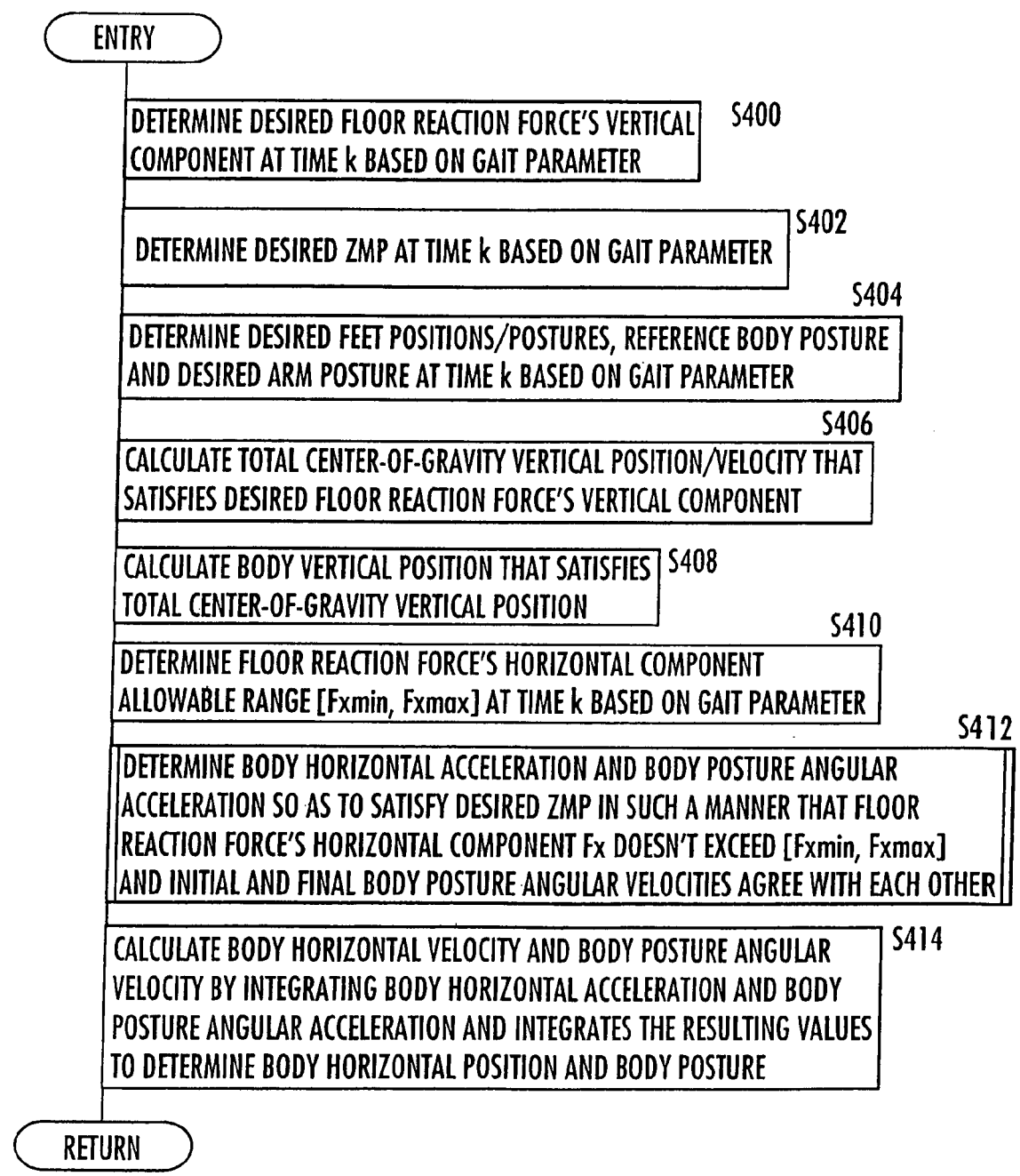
FIG. 22 is a flowchart showing a subroutine process in the flowchart shown in FIG. 21.

First, in step S400 in FIG. 22, based on the normal gait parameters (floor reaction force's vertical component trajectory parameters), the value (current time value) of the desired floor reaction force's vertical component at the time k shown in FIG. 17 is determined. Furthermore, in step S402, based on the normal gait parameters (ZMP trajectory parameters), the value (current time value) of the desired ZMP trajectory at the time k shown in FIG. 19 is determined.

Then, the process proceeds to step S404, where based on the normal gait parameters (the foot trajectory parameters, the reference body posture trajectory parameters and the arm posture trajectory parameters), the values (current time values) of the desired feet positions/postures (desired foot positions/postures of the supporting leg and the free leg), the reference body posture and the desired arm posture at the time k are determined. More specifically, as for the desired arm posture, the total center-of-gravity position of the both arms is determined, although the movement (swing movement) of the arm involving a change of angular momentum about the vertical axis (or body trunk axis) is not determined yet. The current time value (value at the time k) of the desired foot position/posture is determined in the same manner as the foot position/posture at the initial time Ts determined in step S200 in FIG. 20.

Then, the process proceeds to step S406, where the value (current time value) of the total center-of-gravity vertical position/velocity at the time k that provides the desired floor reaction force's vertical component (i.e., brings the sum of the vertical inertial force of the robot 1 and the gravity into balance with the desired floor reaction force's vertical component) is calculated. Specifically, based on the formulas a8 and b11 concerning the simplified model in FIG. 11, the total center-of-gravity vertical position/velocity is calculated. That is, according to the formulas a8 and b11, there is provided a formula (equation of motion concerning the total center of gravity of the robot 1 in the vertical direction) that represents that the total mass of the robot 1 multiplied by the sum of the total center-of-gravity vertical acceleration due to the movement of the robot 1 and the gravitational acceleration equals to the floor reaction force's vertical component. Thus, from the formula and the desired floor reaction force's vertical component, the total center-of-gravity vertical acceleration is determined.

This formula itself generally holds without depending on the model of the robot 1. Then, the total vertical acceleration thus determined is integrated, thereby calculating the total center-of-gravity vertical velocity, and the total center-of-gravity vertical velocity is further integrated, thereby calculating the total center-of-gravity vertical position. More generally, these calculations are performed using the dynamical formulas represented by the following formulas c15 and c16 (discrete versions of the Newton's equation of motion).

total center-of-gravity vertical velocity at the time k

=total center-of-gravity vertical velocity at the time $(k-\Delta k)$

+((floor reaction force's vertical component/total mass of the robot)+gravitational acceleration) $*\Delta k$ (The gravitational acceleration is a negative value.)  formula c15 total center-of-gravity vertical position at the time k

=total center-of-gravity vertical position at the time $(k-\Delta k)$

+total center-of-gravity vertical velocity at the time $k*\Delta k$  formula c16

Then, the process proceeds to step S408, where the body vertical position that provides the total center-of-gravity vertical position is calculated. Specifically, using the formula b11 concerning the simplified model in FIG. 11, the total center-of-gravity vertical position is calculated. That is, from the current values of the desired foot positions/postures of the supporting leg and the free leg, the vertical positions of the supporting leg material particle 2m and the free leg material particle 2m in the simplified model in FIG. 11 are determined. Then, these vertical positions of the supporting leg material particle 2m and the free leg material particle 2m and the current value of the total center-of-gravity vertical position determined in step S407 are applied to the formula b11, thereby determining the vertical position of the body material particle 24m. Furthermore, the body vertical position is determined from the vertical position of the body material particle 24m and the current value of the desired body posture angle (the current time value set in step S404 or the last time desired body posture angle (at the time k–Δk) determined in step S414 described later).

Alternatively, a more precise model (for example, the full model such as shown in FIG. 12) may be used to determine the body vertical position. In this case, the body vertical position is determined in such a manner that the total center-of-gravity vertical position agrees with the current time value of the total center-of-gravity vertical position determined as described above. Here, the total center-of-gravity vertical position is determined by the current time value of the desired feet positions/postures determined as described above (value at the time k), the desired body posture at the time (k–Δk) (or current time value of the reference body posture determined as described above), the current time value of the desired arm posture determined as described above (position of the center of gravity of the arms), the body horizontal position at the time (k–Δk) and the body vertical position to be determined.

In this case, the body posture and the body horizontal position at the time k are undetermined, and therefore, the values thereof at the time (k–Δk) are used instead thereof.

For a higher precision, the estimated values thereof at the time k may be determined from the gait state at the time (k–Δk) by extrapolation.

Then, the process proceeds to step S410, where based on the gait parameters (parameters defining the floor reaction force's horizontal component allowable range) determined in step S108 in FIG. 15, the value (current time value) of the floor reaction force's horizontal component allowable range [Fxmin, Fxmax] at the time k shown in FIG. 18 is determined.

Then, the process proceeds to step S412, where based on the simplified model in FIG. 11, the current time values of the body horizontal acceleration and the body posture angular acceleration are determined in such a manner that the dynamical equilibrium condition concerning the desired ZMP (condition that the horizontal component of the moment caused about the desired ZMP by the resultant force of the inertial force of the robot 1 and the gravity is 0) is satisfied. However, the body horizontal acceleration and the body posture angular acceleration are determined in such a manner that the floor reaction force's horizontal component Fx doesn't exceed the range [Fxmin, Fxmax] and an equal body posture angular velocity is provided at the start and the end of the normal gait. Details thereof will be described below.

Since the instantaneous values (current time values) of the foot position/posture and the body vertical position have been determined as described above at this point in time, the desired movement of the robot 1 except for the degree of freedom of the movement of the arm that involves a change of the angular momentum about the vertical axis can be determined uniquely by determining the body horizontal position and the body posture angle. Therefore, if the body horizontal position and the body posture angle are determined, all the quantities concerning the floor reaction force are uniquely determined except for the moment of the floor reaction force about the vertical axis. In this embodiment, the desired floor reaction force's vertical component and the desired ZMP for the normal gait are defined by the floor reaction force's vertical component trajectory parameters and the desired ZMP trajectory parameters determined in step S022 in FIG. 12, respectively. Therefore, of the quantities concerning the floor reaction force, only the floor reaction force's horizontal component is determined depending on the body horizontal position and the body posture angle determined. In addition, as described above, since the robot 1 has six degrees of freedom for each leg, the positions/postures of the parts of each leg 2 are uniquely determined from the desired foot position/posture and the desired body position/posture. The degree of freedom of the movement of the arm that involves a change of the angular momentum about the vertical axis is used to cancel a spinning force, as described later.

In gait generation, if the desired ZMP is provided (the horizontal component of the floor reaction force moment about the desired ZMP is brought to 0) using primarily the body rotation mode rather than the body translation mode, there arises a possibility that the body posture angle fluctuates too largely. Thus, to avoid this, the body translation mode should be used as far as circumstances permit. However, since the body translation mode involves a change of the floor reaction force's horizontal component, in the case where the floor reaction force's horizontal component allowable range is narrow, there is a possibility that the robot slips if the body translation mode works intensely. In such a case, the body rotation mode has to be used. In particular, in a period in which the floor reaction force's horizontal component allowable range is 0 as in the case of the running gait, such a gait that produce a floor reaction force's horizontal component cannot be generated, and thus, the body rotation mode has to be used. In view of the points described above, in this embodiment, the body horizontal acceleration and the body posture angular acceleration are determined according to the flowchart shown in FIG. 23.

First, in step S500, a time Tm is set. The time Tm is an instant when the floor reaction force's vertical component has increased to a predetermined level during a second turning gait after the initial time Ts and the floating period of a first turning gait. In addition, there is set a time Ts2 at which the floor reaction force's vertical component has decreased to some degree in the latter half of the second turning gait. In addition, there is set a time Tm2 at which the floor reaction force's vertical component has increased to a predetermined magnitude in the next first turning gait after the floating period in the second turning gait.

FIG. 17 shows these times. The time Tm is preferably set to the instant when substantially the whole surface of the sole of the supporting leg's foot 22 comes into contact with the floor or a time immediately after the instant. The same holds true for the time Tm2. Besides, the time Ts2 is preferably set to the instant when the foot 22 having been in contact with the floor at substantially the whole surface of the sole thereof comes into contact with the floor only at the toe thereof or a time immediately before the instant.

As for the relationship between the desired ZMP shown in FIG. 19 determined in step S110 in FIG. 15 and the times Tm, Ts2 and Tm2, it is preferably that the time Tm is an instant when the desired ZMP, which has remained at an initial position, which is the position of the heel of the supporting leg's foot 22, until substantially the whole surface of the sole of the foot 22 comes into contact with the floor, starts moving toward the middle of the supporting leg's foot 22. The time Ts2 is preferably set to an instant when the desired ZMP is completely shifted to the toe and only the toe of the supporting leg's foot 22 is in contact with the floor. In addition, the time Tm2 is preferably set to an instant when the desired ZMP, which has remained at an initial position, which is the position of the heel of the supporting leg's foot 22, until substantially the whole surface of the sole of the foot 22 comes into contact with the floor, starts moving toward the middle of the supporting leg's foot 22.

The reason why these times are determined as described above will be described later.

Then, in step S502, it is determined whether the present time k (value indicated by a normal gait generation timer) lies between the time Ts and the time Tm or between the time Ts2 and the time Tm2. If the result of the determination in step S502 is YES, the process proceeds to step S504, and if the result is NO, the process proceeds to step S518.

In step S504, the body horizontal acceleration atmp is determined which is required to satisfy the current time desired ZMP (at the time k) (that is, to provide a horizontal component of a floor reaction force moment about the desired ZMP of 0) in the case where the angular acceleration for the body rotation mode is set to 0 to make the robot 1 move in the body translation mode from the last time instantaneous gait state (gait state at the time k−1) of the robot 1. The value atmp is determined using the formula a10 concerning the simplified model (dynamics model) shown in FIG. 11. More specifically, for example, the vertical accelerations of the supporting leg material particle 2m and the free leg material particle 2m at the present time k are determined using time series values of the desired foot position/posture determined before the present time k, and the vertical positions of the supporting leg material particle 2m and the free leg material particle 2m are determined using the (current time) desired foot position/posture at the present time k. Besides, the vertical position of the body material particle 24m is determined using the (current time) floor reaction force's vertical position at the present time k, and the vertical acceleration of the body material particle 24m at the present time k is determined using time series values of the desired body vertical position determined before the present time k. Then, a formula obtained by substituting the determined values into the formula a10 and substituting 0 for My and $d2\theta by/dt2$ in the formula a10 is solved with respect to the body material particle's horizontal acceleration $d2Xb/dt2$, thereby determining the body horizontal acceleration αxtmp in the form of the body material particle's horizontal acceleration $d2Xt/dt2$.

In this embodiment, since the reference body posture is the vertical posture and the body posture angular acceleration depending on the reference body posture is 0, the body horizontal acceleration αxtmp is determined assuming that the angular acceleration in the body rotation mode is 0. However, in the case where the reference body posture trajectory parameters are set so that the reference body posture varies and the reference body posture angular acceleration at the present time k which depends on the reference body posture has a value other than 0, the body horizontal acceleration atmp may be determined using the dynamics model by setting the angular acceleration for the body rotation mode to the value of the reference body posture angular acceleration other than 0 (for example, the body horizontal acceleration atmp may be determined in the same manner as described above by setting $d2\theta by/dt2$ in the formula a10 to the value of the reference body posture angular acceleration other than 0).

Then, the process proceeds to step S506, where the floor reaction force's horizontal component Fxtmp is determined using the formula a9 which relates the value of Fxtmp at the time k in the case where the body horizontal acceleration is αtmp with the simplified model shown in FIG. 11. That is, Fxtmp is determined using the following formula c17. In this formula, $d2Xsup/dt2$ and $d2Xswg/dt2$ represent the supporting leg's foot material particle horizontal acceleration and the free leg's foot material particle horizontal acceleration at the time k, respectively.

$$Fxtmp = mb*\alpha tmp + msup*d2Xsup/dt2$$

$$+ mswg*d2Xswg/dt2 \qquad \text{formula c17}$$

Figure 24:
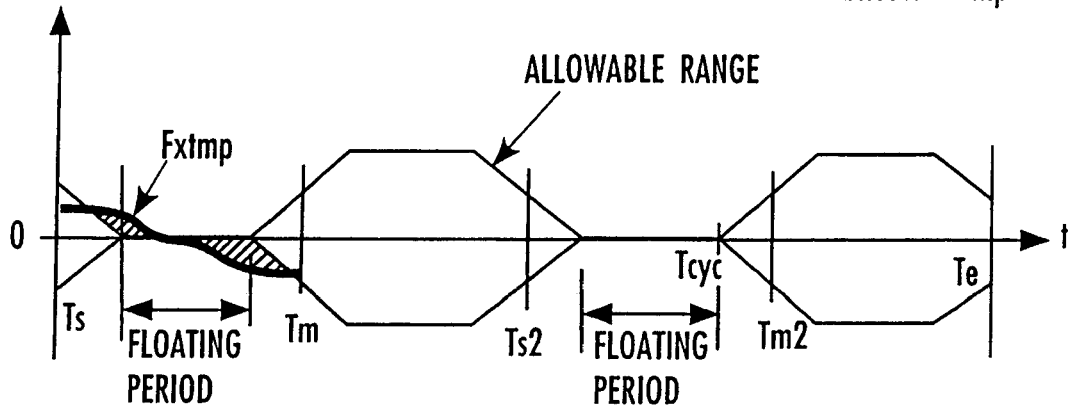
FIGS. 24 to 31 are graphs for illustrating essential processings in the flowchart shown in FIG. 22.

An example of Fxtmp thus determined is shown in FIG. 24. In FIG. 24, the shaded areas indicate that Fxtmp exceeds the floor reaction force's horizontal component allowable range [Fxmin, Fxmax].

Then, the process proceeds to step S508, where the body horizontal acceleration a for the body translation mode, the floor reaction force's horizontal component Fx caused by the body horizontal acceleration, and the body angular acceleration β for the body rotation mode are determined in the following matter (S508 to S516).

That is,

If Fxtmp>Fxmax, the process proceeds to step S510, where Fx is determined by the following formula.

$$Fx = Fxmax \qquad \text{formula c18}$$

If Fxtmp<Fxmin, the process proceeds to step S512, where Fx is determined by the following formula.

$$Fx=Fxmin \qquad \text{formula c19}$$

Otherwise, that is, if Fxtmp lies within the floor reaction force's horizontal component allowable range [Fxmin, Fxmax], the process proceeds to step S514, where Fx is determined by the following formula.

$$Fx=Fxtmp \qquad \text{formula c20}$$

In any of the cases, the process then proceeds to step S516, where the body horizontal acceleration α and the body posture angular acceleration β are determined by the following formulas.

$$\alpha = \alpha tmp + (Fx - Fxtmp)/\Delta Fp \qquad \text{formula c21}$$

$$\beta = (\alpha tmp - \alpha) * \Delta Mp / \Delta Mr \qquad \text{formula c22}$$

However, ΔFp, ΔMp and ΔMr are determined by the formulas c06, c07 and c09, respectively.

For a higher precision of the dynamical calculation, after the body angular acceleration β is determined as described above, the body horizontal acceleration α for the body translation mode is preferably determined in an analytic or searching manner using a more precise dynamics model so that a composite movement of the body translation mode and the body rotation mode having the body angular acceleration β satisfies the desired ZMP. As the determination method in a searching manner, the simplex method or a method of determining an affine Jacobian (sensitivity matrix) and determining a next candidate by the pseudo Newton method may be used.

Furthermore, in order to entirely prevent the floor reaction force's horizontal component Fx from exceeding the floor reaction force's horizontal component allowable range [Fxmin, Fxmax], a set of the body horizontal acceleration a and the body angular acceleration β may be determined in a searching manner in such a manner that Fx=Fxmax and the horizontal component of the floor reaction force moment about the desired ZMP is 0 in step S510 or Fx=Fxmin and the horizontal component of the floor reaction force moment about the desired ZMP is 0 in step S512.

Figure 25:
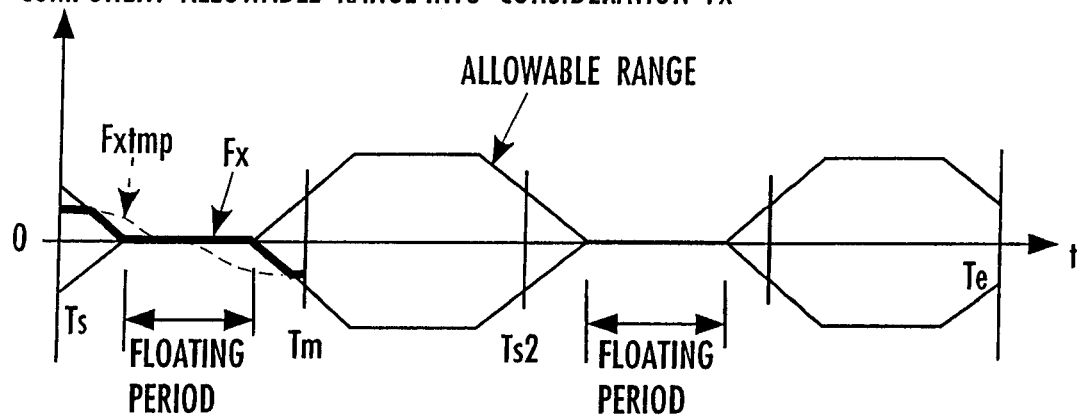

Fx thus determined is shown in FIG. 25. This Fx is Fxtmp that is limited (saturated) not to exceed the floor reaction force's horizontal component allowable range [Fxmin, Fxmax]. More specifically, if Fxtmp associated with the body horizontal acceleration atmp of the body translation mode falls within the allowable range [Fxmin, Fxmax], Fxtmp is adopted as Fx as it is. On the other hand, if Fxtmp associated with the body horizontal acceleration αtmp of the body translation mode is larger than the upper limit of the allowable range [Fxmin, Fxmax] or is smaller than the lower limit thereof, Fx is forcedly limited to Fxmax or Fxmin, respectively. In particular, during the floating period in the running gait, since Fxmax and Fxmin are always 0 (Fxmax=Fxmin=0), Fx is also 0 (Fx=0).

Figure 26:
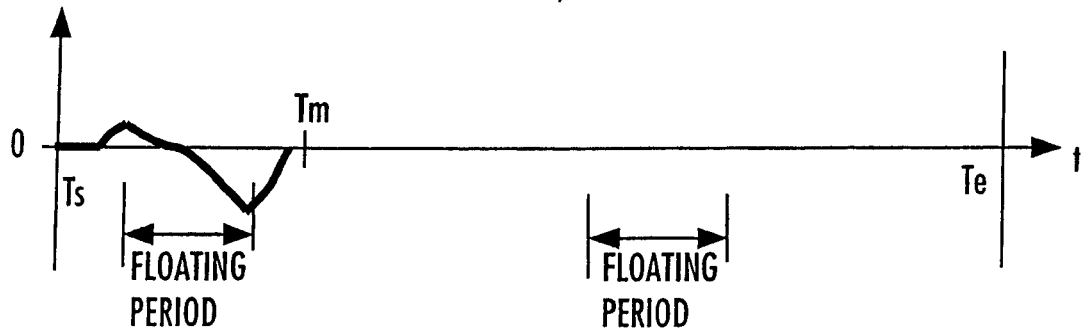

In addition, the body posture angular acceleration β thus determined is also shown in FIG. 26. An insufficient floor reaction force moment due to limitation of the acceleration for the body translation mode intended for preventing Fx caused in the body translation mode from exceeding the allowable range [Fxmin, Fxmax] is compensated for by the body rotation mode (specifically, the insufficient floor reaction force moment is the inertial force moment required for providing a horizontal component of the floor reaction force moment about the desired ZMP of 0 minus a moment component due to the limited body horizontal movement and the movements of the legs 2, 2). During the floating period of the running gait, the body horizontal acceleration α of the body translation mode is always limited to 0, and therefore, the insufficient floor reaction force moment described above is compensated for only by the body posture angular acceleration β of the body rotation mode.

Described above is the processings performed in the case where the time k lies between the time Ts and the time Tm or between the time Ts2 and the time Tm2.

If the result of the determination in step S502 is NO, the following processings are performed. First, the process proceeds to step S518, where there is set a pattern of a ZMP-converted value of the horizontal component of the floor reaction force moment which produces a body posture angular acceleration for returning the body posture angular velocity to the initial value (which is the value at the time Ts if the present time k is ahead of the time Ts2, or otherwise, the value at the time Ts2) by the time Ts2 if the present time k is ahead of the time Ts2, or otherwise, by the time Te (the ZMP-converted value of the floor reaction force moment is referred to as a body posture restoring moment ZMP-converted value and abbreviated as ZMPrec, hereinafter).

This will be described in detail below. The processings performed if the present time k is subsequent to the time Tm2 are the same as those performed if the present time k is ahead of the time Ts2, and therefore, only the processings performed if the present time k is ahead of the time Ts2 will be described.

It is to be considered to return the body posture angular velocity to the initial value (value at the time Ts) by producing the body posture angular acceleration using the body rotation mode in a period from the time Tm to the time Ts2. A body posture angular acceleration pattern for this is denoted by β(k).

In the body rotation mode, when trying to produce the body posture angular acceleration β(k), a horizontal component of a floor reaction force moment β(k)*ΔMr is produced. As a result, assuming that the floor reaction force's vertical component at that instant is Fz(k), the ZMP(k) calculated from the movement (rather than the desired ZMP) is shifted by ΔZMP determined by the following formula.

$$\Delta ZMP(k) = -\beta(k) * \Delta Mr / Fz(k) \qquad \text{formula c23}$$

Therefore, if the patterns of ΔMr and Fz(k) are determined (known), the body posture angular acceleration pattern that satisfies the formula c23 can be produced by appropriately setting the pattern of ΔZMP(k), and thus, the body posture angular velocity can be returned to the initial value (value at the time Ts), that is, to the body posture angular velocity in the initial state of the reference body posture trajectory (at the time Ts).

The "body posture restoring moment ZMP-converted value (ZMPrec)" means ΔZMP(k) that is appropriately set in this way. Strictly speaking, when the body posture restoring moment ZMP-converted value is set using the formula c23, ΔMr varies. However, it may be set to an approximate constant value. The reason for this is that the normal gait doesn't require a quite high dynamical precision because the normal gait generated is a provisional one and the actual robot doesn't follow the gait.

Figure 27:
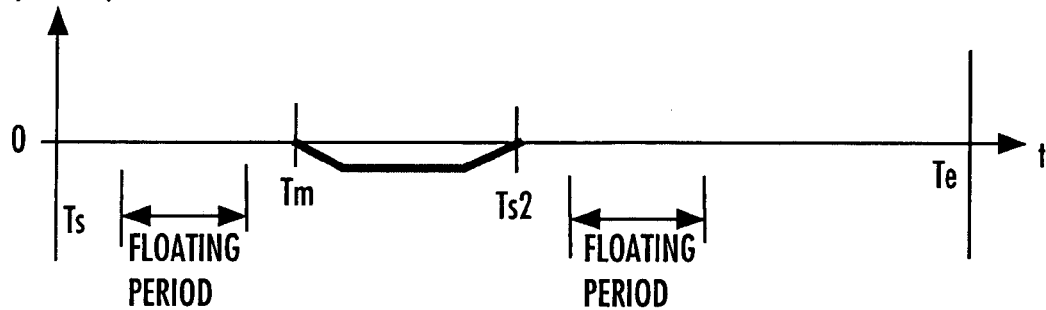

FIG. 27 shows an example of ZMPrec. In FIG. 27, ZMPrec has a trapezoidal pattern. The times of the apexes of the trapezoidal pattern agree with the times of the apexes of the desired ZMP pattern in the period from the time Tm to the time Ts2 (see FIG. 19). This is intended for simplifying modification of the desired ZMP pattern of the current time gait, as described later. If ZMPrec is substituted for ΔZMP(k) in the formula c23, the following formula results.

$$\beta(k) = -ZMPrec * Fz(k)/\Delta Mr \qquad \text{formula c24}$$

Figure 28:
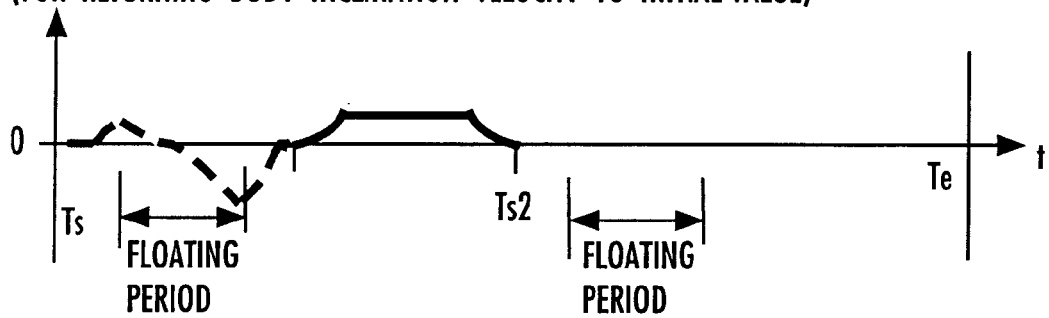

Therefore, β(k) determined by the formula c24 is as shown by the solid line in FIG. 28. The dotted line in FIG. 28 shows the body posture angular velocity from the time Ts to the time Tm (shown by the solid line in FIG. 26).

For the normal gait, the body posture angular velocity at the time Ts2 preferably agrees with the body posture angular velocity at the time Ts. This is because such agreement provides reduced variation of the body posture angle.

Thus, in order to make the body posture angular velocity at the time Ts2 agree with the body posture angular velocity at the time Ts, the body posture angular acceleration pattern is set in such a manner that the integral of the body posture angular acceleration β for the period from the time Ts to the time Ts2 is 0. That is, the body posture angular acceleration pattern is set in such a manner that the integral of β(k) for the period from the time Tm to the time Ts2 (i.e., integral for the solid line section in FIG. 28) equals to the integral of the body posture angular acceleration for the period from the time Ts to the time Tm (determined in steps S504 to S516 as described above) (i.e., integral for the dotted line section in FIG. 28, in other words, the difference between the body posture angular velocity at the time Tm and the body posture angular velocity at the time Ts) multiplied by −1.

More specifically, in this embodiment, in the trapezoidal pattern of ZMPrec shown in FIG. 27, by assuming that the times of the apexes of the trapezoid (determined based on the desired ZMP trajectory for the normal gait as described above) are known, and the height of the trapezoid is unknown, the height of the trapezoid of ZMPrec that satisfies the above-described relationship (parameter that defines the ZMPrec pattern) can be determined.

The height of the trapezoid of ZMPrec for the first turning gait is referred to as a first turning gait's body posture restoring moment's ZMP-converted value's trapezoid height acyc1. The height of the trapezoid of ZMPrec for the second turning gait is referred to as a second turning gait's body posture restoring moment's ZMP-converted value's trapezoid height acyc2. ZMPrec for the second turning gait is a trapezoidal pattern set in the period from the time Tm2 to the time Te.

Furthermore, as far as the gait parameters are not changed in the process of generation of one step of the current time gait, the ZMPrec patterns for the period between the time Tm and the time Ts2 and the period between the time Tm2 and the time Te determined in step S518 are the same (i.e., the same parameter values are calculated), and therefore, the processing of step S518 may be performed only at the times Tm and Tm2.

Then, the process proceeds to step S520, where the instantaneous value (current time value) of the body posture restoring moment's ZMP-converted value ZMPrec at the time k is calculated based on the parameter (trapezoid height) determined as described above.

Then, the process proceeds to step S522, where the instantaneous value (current time value) β of the body posture angular acceleration pattern at the time k is calculated using the formula c24.

Then, the process proceeds to step S524, where the body horizontal acceleration atmp required for satisfying the current time (time k) desired ZMP in the case where the robot moves only in the body translation mode without the movement in the body rotation mode from the last time instantaneous desired gait state (desired gait state at the time k−1) is determined using the dynamics model of the robot 1. This calculation is performed in the same manner as in step S504.

Then, the process proceeds to step S526, where the body horizontal acceleration α for the body translation mode is calculated using the following formula.

$$\alpha = atmp - (\Delta Mr/\Delta Mp) * \beta \qquad \text{formula c25}$$

Then, the process proceeds to step S528, where the floor reaction force's horizontal component Fx at the time k for the body horizontal acceleration of α is determined using the following formula c26 similar to the formula c17.

$$Fx = mb*\alpha + msup*d2Xsup/dt2 + mswg*d2Xswg/dt2 \qquad \text{formula c26}$$

Incidentally, for a higher precision of the dynamical calculation, after the body angular acceleration β is determined as described above, instead of calculating the body horizontal acceleration α using the formula c25 in step S526, the body horizontal acceleration α for the body translation mode is preferably determined in an analytic or searching manner using a more precise dynamics model so that a composite movement of the body translation mode and the body rotation mode having the body angular acceleration β satisfies the desired ZMP, as supplementally described concerning step S516.

Described above is the processings performed in the case where the time k is not included in any of the periods between the time Ts and the time Tm and between the time Ts2 and the time Tm2.

Figure 29:
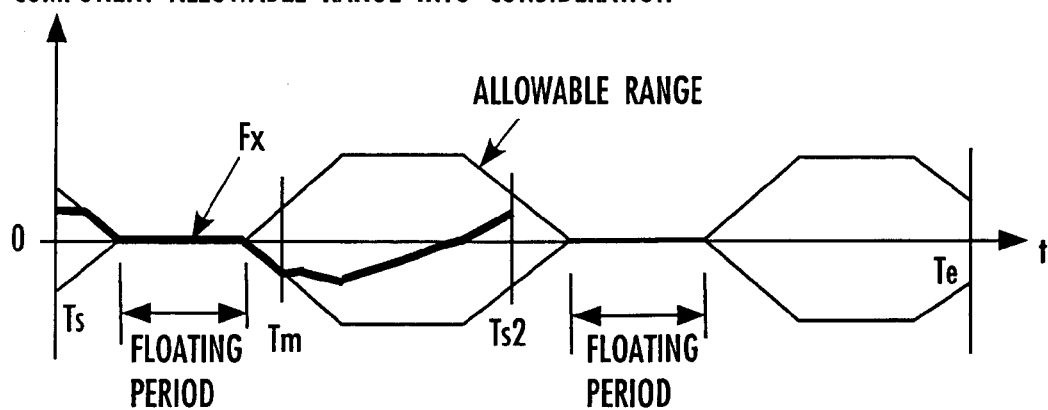
Figure 30:
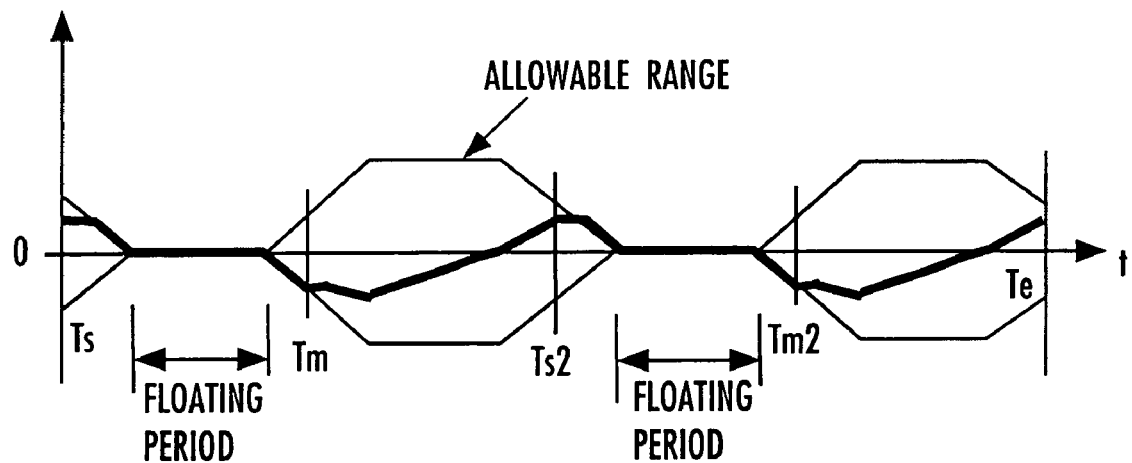
Figure 31:
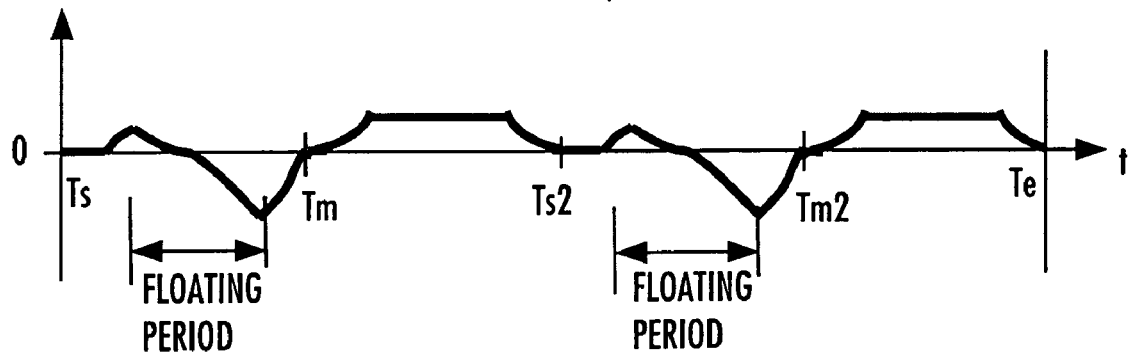
Figure 32:
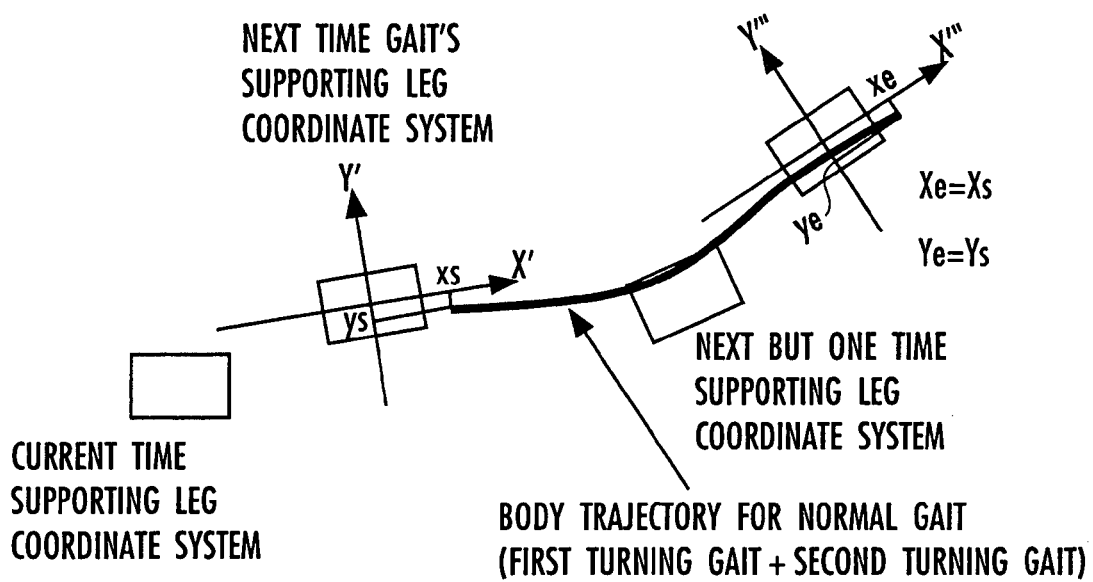
FIG. 32 is a diagram showing an example of a trajectory of the body position for the normal gait.

The floor reaction force's horizontal component Fx provided when the above-described processings to the time Ts2 are completed is shown in FIG. 29. In addition, the floor reaction force's horizontal component Fx and the body posture angular acceleration β provided when the above-described processings to the time Te are completed are shown in FIGS. 30 and 31, respectively. The processing of step S412 described above (subroutine for determining the body horizontal acceleration and the body posture angular acceleration) is to determine the instantaneous values of the body horizontal acceleration and the body posture angular acceleration at the time k, rather than to collectively generate the time series values thereof to the time Te.

In this embodiment, since the reference body posture is the vertical posture, and the body posture angular acceleration depending on the reference body posture is 0, the angular acceleration β for the body rotation mode determined as described above is regarded as the body posture angular acceleration determined in the processing of step S412. However, if the reference body posture trajectory parameters are set in such a manner that the reference body posture varies, the sum of the angular acceleration β for the body rotation mode determined as described above and the reference body posture angular acceleration should be regarded as the body posture angular acceleration determined in the processing of step S412.

The times Ts, Tm, Ts2 and Tm2 are set as described above to prevent the floor reaction force's horizontal component Fx from exceeding the allowable range [Fxmin, Fxmax] even if the body posture angular acceleration β is produced so as to return the body posture angular velocity to the initial angular velocity of the reference body posture trajectory in the periods between the time Tm to the time Ts2 and between the time Tm2 and the time Te. In other words, during the periods from the time Tm to the time Ts2 and from the time Tm2 to the time Te, the floor reaction force's horizontal component allowable range is sufficiently wide, and therefore, even if the body posture angular acceleration β is produced to return the body posture angular velocity to the initial value while satisfying the desired ZMP, the floor reaction force's horizontal component Fx doesn't exceed the allowable range.

Alternatively, rather than making the body posture angular velocity at the time Ts agree with the body posture angular velocity at the time Ts, assuming that acyc1 and acyc2 have an equal value (assuming that acyc1=acyc2), the value of acyc1 and acyc2 may be determined so as to make the body posture angular velocity at the time Te agree with the body posture angular velocity at the time Ts.

Then, the process proceeds to step S414 in FIG. 22, where the body horizontal velocity is determined by integrating the body horizontal acceleration determined in step S412 (cumulatively summing the body horizontal acceleration values from the time Ts to the present time k), and the body horizontal position (current time value) is determined by integrating the body horizontal velocity (cumulatively summing the body horizontal velocity values from the time Ts to the present time k). In addition, the body posture angular velocity is determined by integrating the body posture angular acceleration determined in step S412 (cumulatively summing the body posture angular acceleration values from the time Ts to the present time k), and the body posture angle (current time value) is determined by integrating the body posture angular velocity (cumulatively summing the body posture angular velocity values from the time Ts to the present time k).

After the normal gait's instantaneous value determination subroutine of step S306 in FIG. 21 is conducted as described above, the process proceeds to step S308, where the value of the gait generation time k is incremented by the gait generation interval Δk. Then, the process returns to step S304, and as far as the condition shown in step S304 is satisfied, the processings of steps S306 and S608 are repeated. If the condition shown in step S304 is not satisfied, that is, if the generation of the provisional normal gait to the end thereof (to the time Te=Ts+Tcyc) is completed, the process proceeds to step S310. In step S310, the initial (time Ts) body posture angle and the initial (time Ts) body posture angular velocity are modified in accordance with the following formulas based on the final (time Te) body posture angle of the provisional gait determined as described above or the like. This modification is intended for satisfying the boundary requirements of the normal gait concerning the body posture angle and the angular velocity thereof (that is, both the body posture angle and the angular velocity thereof are the same at the start and the end of the normal gait) In this description, it is assumed that the gait of the robot 1 is one with which the robot 1 moves straight.

In this case, renewed values in the following formulas are the modified values.

renewed initial body posture angular velocity

=initial body posture angular velocity for the provisional gait

−(final body posture angle for the provisional gait

−initial body posture angle for the provisional gait)/
Tcyc      formula c30 renewed initial body posture angle=initial (time Ts) reference body posture angle      formula c31

Now, a reason why the initial state posture angular velocity is modified using the formula c30 will be described below. For the normal gait, the initial state posture angle and the angular velocity thereof have to be determined to avoid the movement of the robot 1 from being discontinuous at the boundaries between the gaits when the gait is repeated (to satisfy the boundary requirements). In this case, the final body posture angular velocity for the provisional normal gait thus determined agrees with the initial body posture angular velocity's initial value (reference body posture angular velocity's initial value) since the body posture angular acceleration pattern associated with the body posture restoring moment ZMP-converted value ZMPrec is set. Therefore, if the following formula, which is the remaining requirement, is satisfied, the above-described requirements concerning the body posture angle and the angular velocity thereof are satisfied.

final body posture angle=initial body posture angle      formula c32

In addition, there is a relationship expressed by the following formula.

second order differential of the body posture angle=body posture angular acceleration      formula c33

Therefore, second-order integrating the both sides of the formula C33 for the period from the start to the end of the normal gait provides the following relationship.

final body posture angle=initial body posture angle

+initial body posture angular velocity*Tcyc

+second order integral of the body posture angular acceleration      formula c34

On the other hand, in normal gait generation, the horizontal acceleration (horizontal acceleration/deceleration) of the body 24 is adjusted using primarily the body translation mode for satisfying the desired ZMP as described above. However, if the horizontal acceleration of the body 24 that satisfies the desired ZMP cannot produced adequately (if a sufficient friction force cannot be produced), the insufficient body horizontal acceleration for the body translation mode is compensated for by adjusting the angular acceleration of the body posture angle while keeping constant the total center-of-gravity acceleration using the body rotation mode.

The adjustment of the body posture angular acceleration using the body rotational movement mode is approximately equivalent to adjustment of the angular acceleration of the flywheel FH of the robot 1 shown in FIG. 11. If the rotational velocity of the flywheel FH is close to 0, no gyro effect occurs, and the force caused by the flywheel FH is determined only by the angular acceleration of the flywheel FH. Therefore, in the robot 1 having the flywheel FH in the body 24, even if the initial angle and the initial angular velocity of the flywheel FH vary slightly, substantially constant force is produced as far as the flywheel FH moves with an angular acceleration of a same pattern. Therefore, in the formulas a8, a9 and a10, which are robot dynamics equations, the gyro effect is neglected. Therefore, for the robot 1 according to this embodiment, according to any of the formulas a8, a9 and a10 and a more general and precise dynamics model, even when the initial body posture angle and the initial angular velocity vary slightly, substantially the same resultant force of the inertial force and the gravity is produced as far as the body posture angle is changed with an angular acceleration of a same pattern while maintaining a constant total center-of-gravity acceleration (that is, as far as the body posture angle is changed with an angular acceleration of a same pattern in the body rotational movement mode). In other words, even if the initial body posture angle and the initial angular velocity vary slightly, the body posture angular acceleration for the gait generated according to the flowchart described above is not changed.

That is, the second order integral of the body posture angular acceleration in the formula c34 is independent of the initial body posture angle and the initial angular velocity. That is, the second order integral of the body posture angular acceleration in the formula c34 can be treated as a constant value regardless of the values of the initial body posture angle and the initial angular velocity.

Since the final body posture angle is the final body posture angle for the provisional gait when the value of the initial body posture angle is the initial body posture angle for the provisional gait, and the value of the initial body posture angular velocity is the initial body posture angular velocity for the provisional gait, applying this relationship to the formula c34 results in the following formula.

final body posture angle for the provisional gait=initial body posture angle for the provisional gait +second order integral of the body posture angular acceleration +initial body posture angular velocity for the provisional gait*Tcyc  formula c35

Thus, the following formula results.

second order integral of the body posture angular acceleration

=(final body posture angle for the provisional gait

−initial body posture angle for the provisional gait)

−initial body posture angular velocity for the provisional gait*Tcyc  formula c36

Since, from the above discussion, it is seen that the second order integral of the body posture angular acceleration can be treated as a constant (the second order integral of the body posture angular acceleration is independent of the initial body posture angle and the initial angular velocity), substituting the above formula into the formula c34 results in the following formula.

final body posture angle=initial body posture angle

+(final body posture angle for the provisional gait

−initial body posture angle for the provisional gait)

−initial body posture angular velocity for the provisional gait*Tcyc

+initial body posture angular velocity*Tcyc  formula c37

From the formulas c37 and c32, the above-described formula c30 is provided.

In this embodiment, the initial body posture angle the initial body posture angle agrees with the initial value of the reference body posture angle as expressed by the formula c31. However, the initial body posture angle may be set so that the average value of the body posture angles for the normal gait agrees with the initial value of the reference body posture angle. Alternatively, the initial body posture angle may be set so that the average value of the maximum and the minimum of the body posture angle for the normal gait agrees with the initial value of the reference body angle.

Furthermore, while a case where the robot 1 moves only straight is described above, when determining a normal gait including a turning movement, the robot 1 travels in different directions at the start and the end of the normal gait. Therefore, the initial body posture angular velocity depends on the initial body posture angle. Therefore, the initial body posture angle and the initial angular velocity have to be determined considering this fact. In this case, for example, the initial body posture angle and the initial body posture angular velocity may be updated so that the following formulas c37a and c37b are satisfied.

final body posture angle−initial body posture angle

=second order integral of the body posture angular acceleration determined so as to satisfy the floor reaction force's horizontal component allowable range +second order integral of the body posture angular acceleration caused by ZMPrec +initial body posture angular velocity*period of the normal gait  formula c37a final body posture angular velocity−initial body posture angular velocity =first order integral of the body posture angular acceleration determined so as to satisfy the floor reaction force's horizontal component allowable range +first order integral of the body posture angular acceleration caused by ZMPrec  formula c37b For the formulas c37a and c37b, the integral time for the first term in the right side thereof is a sum of the period from the time Ts to the time Tm and the period from the time Ts2 to the time Tm2, and the integral time for the second term in the right side thereof is a sum of the period from the time Tm to the time Ts2 and the period from the time Tm2 to the time Te.

Figure 23:
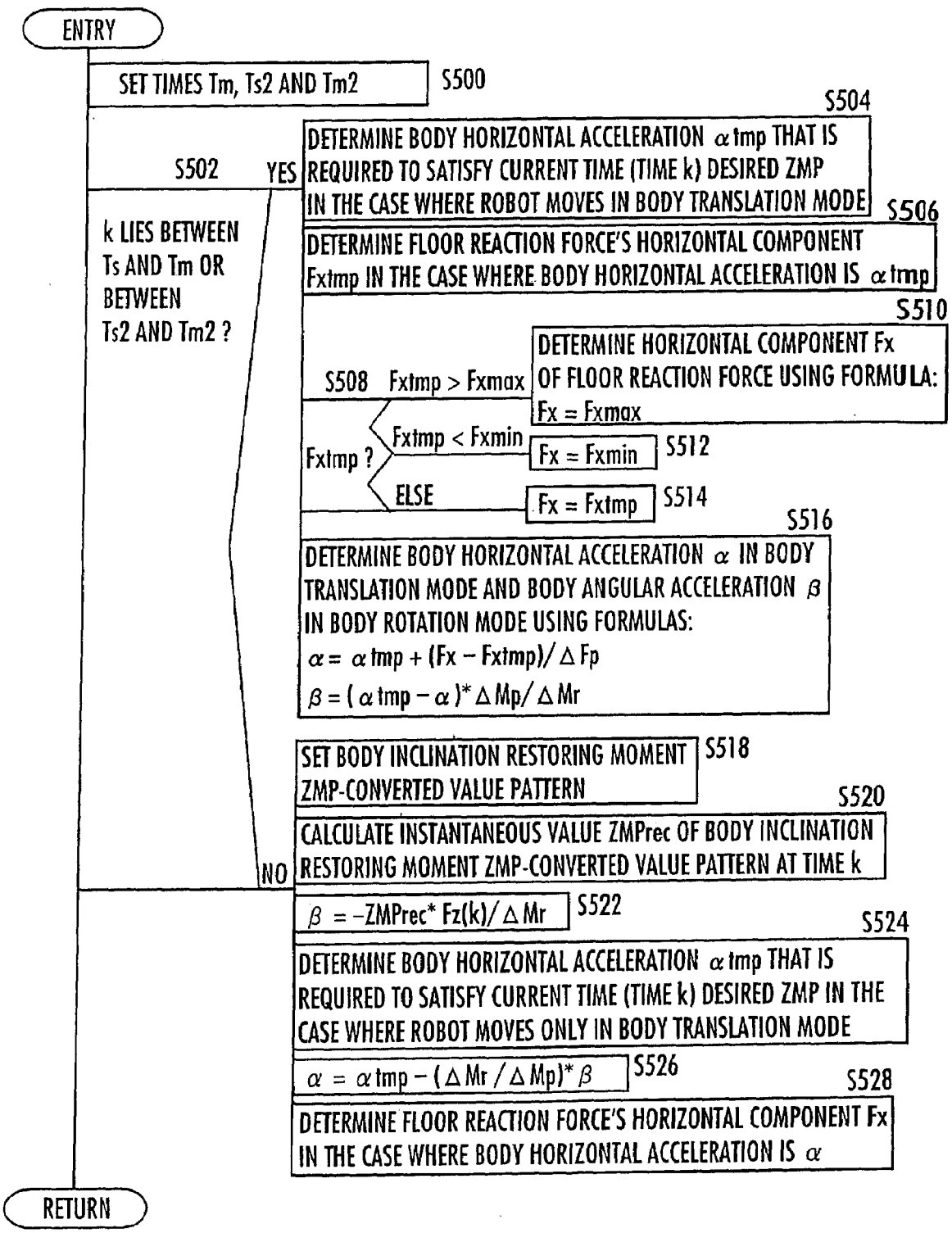
FIG. 23 is a flowchart showing a subroutine process in the flowchart shown in FIG. 22.

More specifically, in the normal gait, the initial state posture angle and the initial state angular velocity seen from the first turning gait's supporting leg coordinate system (next but two time gait's supporting leg coordinate system) have to agree with the final body posture angle and the final angular velocity seen from the next first turning gait's supporting leg coordinate system (next time gait's supporting leg coordinate system), respectively. Thus, in this embodiment, the renewed initial body posture angle is determined by the formula c31, and the renewed initial body posture angle and a value seen from the next gait's supporting leg coordinate system derived from the renewed initial body posture angle by coordinate transformation thereof using a matrix corresponding to the total turning angle of the robot 1 in the normal gait (turning angle about the vertical axis (rotating coordinate transformation matrix) are substituted for the initial body posture angle and the final body posture angle in the left side of the formula c37a, respectively. Besides, as the body posture angular acceleration concerning the integration in the first term of the right side of each of the formulas c37a and c37b, the one determined successively in step S516 in FIG. 23 is used.

Then, assuming that the initial body posture angular velocity in the formulas c37a and c37b and the trapezoid height of ZMPrec (the trapezoidal pattern shown in FIG. 27) concerning the integration in the second term of the right side of the formulas c37a and c37b are unknown quantities (where the times of the apexes of the ZMPrec trapezoidal pattern are previously determined, and the trapezoid height acyc1 of ZMPrec for the first turning gait equals to the trapezoid height acyc2 of ZMPrec for the second turning gait), the simultaneous equations c37a and c37b including these unknown quantities are solved to determine the initial body posture angular velocity as the renewed initial body posture angular velocity. In this case, the final body posture angular velocity in the formula c37b is a value seen from the next time gait's supporting leg coordinate system derived from the unknown initial body posture angular velocity by coordinate transformation using the matrix corresponding to the total turning angle in the normal gait.

In the case where the robot 1 makes a movement including turning, the renewed initial body posture angle and the renewed initial angular velocity may be determined as described above.

The initial body posture angular velocity that satisfies the boundary requirements of the normal gait may be determined in a searching manner.

After the processing of step S310 in FIG. 21 is completed, the process proceeds to step S210 in FIG. 20, where the final body horizontal position/velocity for the gait generated (provisional normal gait) are converted into values seen from a supporting leg coordinate system associated with the supporting leg at that instant (that is, $X'''$, $Y'''$, $Z'''$ coordinate system in FIG. 32), and the values are denoted by (Xe, Vxe) where Xe denotes a final body horizontal position and Vxe denotes a final body horizontal velocity.

Then, the process proceeds to step S212, where the difference between the initial body horizontal position/velocity (Xs, Vxs) and the final body horizontal position/velocity (Xe, Vxe) is calculated as shown in the drawing. The difference (Xs−Xe, Vxs−Vxe) is referred to as a body horizontal position/velocity boundary requirement error (errx, errvx). Since the boundary requirements have to be satisfied in the normal gait, (xs, Vxs) has to agree with (Xe, Vxe). Therefore, the body horizontal position/velocity boundary requirement error (errx, errvx) has to be 0 or approximately 0. In this embodiment, (Xs, Vxs) that provides a body horizontal position/velocity boundary requirement error (errx, errvx) of approximately 0 is determined in a searching manner as described below.

Then, the process proceeds to step S214, where it is determined whether the calculated body horizontal position/velocity boundary requirement error (errx, errvx) falls within an allowable range previously appropriately set. Instead of setting the allowable range for the body horizontal position/velocity boundary requirement error as described above, it may be determined whether the difference between the initial divergence component (Xs+Vxs/ω0) and the final divergence component (Xe+Vxe/ω0) and the difference between the initial convergence component (Xs−Vxs/ω0) and the final convergence component (Xe−Vxe/ω0) fall within respective allowable ranges. As described earlier, ω0 is a predetermined value.

If the result of the determination in step S214 is NO, the process proceeds to step S216. In step S216, a plurality of (two, in this embodiment) initial value candidates (Xs+ΔXs, Vxs), (Xs, Vxs+ΔVxs) are determined in the vicinity of (Xs, Vxs). Here, ΔXs and ΔVxs mean a predetermined small variations of Xs and Vxs, respectively. Assuming that each of these initial value candidates is an initial state of the body horizontal position/velocity, a normal gait is generated using gait parameters in the same manner as in the processing of step S208. Furthermore, values (Xe+ΔXe1, Vxe+ΔVxe1) and (Xe+ΔXe2, Vxe+ΔVxe2) seen from the supporting leg coordinate system associated with the supporting leg at that instant converted from the final body position/velocity of the generated normal gait are determined. Here, (Xe+ΔXe1, Vxe+ΔVxe1) indicates the final body position/velocity corresponding to (Xs+ΔXs, Vxs), and (Xe+ΔXe2, Vxe+ΔVxe2) indicates the final body position/velocity corresponding to (Xs, Vxs+ΔVxs). In this processing of normal gait (provisional gait) generation, the initial states (states at the time Ts) of the variables other than the body horizontal position/velocity may be set the same as in the case where the initial value candidate of the body horizontal position/velocity is (Xs, Vxs), for example. In step S216, in addition, the difference between each initial value candidate and the final body position/velocity corresponding thereto, that is, the body horizontal position/velocity boundary requirement error for each of the initial value candidates (Xs+ΔXs, Vxs) and (Xs, Vxs+ΔVxs) is determined in the same processing as that of step S210.

Then, the process proceeds to step S218, where based on the body horizontal position/velocity boundary requirement error for each of (Xs, Vxs) and the initial value candidates in the vicinity thereof (Xs+ΔXs, Vxs) and (Xs, Vxs+ΔVxs), an initial value candidate following (Xs, Vxs) is determined by a searching method (for example, the simplex method or a method of determining an affine Jacobian (sensitivity matrix) and determining a next candidate by the steepest descent method). That is, from the body horizontal position/velocity boundary requirement error for each of (Xs, Vxs) and the initial value candidates in the vicinity thereof (Xs+ΔXs, Vxs) and (Xs, Vxs+ΔVxs), a sensitivity matrix that indicates the degree of change of the body horizontal position/velocity boundary requirement error caused when the body horizontal position and the body horizontal velocity are each slightly changed from the initial value candidates Xs and Vxs, respectively, and based on the sensitivity matrix, an initial value candidate (Xs, Vxs) that provides further reduced body horizontal position/velocity boundary requirement error is newly determined. Then, once the new initial value candidate (Xs, Vxs) for the body horizontal position/velocity is determined, the process returns to step S206.

As far as the result of the determination in step S214 is NO, the processings described above (steps S206 to S218) are repeated. In this case, in step S300 (see FIG. 21) in the process of normal gait generation (step S208) for the new initial value candidate (Xs, Vxs) of the body horizontal position/velocity, the initial value of the body posture angular velocity is set to the value determined in step S310 (see FIG. 20) in the processing of step S208 for the last-time's initial value candidate (Xs, Vxs) of the body horizontal position/velocity, rather than the initial value of the reference body posture angular velocity. Then, if the result of the determination in step S214 is YES, the repetition loop (step S204) is exited, and the process proceeds to step S220. The provisional normal gait generated immediately before exiting the repetition loop of step S204 is adopted as the normal gait that satisfies the boundary requirements.

In step S220, the initial body horizontal position/velocity (X0, V0) at the original initial time 0 (end time of the current time gait), the initial body vertical position/velocity (Z0, Vz0) at the initial time 0, and the initial body posture angle and the initial angular velocity at the initial time 0 are determined.

Specifically, (X0, V0) and (Z0, Vz0) are set to values seen from the supporting leg coordinate system ($X'''$, $Y'''$, $Z'''$ coordinate system in FIG. 32) for the supporting leg for a step starting at the time Tcyc (that is, the second-time first turning gait) which are converted from the body horizontal position/velocity and the body vertical position/velocity determined at the instant when switching from the second turning gait to the second turning gait occurs in steps S408 and S414 in the normal gait instantaneous value determination subroutine shown in FIG. 22, that is, at the time k=Tcyc (time Te-Ts). Similarly, the initial state posture angle and the initial state angular velocity are set to values seen from the supporting leg coordinate system (X''', Y''', Z''' coordinate system in FIG. 32) for the supporting leg for a step starting at the time Tcyc (that is, the second-time first turning gait) which are converted from the body posture angle and the angular velocity determined at the time k=Tcyc (time Te−Ts).

Then, the process proceeds to step S222, where the normal gait's initial divergence component q[0] is determined by the following formula.

$$q[0]=X0+V0/\omega0 \qquad \text{formula 40}$$

As described in the explanation about divergence, $\omega0$ is a predetermined value.

Then, the process proceeds to step S224, where the normal gait's initial divergence component q[0] is converted into a value seen from the current time gait's supporting leg coordinate system, and the resulting value is determined as q''[0]. The initial body vertical position/velocity (Z0, Vz0) is converted into a value seen from the current time gait's supporting leg coordinate system, and the resulting value is determined as (Z0'', Vz0'').

Specifically, (Z0'', Vz0'') agrees with the body vertical position/velocity at the end of the second turning gait seen from the second turning gait's supporting leg coordinate system (X'', Y'', Z'' coordinate system in FIG. 16). Besides, q'' [0] also agrees with the final divergence component of the second turning gait seen from the second turning gait's supporting leg coordinate system (X'', Y'', Z'' coordinate system in FIG. 15). Therefore, (Z0'', Vz0'') and q''[0] may be calculated using these characteristics.

Then, the processing of step S024 in FIG. 13, that is, the subroutine processing for determining the initial states of the normal gait, is completed.

Then, the process proceeds to step S026 in FIG. 13, where the gait parameters for the current time gait are determined (some of them are provisionally determined). In step S026, a process described below is conducted in accordance with the flowchart shown in FIG. 33.

First, in step S600, the foot trajectory parameters for the current time gait are set in such a manner that the foot position/posture trajectory for the current time gait connects to the foot position/posture trajectory for the normal gait.

Specifically, the current time gait's free leg's foot position/posture (initial value of the current time gait's free leg's foot position/posture) is set to the current free leg position/posture seen from the current time gait's supporting leg coordinate system (free leg position/posture at the end of the last time gait). The supporting leg's foot position/posture at the start of the current time gait (initial value of the current time gait's supporting leg's foot position/posture) is set to the current supporting leg's foot position/posture seen from the current time gait's supporting leg coordinate system (supporting leg's foot position/posture at the end of the last time gait). In addition, the free leg's foot position/posture at the end of the current time gait is determined in accordance with the next time gait's supporting leg coordinate system seen from the current time gait's supporting leg coordinate system (that, is, in accordance with the required value of the free leg landing position/posture for the first step of the current time gait). That is, the free leg's foot position/posture at the end of the current time gait is determined in such a manner that, when the free leg's foot 22 is rotated from the free leg's foot position/posture at the end of the current time gait until substantially the whole surface of the sole of the foot 22 comes into contact with the floor while keeping the foot in contact with the floor without slipping, the representative point of the foot 22 agrees with the origin of the next time gait's supporting leg coordinate system seen from the current time gait's supporting leg coordinate system.

At the end of the current time gait, the supporting leg's foot 22 is away from the floor and floats in the air. To determine the trajectory after the supporting leg's foot 22 takes off the floor, the expected landing position/posture of the supporting leg's foot is set. The expected landing position/posture of the supporting leg's foot is set in accordance with the next but one time gait's supporting leg coordinate system seen from the current time gait's supporting leg coordinate system (that is, in accordance with the required value of the free leg's foot position/posture for the second step of the current time gait). More specifically, the expected landing position/posture of the supporting leg's foot is set in such a manner that, when the foot 22 is rotated from the position/posture until substantially the whole surface of the sole of the foot 22 comes into contact with the floor while keeping the foot 22 in contact with the floor without slipping, the representative point of the foot 22 agrees with the origin of the next but one time gait's supporting leg coordinate system seen from the current time gait's supporting leg coordinate system.

The supporting leg's foot position/posture at the end of the current time gait is determined using the finite duration settling filter to generate, until the end of the current time gait, the foot position/posture trajectory that leads from the current supporting leg position/posture (supporting leg's foot position/posture at the start of the current time gait) to the expected foot landing position/posture associated with the next time gait's supporting leg coordinate system (required value of the free leg's foot landing position/posture for the second step of the required parameters).

Then, the process proceeds to step S602, where the reference body posture trajectory parameters for the current time gait are determined in the same manner as the first and second turning gaits of the normal gait. However, the parameters are set in such a manner that the reference body posture trajectory for the current time gait is seamlessly connected to the reference body posture trajectory for the normal gait (that is, the reference body posture angle and the angular velocity at the end of the current time gait agree with the reference body posture angle and the angular velocity at the start of the normal gait, respectively). In this embodiment, both for the current time gait and the normal gait, the reference body posture is constantly the vertical posture.

Then, the process proceeds to step S604, where the arm posture trajectory parameters for the current time gait are determined in the same manner as the first and second turning gaits of the normal gait. The parameters are set in such a manner that the arm posture trajectory for the current time gait is continuously connected to the arm posture trajectory for the normal gait. The arm posture trajectory parameters determined in this step are movement parameters other than the parameter concerning a change of the angular momentum of the arms about the vertical axis (or body trunk axis), which define the trajectory of the position of the center of gravity of the arms, as with the normal gait parameters determined in step S104 in FIG. 15.

Then, the process proceeds to step S606, where the floor reaction force's vertical component trajectory parameters for the current time gait are set in such a manner that the floor reaction force's vertical component trajectory defined by the parameters is substantially continuous (i.e., has no step-wise discrete values) as shown in FIG. 6, as with the first and second turning gaits of the normal gait.

The floor reaction force's vertical component trajectory parameters are set in such a manner that both the total center-of-gravity vertical position/posture and the floor reaction force's vertical component trajectory are continuously connected to those of the normal gait.

Specifically, based on the value (Z0", Vz0") seen from the current time gait's supporting leg coordinate system converted from the initial body vertical position/velocity for the normal gait finally determined in the processing of step S024 in FIG. 13 (processing for determining the initial state of the normal gait), that is, the value (Z0", Vz0") determined in step S224 in FIG. 20 or the like, the initial total center-of-gravity position/velocity for the normal gait seen from the current time gait's supporting leg coordinate system is determined using the formula b11 (or kinematics model of the robot 1), for example. Specifically, the initial total center-of-gravity vertical position for the normal gait seen from the current time gait's supporting leg coordinate system is determined by substituting, into the formula b11, the body material particle vertical position in the simplified model in FIG. 11 corresponding to the body vertical position Z0" for the normal gait determined in step S224 and the leg material particle vertical positions for the supporting leg and the free leg corresponding to the values seen in the current time gait's supporting leg coordinate system converted from the foot positions thereof at the start of the normal gait. Besides, the initial total center-of-gravity vertical velocity for the normal gait seen from the current time gait's supporting leg coordinate system is determined by substituting, into a formula obtained by differentiating the both sides of the formula b11, the body material particle vertical velocity in the simplified model in FIG. 11 corresponding to the body vertical velocity Vz0" for the normal gait determined in step S224 and the leg material particle vertical velocities for the supporting leg and the free leg corresponding to the values seen in the current time gait's supporting leg coordinate system converted from the foot vertical velocities thereof at the start of the normal gait. The calculation of the initial total center-of-gravity vertical position/velocity may be performed using a more precise model.

Then, the initial total center-of-gravity vertical position/velocity for the normal gait thus determined is substituted for the final total center-of-gravity vertical position/velocity in the formula c13 and the following formula c41, and the last-time desired gait instantaneous values (more specifically, values in the current time supporting leg coordinate system converted from the final states of the last time desired gait) of the total center-of-gravity vertical position and velocity are substituted for the initial total center-of-gravity vertical position and velocity in the formulas c13 and c41, thereby determining the floor reaction force's vertical component pattern (more specifically, parameter values) for the current time gait so that the formulas c13 and c41 are satisfied. Here, the integral values in the formulas c13 and c41 are the integral values for the period from the start to the end of the current time gait.

final total center-of-gravity vertical velocity−initial total center-of-gravity vertical velocity =first order integral of (floor reaction force's vertical component/mass of the robot)

+first order integral of the gravitational acceleration    formula c41

Here, the gravitational acceleration is a negative value.

More specifically, first, assuming that at least two parameters of the floor reaction force's vertical component parameters (times of apexes or the like) that define the floor reaction force's vertical component pattern as shown in FIG. 6 are unknown variables, the value of the unknown variables are determined by solving the simultaneous equations comprising the formulas c13 and c41.

As the floor reaction force's vertical component parameters assumed to be unknown variables, the height (peak value of the floor reaction force's vertical component) and the width (duration of the one leg supporting period) of the trapezoid in FIG. 6 may be adopted. In this case, the gradients of the sides of the trapezoid in FIG. 6 are set to values predetermined in accordance with the period of the current time gait or the like, or the times of the apexes of the floor reaction force's vertical component pattern excluding the time of shifting from the one leg supporting period to the floating period occurs are set to values predetermined in accordance with the period of the current time gait or the like. Incidentally, if there is only one unknown variable, in general, there is no solution that satisfies the formulas c13 and c41.

Figure 34:
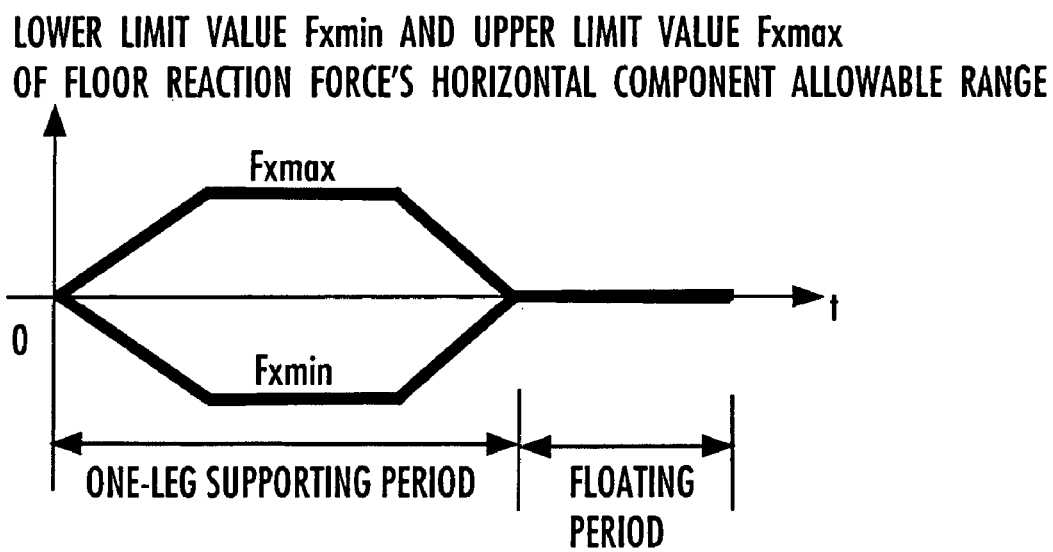
FIG. 34 is a graph showing an example of setting of the floor reaction force's horizontal component allowable range for a current time gait.

Then, the process proceeds to step S608, where the floor reaction force's horizontal component allowable range [Fxmin, Fxmax] for the simplified model gait (specifically, parameters for defining the pattern of the floor reaction force's horizontal component allowable range) is determined in the same manner as the first and second turning gaits of the normal gait. For example, the floor reaction force's horizontal component allowable range having a pattern shown in FIG. 34 is set. In this embodiment, the floor reaction force's horizontal component allowable range is set based on the formula c12 in accordance with the floor reaction force's vertical component pattern previously determined in step S606. Here, the floor reaction force's horizontal component allowable range for the simplified model gait determined in this step may exceed the friction force limit as with the floor reaction force's horizontal component allowable range determined previously when generating the normal gait. This is because the floor reaction force horizontal component is to be limited by the floor reaction force's horizontal component allowable range for gait correction in full model correction described later.

Then, the process proceeds to step S610, where the ZMP trajectory for the current time gait (specifically, parameters defining the ZMP trajectory, such as times or positions of the apexes of the trajectory) is set as shown in FIG. 7 to have a high stability margin and not to change abruptly, as with the first and second turning gaits of the normal gait. The parameters are set in such a manner that the ZMP trajectory for the current time gait is seamlessly connected to the ZMP trajectory for the normal gait. That is, the ZMP trajectory parameters are determined in such a manner that the position of the ZMP at the end of the current time gait agrees with the ZMP position at the start of the normal gait. In this case, for the running gait, the times or positions of the apexes of the ZMP trajectory in the one leg supporting period may be set in the same manner as the ZMP trajectory parameters for the normal gait described above. And, the ZMP trajectory parameters are set in such a manner that the desired ZMP trajectory in the floating period linearly continuously change from the start of the floating period to the ZMP position at the start of the normal gait.

Here, the ZMP trajectory parameters for the current time gait determined in step S610 are provisional ones and to be corrected as described later. Thus, the ZMP trajectory for the current time gait thus set is referred to as a provisional desired ZMP trajectory for the current time gait hereinafter.

Finally, the process proceeds to step S612, where a body posture angle restoring period [Ta, Tb] is set. The body posture angle restoring start time Ta corresponds to the time Tm in the second turning gait of the normal gait, and the body posture angle restoring end time Tb corresponds to the time Ts2 in the second turning gait of the normal gait. These times Ta and Tb are set in the same manner as the times Tm and Ts2, respectively.

Returning to FIG. 13, after the processing of step S026 (processing of determining the gait parameters for the current time gait) is performed as described above, the process proceeds to step S028, where the gait parameters for the current time gait (ZMP trajectory parameters) are corrected. In this processing, the ZMP trajectory parameters are corrected to make the body position/posture trajectory continuous with the normal gait or bring the same close to the normal gait.

Figure 35:
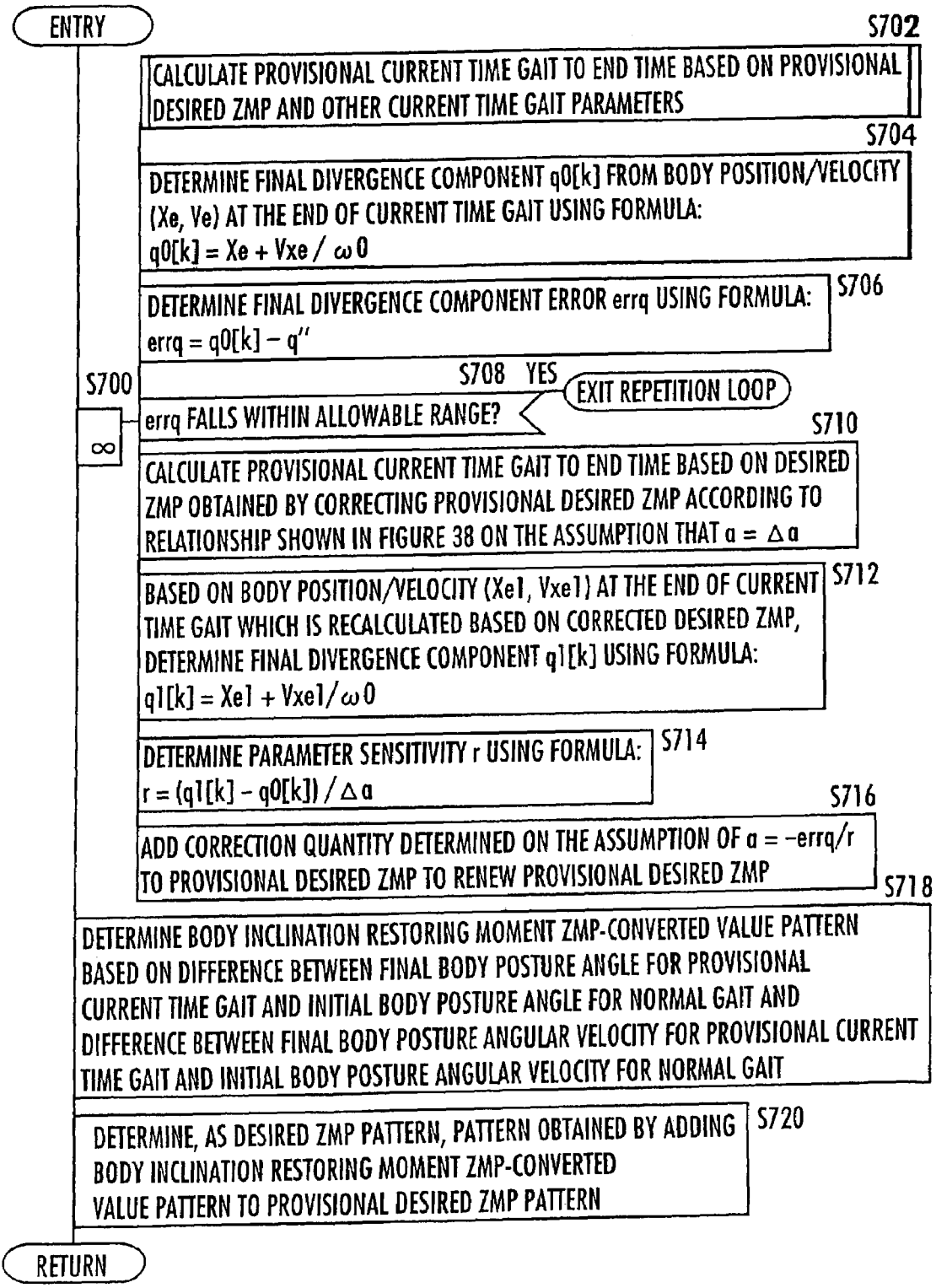
FIG. 35 is a flowchart showing a subroutine process in the flowchart shown in FIG. 13.

FIG. 35 is a subroutine flowchart showing the processing.

First, the process proceeds to step S702 via step S700, where based on the provisional desired ZMP pattern and the other current time gait parameters, a provisional current time gait to the end time of the current time gait is provisionally generated.

In step S702, a process described below is conducted in accordance with the flowchart shown in FIG. 36.

In step S800, various initializations are performed. Specifically, 0 is substituted for the provisional gait generation time k. In addition, values in the current time supporting leg coordinate system converted from the final states of the last time desired gait (more specifically, final values of the gait states including the body horizontal position/velocity, the body vertical position/velocity, the body posture angle and the angular velocity, and the desired foot position/posture and the arm desired posture) are used as the current time gait's initial states.

Then, in step S804 after step S802, it is determined whether the provisional gait generation time k precedes the end time Tcurr of the current time gait or not (whether k≦Tcurr). If the result of the determination is YES, the process proceeds to a current time gait instantaneous value determination subroutine of step S806, where instantaneous values for the current gait at the time k are determined. Then, the process proceeds to step S808, where the provisional gait generation time k is incremented by Δk, and then, the process returns to step S804.

Figure 36:
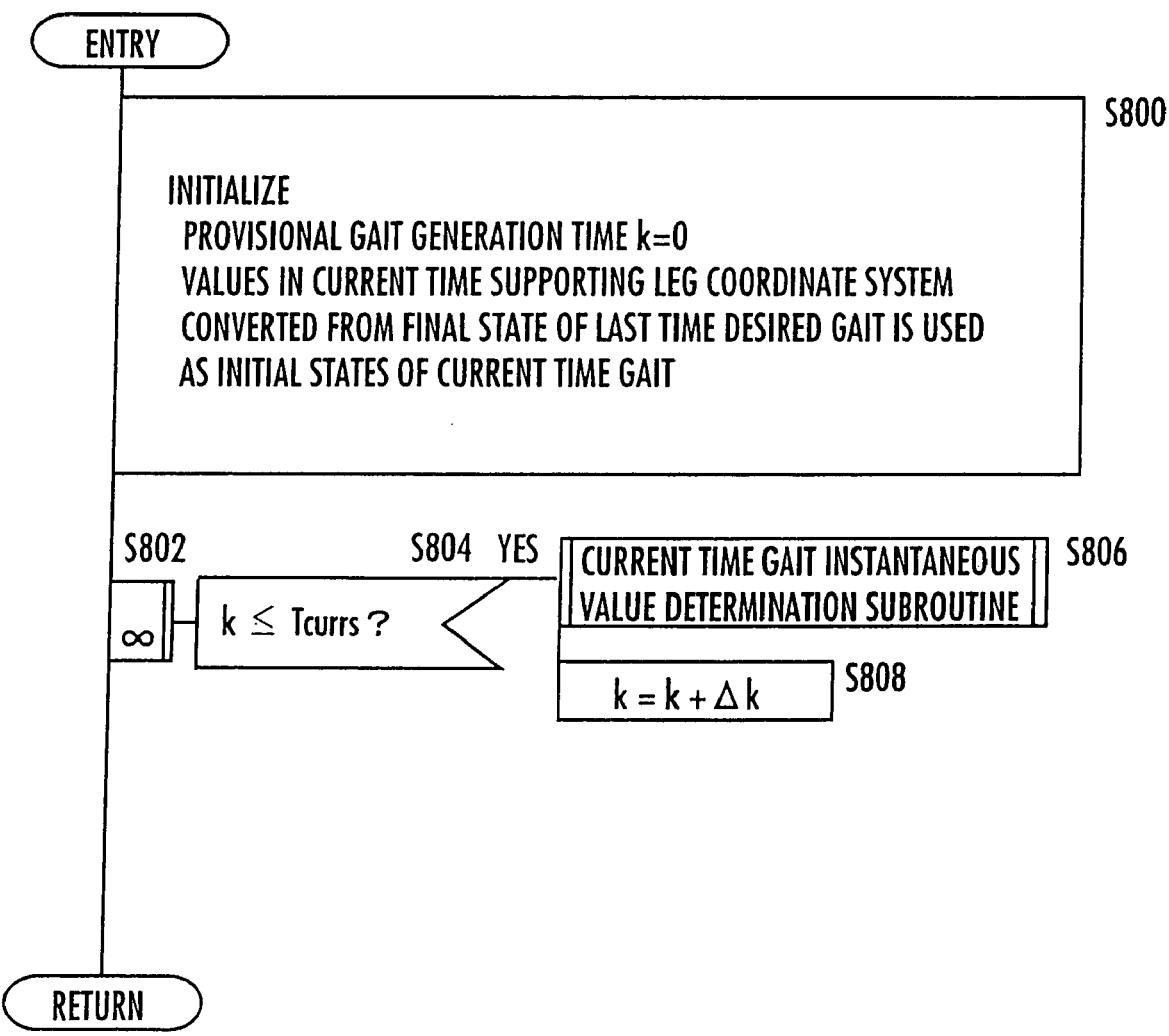
FIG. 36 is a flowchart showing a subroutine process in the flowchart shown in FIG. 35.

If the result of the determination in step S804 is NO, the process shown in the flowchart in FIG. 36 is completed.

By the process described above, the provisional current gait is generated from the start to the end thereof.

Figure 37:
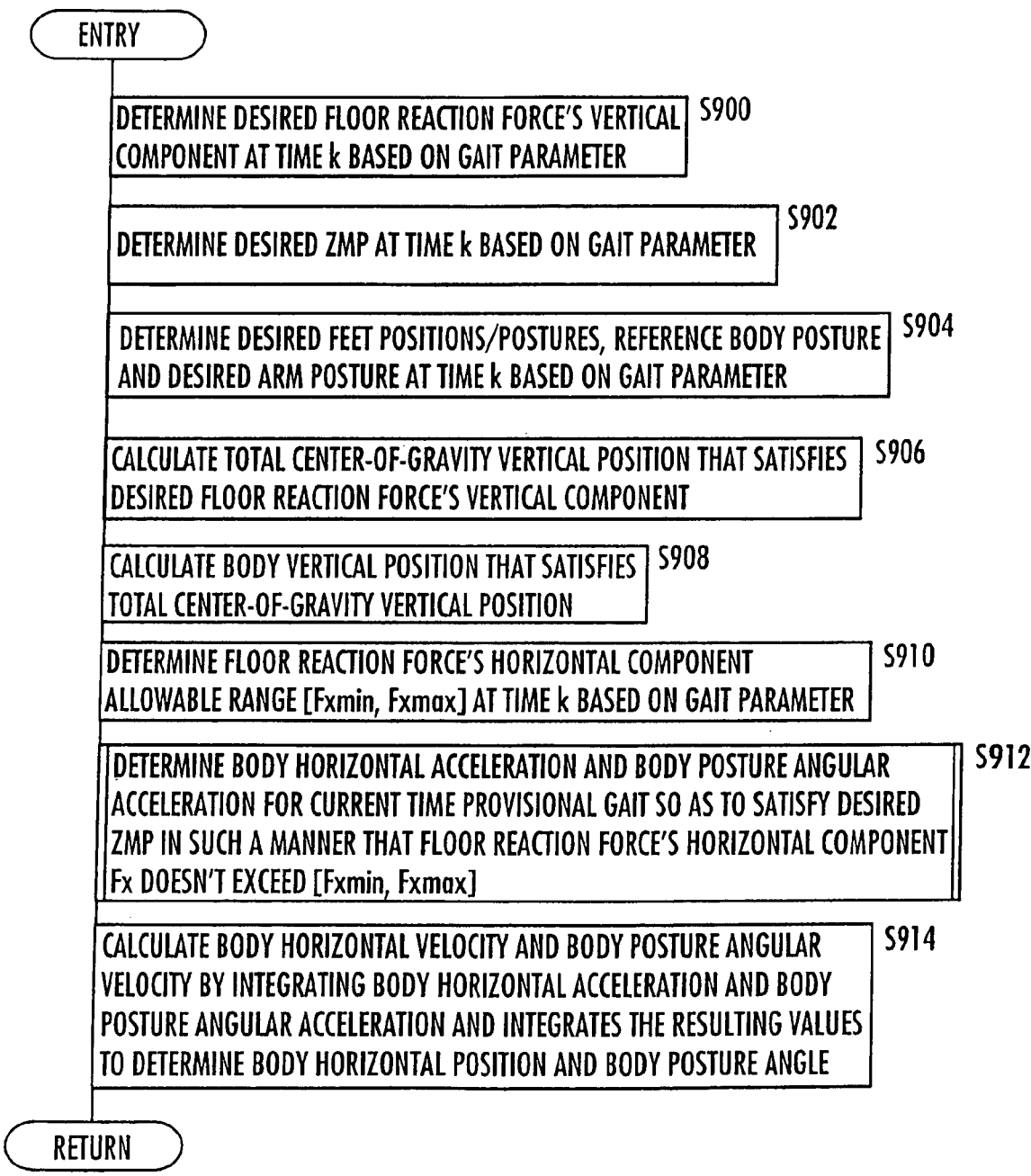
FIG. 37 is a flowchart showing a subroutine process in the flowchart shown in FIG. 36.

In the gait instantaneous value determination subroutine in step S806, the process shown in FIG. 37 is performed. This process will be described below.

First, in step S900, based on the floor reaction force's vertical component trajectory parameters of the current time gait parameters, the value (current time value) of the desired floor reaction force's vertical component at the time k shown in FIG. 6 is determined. Then, in step S902, based on the ZMP trajectory parameters of the current time gait parameters, the value (current time value) of the desired ZMP trajectory (provisional desired ZMP trajectory) at the time k shown in FIG. 7 is determined.

Then, the process proceeds to step S904, where based on the current time gait parameters (the foot trajectory parameters, the reference body posture trajectory parameters and the arm posture trajectory parameters), the values (current time values) of the desired feet positions/postures, the reference body posture and the desired arm posture at the time k are determined. However, as for the desired arm posture, while the total arm center-of-gravity position is determined, the degree of freedom of the movement that involves a change of angular momentum about the vertical axis (or the body trunk axis) is not determined yet. As in the normal gait, the desired foot position/posture trajectory and the floor reaction force's vertical component trajectory for the current time gait are independently determined in accordance with the foot trajectory parameters and the floor reaction force's vertical component trajectory parameters determined in the flowchart in FIG. 33, respectively.

Then, the process proceeds to step S906, where the total center-of-gravity vertical position at the time k that provides the current time value of the desired floor reaction force's vertical component determined in step S900 (i.e., brings the sum of the vertical inertial force of the robot 1 and gravity into balance with the desired floor reaction force's vertical component) is calculated. Specifically, this calculation is performed in the same manner as the processing in step S406 in FIG. 22.

Then, the process proceeds to step S908, where the current time value of the body vertical position that provides the total center-of-gravity vertical position thus determined is calculated. Specifically, this calculation is performed in the same manner as the processing in step S408 in FIG. 22.

Figure 33:
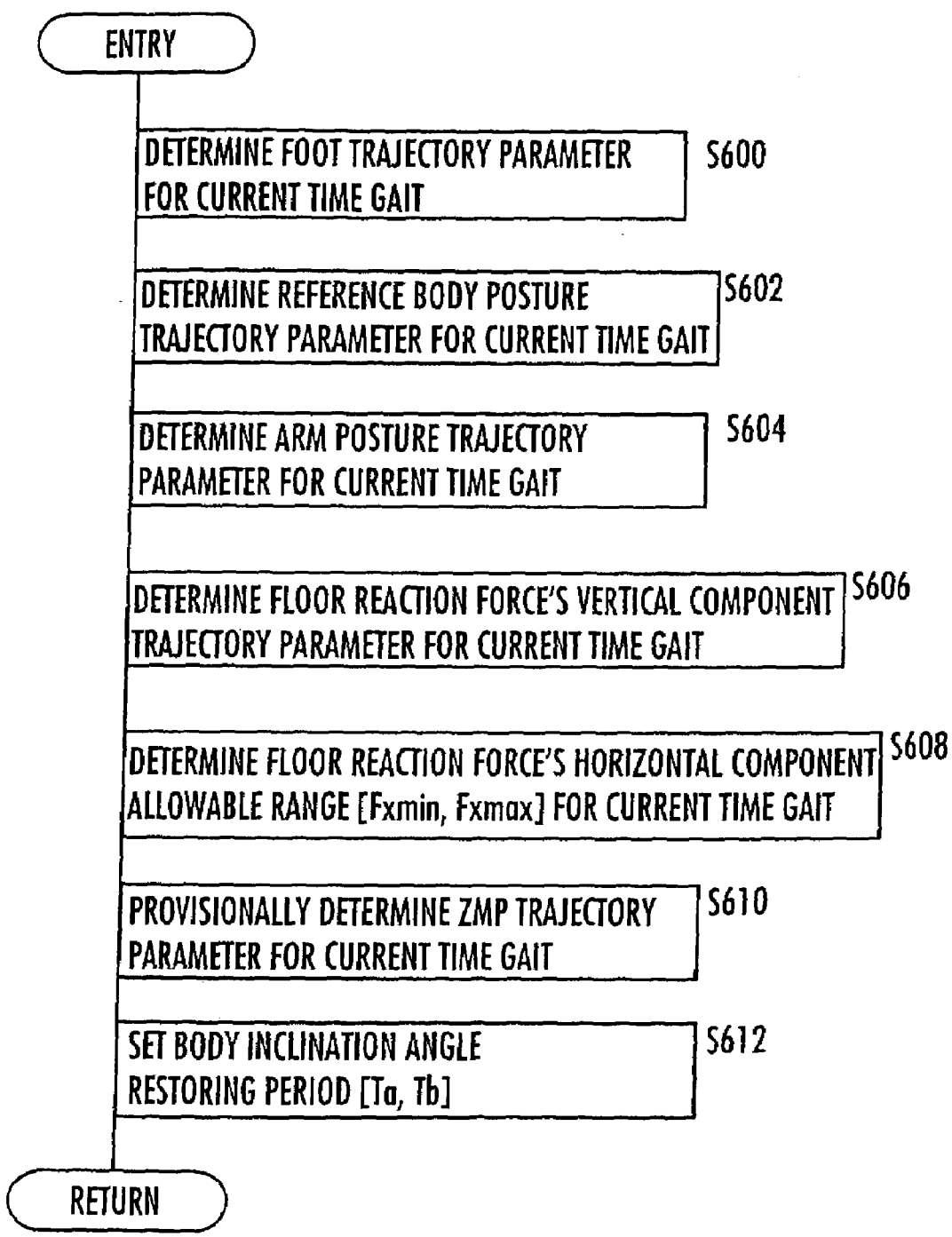
FIG. 33 is a flowchart showing a subroutine process in the flowchart shown in FIG. 13.

Then, the process proceeds to step S910, where based on the parameters of the floor reaction force's horizontal component allowable range determined in step S608 in FIG. 33, the value (current time value) of the floor reaction force's horizontal component allowable range [Fxmin, Fxmax] at the time k shown in FIG. 34 is determined.

Then, the process proceeds to step S912, where the body horizontal acceleration and the body posture angular acceleration for the current time provisional gait are determined so as to satisfy the desired ZMP (that is, the horizontal component of the moment about the desired ZMP is 0). However, these acceleration are determined in such a manner that the floor reaction force's horizontal component Fx doesn't exceed the range [Fxmin, Fxmax]. This process is slightly different from the process shown in the flowchart in FIG. 23, which illustrates the processing in step S412 in FIG. 22 in detail.

Figure 38:
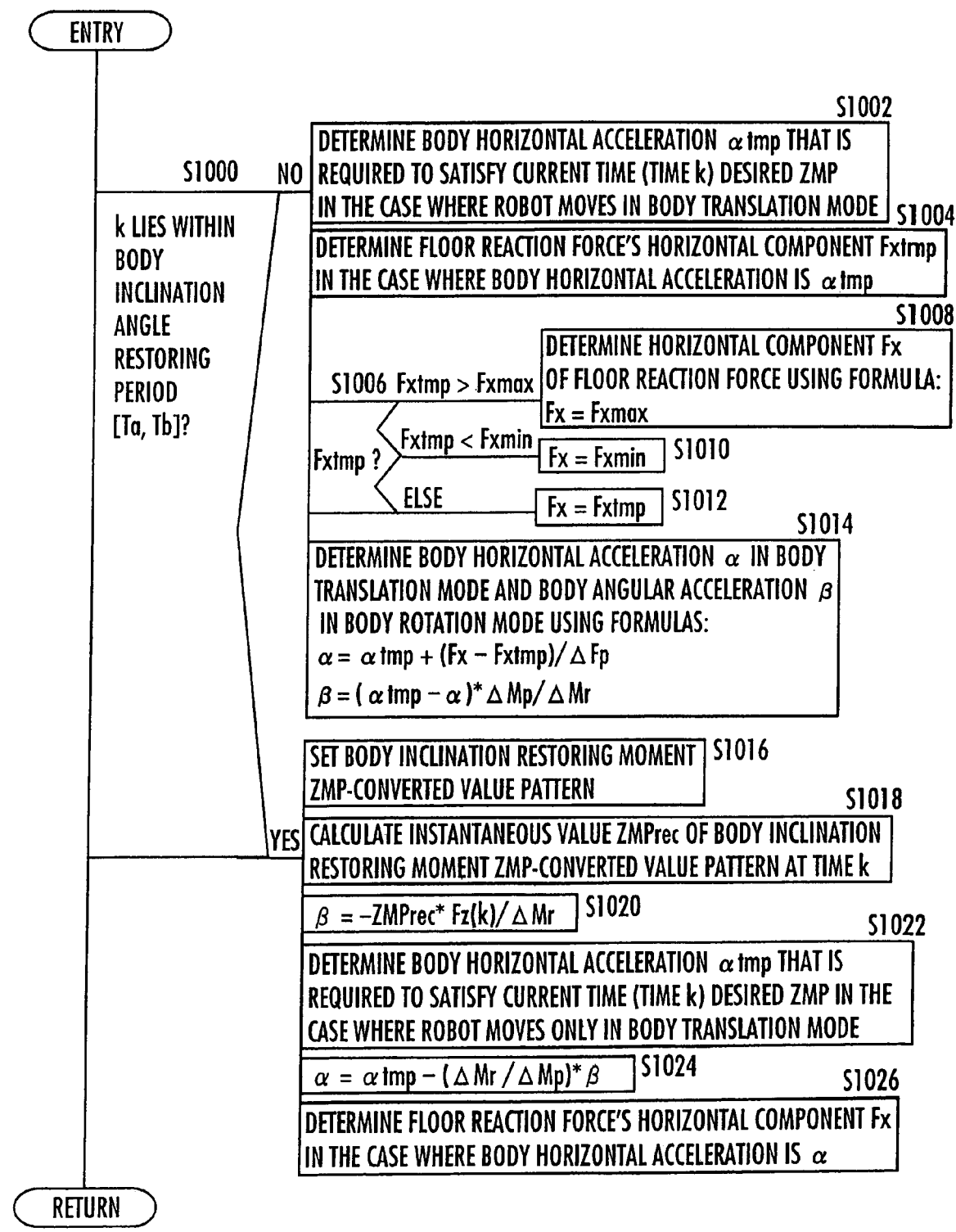
FIG. 38 is a flowchart showing a subroutine process in the flowchart shown in FIG. 37.

Specifically, in step S912, the process shown in FIG. 38 is performed. In the flowchart shown in FIG. 38, first in step S1000, it is determined whether or not the time k lies within the body posture angle restoring period [Ta, Tb] determined in step S612 in FIG. 33.

If the result of the determination is NO (the floor reaction force's horizontal component allowable range is 0 or narrow), the processings from step S1002 to step S1014 are performed. The processings from step S1002 to step S1014 are the same as the processings from step S504 to step S516 in FIG. 23 described above, and thus, description thereof is omitted.

If the result of the determination in step S1000 is YES, the process proceeds to step S1016, where the body posture restoring moment ZMP-converted value pattern ZMPrec is set. In this case, unlike step S518 in FIG. 23 concerning the normal gait generation, ZMPrec is set to a pattern of a constant value of 0 (that is, the height of the trapezoidal pattern shown in FIG. 27 is 0). Then, the processings from step S1018 to step S1026 are performed. The processings from step S1018 to step S1026 are the same as the processings from step S520 to step S528 in FIG. 23 described above, and thus, description thereof is omitted. In the processings from step S1016 to step S1026, the instantaneous value of the body posture restoring moment ZMP-converted value ZMPrec is always 0, and therefore, the body posture angular acceleration β for the body rotation mode determined in step S1020 is also 0. Therefore, assuming that β=0, only the processings in steps S1022, S1024 and S1026 may be performed. If the result of the determination in step S1000 is YES, that is, during the body posture angle restoring period [Ta, Tb], β is 0 (β=0) as described above. Therefore, in step S912, in the body posture angle restoring period [Ta, Tb] (that is, a period in which the floor reaction force's horizontal component allowable range is wide enough), a movement trajectory for body posture change in the direction for restoring the body posture angular velocity is not generated, unlike the case of normal gait generation.

In this embodiment, since the reference body posture is the vertical posture, and the body posture angular acceleration depending on the reference body posture is 0, the angular acceleration for the body rotation mode determined as described above is regarded as the body posture angular acceleration determined in the processing in step S912. However, if the reference body posture trajectory parameters are set in such a manner that the reference body posture varies, the sum of the angular acceleration β for the body rotation mode determined as described above and the reference body posture angular acceleration should be regarded as the body posture angular acceleration determined in the processing of step S912.

Once the processing in step S912 in FIG. 37 is completed as described above, the process proceeds to step S914, where the body horizontal velocity is determined by integrating the body horizontal acceleration determined in step S912 (cumulatively summing the body horizontal acceleration values from the start of the current time gait (time k=0) to the present time k), and the body horizontal position (current time value) is determined by integrating the body horizontal velocity (cumulatively summing the body horizontal velocity values from the start of the current time gait (time k=0) to the present time k). In addition, the body posture angular velocity is determined by integrating the body posture angular acceleration determined in step S912 (cumulatively summing the body posture angular acceleration values from the start of the current time gait (time k=0) to the present time k), and the current time value of the body posture angle is determined by integrating the body posture angular velocity (cumulatively summing the body posture angular velocity values from the start of the current time gait (time k=0) to the present time k) The processing in step S914 is the same as the processing in step S414 in FIG. 22.

After the current time gait instantaneous value determination subroutine of step S806 in FIG. 36 is conducted as described above, the process proceeds to step S808, where the value of the gait generation time k is incremented by the gait generation interval Δk. Then, the process returns to step S804, and as far as the condition shown in step S804 is satisfied, the processings of steps S806 and S808 are repeated. Then, if the condition shown in step S804 is not satisfied, that is, if the provisional current time gait is generated to the end thereof, the process proceeds to step S704 in FIG. 35.

In step S704, from the body horizontal position/velocity (Xe, Vxe) at the end of the current time gait determined in step S702 as described above, the final divergence component $q0[k]$ (k=Tcurr) is determined using the formula shown in the drawing (formula 10).

Then, the process proceeds to step S706, where a final divergence component error errq, which is the difference between the current time gait's final divergence component $q0[k]$ and the normal gait's initial divergence component q" (determined in step S224 in FIG. 20), is determined using the formula shown in the drawing. Then, the process proceeds to step 708, where it is determined whether the final divergence component error errq thus determined falls within an allowable range (a range in the vicinity of 0) or not.

Figure 39:
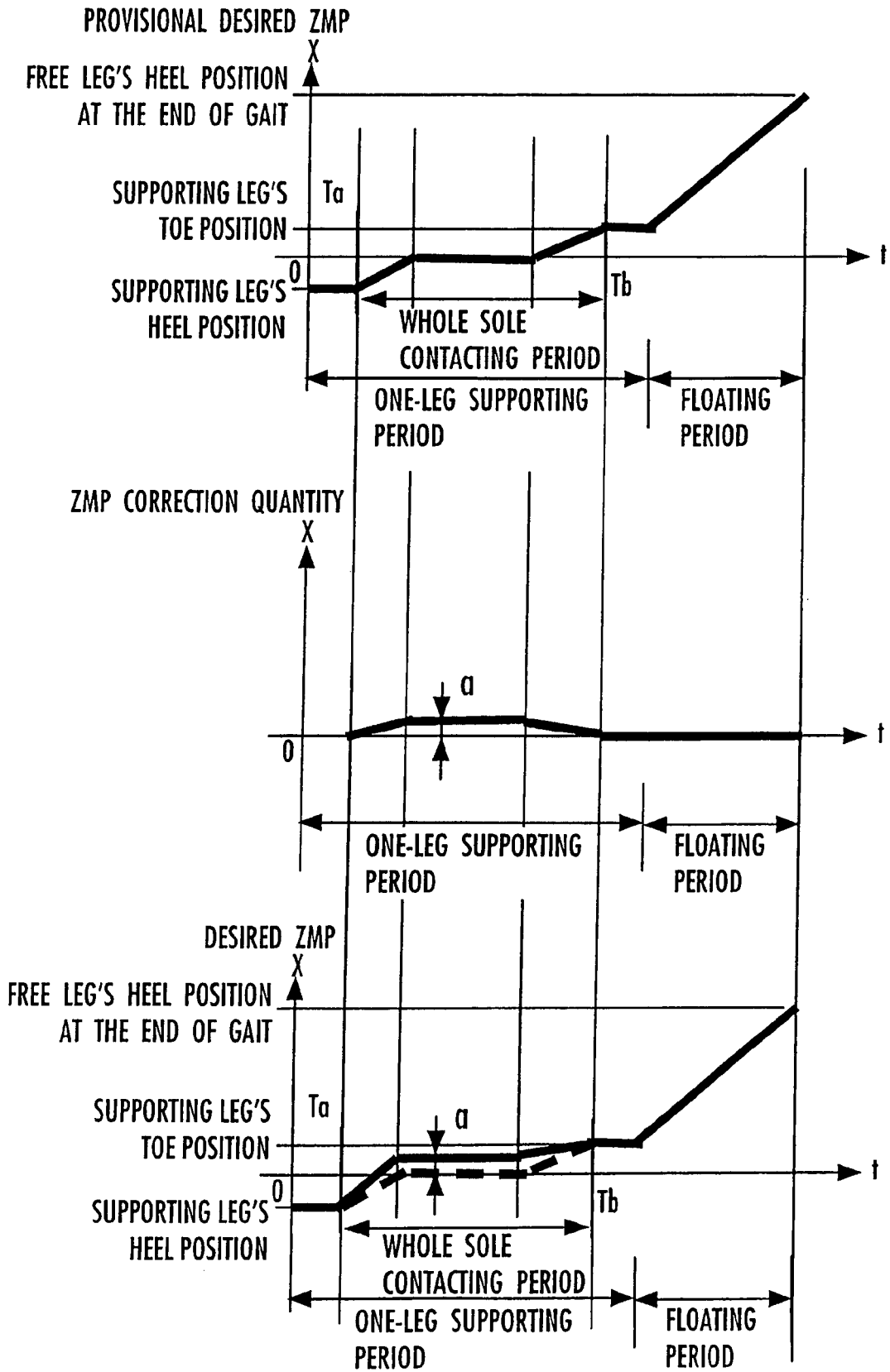
FIG. 39 is a graph for illustrating essential processings in the flowchart shown in FIG. 38.

If the result of the determination in step S708 is NO, the process proceeds to step S710, where, assuming that a=Δa (Δa is a predetermined small amount), based on a desired ZMP obtained by correcting the current provisional desired ZMP pattern to be trapezoidal in accordance with the relationship shown in FIG. 39, the provisional current time gait to the end thereof is calculated in the same manner as in step S702. Here, with reference to FIG. 39, "a" denotes the height of the trapezoidal pattern for correcting the provisional desired ZMP to make the current time gait's final divergence component agree with the normal gait's initial divergence component as closely as possible (bring the body horizontal position/posture trajectory for the current time gait close to the body horizontal position/posture trajectory for the normal gait). In this case, in this embodiment, the correction of the provisional desired ZMP is performed during a period in which substantially the whole surface of the sole of the supporting leg's foot 22 (whole sole contact period), that is, during a period in which the floor reaction force's horizontal component allowable range is sufficiently wide, and the times of the apexes of the trapezoidal pattern are set to the times of the apexes of the provisional desired ZMP pattern in the whole sole contact period. The assumption that a=Δa in step S710 is intended for observing a change of the final divergence component error errq occurring when the current provisional desired ZMP trajectory is corrected by a small amount using the trapezoidal pattern.

After the provisional current time gait obtained when the provisional desired ZMP trajectory is corrected on the assumption that a=Δa is generated to the end thereof in step S710, the process proceeds to step S712, where based on the body horizontal position/velocity (Xe1, Vxe1) at the end of the provisional current time gait, the final divergence component $q1[k]$ for the provisional current time gait is determined using the formula shown in the drawing (formula c10).

In this embodiment, Δa is assumed to be an appropriately set small constant in step S710. However, Δa may be set to decrease as the final divergence component error errq decreases through repeated calculations described below. However, if Δa is a constant, the final divergence component error errq can be made to fall within the allowable range by several repeated calculations.

Then, the process proceeds to step S714, where a parameter sensitivity r (rate of change of the final divergence component error with respect to Δa) is determined using the formula shown in the drawing. Then, the process proceeds to step S716, where a correction quantity in a trapezoidal pattern having a height of a (=−errq/r, which is a value obtained by dividing the final divergence component error errq determined in step S706 by the parameter sensitivity r determined in step S714) is added to the provisional desired ZMP pattern in accordance with the relationship shown in FIG. 39, thereby correcting the provisional desired ZMP pattern (determining a new provisional desired ZMP pattern).

Then, the process returns to step S702. Then, as far as the result of the determination in step S708 is NO, the processings from steps S702 to S716 are repeated, and if the result of the determination in step S708 is YES, the repetition loop (step S700) is exited, and the process proceeds to step S718.

In step S718, based on the difference between the final body posture angle for the provisional current time gait and the initial body posture angle for the normal gait, the difference between the final body posture angular velocity for the current time gait and the initial body posture angular velocity for the normal gait or the like, a pattern of the body posture restoring moment ZMP-converted value (ZMPrec) for the current time gait is determined in such a manner that the body posture angle for the current time gait is brought close to the body posture angle for the normal gait. ZMPrec determined in this step is used for correcting the provisional desired ZMP to maintain the agreement between the current time gait's final divergence component and the normal gait's initial divergence component (condition in step S708) even if a body posture angular acceleration is produced so as to connect the body posture angle trajectory to the normal gait (bring the body posture angle trajectory close to the normal gait) during a period in which the floor reaction force's horizontal component allowable range is sufficiently wide (a period in the one leg supporting period) in the processing of generating the current time gait instantaneous values described later.

ZMPrec has a trapezoidal pattern as with that described concerning the normal gait generation process and, specifically, is determined in the following manner. That is, assuming that, in the trapezoidal pattern of ZMPrec shown in FIG. 27, the times of the apexes (folds) of the trapezoid are known (specifically, the times of the apexes of the trapezoid are adjusted to the times of apexes of the desired ZMP) and the height of the trapezoid is unknown, the height (parameter) of trapezoid of ZMPrec is determined as described below. However, concerning step S718, the times Tm and Ts2 in FIG. 27 are replaced with the times Ta and Tb, respectively.

If the body posture restoring moment ZMP-converted pattern has only one unknown parameter as described above, in general, both of the body posture angle and the body posture angular velocity of the current time gait cannot be seamlessly connected to those of the normal gait at the end of the current time gait. Thus, in this embodiment, the unknown parameter is determined in such a manner that the state of the generated gait is gradually brought close to the state of the normal gait through plural steps.

Incidentally, both of the body posture angle and the body posture angular velocity of the current time gait may be connected to those of the normal gait at the end of the current time gait under the conditions that the ZMPrec pattern for one gait is more complicated and two or more unknown parameters are used. However, in such a case, there is a possibility that the ZMPrec pattern varies too largely in a zigzag.

In the following, a calculation principle will be described, and then, a calculation procedure will be described.

The difference between the final body posture angle for the provisional current time gait determined as described above on the assumption that the height of the trapezoidal ZMPrec pattern is 0 in step S702 and the initial body posture angle for the normal gait, and the difference is denoted by θerr. In addition, the difference between the final body posture angular velocity for the provisional current time gait and the initial body posture angular velocity for the normal gait is determined, and the difference is denoted by vθerr.

Here, it is assumed that the current time gait is generated on the assumption that the height of the trapezoidal ZMPrec pattern is a certain value bcurr, and subsequently, the first turning gait is generated by the same algorithm as the current time gait. Here, it is assumed that the pattern of the body posture restoring moment ZMP-converted value ZMPrec for the first turning gait is expressed by a sum of the ZMPrec pattern for the first turning gait determined in step S518 in FIG. 23 (trapezoidal pattern having a height of acyc1 shown in FIG. 27) and a certain value b1.

The gait thus generated is referred to as a ZMPrec-corrected gait, and the final body posture angle and the final angular velocity (at the end of the first turning gait) are denoted by θ1 and vθ1, respectively.

The body posture angle and the angular velocity at the end of the first turning gait of the original normal gait determined when the subroutine for determining the initial states of the normal gait in step S024 are denoted by θ1org and vθ1org, respectively (the original normal gait is one determined on the assumption that the initial body posture angle and the initial angular velocity for the normal gait determined by the formulas c30 and c31 in step S310 are used as initial values, and the pattern determined in step S518 (trapezoidal pattern having a height of acyc1 in FIG. 27) is used as the ZMPrec pattern).

Here, $\Delta\theta1$ and $\Delta v\theta1$ are defined as follows.

$$\Delta\theta1 = \theta1 - \theta1org \qquad \text{formula c50}$$

$$\Delta v\theta1 = v\theta1 - v\theta1org \qquad \text{formula c51}$$

$\Delta\theta1$ and $\Delta v\theta1$ represent differences in body posture angle and angular velocity, respectively, between the ZMPrec-corrected gait and the original normal gait at the time when the first turning gait is generated to the end thereof. If $\Delta\theta1$ and $\Delta v\theta1$ are 0, when the second turning gait is generated subsequently to the ZMPrec-corrected gait by the same algorithm as the current time gait on the assumption that the height of the trapezoidal ZMPrec pattern is acyc2, the generated gait agrees with the original normal gait.

Therefore, a current time gait's trapezoidal pattern height bcurr and a first turning gait's trapezoidal pattern height b1 are determined so that $\Delta\theta1$ and $\Delta v\theta1$ are 0, and the determined value bcurr is used finally as the trapezoidal pattern height for the current time gait.

Since the dynamics model concerning the body posture angle of the robot 1 has a linearity similar to that of the flywheel FH as shown in FIG. 11, $\Delta\theta1$ and $\Delta v\theta1$ are related as follows with the current time gait's trapezoidal pattern height bcurr, the first turning gait's trapezoidal pattern height b1, the difference θerr between the final body posture angle for the provisional current time gait and the initial body posture angle for the normal gait, and the difference vθerr between the final body angular velocity for the provisional current time gait and the initial body posture angular velocity for the normal gait.

$$\Delta\theta1 = c11*bcurr + c12*b1 + \theta err + e1*v\theta err \qquad \text{formula c52}$$

$$\Delta v\theta1 = c21*bcurr + c22*b1 + e2*v\theta err \qquad \text{formula c53}$$

Here, c11, c12, c21, c22, e1 and e2 are coefficients that are uniquely determined by the gait periods of the current time gait and the first turning gait, parameters of the pattern of the body posture restoring moment ZMP-converted value ZMPrec (in particular, parameters concerning time), or the like.

Based on the principle described above, in the calculation procedure, the body posture angle difference θerr and the angular velocity difference Vθerr at the boundary between the provisional current time gait and the normal gait are first determined.

Then, the coefficients c11, c12, c21, c22, e1 and e2 of the formulas c52 and c53 are determined based on the gait periods of the current time gait and the first turning gait, parameters of the pattern of the body posture restoring moment ZMP-converted value ZMPrec (in particular, parameters concerning time), or the like.

Then, the current time gait's trapezoidal pattern height bcurr and the first turning gait's trapezoidal pattern height b1 are determined in such a manner that the right sides of the formulas c52 and c53 are 0. That is, the simultaneous equations of the formulas c52 and c53 with the right sides being 0 are solved to determine the values bcurr and b1.

Finally, the height of the trapezoidal pattern of the body posture restoring moment ZMP-converted value (ZMPrec) for the current time gait is set to the determined current time gait's trapezoidal pattern height bcurr.

Then, the process proceeds to step S720, where as a desired ZMP pattern for the current time gait, a pattern is determined which is a sum of the current provisional desired ZMP pattern (provisional desired ZMP pattern when the repetition loop in step S700 is exited) and the body posture restoring moment ZMP-converted value pattern determined as described above in step S718. This processing is the same as the processing of adding the trapezoidal pattern having a height of Δa to the provisional desired ZMP pattern in step S710.

A reason why the body posture restoring moment ZMP-converted value pattern is added to the provisional desired ZMP pattern will be described below.

The provisional current time gait generated in the loop in step S700 is generated on the assumption that the body posture restoring moment ZMP-converted value ZMPrec is 0 (the height parameter of the trapezoidal ZMPrec pattern is 0) as described above. For the provisional current time gait thus finally generated in the loop in step S700, while the body position/velocity is continuous to or close to that for the normal gait, the body posture angle is shifted from the body posture angle for the normal gait or possibly diverges.

The body posture restoring moment ZMP-converted value pattern determined in step S718 is one that produces such a body posture angular acceleration that brings the shift of the body posture angle from that for the normal gait close to 0.

However, if the body posture angular acceleration according to the body posture restoring moment ZMP-converted value pattern determined in step S718 is produced without correcting the provisional desired ZMP pattern resulting from the loop in step S700, the body horizontal position trajectory has to be shifted from the body horizontal position trajectory for the provisional current time gait in order to satisfy the dynamical equilibrium condition (that the moments applied to the desired ZMP by the resultant force of gravity and the inertial force of the robot, except for the vertical moment, are 0). Thus, in this embodiment, the provisional desired ZMP pattern is corrected so that there is no need to shift the body horizontal position trajectory from that resulting from the loop in step S700

If, besides the movement according to the provisional current time gait, the body posture angular acceleration according to the body posture restoring moment ZMP-converted value pattern determined in step S718 is produced, the ZMP (a point where the moments caused by gravity and the inertial force caused by a movement, except for the vertical moment, are 0) is shifted by the body posture restoring moment ZMP-converted value. Therefore, if a pattern which is a sum of the provisional desired ZMP pattern and the body posture restoring moment ZMP-converted pattern is used as a desired ZMP pattern, and a current time gait that satisfies the desired ZMP pattern is generated while producing a body posture angular acceleration for the body rotation mode associated with the body posture restoring moment ZMP-converted value pattern determined in step S718, a body translation movement similar to the provisional current time gait is provided.

Above described is a reason why the sum of the body posture restoring moment ZMP-converted value pattern and the provisional desired ZMP pattern is used as the desired ZMP pattern.

Returning to FIG. 13, after correcting the current time gait parameters in step S208 as described above, the process proceeds to step S030, where parameters defining the floor reaction force's horizontal component allowable range and the ZMP allowable range for gait correction are determined. In this case, the floor reaction force's horizontal component allowable range for gait correction is set to have the pattern shown in FIG. 34 for the X axis direction (back-and-forth direction) and the Y axis direction (sideward direction) based on the floor reaction force's vertical component trajectory and the formula c12, as with the floor reaction force's horizontal component for the simplified model gait, for example. And, for example, the value of ka*μ in the formula c12 is set as a parameter that defines the floor reaction force's horizontal component allowable range for gait correction. However, it is preferably that the floor reaction force's horizontal component allowable range is reliably set within the friction limit by setting the coefficient ka in the formula c12 to a value smaller than the floor reaction force's horizontal component allowable range for the simplified model gait, for example.

In addition, as described in detail later, the ZMP allowable range is determined in accordance with the supporting polygon that is determined by the feet position/posture trajectory. Basically, the ZMP allowable range is set to a rectangular region in the supporting polygon (region in the XY plane), and as parameters that define the ZMP allowable range, the end values thereof in the X axis direction and the end values thereof in the Y axis direction are set, for example. The ZMP allowable range for the running gait is set within the contact surface of the supporting leg's foot 22 during the one leg supporting period and set within a range having no width in both the X and Y axis directions (that is, a point) during the floating period (for example, the desired ZMP itself is regarded as the ZMP allowable range).

After the processing in step S030 is performed, or if the result of the determination in step S016 is NO, the process proceeds to step S032, where current time gait's instantaneous values (values at the present time t) are determined using the simplified model.

In step S032, the same processings as those in steps S900 to S910 in FIG. 37 are performed, and then, the processings in steps S1000 to S1026 in FIG. 38, which is the subroutine of step S912, are performed. In this case, however, in step S1016 in FIG. 38, the body posture restoring moment ZMP-converted value (ZMPrec) pattern is not set to 0 but to be the body posture restoring moment ZMP-converted value (ZMPrec) pattern set in step S718 in FIG. 35. Then, the same processing as that in step S914 in FIG. 37 is performed, and the process in step S032 in FIG. 13 is completed.

Then, the process proceeds to step S034, where an arm movement that cancels the spinning force (that allows the floor reaction force's vertical moment caused about the desired ZMP by movements of parts, other than the arms, of the robot 1 to be substantially 0) is determined. Specifically, the floor reaction force moment's vertical component trajectory in the desired ZMP in the case where the arms don't swing is determined. More strictly, values obtained by inverting the signs of the instantaneous values of the vertical component trajectory of the moment applied to the desired ZMP by the resultant force of gravity and the inertial force of the robot in the case where the gait is generated without the arms swinging are determined. That is, an instantaneous value is determined for the floor reaction force moment vertical component about the desired ZMP (instantaneous value) in balance with the instantaneous value of the movement according to the gait generated in the processing in step S032 (excluding the arm swing movement). Then, the instantaneous value is divided by the equivalent moment of inertia the arm swing movement, thereby determining the angular acceleration of the arm swing movement required for canceling the spinning force. Incidentally, a too wide arm swing can be addressed by dividing the instantaneous value by a value larger than the equivalent moment of inertia.

Then, the angular acceleration is integrated two times, the resulting value is passed through a low cut filter for preventing the integral value from being too large, and the resulting angle is regarded as an arm swing movement angle. However, in the arm swing movement, the left and right arms are swung oppositely in the back-and-forth direction to prevent the center of gravity of the arms from varying. An arm swing movement for canceling the spinning force may be generated for the normal gait, and the arm swing movement for the current time gait be determined so as to connect to the arm swing movement.

The instantaneous values at the present time t generated by the process up to step S034 described above will be referred to as simplified model gait's instantaneous values, hereinafter. In this embodiment, the simplified model gait's instantaneous values are determined using the simplified model (dynamics model shown in FIG. 11) in such a manner that the horizontal component of the floor reaction force moment caused about the desired ZMP by the resultant force of the inertial force and gravity caused by movement of the robot 1 is 0 (the dynamical equilibrium condition concerning the desired ZMP is satisfied). Therefore, the simplified model gait in this embodiment is equivalent to the desired gait according to the definition (b').

In this case, of the simplified model gait's instantaneous values, the instantaneous values of the body position/posture and the body vertical position are provisional ones, which are to be corrected by full model correction described later. In addition, of the simplified model gait's instantaneous values in this embodiment, the instantaneous value of the horizontal component of the floor reaction force moment about the desired ZMP is 0, although it is also a provisional one, which is to be corrected by full model correction described later.

Figure 40:
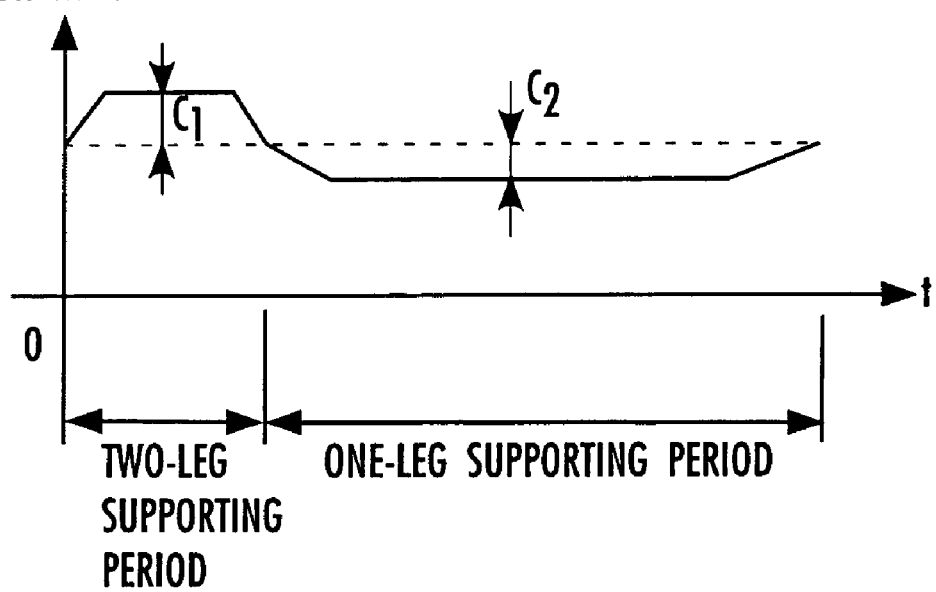
FIG. 40 is a graph showing an example of setting of a floor reaction force's vertical component during walking.

While the running gait shown in FIG. 5 is taken as an example in the process of determining the simplified model gait's instantaneous values described above, the simplified model gait's instantaneous values can be determined in the same manner even in the case of generating a walking gait of the robot 1. In this case, the floor reaction force's vertical component trajectory (one step of trajectory) may be set to be a polygonal pattern as shown in FIG. 40, for example. In this example, more specifically, the floor reaction force's vertical component trajectory for the walking gait is set to have a trapezoidal shape protruding in the direction of the floor reaction force's vertical component increasing (protruding upward) during the two leg supporting period and set to have a trapezoidal shape protruding in the direction of the floor reaction force's vertical component decreasing (protruding downward) during the one leg supporting period. In this case, the heights C1 and C2 and the like of the two trapezoidal parts of the floor reaction force's vertical component are preferably determined in the following manner. That is, using the body height determination method previously proposed by the applicants (in Japanese Patent Laid-Open No. 10-86080, more specifically, the method shown in FIG. 6 of this document or the like), the body vertical position trajectory that satisfies a predetermined geometrical condition concerning displacement of the joints (specifically, the knee joints) of the legs 2, 2 of the robot 1 (condition for preventing the legs 2, 2 from being fully stretched) is determined as a reference body vertical position trajectory. Then, the height C1 and C2 of the two trapezoidal parts of the floor reaction force's vertical component trajectory are determined in such a manner that a characteristic quantity concerning the shape of the body vertical position trajectory corresponding to the total center-of-gravity vertical position trajectory of the robot 1 obtained by second order integral of the floor reaction force's vertical component trajectory from the start to the end of the gait (for example, difference between the maximum value and the minimum value) agrees with a characteristics quantity of the reference body vertical position trajectory (for example, difference between the maximum value and the minimum value). In this case, as in setting of the floor reaction force's vertical component trajectory for the running gait, in setting of the floor reaction force's vertical component trajectory for the walking gait, the average value of the floor reaction force's vertical component for one period thereof is adapted to agree with the weight of the robot 1.

By determining the floor reaction force's vertical component trajectory for the walking gait in this way, appropriate simplified model gait's instantaneous values (in particular, an instantaneous value of the body vertical position) that prevent the legs 2, 2 from being fully stretched can be determined. When generating a walking gait, the simplified model gait's instantaneous values can be determined by performing the same process as the process of generating the simplified model gait's instantaneous values for the running gait except that the floor reaction force's vertical component trajectory is set as described above.

The simplified model gait's instantaneous values for the walking gait may be determined by the method according to the first embodiment or the like described in Japanese Patent Laid-Open No. 2000-352011 previously proposed by the applicants.

Returning to the flowchart in FIG. 13, then, the process proceeds to step S036, where, based on the parameters that defines the floor reaction force's horizontal component allowable range and the ZMP allowable range for gait correction (these parameters are set in step S030), the instantaneous values (values at the present time t) of the floor reaction force's horizontal component allowable range and the ZMP allowable range for gait correction are determined.

Then, the process proceeds to step S038, where the full model is used to generate a corrected gait (correct the gait), thereby determining the instantaneous values for the final desired gait. That is, as described earlier with reference to FIG. 8, calculation (determination) of the corrected desired body position/posture, the corrected desired horizontal component of the floor reaction force moment about the desired ZMP or the like is performed.

The gait correction method in step S038 constitutes a principal characteristic of the present invention. Various examples of the gait correction method will be explained below, and first, the gait correction method will be outlined.

Figure 41:
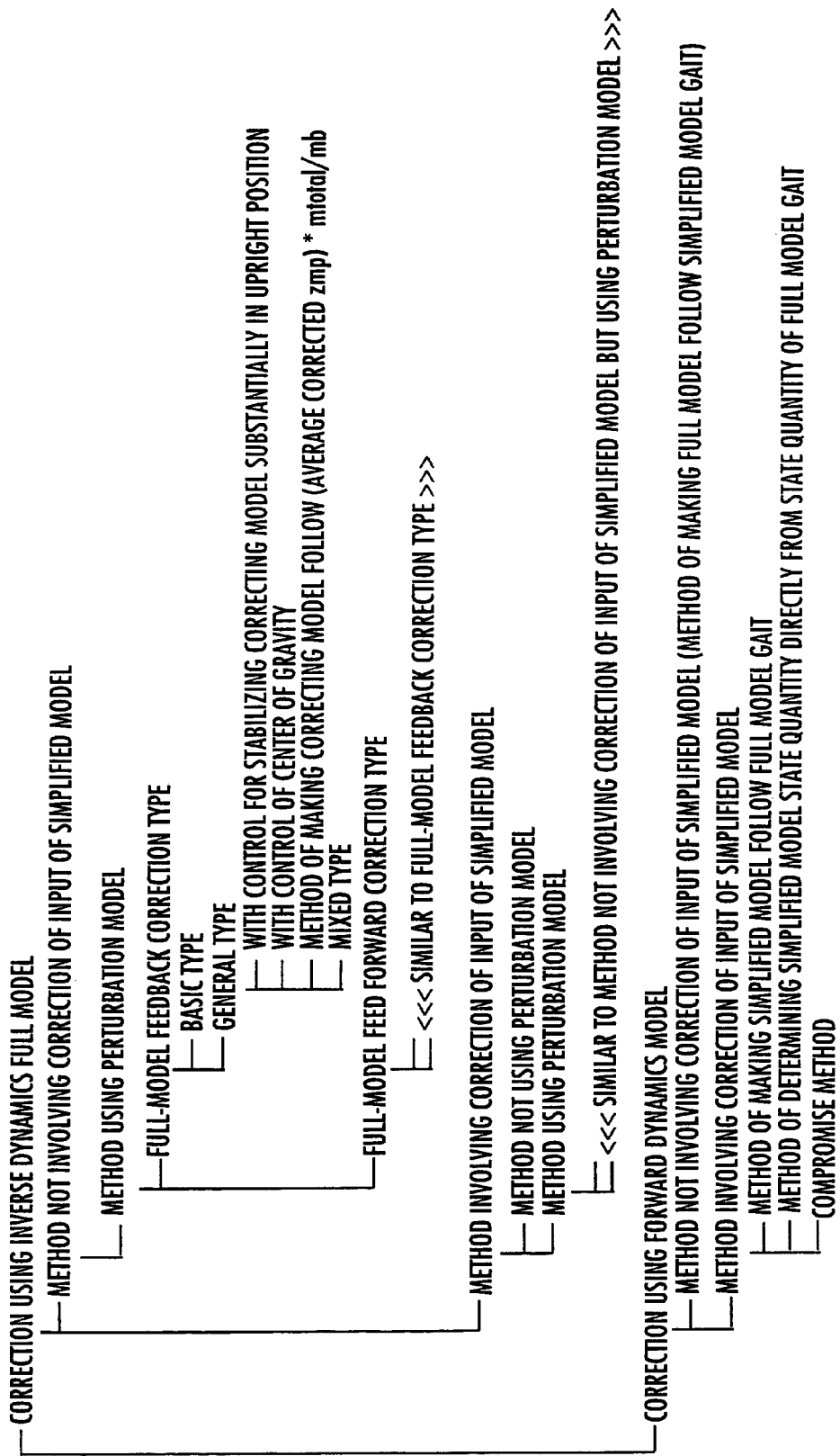
FIG. 41 illustrates categories of gait correction methods used in essential parts of the present invention.

The gait correction methods can be categorized as shown in FIG. 41. This categorization table is substantially the same as that shown in FIG. 12 of Japanese Patent Application No. 2001-133621 previously proposed by the applicants. However, of the method involving no correction of inputs of the simplified model, the method that doesn't use a perturbation model is excluded. This is because this method involves correcting only the floor reaction force to satisfy the dynamical equilibrium condition and cannot actually correct a gait, such as a running gait, that may have narrow floor reaction force's horizontal component allowable range and ZMP allowable range while preventing these allowable ranges from being exceeded.

A correction method for the device according to the first embodiment is of a full model feed forward type. Furthermore, it uses the inverse dynamics full model (inverse full model), does not correct the simplified model gait and uses the perturbation model.

Figure 42:
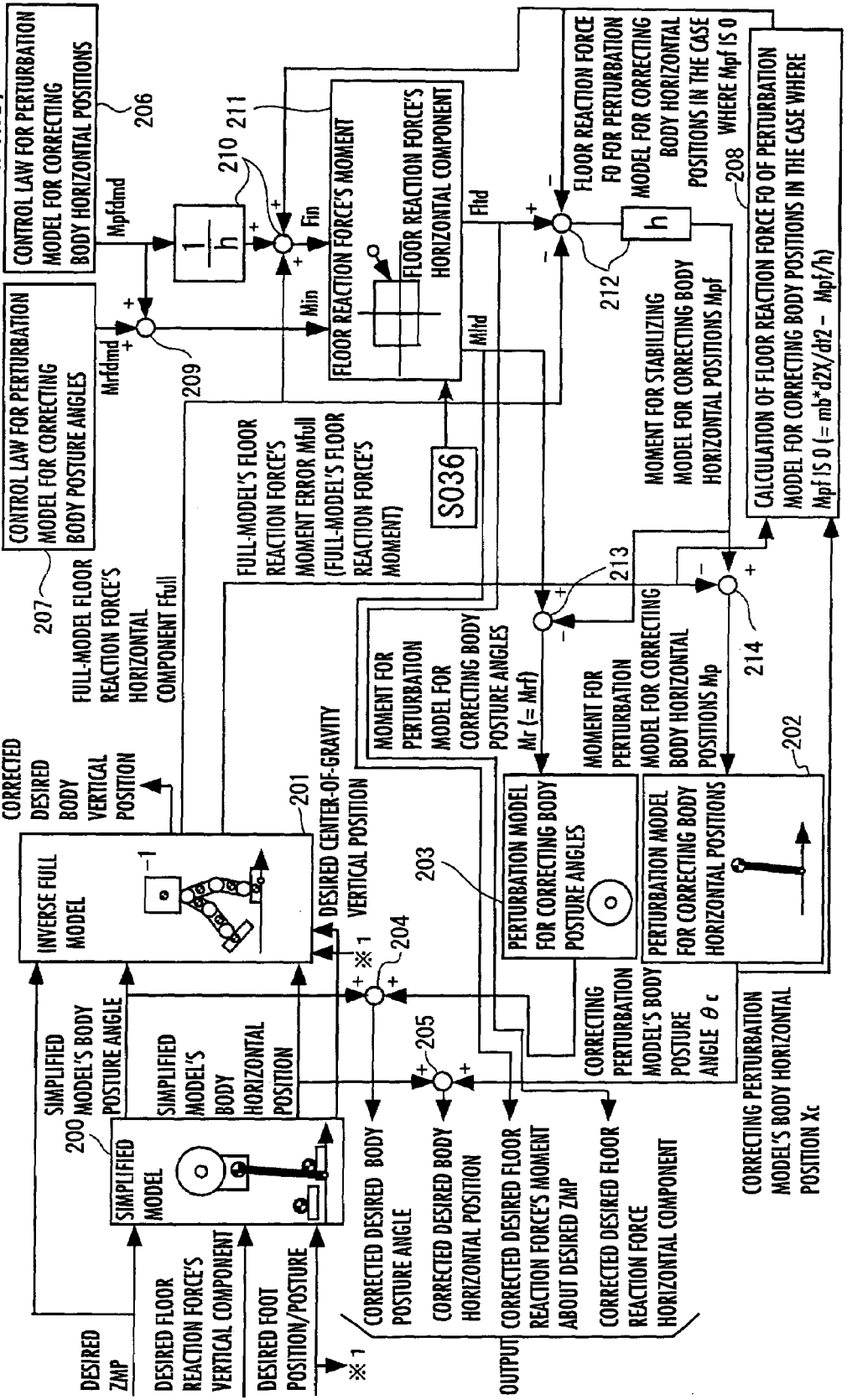
FIG. 42 is a functional block diagram for illustrating a gait correction method according to a first embodiment of the present invention.

FIG. 42 is a functional block diagram for illustrating an operation of the gait generation device 100 according to the first embodiment of the present invention, specifically, the gait correction method in step S038 in the flow chart in FIG. 13. However, a simplified model 200 shown in FIG. 42 is not simply a dynamics model but represents the process from steps S010 to S034 described above, that is, calculation (determination) of the simplified model gait's instantaneous values. Therefore, the sections following the simplified model 200 in FIG. 42 are associated with the processing in step S038.

The process of determining the instantaneous values of the floor reaction force's horizontal component allowable range and the ZMP allowable range for gait correction is denoted by reference numeral S036, which is equivalent to that in the flowchart in FIG. 13.

Since the process is actually performed by one computer, the process is performed, after the block diagram is digitized, sequentially from the upstream part toward the downstream part (gait output) in the block diagram. However, as a feedback quantity returned to the upstream stage, a value (state quantity) calculated during the last time control cycle (at the time t−Δt, where t denotes the present time) is used. In the following, the value calculated during the last time control cycle (at the time t−Δt) will be abbreviated as a last time value.

Each time the process in step S038 is performed, calculation for one control cycle in the block diagram is performed.

Incidentally, as a digitization method, a backward difference method, a forward difference method, a bilinear conversion and the like are known, and any of them can be used. However, for example, if the backward difference method is used, calculation of the current time value (output) of a variable may require the current time value (output) of the variable itself. Thus, as in the case where when determining a value of y that satisfies the formula y=f(u, y), the formula is transformed to provide an expression of y not using y itself, the block diagram has to be transformed into one that clearly shows the input/output relationship. According to the block diagram thus transformed, the process is performed sequentially from the upstream part toward the downstream part (gait output).

In step S038, first, the instantaneous value of the variables (referred to as movement variables) that represent the movement, such as the desired body posture angle for the simplified model gait obtained as described above (referred to as a simplified model's body posture angle, hereinafter), the desired body horizontal position (referred to as a simplified model's horizontal position, hereinafter), the desired center-of-gravity position, the desired foot position/posture and the desired arm posture and the instantaneous value of the desired ZMP are input to an inverse dynamics full model (inverse full model) 201. Through a calculation process in the inverse full model 201, the floor reaction force's horizontal component and the floor reaction force moment about the desired ZMP that are in balance with the movement represented by the input movement variables (i.e., that are produced by the full model in accordance with the movement) are calculated. Since the horizontal component of the floor reaction force moment about the desired ZMP in the simplified model gait is 0, the horizontal component of the floor reaction force moment about the desired ZMP calculated by the inverse full model 201 indicates the error of the simplified model gait. The floor reaction force's horizontal component and the horizontal component of the floor reaction force moment determined by the inverse full model 201 are referred to as "full-model's floor reaction force's horizontal component" and "full-model's floor reaction force moment", respectively. In addition, the full-model's floor reaction force's horizontal component is often abbreviated as Ffull and the full-model's floor reaction force moment is often abbreviated as Mfull hereinafter.

Besides, the inverse full model 201 calculates the body vertical position that satisfies the desired center-of-gravity position. In addition, although not shown, the inverse full model 201 calculates the center-of-gravity horizontal position.

Incidentally, since the desired total center-of-gravity vertical position is input to the full model, and the desired floor reaction force's vertical component can be derived from the desired total center-of-gravity vertical position by second order differentiation thereof, there is no need to input the desired floor reaction force's vertical component to the full model. Although redundant, the desired floor reaction force's vertical component may be input to the full model in order to reduce the calculation amount, for example.

Now, a perturbation model used for gait correction will be described.

The perturbation model consists of a perturbation model 202 for correcting body horizontal positions and a perturbation model 203 for correcting body posture angles. Alternatively, rather than such two separate models, one integral perturbation model may be used as shown in FIG. 11.

The perturbation model 202 for correcting body horizontal positions represents a relationship between the perturbation of the floor reaction force and the perturbation of the body horizontal position in the body translation mode.

The perturbation model 202 for correcting body horizontal positions receives a correction quantity of the desired horizontal component of the floor reaction force moment and calculates a correction quantity of the desired body horizontal position that is in balance with the received correction quantity in terms of dynamics. The input (correction quantity of the desired horizontal component of the floor reaction force moment) is referred to as a moment Mp for the perturbation model for correcting body horizontal positions. In addition, the output (correction quantity of the desired body horizontal position) of the perturbation model 202 for correcting body horizontal positions is referred to as a correcting perturbation model's body horizontal position Xc. In addition, the floor reaction force's horizontal component produced by the perturbation model 202 for correcting body horizontal positions is referred to as a floor reaction force's horizontal component Fp for the perturbation model for correcting body horizontal positions.

Figure 43:
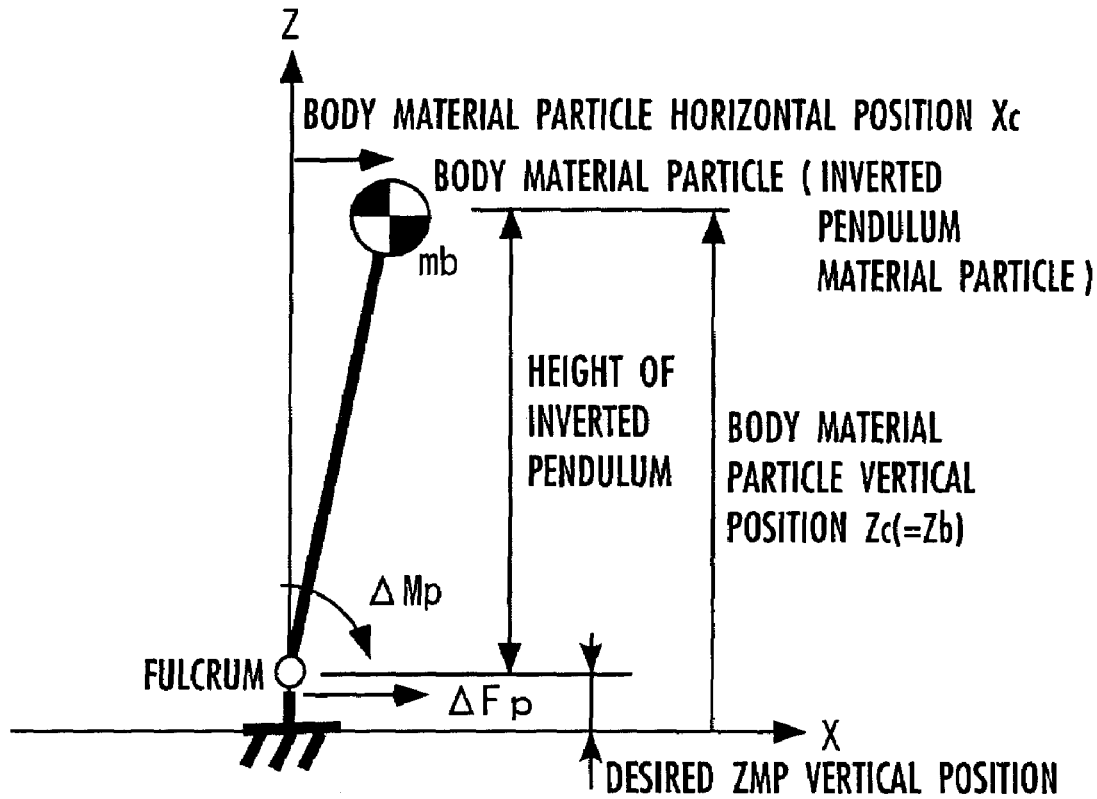
FIGS. 43 and 44 are diagrams for illustrating perturbation models.

As shown in FIG. 43, the perturbation model 202 for correcting body horizontal positions is represented by an inverted pendulum consisting a fulcrum, an inverted pendulum material particle (body material particle) and an expandable supporting bar that links them to each other. The fulcrum is positioned so that the horizontal position of the fulcrum agrees with the horizontal position of the origin of the current time gait's supporting leg coordinate system, and the vertical position of the fulcrum agrees with the vertical position of the desired ZMP. The mass mb of the inverted pendulum material particle is equal to the mass of the body material particle in the simplified model (model consisting of three material particles and a flywheel) shown in FIG. 11. The vertical position Zc of the inverted pendulum material particle is the same as the vertical position Zb of the body material particle in the simplified model for the simplified gait shown in FIG. 11.

The perturbation model 202 for correcting body horizontal positions represents a relationship between a horizontal component of the floor reaction force moment's perturbation $\Delta My$ and a body material particle horizontal position's perturbation $\Delta Xb$ in the dynamical equations a8, a9 and a10 for the simplified model (three-material-particle model).

Thus, assuming that the values other than My, Xb and Zb are constants, the relationship between the horizontal component of the floor reaction force moment's perturbation $\Delta My$ and the body material particle horizontal position's perturbation $\Delta Xb$ is determined from the formula a10. Then, the following formula results.

$$\Delta My = -mb^* \Delta Xb^*(g+d2Zb/dt2) + mb^*(Zb-Zzmp)^*d2\Delta Xb/dt2 \qquad \text{formula a12}$$

Similarly, assuming that the values other than Fx and Xb are constants, the relationship between a floor reaction force's horizontal component's perturbation $\Delta Fx$ and the body material particle horizontal position's perturbation $\Delta Xb$ is determined from the formula a9. Then, the following formula results.

$$\Delta Fx = mb^* d2\Delta Xb/dt2 \qquad \text{formula a13}$$

Since the body translation mode floor reaction force ratio h, which is a ratio between $\Delta Mp$ and $\Delta Fp$ caused by the body horizontal acceleration, is a ratio between the term caused by the body horizontal acceleration in the right side of the formula a12 (that is, the second term) and the right side of the formula a13, the following formula results.

$$h = (Zb-Zzmp) \qquad \text{formula a14}$$

That is, the body translation mode floor reaction force ratio his equivalent to the height of the body material particle (inverted pendulum material particle) from the fulcrum in the simplified model.

Therefore, from the formulas a12 and a14, the following formula results.

$$\Delta My = -mb^* \Delta Xb^*(g+d2Zb/dt2) + mb^*h^*d2\Delta Xb/dt2 \qquad \text{formula a15}$$

On the other hand, the floor reaction force's vertical component in balance with the translation force's vertical component of the resultant force of gravity and the inertial force applied to the body material particle (inverted pendulum material particle) is referred to as a body floor reaction force's vertical component Fbz. The body floor reaction force's vertical component Fbz is defined by the following formula.

$$Fbz = mb^*(g+d2Zb/dt2) \qquad \text{formula a16}$$

From the formula a8, the body floor reaction force's vertical component Fzb can be expressed as the following formula.

$$Fbz = Fz - msup^*(g+d2Zsup/dt2) - mswg^*(g+d2Zswg/dt2) \qquad \text{formula a17}$$

In other words, the body floor reaction force's vertical component equals to a sum of the floor reaction force's vertical component Fz and the translation force's vertical component of the resultant force of gravity and the inertial force applied to the leg material particles in the simplified model (model consisting three material particles and a flywheel) shown in FIG. 11.

Substituting the formula a16 into the formula a15 results in the following formula.

$$\Delta My = -Fbz^* \Delta Xb + mb^*h^*d2\Delta Xb/dt2 \qquad \text{formula a18}$$

Associating $\Delta My$ and $\Delta Xb$ in the formula a18 with the moment Mp for the perturbation model for correcting body horizontal positions and the correcting perturbation model's body horizontal position Xc, respectively, (substituting the moment Mp for the perturbation model for correcting body horizontal positions and the correcting perturbation model's body horizontal position Xc into $\Delta My$ and $\Delta Xb$ in the formula a18, respectively,) results in the following formula.

$$Mp = -Fbz^* Xc + mb^*h^*d2Xc/dt2 \qquad \text{formula a19}$$

That is, the perturbation model 202 for correcting body horizontal positions is expressed by the formula a19 using the body translation mode floor reaction force ratio h determined by the formula a14 and the body floor reaction force's vertical component Fbz determined by the formula a17.

In addition, associating $\Delta Fx$ in the formula a13 with the floor reaction force's horizontal component Fp for the perturbation model for correcting body horizontal positions results in the following formula.

$$Fp = mb^*d2Xc/dt2 \qquad \text{formula a20}$$

That is, the perturbation model 202 for correcting body horizontal positions is described by the formulas a14, a17, a19 and a20.

Incidentally, it is considered that the perturbation of the body material particle position agrees with the perturbation of the body position (position of the representative point of the body) herein. However, strictly speaking, they don't always agree with each other actually. Therefore, to determine the relationship among Mp, Fp and Xc, a model is needed which represents a geometrical relationship between the body material particle horizontal position and the body position.

On the other hand, the perturbation model 203 for correcting body posture angles represents a relationship between the perturbation of the floor reaction force and the perturbation of the body posture angle in the body rotation mode.

The perturbation model 203 for correcting body posture angles receives a correction quantity of the horizontal component of the floor reaction force moment and calculates a correction quantity of the desired body posture angle in balance with the received correction quantity in terms of dynamics. The input (correction quantity of the horizontal component of the floor reaction force moment) is referred to as a moment Mr for the perturbation model for correcting body posture angles. In addition, the output (correction quantity of the desired body posture angle) of the perturbation model 203 for correcting body posture angles is referred to as a correcting perturbation model's body posture angle θc. In addition, the floor reaction force's horizontal component produced by the perturbation model for correcting body posture angles is referred to as a floor reaction force's horizontal component Fr for the perturbation model for correcting body horizontal positions. As described above, Fr is 0. That is, the following formula always holds.

$$Fr=0 \qquad \text{formula a21}$$

Figure 44:
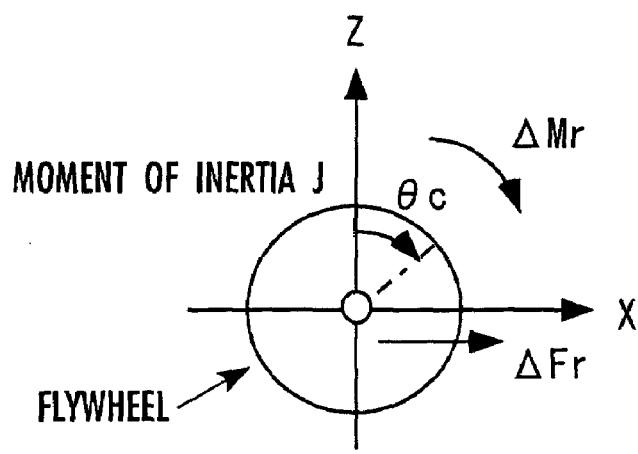

The perturbation model 203 for correcting body posture angles is expressed by a flywheel FH as shown in FIG. 44. The inertia of the flywheel equals to that of the flywheel FH in the simplified model (model consisting of three material particles and a flywheel) shown in FIG. 11. The rotation angle of the flywheel of the perturbation model 203 for correcting body posture angles corresponds to the correcting perturbation model's body posture angle θc, and the horizontal component of the floor reaction force moment caused by the flywheel corresponds to the moment Mr for the perturbation model for correcting body posture angles.

The perturbation model 203 for correcting body posture angles represents a relationship between a horizontal component of the floor reaction force moment's perturbation ΔMy and a body posture angle's perturbation Δθb in the dynamical equation a10 for the simplified model (model consisting three material particles and a flywheel).

Thus, assuming that the values other than My and θb are constants, the relationship between the horizontal component of the floor reaction force moment's perturbation ΔMy and the body posture angle's perturbation Δθb is determined from the formula a10. Then, the following formula results.

$$\Delta My=J*d2\Delta\theta b/dt2 \qquad \text{formula a22}$$

Associating ΔMy and Δθb in the formula a22 with the moment Mr for the perturbation model for correcting body posture angles and the correcting perturbation model's body posture angle θc, respectively, results in the following formula.

$$Mr=J*d2\theta c/dt2 \qquad \text{formula a23}$$

That is, the perturbation model 203 for correcting body posture angles is expressed by the formula a23. In addition, as described above, the floor reaction force's horizontal component Fr for the perturbation model for correcting body horizontal positions is as shown in the formula a21 (Fr=0).

As described later, in step S038, finally, a corrected gait (more specifically, desired instantaneous values obtained by correcting the instantaneous values for a part of the simplified model gait) is generated (output). The desired body posture angle for the corrected gait (referred to as a corrected desired body posture angle, hereinafter) is obtained by a calculator 204 adding the correcting perturbation model's body posture angle θc (value determined in the control cycle including the present time t) to the instantaneous value of the simplified model's body posture angle determined as described above (instantaneous value of the desired body posture angle for the current time gait at the present time t determined in step S032). The desired body horizontal position for the corrected gait (referred to as a corrected desired body horizontal position, hereinafter) is obtained by a calculator 205 adding the correcting perturbation model's body horizontal position Xc (value determined in the control cycle including the present time t) to the instantaneous value of the simplified model body horizontal position determined as described above (instantaneous value of the desired body horizontal position for the current time gait at the present time t determined in step S032).

The desired floor reaction force for the corrected gait is also corrected. Specifically, the floor reaction force moment's horizontal component about the desired ZMP is not 0, and the corrected desired horizontal component of the floor reaction force moment is output as a desired value. Therefore, the desired ZMP loses its original meaning (meaning that it is a point where the floor reaction force moment's horizontal component is 0). In addition, the desired floor reaction force's horizontal component is also corrected, and the corrected desired floor reaction force's horizontal component is output.

As described above, the movement according to the corrected gait is a sum (combination) of the movement according to the simplified model gait and the movement according to the perturbation model (specifically, the movements according to the perturbation model for correcting body positions/postures and the perturbation model for correcting body posture angles).

In general, the floor reaction force caused by a combination of a reference movement and a perturbation movement can be approximated by a sum of the floor reaction force caused by the reference movement (floor reaction force in balance with gravity and the inertial force caused by the movement) and the perturbation of the floor reaction force caused by the perturbation movement.

Therefore, the floor reaction force caused by the movement according to the corrected gait (strictly, value of the floor reaction force caused by the movement according to the corrected gait, calculated using the inverse full model 201) is a sum of the floor reaction force for the inverse full model 201 (value of the floor reaction force caused by the movement according to the simplified model gait, calculated using the inverse full model 201), the input moment for the perturbation model 202 for correcting body horizontal positions/postures (the moment Mp for the perturbation model for correcting body horizontal positions) and the input moment for the perturbation model 203 for correcting body posture angles (the moment Mr for the perturbation model for correcting body posture angles).

In order for a corrected gait precisely to satisfy the dynamical equilibrium condition, the floor reaction force caused by the movement according to the corrected gait (specifically, the floor reaction force produced by the movement according to the corrected gait in the inverse full model 201) has to approximately agree with the corrected desired floor reaction force. Therefore, in order to satisfy the condition, the following two formulas have to be satisfied.

full model floor reaction force moment Mfull

+moment for the perturbation model for correcting body horizontal positions Mp

+moment for the perturbation model for correcting body posture angles Mr

=corrected desired horizontal component of the floor reaction force moment     formula 5 full model floor reaction force's horizontal component Ffull

+floor reaction force's horizontal component for the perturbation model for correcting body horizontal positions Fp +floor reaction force's horizontal component for the
perturbation model for correcting body posture
angles Fr =corrected desired floor reaction force's horizontal
component        formula 6

In addition, the true ZMP for the corrected gait is displaced from the desired ZMP (ideal desired ZMP) for the simplified model gait by a value obtained by dividing the corrected desired horizontal component of the floor reaction force moment by the desired floor reaction force's vertical component.

true ZMP for the corrected gait=desired ZMP

+corrected desired horizontal component of the floor
reaction force moment/desired floor reaction
force's vertical component        formula 7

When calculating the x-directional (back-and-forth directional) component of the true ZMP for the corrected gait, the component of the corrected desired floor reaction force moment about the Y axis (sideward directional axis) is used. Besides, when calculating the Y-directional component of the true ZMP for the corrected gait, the component of the corrected desired floor reaction force moment about the X axis (back-and-forth directional axis) is used. However, when calculating the Y-directional component of the true ZMP for the corrected gait, the sign "+" in the right side of the formula 7 has to be replaced with the sign "−".

The true ZMP for the corrected gait determined from the formula 7 has to lie within the ZMP allowable range. This is referred to as a ZMP limitation condition.

In addition, the corrected desired floor reaction force's horizontal component has to fall within the floor reaction force's horizontal component allowable range for gait correction. This is referred to as a floor reaction force's horizontal component limitation condition.

As described above, the corrected gait has to satisfy the formulas 5 and 6, the ZMP limitation condition (condition of the possible range of the true ZMP for the corrected gait determined from the formula 7) and the floor reaction force's horizontal component limitation condition.

However, if the formulas and the conditions is simply satisfied, the correcting perturbation model's body position and the correcting perturbation model's body posture angle diverge.

Thus, based on the state quantities of the perturbation model 202 for correcting body horizontal positions and the perturbation model 203 for correcting body posture angles (more specifically, the correcting perturbation model's body horizontal position/velocity, the correcting perturbation model's body posture angle, the correcting perturbation model body angular velocity or the like), the correcting perturbation models 202 and 203 are controlled for stabilization to make these state quantities converge to predetermined states (be stabilized).

First, stabilization control of the perturbation model 202 for correcting body horizontal positions will be described in detail.

In Japanese Patent Application No. 2001-133621 previously proposed by the applicants, an inverted pendulum type perturbation model is used, a control law is adopted which makes the position XGf of the center of gravity calculated using the full model based on the instantaneous posture in the corrected gait converge to position XGs of the center of gravity calculated using the simplified model based on the instantaneous posture in the simplified model, and the feed-back quantity (fed-back manipulating quantity) determined by the control law is additionally input to the perturbation model for correcting body horizontal positions.

Specifically, the control law represented by the formula 9 is given so that convergence to the desired settling position represented by the formula 8 is provided. In these formulas, "mtotal" denotes the total weight of the robot, "mb" denotes the mass of the body material particle (mass of the inverted pendulum), and "XGf" denotes the position of the center of gravity calculated using the full model based on the instantaneous posture in the simplified model gait, that is, the horizontal position of the center of gravity calculated using the inverse full model. In addition, "Kp" and "Kv" denote gains of feedback control.

desired settling position=−$m$total/$mb$*($XGf$−$XGs$)        formula 8

ZMP-converted value of the feedback quantity for
the perturbation model for correcting body horizontal positions =Kp*(correcting perturbation model's body horizontal position −desired settling position)

+Kv*correcting perturbation model's body horizontal velocity

+correcting perturbation model's body horizontal position        formula 9

Incidentally, in actual calculation by a computer, the last time values are used for the variables in the right side of the formula. This holds true for the control laws described below.

The perturbation model for correcting body horizontal positions used in the full model correction method proposed in this specification by the applicants is similar to the perturbation model for correcting body horizontal positions used in Japanese Patent Application No. 2001-133621 previously proposed by the applicants in that it is an inverted pendulum type model, although it has a strong nonlinearity.

Thus, also in the full model correction method proposed in this specification, the desired settling position is determined in the same manner, and only the control law for convergence to the desired settling position is altered.

The control law for converging (stabilizing) the perturbation model 202 for correcting body horizontal positions to the desired settling position is referred to as a control law 206 for the perturbation model for correcting body horizontal positions, and the feedback quantity (manipulating quantity) determined by the control law is referred to as a required value Mpfdmd of the moment for stabilizing the perturbation model for correcting body horizontal positions. The term "required value" means that the value determined by the control law is limited and corrected so that the true ZMP lies within the ZMP allowable range and the floor reaction force's horizontal component falls within the floor reaction force's horizontal component allowable range, as described later. The moment limited and corrected is referred to as a moment Mpf for stabilizing the perturbation model for correcting body horizontal positions.

As the control law 206 for the perturbation model for correcting body horizontal positions, the following formula may be used instead of the formula 9.

required value Mpfdmd of the moment for stabilizing the perturbation model for correcting body horizontal positions =Kpp*(correcting perturbation model's body horizontal position Xc−desired settling position)

+Kpv*correcting perturbation model's body horizontal velocity dXc/dt

−correcting perturbation model's body horizontal position Xc* body floor reaction force's vertical component Fbz                    formula 10

In the formula, "Kpp" and "Kpv" denote gains of feedback control.

As described concerning the perturbation model 202 for correcting body horizontal positions, the body floor reaction force's vertical component Fbz is applied to the body material particle (inverted pendulum material particle) in the vertical direction. Therefore, if the body material particle is displaced from the origin (position of the fulcrum), a moment that promotes the displacement is further applied to the body material particle. The third term in the right side of the formula 10 represents the moment for canceling this effect.

When determining the component about the X axis (back-and-forth directional axis) of the required value Mpfdmd of the moment for stabilizing the perturbation model for correcting body horizontal positions, the Y axis directional (sideward directional) components of the correcting perturbation model's body horizontal position/velocity and the desired settling position are used.

When determining the component about the Y axis (sideward directional axis) of the required value Mpfdmd of the moment for stabilizing the perturbation model for correcting body horizontal positions, the X axis directional (back-and-forth directional) components of the correcting perturbation model's body horizontal position/velocity and the desired settling position are used, and the sign "−" of the third term in the right side is replaced with the sign "+".

The desired settling position may be 0 (horizontal position of the fulcrum of the inverted pendulum). In addition, the control law 206 for the perturbation model for correcting body horizontal positions may be any of the various methods described in Japanese Patent Application No. 2001-133621 previously proposed by the applicants. Besides them, the control law 206 for stabilizing the perturbation model for correcting body horizontal positions may be determined in such a manner that at least any of the state quantities of the perturbation model 202 for correcting body horizontal positions (more specifically, the correcting perturbation model's body horizontal position/velocity or the like) converges (is stabilized) to a predetermined state.

Now, stabilization control of the perturbation model 203 for correcting body posture angles will be described in detail.

In order for the corrected desired body posture angle, that is, the sum of the desired body posture angle according to the simplified model and the correcting perturbation model's body posture angle to be settled to, or follow, the reference body posture angle (determined in step S904 in FIG. 37) output by the desired instantaneous value generator 100b or the desired body posture angle according to the simplified model (determined in step S914 in FIG. 37), the feedback quantity (manipulating quantity) is determined by a feedback control law, such as PI control, in accordance with the state of the perturbation model 203 for correcting body posture angles, and the determined feedback quantity is additionally input to the perturbation model 203 for correcting body posture angles.

The control law is referred to as a control law 207 for the perturbation model for correcting body posture angles, and the feedback quantity is referred to as a required value Mrfdmd of the moment for stabilizing the perturbation model for correcting body posture angles. The term "required value" means the same as the required value Mpfdmd of the moment for stabilizing the perturbation model for correcting body horizontal positions. The moment limited and corrected is referred to as a moment Mrf for stabilizing the perturbation model for correcting body posture angles.

Specifically, the control law 207 for the perturbation model for correcting body posture angles, which determines the required value Mrfdmd of the moment for stabilizing the perturbation model for correcting body posture angles, may be represented as follows.

required value Mrfdmd of the moment for stabilizing the perturbation model for correcting body posture angles =Krp*(correcting perturbation model's body posture angle θc −(reference body posture angle−desired body posture angle according to the simplified model))

+Krv*correcting perturbation model's body posture angular velocity dθc/dt                    formula 11

In the formula, "Krp" and "Krv" denote gains of feedback control.

In the formula II, the term (reference body posture angle—desired body posture angle according to the simplified model) may be substituted with 0.

Returning to explanation of the process in step S038 with reference to the functional block diagram in FIG. 42, the required value Mpfdmd of the moment for stabilizing the perturbation model for correcting body horizontal positions is determined by the control law 206 for the perturbation model for correcting body horizontal positions as described above. In addition, the required value Mrfdmd of the moment for stabilizing the perturbation model for correcting body posture angles is determined by the control law 207 (formula 11) for the perturbation model for correcting body posture angles.

Then, an F0 calculator 208 determines the estimated (calculated) floor reaction force value F0 for the perturbation model for correcting body position in the case where the moment Mpf for stabilizing the perturbation model for correcting body horizontal positions is assumed to be 0. As described later, the sum of the full model floor reaction force moment Mfull and the moment Mpf for stabilizing the perturbation model for correcting body horizontal positions is input to the perturbation model 202 for correcting body horizontal positions. Therefore, F0 is the floor reaction force that is produced by the perturbation model 202 for correcting body horizontal positions when only the full model floor reaction force moment Mfull with the sign being inverted is input to the perturbation model 202 for correcting body horizontal positions.

Specifically, F0 is determined by the following formula.

$$F0 = mb * d2Xc/dt2 - 1/h * Mpf$$                    formula 12

The first term in the right side represents the last-time floor reaction force's horizontal component for the perturbation model 202 for correcting body horizontal positions (at the time t−Δt).

The second term in the right side represents the floor reaction force's horizontal component directly produced in the perturbation model 202 for correcting body horizontal positions by the last-time moment Mpf for stabilizing the perturbation model for correcting body horizontal positions (that is, floor reaction force's horizontal component of feed through term).

That is, the estimated value of the floor reaction force F0 for the perturbation model for correcting body positions in the case where Mpf is assumed to be 0 is determined by subtracting the last-time moment Mpf for stabilizing the perturbation model for correcting body horizontal positions divided by the body translation mode floor reaction force ratio h from the last-time body material particle's horizontal acceleration multiplied by the mass mb of the body material particle of the perturbation model 202 for correcting body horizontal positions.

Then, neglecting the limitations (the floor reaction force's horizontal component limitation condition and the ZMP limitation condition), an Min calculator 209 determines the horizontal component of the floor reaction force's moment Min that is produced about the desired ZMP if it is assumed that the moment Mpf for stabilizing the perturbation model for correcting body horizontal positions agrees with the required value Mpfdmd of the moment for stabilizing the perturbation model for correcting body horizontal positions, and the moment Mrf for stabilizing the perturbation model for correcting body posture angles agrees with the required value Mrfdmd of the moment for stabilizing the perturbation model for correcting body posture angles. The horizontal component of the floor reaction force's moment is referred to as an unlimited corrected desired floor reaction force's moment Min. The unlimited corrected desired floor reaction force's moment Min is determined by the following formula.

$$\text{Min} = Mpfdmd + Mrfdmd \quad \text{formula 13}$$

That is, the unlimited corrected desired floor reaction force's moment Min is determined by adding the required value Mrfdmd of the moment for stabilizing the perturbation model for correcting body posture angles to the required value Mpfdmd of the moment for stabilizing the perturbation model for correcting body horizontal positions.

Now, it will be proven that the formula 13 holds. As described later, the moment Mp for the perturbation model for correcting body horizontal positions is determined as a value obtained by subtracting the full model's floor reaction force's moment Mfull from the moment Mpf for stabilizing the perturbation model for correcting body horizontal positions, and the moment Mr for the perturbation model for correcting body posture angles is determined to be Mrf (see the formulas 22 and 23 described later).

Therefore, the corrected desired horizontal component of the floor reaction force's moment determined by the formula 5 is expressed as the following formula.

corrected desired horizontal component of the floor
reaction force's moment = $Mpf + Mrf$ \quad formula 14

Thus, the formula 13 results if the required value Mpfdmd of the moment for stabilizing the perturbation model for correcting body horizontal positions is substituted into the moment Mpf for stabilizing the perturbation model for correcting body horizontal positions in the formula 14, and the required value Mrfdmd of the moment for stabilizing the perturbation model for correcting body posture angles is substituted into the moment Mrf for stabilizing the perturbation model for correcting body posture angles.

Then, neglecting the limitations (the floor reaction force's horizontal component limitation condition and the ZMP limitation condition), an Fin calculator 210 determines the floor reaction force's horizontal component Fin that is produced if the moment Mpf for stabilizing the perturbation model for correcting body horizontal positions agrees with the required value Mpfdmd of the moment for stabilizing the perturbation model for correcting body horizontal positions, and the moment Mrf for stabilizing the perturbation model for correcting body posture angles agrees with the required value Mrfdmd of the moment for stabilizing the perturbation model for correcting body posture angles. The floor reaction force's horizontal component is referred to as an unlimited corrected desired floor reaction force's horizontal component Fin.

The corrected desired floor reaction force's horizontal component is determined by the formula 6, and as described above, a behavior of the perturbation model 203 for correcting body posture angles causes no floor reaction force's horizontal component in the perturbation model 203 for correcting body posture angles, that is, Fr is 0. Therefore, the unlimited corrected desired floor reaction force's horizontal component Fin is a sum of the corrected desired floor reaction force's horizontal component in the case where the moment Mpf for stabilizing the perturbation model for correcting body horizontal positions is assumed to be 0 and the increment of the floor reaction force's horizontal component caused by changing the moment Mpf for stabilizing the perturbation model for correcting body horizontal positions to the required value Mpfdmd of the moment for stabilizing the perturbation model for correcting body horizontal positions.

The increment of the floor reaction force's horizontal component caused by changing the moment Mpf for stabilizing the perturbation model for correcting body horizontal positions from 0 to the required value Mpfdmd of the moment for stabilizing the perturbation model for correcting body horizontal positions equals to the required value Mpfdmd of the moment for stabilizing the perturbation model for correcting body horizontal positions divided by the body translation mode floor reaction force ratio h.

Therefore, as shown by the formula 15, the unlimited corrected desired floor reaction force's horizontal component Fin is obtained by dividing the required value Mpfdmd of the moment for stabilizing the perturbation model for correcting body horizontal positions divided by the body translation mode floor reaction force ratio h, adding the resulting value to the full model's floor reaction force's horizontal component Ffull, and further adding the resulting value to the floor reaction force F0 for the perturbation model for correcting body positions calculated on the assumption that the moment Mpf for stabilizing the perturbation model for correcting body horizontal positions is 0.

$$Fin = 1/h*Mpfdmd + Ffull + F0 \quad \text{formula 15}$$

Then, using limiter means described in detail later, a limitation processor 211 determines a limited corrected desired floor reaction force's moment Mltd (about the desired ZMP) and a limited corrected desired floor reaction force's horizontal component Fltd from the unlimited corrected desired floor reaction force's moment Min and the unlimited corrected desired floor reaction force's horizontal component Fin. As described later, the horizontal component of the floor reaction force's moment (about the ZMP) for the corrected gait agrees with the limited corrected desired floor reaction force's moment Mltd, and the floor reaction force's horizontal component for the corrected gait agrees with the limited corrected desired floor reaction force's horizontal component Fltd (see the proof of the formulas 26 and 27 described later).

The limited corrected desired floor reaction force's moment Mltd and the limited corrected desired floor reaction force's horizontal component Fltd are determined in such a manner that the true ZMP for the corrected gait lies within the ZMP allowable range, and the floor reaction force's horizontal component for the corrected gait falls within the floor reaction force's horizontal component allowable range. That is, the values Mltd and Fltd are determined so as to satisfy the ZMP limitation condition and the floor reaction force's horizontal component limitation condition.

In addition, under the limitation conditions, the moment Mp for stabilizing the perturbation model for correcting body horizontal positions is determined so as to agree with or approximate to the required value Mpfdmd of the moment for stabilizing the perturbation model for correcting body horizontal positions as closely as possible. Similarly, the moment Mr for stabilizing the perturbation model for correcting body posture angles is determined so as to agree with or approximate to the required value Mrfdmd of the moment for stabilizing the perturbation model for correcting body posture angles as closely as possible. In this way, the correcting perturbation model's body position Xc and the correcting perturbation model's body posture angle θc are stabilized and prevented from diverging.

Then, using the following formulas, an Mpf calculator 212 and an Mrf calculator 213 determine the moment Mpf for stabilizing the perturbation model for correcting body horizontal positions and the moment Mrf for stabilizing the perturbation model for correcting body posture angles, respectively.

$$Mpf=(Fltd-Ffull-F0)*h \quad \text{formula 20}$$

$$Mrf=Mltd-Mpf \quad \text{formula 21}$$

That is, the Mpf calculator 212 determines the moment Mpf for stabilizing the perturbation model for correcting body horizontal positions by subtracting, from the limited corrected desired floor reaction force's horizontal component Fltd, the full model's floor reaction force's horizontal component Ffull and the floor reaction force value F0 of the perturbation model 202 for correcting body positions that is calculated on the assumption that Mp is 0, and multiplying the resulting value by the body translation mode floor reaction force ratio h. Besides, the Mrf calculator 213 determines the moment Mrf for stabilizing the perturbation model for correcting body posture angles by subtracting the moment Mpf for stabilizing the perturbation model for correcting body horizontal positions from the limited corrected desired floor reaction force's moment Mltd about the desired ZMP.

Then, by the following formulas, the floor reaction force's moment Mp for the perturbation model for correcting body horizontal positions and the floor reaction force's moment Mr for the perturbation model for correcting body posture angles are determined.

$$Mp=Mpf-Mfull \quad \text{formula 22}$$

$$Mr=Mrf \quad \text{formula 23}$$

That is, in the Mp calculator 214, the full model floor reaction force's moment M full is subtracted from the moment Mpf for stabilizing the perturbation model for correcting body horizontal positions, thereby determining the floor reaction force's moment Mp for the perturbation model for correcting body horizontal positions. In addition, the floor reaction force's moment Mr for the perturbation model for correcting body posture angles is set to the same value as the moment Mrf for stabilizing the perturbation model for correcting body posture angles.

Then, the floor reaction force's moment Mp for the perturbation model for correcting body horizontal positions is input to the perturbation model 202 for correcting body horizontal positions, and the correcting perturbation model's body horizontal position Xc in balance with the input floor reaction force's moment is calculated.

In addition, the floor reaction force's moment Mr for the perturbation model for correcting body posture angles is input to the perturbation model 203 for correcting body posture angles, and the correcting perturbation model's body posture angle θc in balance with the input floor reaction force's moment is calculated.

Then, in the calculators 205 and 204, the corrected desired body horizontal position and the corrected desired body posture angle are determined according to the following formulas 24 and 25, respectively, and the results are output as the final desired instantaneous values of the body horizontal position and posture.

corrected desired body horizontal position $$=\text{simplified model's body horizontal position+correcting perturbation model's body position Xc} \quad \text{formula 24}$$

corrected desired body posture angle $$=\text{simplified model's body posture angle+corrected perturbation model's body posture angle θc} \quad \text{formula 25}$$

That is, the correcting perturbation model's body position Xc is added to the simplified model's body horizontal position, thereby providing the corrected desired body horizontal position, and the corrected desired body horizontal position is output. In addition, the correcting perturbation model's body posture angle θc is added to the simplified model's body posture angle, thereby providing the corrected desired body posture angle, and the corrected desired body posture angle is output.

The limited corrected desired floor reaction force's moment Mltd is output as the corrected desired horizontal component of the floor reaction force's moment about the desired ZMP, and the limited corrected desired floor reaction force's horizontal component Fltd is output as the corrected desired floor reaction force's horizontal component.

That is, as the final desired instantaneous values of the floor reaction force's horizontal component and the horizontal component of the floor reaction force's moment (horizontal component of the about the desired ZMP), the corrected desired floor reaction force's horizontal component and the corrected desired horizontal component of the floor reaction force's moment about the desired ZMP are determined according to the formulas 27 and 26, respectively, and the results are output.

corrected desired horizontal component of the floor reaction force's moment $$=\text{limited corrected desired floor reaction force's moment Mltd} \quad \text{formula 26}$$

corrected desired floor reaction force's horizontal component $$=\text{limited corrected desired floor reaction force's horizontal component Fltd} \quad \text{formula 27}$$

The gait correction in step S038 is conducted as described above.

Now, it will be proven that, for the gait (corrected gait) having such a corrected body horizontal position and such a corrected body posture angle, the corrected desired floor reaction force's horizontal component and the corrected desired horizontal component of the floor reaction force's moment about the desired ZMP that substantially satisfy the dynamical equilibrium condition (dynamical equilibrium condition on the inverse full model $201$) are determined by the formulas 26 and 27.

If the formulas 20, 21, 22 and 23 are substituted for the left side of the formula 5, the corrected desired horizontal component of the floor reaction force's moment for satisfying the dynamical equilibrium condition is Mltd. Thus, it is proven that the corrected desired horizontal component of the floor reaction force's moment for satisfying the dynamical equilibrium condition is determined by the formula 26.

On the other hand, if the formulas a20, a21, 12 and 20 are substituted for the left side of the formula 6, the corrected desired floor reaction force's horizontal component for satisfying the dynamical equilibrium condition is Fltd, as described by the following formula. Thus, it is proven that the corrected desired floor reaction force's horizontal component for satisfying the dynamical equilibrium condition is determined by the formula 27.

corrected desired floor reaction force's horizontal component $= mb*d2Xc/dt2 + F\text{full}$ $= F0 + 1/h * Mpf + F\text{full}$ $= F0 + 1/h * (F\text{ltd} - F\text{full} - F0)*h + F\text{full}$ $= F\text{ltd}$   formula 30

Incidentally, in the first embodiment, the correction method is of feed forward type, and the perturbation dynamics model is not a strict model. Therefore, even if the gait is corrected so as to satisfy the formulas 5 and 6 as described above, the dynamical equilibrium condition is not satisfied in a strict manner but satisfied in an approximate manner.

Now, details of the limiter means, that is, details of the processing in the limitation processor $211$ will be described.

In the limiter means (limitation processor $211$), the following processings are performed to provide the above described function.

First, the instantaneous value of the ZMP allowable range determined by the desired instantaneous value generator $100b$, that is, the instantaneous value of the ZMP allowable range determined in step S036 in FIG. 13 is converted into the instantaneous value of the allowable range of the horizontal component of the floor reaction force's moment about the desired ZMP.

Specifically, the following formula is used to determine the allowable range of the horizontal component of the floor reaction force's moment.

allowable range of the horizontal component of the floor reaction force's moment $=$(ZMP allowable range−desired ZMP)*floor reaction force's vertical component's vector   formula 32

In the formula 32, all the variables are vectors. The floor reaction force's vertical component's vector is a translation floor reaction force's vector with the components other than the vertical component being 0. The symbol "*" means outer product.

The ZMP allowable range has to be determined in accordance with the supporting polygon and generally has a complicated shape. However, for simplifying calculation, it is assumed to be a rectangular region on the floor surface. That is, the back-and-forth directional (X axis directional) components and the sideward directional (Y axis directional) components of the ZMP allowable range and therefore the allowable range of the horizontal component of the floor reaction force's moment derived from the ZMP allowable range are set independently.

Figure 45:
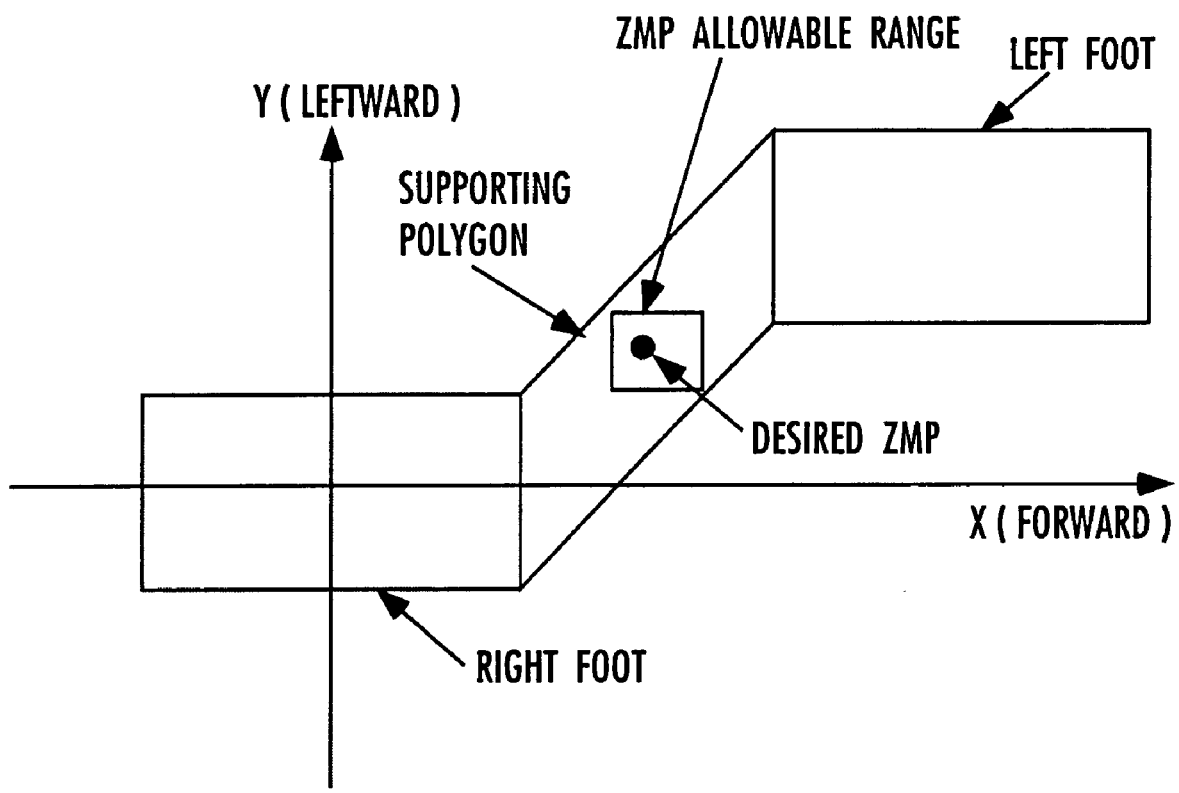
FIG. 45 is a diagram showing an example of setting of a ZMP allowable range.

For example, if the supporting polygon and the desired ZMP are related to each other as shown in FIG. 45, the ZMP allowable range is set to be contained in the supporting polygon as shown in the drawing. At the same time, the ZMP allowable range is set to contain the desired ZMP. The supporting polygon in the example shown in FIG. 45 is one during the two leg supporting period in the walking gait, and the rectangular areas at the both ends represent the contact surfaces of the feet 22 of the legs 2 (surfaces in contact with the floor).

In the one leg supporting period in the walking or running gait, the supporting polygon is identical with the contact surface of the supporting leg's foot 22 (surface in contact with the floor). In this case, the ZMP allowable range is set to contain the desired ZMP and to be contained in, or substantially agree with, the supporting polygon. Besides, in the floating period in the running gait, the ZMP allowable range is set to a region centered on the desired ZMP and having X axis and Y axis directional widths of 0, that is, the desired ZMP itself (this means a region having an area of 0).

As for the floor reaction force's horizontal component allowable range for gait correction, the back-and-forth directional (X axis directional) component and the sideward directional (Y axis directional) component are set independently. In this case, as with the floor reaction force's horizontal component allowable range for the simplified model gait, the X axis directional and Y axis directional components are set according to the formula c12, for example. In this case, as described above, the floor reaction force's horizontal component allowable range is preferably set to reliably fall within the friction limit by making it narrower than the allowable range for the simplified model gait, for example.

It is known that a movement with a gait that satisfies only the dynamical equilibrium condition (in particular, that the horizontal component of the moment applied about the desired ZMP by the resultant force of gravity and the inertial force is 0) without considering the ZMP limitation condition and the floor reaction force's horizontal component limitation condition satisfies the dynamical equilibrium condition in an approximate manner even if a movement on the sagittal plane and a movement on the lateral plane, which are separately generated so as to each satisfy the dynamical equilibrium condition, are synthesized to provide the relevant movement. In addition, setting the ZMP allowable range and the floor reaction force's horizontal component allowable range for gait correction as described above allows the ZMP limitation condition and the floor reaction force's horizontal component limitation condition to be separated into a limitation condition on the sagittal plane and a limitation condition on the lateral plane. Therefore, as for a movement with a gait taking into consideration all of the ZMP limitation condition, the floor reaction force's horizontal component limitation condition and the dynamical equilibrium condition, the movement can be provided by synthesizing a movement on the sagittal plane and a movement on the lateral plane, which are separately generated.

Thus, in the following description, to be readily understood, an operation of the limiter means will be described only with respect to a movement on the sagittal plane. However, the same holds true for a movement on the lateral plane.

By simplification as described above, the fact that the horizontal component of the floor reaction force's moment for the corrected gait falls within the allowable range of the horizontal component of the floor reaction force's moment (this means that the true ZMP for the movement with the corrected gait lies within the ZMP allowable range) is expressed by the following formula. In this formula, Mmax denotes an upper limit of the allowable range of the horizontal component of the floor reaction force's moment allowable range, and Mmin denotes a lower limit thereof.

$$\text{Mmax} \geq \text{horizontal component of the floor reaction force's moment for the corrected gait} \geq \text{Mmin} \quad \text{formula 33}$$

In addition, the fact that the floor reaction force's horizontal component for the corrected gait falls within the floor reaction force's horizontal component allowable range is expressed by the following formula. In this formula, Fmax denotes an upper limit of the floor reaction force's horizontal component allowable range, and Fmin denotes a lower limit thereof.

$$\text{Fmax} \geq \text{floor reaction force's horizontal component} \geq \text{Fmin} \quad \text{formula 34}$$

In addition, as described above, the horizontal component of the floor reaction force's moment for the corrected gait exactly or substantially agrees with the limited corrected desired floor reaction force's moment Mltd, and the floor reaction force's horizontal component for the corrected gait exactly or substantially agrees with the limited corrected desired floor reaction force's horizontal component Fltd.

Therefore, the formulas 33 and 34 can be transformed to the following formulas 35 and 36, respectively, in an approximate manner.

$$\text{Mmax} \geq \text{Mltd} \geq \text{Mmin} \quad \text{formula 35}$$

$$\text{Fmax} \geq \text{Fltd} \geq \text{Fmin} \quad \text{formula 36}$$

Figure 46:
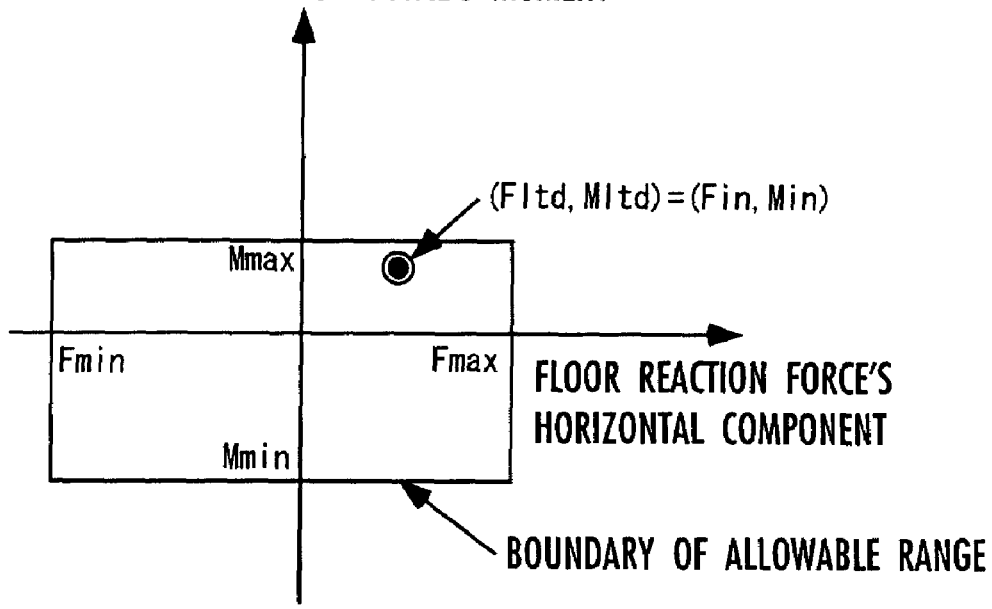
FIGS. 46 to 49 are diagrams for illustrating methods of limiting limitation-target quantities (a floor reaction force's horizontal component and a horizontal component of a floor reaction force's moment)

In a coordinate system having a horizontal axis indicating a component, about the X axis (back-and-forth axis), of the floor reaction force's horizontal component and a vertical axis indicating a component, about the Y axis (sideward axis), of the floor reaction force's moment shown in FIG. 46, if it is assumed that a set (Fltd, Mltd) of the limited corrected desired floor reaction force's horizontal component Fltd and the limited corrected desired floor reaction force's moment Mltd is a point on the coordinate system, a group of points that satisfy the formulas 35 and 36 (allowable range) lies within the rectangular and on the boundary thereof shown in FIG. 46.

As shown by a white spot in FIG. 46 (the white spot overlies a black spot described later in the drawing), if the unlimited corrected desired floor reaction force's moment Min falls within the allowable range of the horizontal component of the floor reaction force's moment, and the unlimited corrected desired floor reaction force's horizontal component Fin falls within the floor reaction force's horizontal component allowable range, that is, if a point (Fin, Min) lies within the rectangular region defined by the allowable range of the horizontal component of the floor reaction force's moment and the floor reaction force's horizontal component allowable range, the value Mltd is the same as the unlimited corrected desired floor reaction force's moment Min, and the value Fltd is the same as the unlimited corrected desired floor reaction force's horizontal component Fin, as indicated by the black spot in the drawing. Of course, this in itself allows the formulas 35 and 36 to hold. That is, the horizontal component of the floor reaction force's moment for the corrected gait falls within the allowable range of the horizontal component of the floor reaction force's moment, and the floor reaction force's horizontal component for the corrected gait falls within the floor reaction force's horizontal component allowable range. In addition, the unlimited corrected desired floor reaction force's moment Min and the unlimited corrected desired floor reaction force's horizontal component Fin are output as Mltd and Fltd without being limited (corrected). Thus, the correcting perturbation model's body position and the correcting perturbation model's body posture angle can be adequately stabilized and prevented from diverging.

Figure 47:
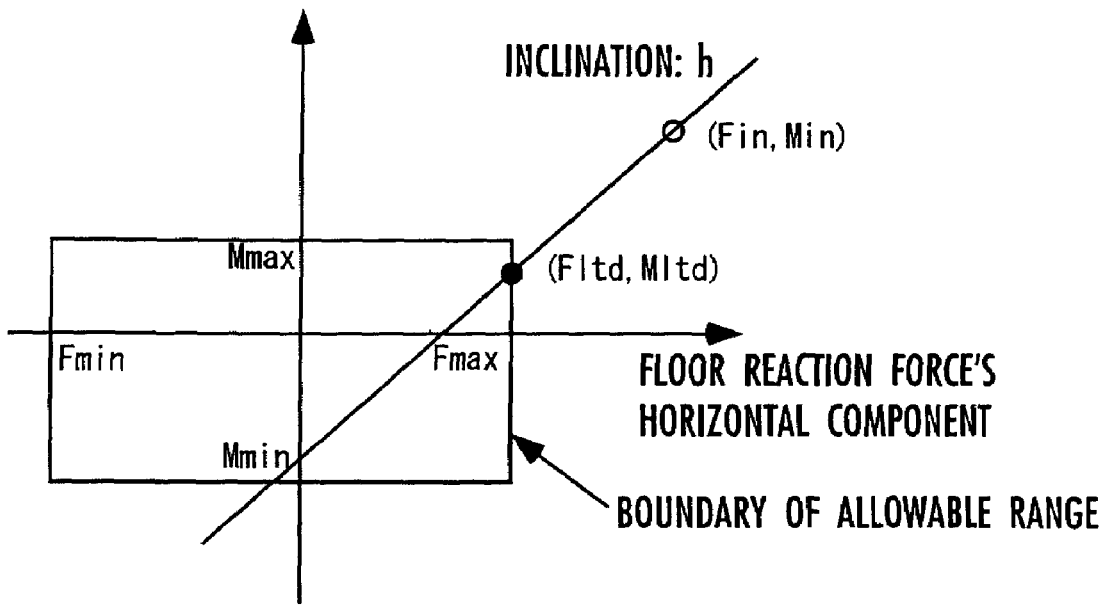
Figure 48:
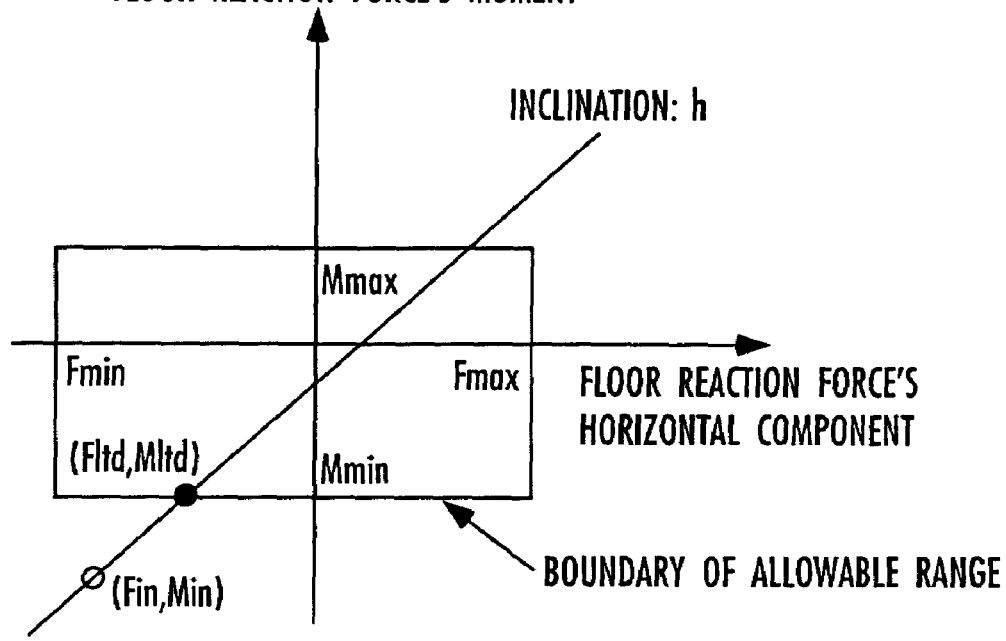
Figure 49:
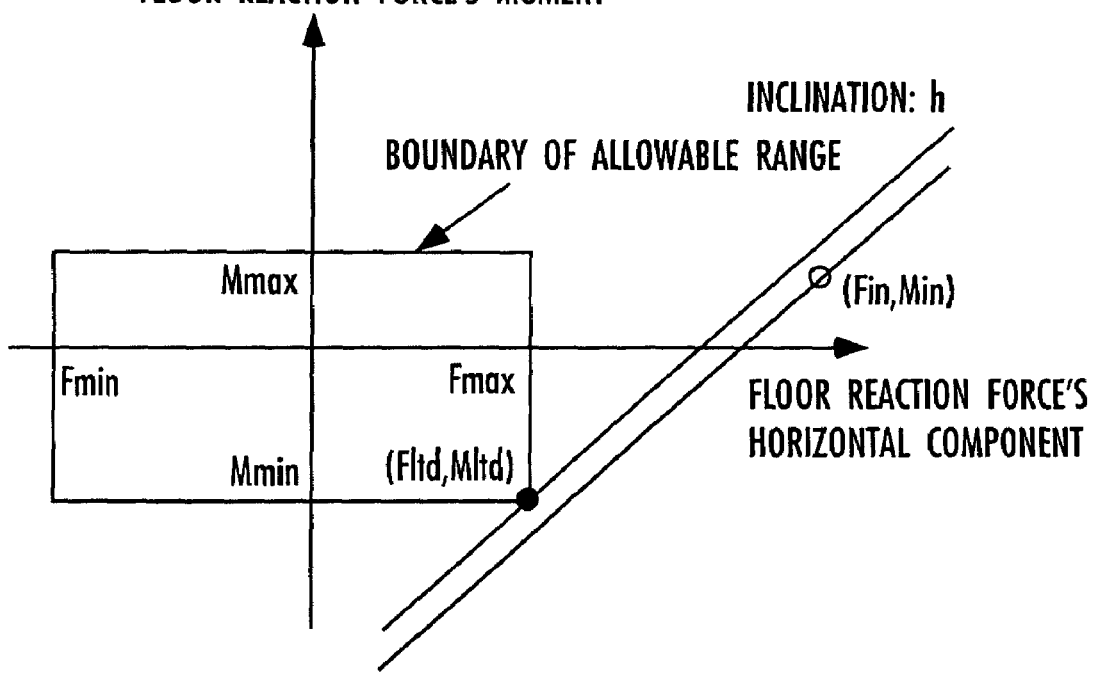

As shown by white spots in FIGS. 47 to 49, if the unlimited corrected desired floor reaction force's moment Min doesn't fall within the allowable range of the horizontal component of the floor reaction force's moment or the unlimited corrected desired floor reaction force's horizontal component doesn't fall within the floor reaction force's horizontal component allowable range, that is, if the point (Fin, Min) doesn't lie within the rectangular region defined by the allowable range of the horizontal component of the floor reaction force's moment and the floor reaction force's horizontal component allowable range, the values Mltd and Fltd are determined as described below.

Before describing a method of determining the values Mltd and Fltd, a principle of the determination will be described.

If, simply, the value Mltd is set to the unlimited corrected desired floor reaction force's moment Min and the value Fltd is set to the unlimited corrected desired floor reaction force's horizontal component Fin, the horizontal component of the floor reaction force's moment for the corrected gait doesn't fall within the allowable range of the horizontal component of the floor reaction force's moment, or the floor reaction force's horizontal component for the corrected gait doesn't fall within the floor reaction force's horizontal component allowable range. The moment Mpf for stabilizing the perturbation model for correcting body horizontal positions and the moment Mrf for stabilizing the perturbation model for correcting body posture angles at that time can be determined by substituting Min and Fin into Mltd and Fltd, respectively, in the formulas 20 and 21. In order for the horizontal component of the floor reaction force's moment for the corrected gait to fall within the allowable range of the horizontal component of the floor reaction force's moment and for the floor reaction force's horizontal component for the corrected gait to fall within the floor reaction force's horizontal component allowable range, the values Mpf and Mrf thus determined have to be changed. In this regard, in this embodiment, priority is given to a condition that the value Mrf agrees with the required value Mrfdmd of the moment for stabilizing the perturbation model for correcting body posture angles as closely as possible, that is, the shift to be corrected of the value Mrf from the value Mrfdmd is reduced to a minimum.

A reason for this will be described below.

The horizontal component of the floor reaction force's moment that can be corrected by the perturbation model 203 for correcting body posture angles is relatively small, and if a large moment is to be corrected, the body posture angle varies significantly. Thus, correction of the simplified model gait using the inverse full model 201 is preferably conducted by adding a movement of the perturbation model 202 for correcting body horizontal positions to the simplified model gait as much as possible. And, it is preferable that, if the movement of the perturbation model 202 for correcting body horizontal positions is not sufficient to correct the simplified model gait, the simplified model gait is corrected by further adding a movement of the perturbation model 203 for correcting body posture angles to the simplified model gait. Therefore, it is preferable that restoration of the perturbation model 203 for correcting body posture angles (restoration to the reference body posture angle) is given a higher priority than restoration of the perturbation model 202 for correcting body horizontal positions (restoration of the body horizontal position to a stable position). That is, it is preferable to give priority to a condition that the value Mrf, which is a quantity manipulated for restoring the perturbation model 203 for correcting body posture angles, agrees with the required value Mrfdmd of the moment for stabilizing the perturbation model for correcting body posture angles as closely as possible.

In order for the value Mrf to agree with the required value Mrfdmd of the moment for stabilizing the perturbation model for correcting body posture angles, of the values Mpf and Mrf obtained by substituting Min and Fin into Mltd and Fltd, respectively, in, the formulas 20 and 21, only the value Mpf has to be changed without changing the value Mrf.

A change amount of Fltd is denoted by $\Delta F$, and a change amount of Mltd is denoted by $\Delta M$. That is, the values Fltd and Mltd are changed as shown by the following formulas.

$$Fltd = Fin + \Delta F \qquad \text{formula 37}$$

$$Mltd = Min + \Delta M \qquad \text{formula 38}$$

Besides, from the formulas 20 and 21, the following relationship results.

$$Mrf = Mltd - (Fltd - Ffull - F0)*h \qquad \text{formula 39}$$

As can be apparently seen from the formulas 37 to 39, if the following formula holds, the value Mrf is not changed.

$$\Delta M = \Delta F * h \qquad \text{formula 40}$$

Thus, the values $\Delta F$ and $\Delta M$ have to satisfy the formula 40.

Furthermore, it is desirable that the value Mpf is close to the required value Mpfdmd of the moment for stabilizing the perturbation model for correcting body horizontal positions as precisely as possible, and therefore, the change amount $\Delta F$ (or $\Delta M$) is determined to have a minimum absolute value. Furthermore, the values Fltd and Mltd are determined using the formulas 37 and 38. This allows at least the correcting perturbation model's body posture angle $\theta c$ to be adequately stabilized and prevented from diverging, and furthermore, the correcting perturbation model's body horizontal position Xc can be stabilized and prevented from diverging to the extent possible.

In FIGS. 47 and 48, indicating a set of the values Fltd and Mltd thus determined by a black spot (Fltd, Mltd), the black spot is a point closest to the white spot (Fin, Min) among the points of intersection of a straight line passing through the white spot (Fin, Min) and having an inclination of h, which is a body translation mode floor reaction force ratio, and the boundary of the allowable range expressed by the formulas 35 and 36.

Incidentally, the straight line is a set of points (Fltd, Mltd) that satisfy the formulas 37, 38 and 40. Besides, if only the moment Mpf for stabilizing the perturbation model for correcting body horizontal positions is changed from the state of the white spot, the ratio between the change amount $\Delta M$ of Mltd and the change amount of $\Delta F$ of the Fltd equals to the body translation mode floor reaction force ratio h. From this fact also, it can be seen that the straight line is a set of points (Fltd Mltd) in the case where only the moment Mpf for stabilizing the perturbation model for correcting body horizontal positions is changed from the state where the point (Fltd, Mltd) agrees with the point (Fin, Min).

However, as shown in FIG. 49, if there are no values Fltd and Mltd that satisfy the formulas 35, 36, 37, 38 and 40, the values Fltd and Mltd are determined as described below. In this case, giving up keeping the value Mr constant, it is to be considered to reduce the change amount of Mr to a minimum.

Thus, instead of the formula 40, the following formula 41 is used.

$$\Delta M = \Delta F * h + \Delta Mp2 \qquad \text{formula 41}$$

The values Fltd and Mltd are determined so as to satisfy the formulas 35, 36, 37, 38 and 41. Here, as the value $\Delta Mp2$ becomes closer to 0, the change amount of Mr becomes smaller. Therefore, the value $\Delta Mp2$ is determined to have a minimum absolute value. Furthermore, in addition to these conditions being satisfied, it is desirable that the value Mp is close to the required value Mpfdmd of the moment for stabilizing the perturbation model for correcting body horizontal positions as precisely as possible, and therefore, the value $\Delta F$ is determined to have a minimum absolute value. This allows at least the correcting perturbation model's body posture angle $\theta c$ to be adequately stabilized and prevented from diverging to the extend possible, and furthermore, the correcting perturbation model's body horizontal position Xc can be stabilized and prevented from diverging to the extent possible.

In FIG. 49, indicating a set of the values Fltd and Mltd thus determined by a black spot (Fltd, Mltd), the black spot is a point closest to a straight line passing through the white spot (Fin, Min) and having an inclination of h, which is a body translation mode floor reaction force ratio, among the apexes of the boundary of the rectangular region defined by the allowable ranges expressed by the formulas 35 and 36 (i.e., the points of intersection of the four lines representing the upper limits and the lower limits of the allowable ranges, or mores generally, the points on the boundary of the rectangular region defined by the allowable ranges).

In this way, the limited corrected desired floor reaction force's moment Mltd about the desired ZMP and the limited corrected desired floor reaction force's horizontal component Fltd are determined.

Incidentally, when the floor reaction force's vertical component is 0 (during the floating period of the running gait), the upper limit values Mmax and Fmax and the lower limit values Mmin and Fmin in the formulas 35 and 36 are 0, and therefore, both the limited corrected desired floor reaction force's moment Mltd about the desired ZMP and the limited corrected desired floor reaction force's horizontal component Fltd are 0.

Returning to the flowchart in FIG. 13, after the processing in step S038 is performed, the process proceeds to step S040, where the time t is incremented by $\Delta t$. Then, the process returns to step S014, and the processings from steps S014 to S040 are repeated.

The operation of the gait generation device according to this embodiment will be further described with reference to FIG. 4. The gait generation device 100 generates the corrected gait as described above. The corrected body position/posture (trajectory) and the desired arm posture (trajectory) of the corrected gait are directly transmitted to a robot geometrical model (inverse kinematics calculator) 102.

Besides, the desired foot position/posture trajectory, the desired total floor reaction force central point (that is, desired ZMP) trajectory and the desired total floor reaction force trajectories (specifically, the desired floor reaction force's vertical component trajectory, the corrected desired floor reaction force's horizontal component trajectory and the trajectory of the corrected desired floor reaction force's moment about the desired ZMP) are transmitted directly to a composite-compliance operation determinator 104 and to a desired floor reaction force distributor 106. Then, the desired floor reaction force distributor 106 distributes the corrected desired floor reaction force among the feet 22R and 22L and determines the desired each-foot floor reaction force central point and the desired each-foot floor reaction force. The desired each-foot floor reaction force central point and the desired each-foot floor reaction force thus determined are transmitted to the composite-compliance operation determinator 104.

The composite-compliance operation determinator 104 transmits a corrected desired foot position/posture (trajectory) w/t deformation compensation to the robot geometrical model 102. Upon receiving the desired body position/posture (trajectory) and the corrected desired foot position/posture (trajectory) w/t deformation compensation, the robot geometrical model 102 calculates joint displacement commands (values) for the twelve joint (such as 10R(L)) of the legs 2,2 and transmits the commands to a displacement controller 108. The displacement controller 108 controls the twelve joints of the legs 2, 2 of the robot 1 by following the joint displacement commands (values) calculated by the robot geometrical model 102 as desired values. Besides, the robot geometrical model 102 calculates displacement commands (values) for the arm joints that satisfy the desired arm posture and transmits the commands to the displacement controller 108. The displacement controller 108 controls the ten (or 8) joints of the arms of the robot 1 by following the joint displacement commands (values) calculated by the robot geometrical model 102 as desired values.

The floor reaction force (specifically, actual each-foot floor reaction force) produced in the robot 1 is detected by the six-axis force sensor 34. The detection value is transmitted to the composite-compliance operation determinator 104. In addition, the posture inclination deviations θerrx and θerry produced in the robot 1 are detected by the inclination sensor 36, and the detection values are transmitted to a posture stabilizing control calculator 112 (specifically, the deviation of the actual posture angle with respect to the desired body posture angle in the roll direction (about the X axis) is denoted by θerrx, and the deviation of the actual posture angle with respect to the desired body posture angle in the pitch direction (about the Y axis) is denoted by θerry). Then, the posture stabilizing control calculator 112 calculates the compensating total floor reaction force's moment about the desired total floor reaction force central point (desired ZMP) for restoring the body posture angle of the robot 1 to the desired body posture angle. Furthermore, the corrected desired horizontal component of the floor reaction force's moment about the desired ZMP is added to the compensating total floor reaction force's moment, and the result is transmitted to the composite-compliance operation determinator 104. Based on the input value, the composite-compliance operation determinator 104 corrects the corrected desired floor reaction force Specifically, the desired floor reaction force is corrected so that the sum of the compensating total floor reaction force's moment and the corrected desired horizontal component of the floor reaction force's moment is applied about the desired total floor reaction force central point (desired ZMP).

The composite-compliance operation determinator 104 determines the corrected desired foot position/posture (trajectory) w/t deformation compensation in order for the states and floor reaction force of the actual robot calculated from the sensor detection values or the like to agree with the corrected desired floor reaction force. However, it is actually impossible that all the states agree with the irrespective desired values, and therefore, various trade-offs are made among these states so that each of them agrees with its desired value as closely as possible. That is, a control deviation for each desired value is weighted, and the weighted average of the control deviation (or the square of the control deviation) is controlled to be minimum. Thus, the actual foot position/posture and the actual total floor reaction force are controlled so as to generally agree with the desired foot position/posture and the desired total floor reaction force, respectively.

Since the present invention essentially concerns robot gait generation by the gait generation device 100, and the configuration and operation of the composite-compliance operation determinator 104 or the like are described in detail in Japanese Patent Laid-Open No. 10-277969 previously filled by the applicants or the like, further details thereof will not be described herein.

As described above, in this embodiment, the limited corrected desired floor reaction force's moment Mltd and the limited corrected desired floor reaction force's horizontal component Fltd are determined in such a manner that the true ZMP for the corrected gait lies within the ZMP allowable range, and the floor reaction force's horizontal component for the corrected gait falls within the floor reaction force's horizontal component allowable range (that is, in such a manner that the ZMP limitation condition and the floor reaction force's horizontal component limitation condition are satisfied).

Furthermore, under the limitation conditions, the moment Mp for stabilizing the perturbation model for correcting body horizontal positions is determined to agree with or be close to the required value Mpfdmd of the moment for stabilizing the perturbation model for correcting body horizontal positions as accurately as possible, and the moment Mr for stabilizing the perturbation model for correcting body posture angles is determined to agree with or be close to the required value Mrfdmd of the moment for stabilizing the perturbation model for correcting body posture angles as accurately as possible. In this way, the correcting perturbation model's body position Xc and the correcting perturbation model's body posture angle θc are stabilized and prevented from diverging.

The horizontal component of the floor reaction force's moment that can be corrected by the perturbation model 203 for correcting body posture angles is relatively small, and if a large moment is to be corrected, the body posture angle varies significantly. Therefore, correction of the simplified model gait using the inverse full model 201 is conducted by adding the movement of the perturbation model 202 for correcting body horizontal positions to the simplified model gait as much as possible. And, it is preferable that, if the movement of the perturbation model 202 for correcting body horizontal postures/positions is not sufficient to correct the simplified model gait, the simplified model gait is corrected by further adding a movement of the perturbation model 203 for correcting body posture angles to the simplified model gait. Therefore, it is preferable that restoration of the perturbation model 203 for correcting body posture angles is given a higher priority than restoration of the perturbation model 202 for correcting body horizontal positions. That is, it is preferable to give priority to a condition that the value Mrf, which is a quantity manipulated for restoring the perturbation model 203 for correcting body posture angles, agrees with the required value Mrfdmd of the moment for stabilizing the perturbation model for correcting body posture angles as closely as possible.

Now, associations of the first embodiment described above with the present invention will be described. The first embodiment is associated with the first to fifteenth implementations of the present invention (except for the eleventh implementation and the implementation(s) based essentially on the eleventh implementation. The same holds true for the following description unless the eleventh implementation is mentioned in particular). In this case, the allowable range setting means according to the first to fifteenth implementations is associated with the processings in steps S030 and S036 in the flowchart in FIG. 13, and the allowable ranges of the translation floor reaction force's horizontal component and the ZMP (true ZMP), which are to be limited, are set. In addition, the provisional instantaneous value determining means according to the first to fifteenth implementations is associated with the processing in step S032 (calculation of the simplified model gait's instantaneous values) in the flowchart in FIG. 13. In this case, in particular, the instantaneous value of the body position/posture, the instantaneous value of the floor reaction force's horizontal position, the desired ZMP, and the instantaneous value of the horizontal component of the floor reaction force's moment about the desired ZMP (=0) are determined as provisional instantaneous values. The model calculation means according to the first to fifteenth implementations is associated with the processings of determining the full-model's floor reaction force's horizontal component Ffull and the full-model's floor reaction force's moment Mfull as model floor reaction force instantaneous values using the inverse full model 201, which is a dynamics model (in particular, processing of determining Mfull). In addition, the desired instantaneous value determining means according to the first to fifteenth implementations is associated with the processing in step S038 in the flowchart in FIG. 13. In this case, the full-model's floor reaction force's moment Mfull is equivalent to the difference between the model floor reaction force instantaneous value and the provisional instantaneous value of the desired floor reaction force. As the desired instantaneous value of the desired floor reaction force in the third or fifteenth implementation, the corrected desired floor reaction force's moment or corrected desired horizontal component of the floor reaction force's horizontal component in the case where the desired ZMP is the point of application is determined.

Furthermore, the first embodiment includes the perturbation model 202 for correcting body horizontal positions and the perturbation model 203 for correcting body posture angles, which are perturbation models in the fourth to tenth implementations and the twelfth to fifteenth implementations (except for the implementation(s) based essentially on the eleventh implementation) In this case, as perturbation model manipulating quantities, the moment Mp for the perturbation model for correcting body horizontal positions and the moment Mr for the perturbation model for correcting body posture angles are determined, and input to the perturbation models 202 and 203, thereby determining the correcting perturbation model's body horizontal position Xc and the correcting perturbation model's body posture angle θc as correction quantities for the desired movement. In addition, the full model's floor reaction force's moment Mfull with the sign inverted (input to the Mp calculator 214) is used as a first manipulating quantity component of the perturbation model manipulating quantity, and the moment Mpf for stabilizing the perturbation model for correcting the body horizontal position and the moment Mrf for stabilizing the perturbation model for correcting body posture angles (which equals to Mr in the first embodiment) are involved as second manipulating quantity components of the perturbation model manipulating quantity. In addition, the required value Mpfdmd of the moment for stabilizing the perturbation model for correcting body horizontal positions and the required value Mrfdmd of the moment for stabilizing the perturbation model for correcting body posture angles are used as required values of the perturbation model manipulating quantities. In addition, as estimated values of the limitation-target quantities in the twelfth and thirteenth implementations, the unlimited corrected desired floor reaction force's moment Min and the unlimited corrected desired floor reaction force's horizontal component Fin are determined by the Min calculator 209 and the Fin calculator 210, respectively, and as limitation-target quantities having been limited, the limited corrected desired floor reaction forceI smoment Mltd and the limited corrected desired floor reaction force's horizontal component Fltd are determined by the limitation processor 211. Besides, the "predetermined part" of the robot according to the eighth implementation is the body 24 of the robot 1.

If the horizontal component of the floor reaction force's moment about the desired ZMP is not 0, it means that the true ZMP is displaced from the desired ZMP by a distance derived by dividing the horizontal component of the floor reaction force's moment by the floor reaction force's vertical component. Therefore, of course, the horizontal component of the floor reaction force's moment used in the first embodiment can be appropriately converted into the ZMP using the desired floor reaction force's vertical component.

In addition, the eleventh implementation involves no required value for the perturbation models, and the embodiment in this case can be provided by setting both the values Mpfdmd and Mrfdmd in the first embodiment to 0. Thus, the embodiment concerning the eleventh implementation and the implementation(s) based essentially thereon is provided. Associations of this embodiment with the eleventh implementation or the like are the same as the associations concerning the first embodiment.

Now, a second embodiment of the present invention will be described. A correction method for a device according to the second embodiment is of a full model feed forward type. Furthermore, the method uses the inverse dynamics full model (inverse full model), doesn't correct the input of the simplified model gait and uses a perturbation model.

Figure 50:
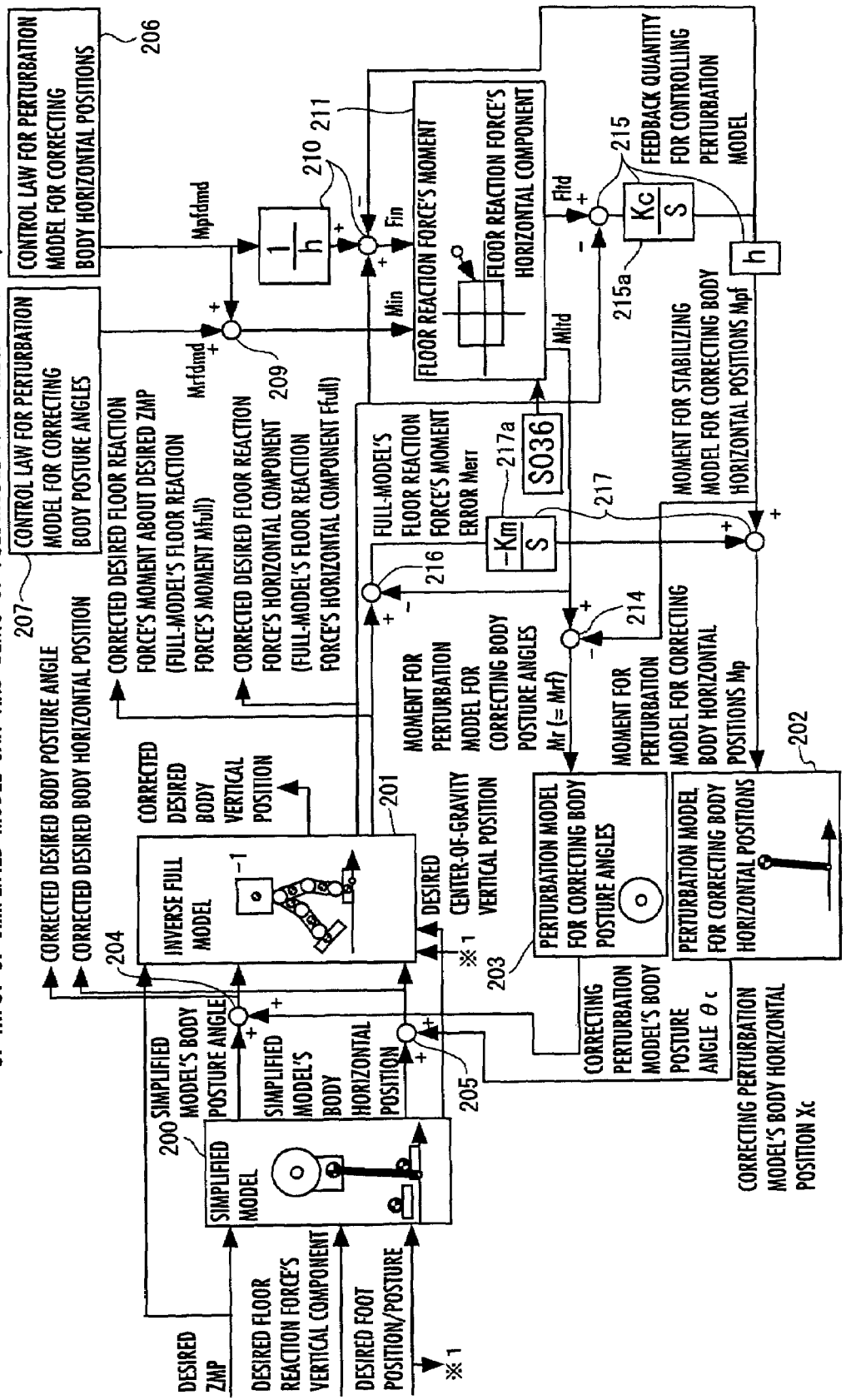
FIG. 50 is a functional block diagram showing a gait correction method according to a second embodiment of the present invention.

FIG. 50 is a functional block diagram for illustrating an operation of the device according to the second embodiment, specifically, the gait correction method in step S038 in the flowchart in FIG. 13. However, as in the first embodiment, a simplified model 200 shown in FIG. 50 is not simply a dynamics model but represents the process from steps S010 to S034 described above, that is, calculation (determination) of the simplified model gait's instantaneous values. Therefore, the sections following the simplified model 200 in FIG. 50 are associated with the processing in step S038. Of the functional sections shown in FIG. 50, same functional sections as those in the first embodiment shown in FIG. 42 are assigned the same reference numerals as those in FIG. 42.

The points other than the processing in step S038 are the same as those in the first embodiment, and therefore, descriptions thereof are omitted. In the following, the processing in step S038 will be described in detail with reference to FIG. 50.

In step S038, as described above, first, the calculator 205 adds the correcting perturbation model's body horizontal position Xc calculated as described later in the last-time control cycle (time t−Δt) to the instantaneous value (provisional instantaneous value determined in the control cycle containing the present time t) of the desired body horizontal position for the simplified model gait determined in step S032 in FIG. 13 as described above, thereby determining the corrected desired body horizontal position. Besides, the calculator 204 adds the correcting perturbation model's body posture angle θc calculated as described later in the last-time control cycle (time t−Δt) to the instantaneous value (provisional instantaneous value determined in the control cycle containing the present time t) of the desired body posture angle for the simplified model gait determined in step S032 in FIG. 13, thereby determining the corrected desired body posture angle. Then, the corrected desired body horizontal position and the corrected desired body posture angle are output as final desired instantaneous values of the body horizontal position and the body posture angle, respectively.

That is, the corrected desired body horizontal position and the corrected desired body posture angle are determined by the formulas 24 and 25, respectively.

Then, the instantaneous values of the movement variables including the desired center-of-gravity position, the desired foot position/posture and the desired arm posture for the simplified model gait determined as described above, the corrected desired body horizontal position and the corrected desired body posture angle, and the instantaneous value of the desired ZMP are input to the inverse dynamics full model 201, thereby calculating the floor reaction force's horizontal component and the horizontal component of the floor reaction force's moment about the desired ZMP which are in balance with the movement represented by the input movement variables (that is, which are produced for the movement by the inverse full model 201). Therefore, in this embodiment, in addition to the body horizontal position and the body posture angle for the simplified model, the correcting perturbation model's body horizontal position Xc and the correcting perturbation model's body posture angle θc are input to the inverse full model 201. In the following, as in the first embodiment, the floor reaction force's horizontal component and the horizontal component of the floor reaction force's moment calculated by the inverse full model 201 are referred to as a full-model's floor reaction force's horizontal component Ffull and a full-model's floor reaction force's moment Mfull, respectively.

The full-model's floor reaction force's horizontal component Ffull and the full-model's floor reaction force's moment Mfull are output as a corrected desired floor reaction force's horizontal component (final desired instantaneous value of the floor reaction force's horizontal component at the present time t) and a corrected desired horizontal component of the floor reaction force's moment (final desired instantaneous value of the horizontal component of the floor reaction force's moment at the present time t), respectively.

That is, the corrected desired floor reaction force's horizontal component and the corrected desired horizontal component of the floor reaction force's moment are determined by the following formulas and output.

corrected desired floor reaction force's horizontal component=full model's floor reaction force's horizontal component Ffull     formula 48 corrected desired horizontal component of the floor reaction force's moment=full-model's floor reaction force's moment Mfull     formula 49

As can be seen from the processing described above, in this embodiment, the full model gait is equivalent to the simplified model gait additionally incorporating a behavior of the perturbation model 202 for correcting body horizontal positions and a behavior of the perturbation model 203 for correcting body posture angles. Thus, the following formulas hold. However, the simplified model's horizontal component of the floor reaction force's moment and the simplified model's floor reaction force's horizontal component are the moment horizontal component and the translation force's horizontal component, respectively, of the floor reaction force produced by the movement with the simplified model gait which is calculated-using the inverse full model 201.

full model's floor reaction force's moment Mfull

=simplified model's horizontal component of the floor reaction force's moment

+moment for the perturbation model for correcting body horizontal positions Mp

+moment for the perturbation model for correcting body posture angles Mr     formula 50 full model's floor reaction force's horizontal component Ffull

=simplified model's floor reaction force's horizontal component

+floor reaction force's horizontal component for the perturbation model for correcting body horizontal positions Fp +floor reaction force's horizontal component for the perturbation model for correcting body posture angles Fr     formula 51

Then, the required value Mpfdmd of the moment for stabilizing the perturbation model for correcting body horizontal positions is determined by the control law 206 for the perturbation model for correcting body horizontal positions. The control law 206 for the perturbation model for correcting body horizontal positions according to this embodiment is set as described in Japanese Patent Application No. 2001-133621 proposed by the applicants. For example, the control law 206 is determined as represented by the following formula.

required value Mpfdmd of the moment for stabilizing the perturbation model for correcting body horizontal positions =Kpg*center-of-gravity difference+Kvg*correcting perturbation model's body horizontal velocity dXc/dt     formula 52

In this formula, the center-of-gravity difference is defined by the following formula.

center-of-gravity difference=full model's center-of-gravity horizontal position−simplified model's center-of-gravity horizontal position    formula 53

"Kpg" and "Kvg" in the formula 52 denote gains of feedback control, and the full model's center-of-gravity horizontal position, the simplified model's center-of-gravity horizontal position and the correcting perturbation model's body horizontal velocity dXc/dt are the instantaneous value of the center-of-gravity horizontal position for the full model gait, the instantaneous value of the center-of-gravity horizontal position for the simplified model gait (center-of-gravity horizontal position XGs calculated using the simplified model based on the instantaneous posture in the simplified model gait) and the correcting perturbation model's body horizontal velocity dXc/dt which are calculated in the last-time control cycle (time t−Δt), respectively.

That is, the feedback quantity (manipulating quantity) for controlling the perturbation model is calculated based on the center-of-gravity difference obtained by subtracting the simplified model's center-of-gravity horizontal position from the full model's center-of-gravity horizontal position and the perturbation model's body velocity, which is one of state quantities of the perturbation model. Such a perturbation model's control law allows the time-average of the center-of-gravity difference to be controlled to substantially 0.

Then, the required value Mrfdmd of the moment for stabilizing the perturbation model for correcting body posture angles is determined by the control law 207 for the perturbation model for correcting body posture angles. This can be attained by using the same control law as in the first embodiment. Therefore, as the control law 207, the formula 11 is used, for example.

Then, the Min calculator 209 determines (estimates) the unlimited corrected desired floor reaction force's moment Min. As in the first embodiment, the unlimited corrected desired floor reaction force's moment Min is the horizontal component of the floor reaction force's moment about the desired ZMP that is produced if, neglecting the limitations (the ZMP limitation condition and the floor reaction force's horizontal component limitation condition), the moment Mpf for stabilizing the perturbation model for correcting body horizontal positions agrees with the required value Mpfdmd of the moment for stabilizing the perturbation model for correcting body horizontal positions, and the moment Mrf for stabilizing the perturbation model for correcting body posture angles agrees with the required value Mrfdmd of the moment for stabilizing the perturbation model for correcting body posture angles.

As in the first embodiment, the unlimited corrected desired floor reaction force's moment Min is determined by calculation of the formula 13. That is, the unlimited corrected desired floor reaction force's moment Min is determined by adding the required value Mrfdmd of the moment for stabilizing the perturbation model for correcting body posture angles to the required value Mpfdmd of the moment for stabilizing the perturbation model for correcting body horizontal positions.

Furthermore, the Fin calculator 210 determines (estimates) the unlimited corrected desired floor reaction force's horizontal component Fin. As in the first embodiment, the unlimited corrected desired floor reaction force's horizontal component Fin is the floor reaction force's horizontal component (equivalent to Ffull) that is produced by the inverse full model 201 if, neglecting the limitations (the ZMP limitation condition and the floor reaction force's horizontal component limitation condition), the moment Mpf for stabilizing the perturbation model for correcting body horizontal positions agrees with the required value Mpfdmd of the moment for stabilizing the perturbation model for correcting body horizontal positions, and the moment Mrf for stabilizing the perturbation model for correcting body posture angles agrees with the required value Mrfdmd of the moment for stabilizing the perturbation model for correcting body posture angles.

Unlike the first embodiment, the unlimited corrected desired floor reaction force's horizontal component Fin is determined by the following formula.

unlimited corrected desired floor reaction force's horizontal component Fin

=full model's floor reaction force's horizontal component Ffull

+1/h

*(required value of the moment for stabilizing the perturbation model for correcting body horizontal positions Mpfdmd −moment for stabilizing the perturbation model for correcting body horizontal positions Mpf    formula 54

Here, as the moment Mpf for stabilizing the perturbation model for correcting body horizontal positions, the last-time value (at the time t−Δt) is used. That is, the difference between the required value Mpfdmd of the moment for stabilizing the perturbation model for correcting body horizontal positions and the moment Mpf for stabilizing the perturbation model for correcting body horizontal positions is determined, and the increment of the full-model's floor reaction force's horizontal component Ffull due to increasing the input to the perturbation model for correcting body horizontal positions by the difference is estimated by dividing the difference by the body translation mode floor reaction force ratio h. Furthermore, the full-model's floor reaction force's horizontal component Ffull is added to the result, thereby estimating the unlimited corrected desired floor reaction force's horizontal component Fin.

Proofs that the unlimited corrected desired floor reaction force's moment Min is determined (estimated) by the formula 13 and that the unlimited corrected desired floor reaction force's horizontal component Fin is determined (estimated) by the formula 54 will be described later.

Then, by applying the limitations to the unlimited corrected desired floor reaction force's moment Min and the unlimited corrected desired floor reaction force's horizontal component Fin, the limiter means (limitation processor 211) similar to that in the first embodiment determines the limited corrected desired floor reaction force's moment Mltd (about the desired ZMP) and the limited corrected desired floor reaction force's horizontal component Fltd in such a manner that the limitations (the ZMP limitation condition and the floor reaction force's horizontal component limitation condition) are satisfied. This procedure is performed in the same manner as in the first embodiment.

As described later, the corrected desired horizontal component of the floor reaction force's moment substantially agrees with the limited corrected desired floor reaction force's moment Mltd, and the corrected desired floor reaction force's horizontal component substantially agrees with the limited corrected desired floor reaction force's horizontal component Fltd. Therefore, if the limited corrected desired floor reaction force's moment Mltd and the limited corrected desired floor reaction force's horizontal component Fltd are determined as described above, the corrected desired horizontal component of the floor reaction force's moment and the corrected desired floor reaction force's horizontal component substantially satisfy the ZMP limitation condition and the floor reaction force's horizontal component limitation condition.

Then, an Mpf calculator 215 determines the moment Mpf for stabilizing the perturbation model for correcting body horizontal positions. More specifically, the full-model's floor reaction force's horizontal component Ffull is subtracted from the limited corrected desired floor reaction force's horizontal component Fltd, the resulting value is multiplied by a gain Kc, the resulting value is integrated by an integrator 215a, and the resulting integral value is further multiplied by the body translation mode floor reaction force ratio h, thereby determining the moment Mpf for stabilizing the perturbation model for correcting body horizontal positions. That is, the moment Mpf for stabilizing the perturbation model for correcting body horizontal positions is determined by the following formula.

$$Mpf = h * \int Kc(Fltd - Ffull) dt \qquad \text{formula 55}$$

Then, the Mrf calculator 214 determines the moment Mrf for stabilizing the perturbation model for correcting body posture angles by subtracting the moment Mpf for stabilizing the perturbation model for correcting body posture angles from the limited corrected desired floor reaction force's moment Mltd. That is, the moment Mrf for stabilizing the perturbation model for correcting body posture angles is determined by the formula 21.

Furthermore, the floor reaction force's moment Mr for the perturbation model for correcting body posture angles is determined by the formula 23. That is, the moment Mrf for stabilizing the perturbation model for correcting body posture angles, which is an output from the Mrf calculator 214, is determined, in itself, as the floor reaction force's moment Mr for the perturbation model for correcting body posture angles.

Then, an Merr calculator 216 calculates a full-model's floor reaction force's moment error Merr defined by the following formula.

full-model's floor reaction force's moment error Merr

=full-model's floor reaction force's moment Mfull–
limited corrected desired floor reaction force's
moment Mltd  formula 56

Then, an Mp calculator 217 determines the floor reaction force's moment Mp for the perturbation model for correcting body horizontal positions in accordance with the following formula.

$$Mp = Mpf - \int Km * Merr \, dt \qquad \text{formula 57}$$

That is, an integrator 217a integrates the full-model's floor reaction force's moment error Merr multiplied by an integral gain Km and inverts the sign of the resulting integral value. The output from the integrator 217a is added to the moment Mpf for stabilizing the perturbation model for correcting body horizontal positions, thereby determining the floor reaction force's moment Mp for the perturbation model for correcting body horizontal positions.

Then, the floor reaction force's moment Mp for the perturbation model for correcting body horizontal positions is input to the perturbation model 202 for correcting body positions, and the correcting perturbation model's body position Xc in balance with the input floor reaction force's moment is calculated.

In addition, the floor reaction force's moment Mr for the perturbation model for correcting body posture angles is input to the perturbation model 203 for correcting body posture angles, and the correcting perturbation model's body posture angle θc in balance with the input floor reaction force's moment is calculated.

The correcting perturbation model's body position Xc, the correcting perturbation model's body posture angle θc and the moment Mpf for stabilizing the perturbation model for correcting body horizontal positions thus determined are used as the last-time values in the next-time control cycle (time t+Δt).

The other configurations and processes are the same as those in the first embodiment.

Now, that the full-model's floor reaction force's moment Mfull substantially agrees with the limited corrected desired floor reaction force's moment Mltd will be described.

It is assumed that the input to the inverse dynamics full model (inverse full model) 201 is the gait movement, the output thereof is the full-model's floor reaction force's moment, and the transfer function from the input to the output is denoted by 1/G(S).

It is assumed that the input to the simplified model 200 is the floor reaction force's moment about the desired ZMP, the output thereof is the gait movement, and the transfer function from the input to the output is the inverse function G(S) of the transfer function of the inverse dynamics full model 201.

However, since the simplified model 200 contains an error due to modeling, the output is represented by the following formula.

$$\text{output} = G(\text{input}) + G(d) \qquad \text{formula 58}$$

In this formula, character d denotes a modeling error of the simplified model 200. If the simplified model 200 is exactly the inverse function of the inverse dynamics full model 201, the modeling error d is 0. However, typically, the modeling error d is not 0 because the simplified model involves approximation.

The transfer function from the input to the output (gait perturbation) of the perturbation model 202 for correcting body horizontal positions and the perturbation model 203 for correcting body posture angles is denoted by Gm(S).

Figure 51:
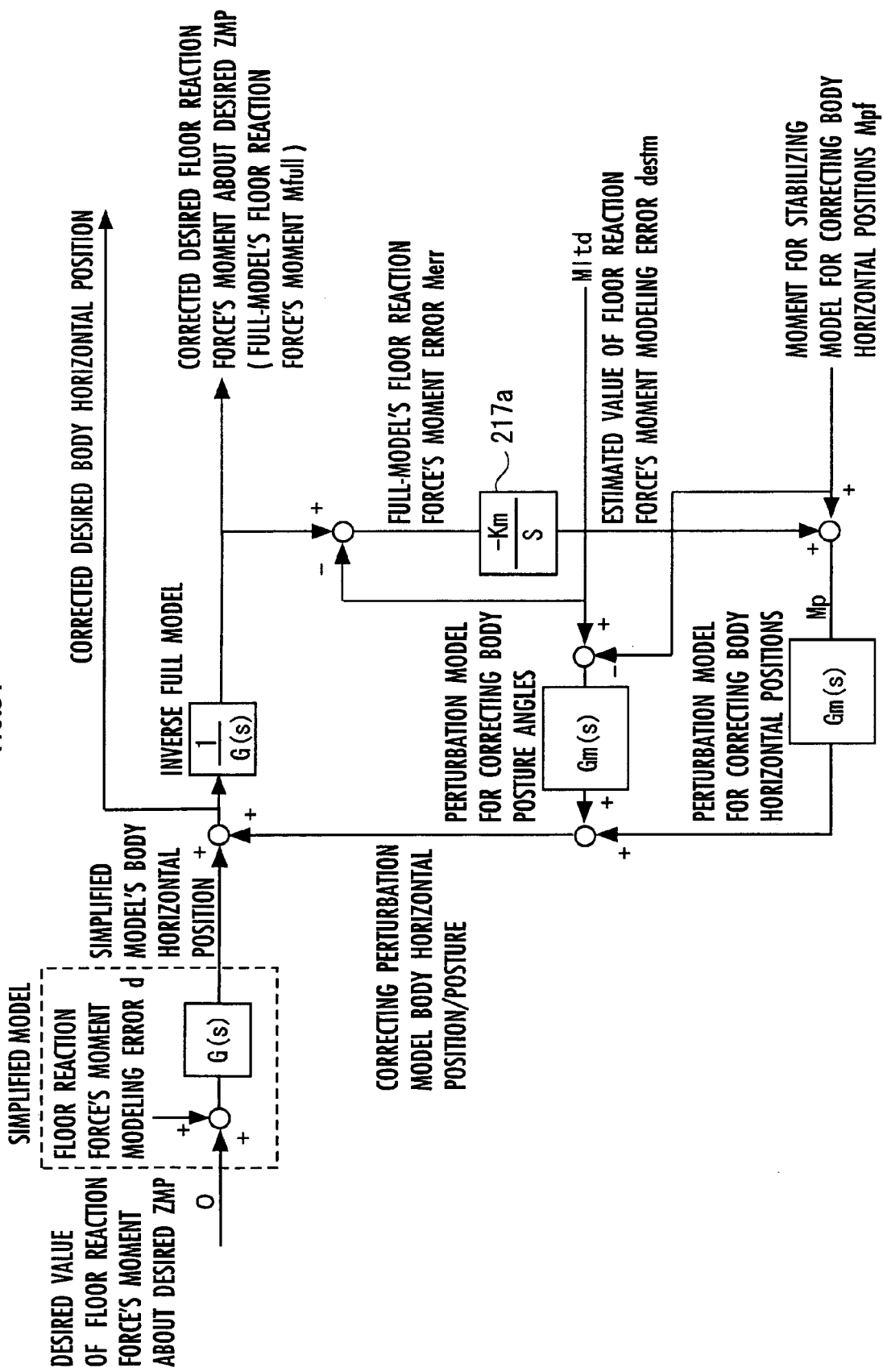
FIGS. 51 to 57 are diagrams for illustrating functions shown in the block diagram of FIG. 50.

If FIG. 50 is redrawn using these transfer functions, FIG. 51 results. In FIG. 51, an estimated floor reaction force's moment modeling error value destm is equivalent to the integral of the output of the integrator 217a of the Mp calculator 217, that is, the full-model's floor reaction force's moment error Merr multiplied by the gait (–Km) (the same holds true for FIGS. 52 to 57 described later).

Furthermore, it is assumed that the perturbation model 202 for correcting body horizontal positions and the perturbation model 203 for correcting body posture angles have a high approximation precision, and the following formula holds approximately.

$$Gm(S) = G(S) \qquad \text{formula 59}$$

Figure 52:
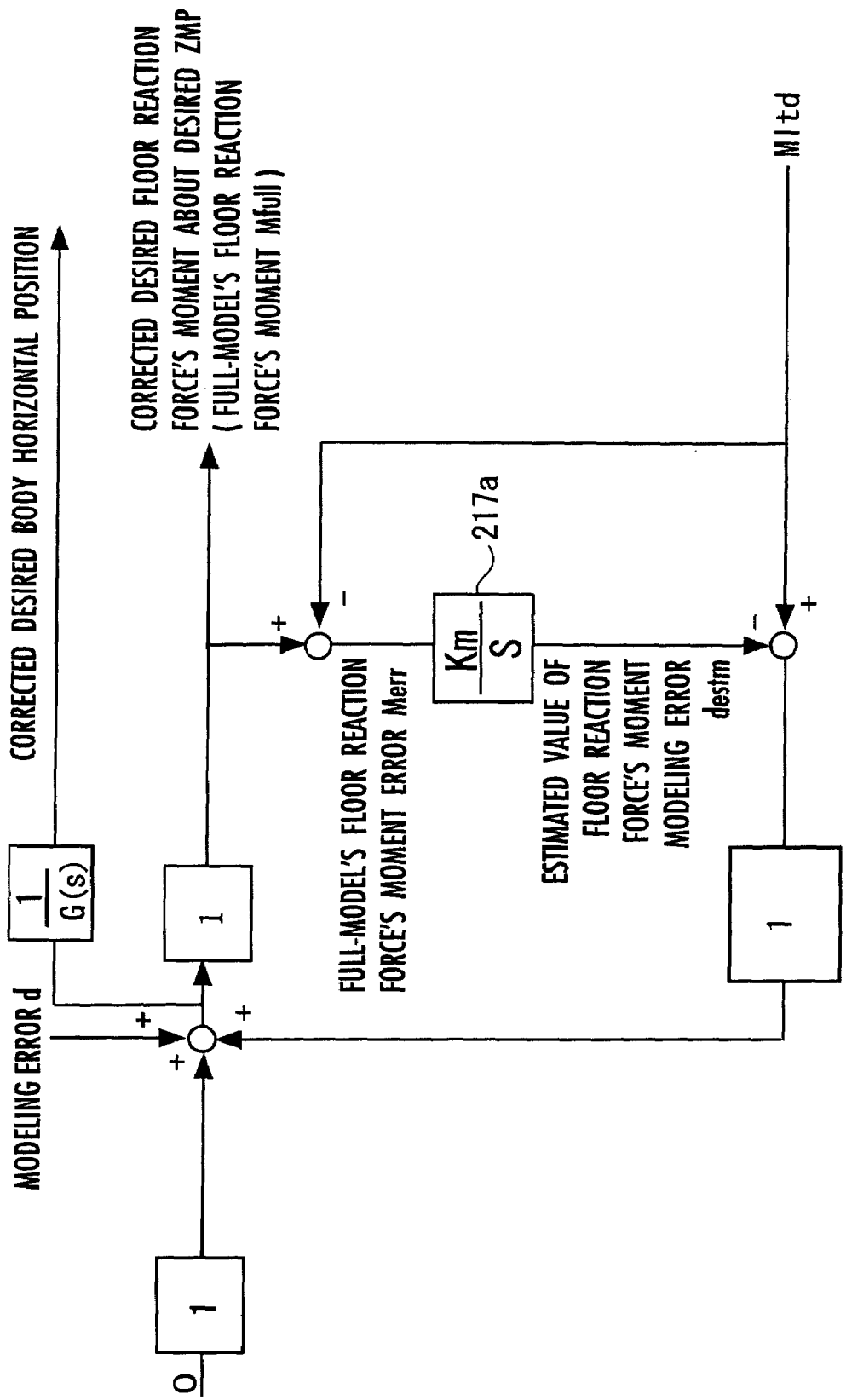

In this case, FIG. 51 can be approximated by FIG. 52.

If FIG. 52 is transformed to determine a transfer function from the limited corrected desired floor reaction force's moment Mltd to the full-model's floor reaction force's moment error Merr, the transfer function equals to 0. That is, the full-model's floor reaction force's moment error Merr is not affected by the limited corrected desired floor reaction force's moment Mltd.

In addition, if FIG. 52 is transformed to determine a transfer function from the modeling error d to the full-model's floor reaction force's moment error Merr, the following formula results.

$$Merr=S/Km/(S/Km+1)*d \quad \text{formula 60}$$

Figure 53:
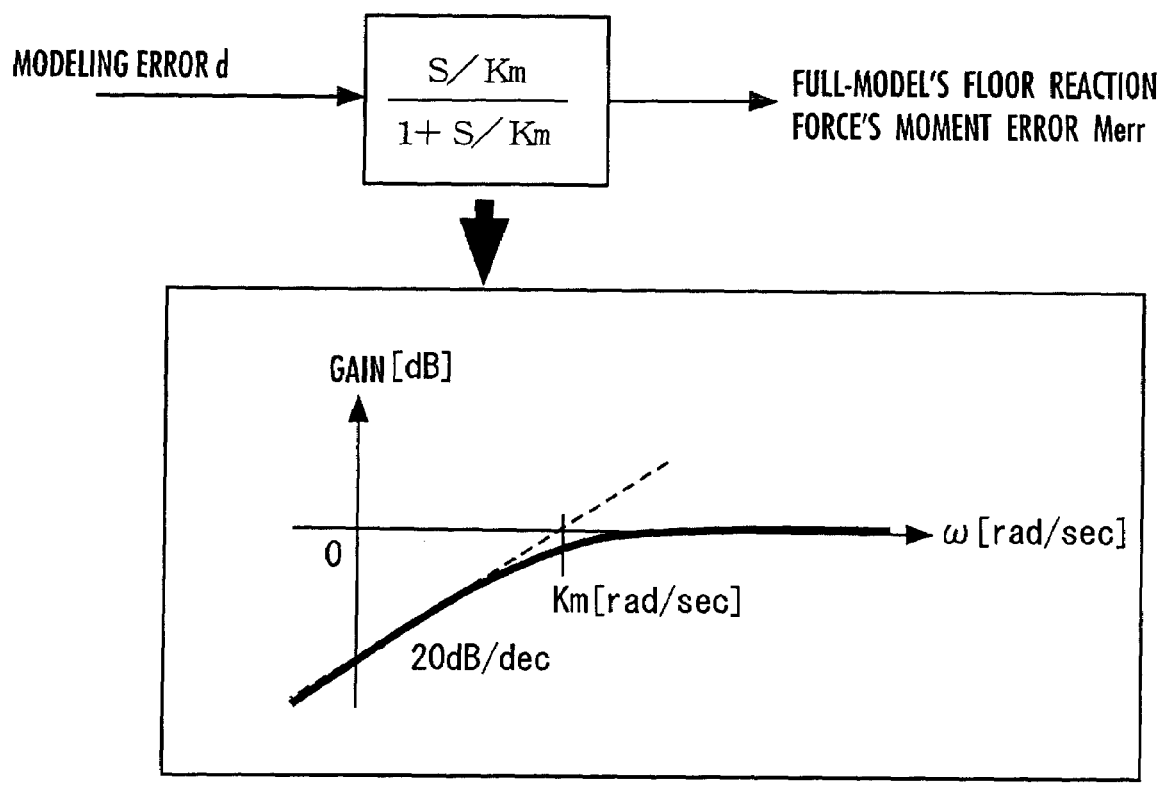

That is, as shown in FIG. 53, the full-model's floor reaction force's moment error Merr is equivalent to the modeling error having passed through a low cut filter having a cutoff angular frequency equal to the gain Km [rad/s] of the integrator 217a.

Generally, assuming the gait cycle as a reference frequency, most of the frequency component of the modeling error d is the third harmonic or lower. Therefore, if the integrator 217a has a sufficiently large gain Km, the full-model's floor-reaction force's moment error Merr is substantially 0.

Thus, the left side of the formula 56 equals to 0, and therefore, the full-model's floor reaction force's moment Mfull substantially agrees with the limited corrected desired floor reaction force's moment Mltd.

Now, that the full-model's floor reaction force Ffull substantially agrees with the limited corrected desired floor reaction force's horizontal component Fltd will be described.

It is defined that the input to the inverse dynamics full model 201 is the body horizontal position, the output thereof is the full-model's floor reaction force's horizontal component, and the transfer function from the input to the output is denoted by 1/Gp(S).

The floor reaction force's horizontal component for the simplified model calculated using the inverse full model 201 is referred to as a simplified model's gait floor reaction force's horizontal component Fs.

According to this definition, if the input to the simplified model 200 is the simplified model's gait floor reaction force's horizontal component Fs and the output of the simplified model 200 is the simplified model's body horizontal position, the transfer function from the input to the output is represented as Gp(S). That is, the following formula holds.

$$\text{body horizontal position}=Gp(S)*Fs \quad \text{formula 61}$$

In addition, since the floor reaction force's horizontal component for the perturbation model 203 for correcting body posture angles is always 0, if the output of the perturbation model 203 for correcting body posture angles is input to the inverse dynamics full model 201, the full-model's floor reaction force's horizontal component is not affected by that. That is, the transfer function from the input of the perturbation model 203 for correcting body posture angles to the full-model's floor reaction force's horizontal component equals to 0.

Figure 54:
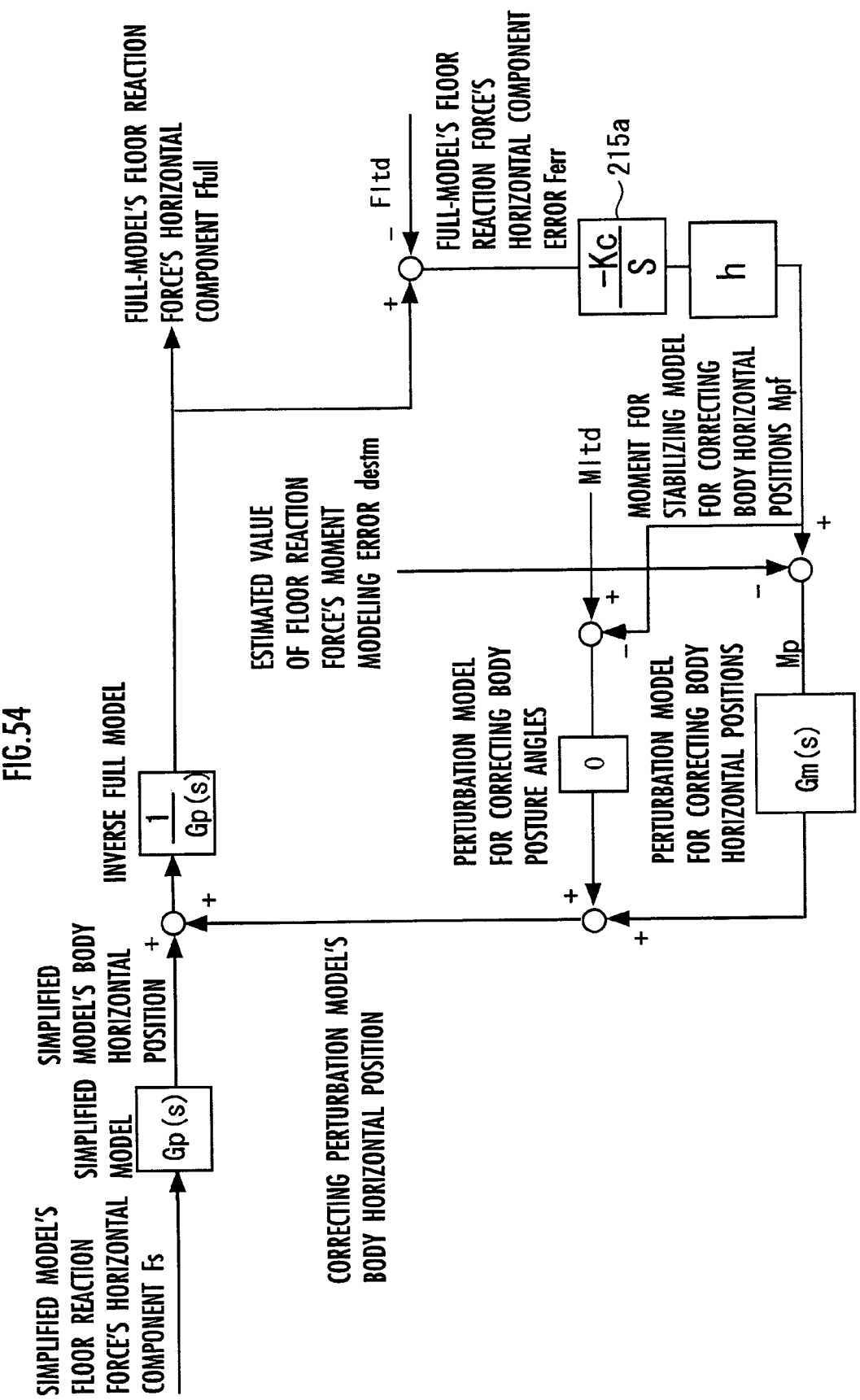

If FIG. 50 is redrawn using these relationships, FIG. 54 results.

As described above, Gm(S) is the transfer function from the input to the output (perturbation of the gait) of the perturbation model 202 for correcting body horizontal positions and the perturbation model 203 for correcting body posture angles.

Figure 55:
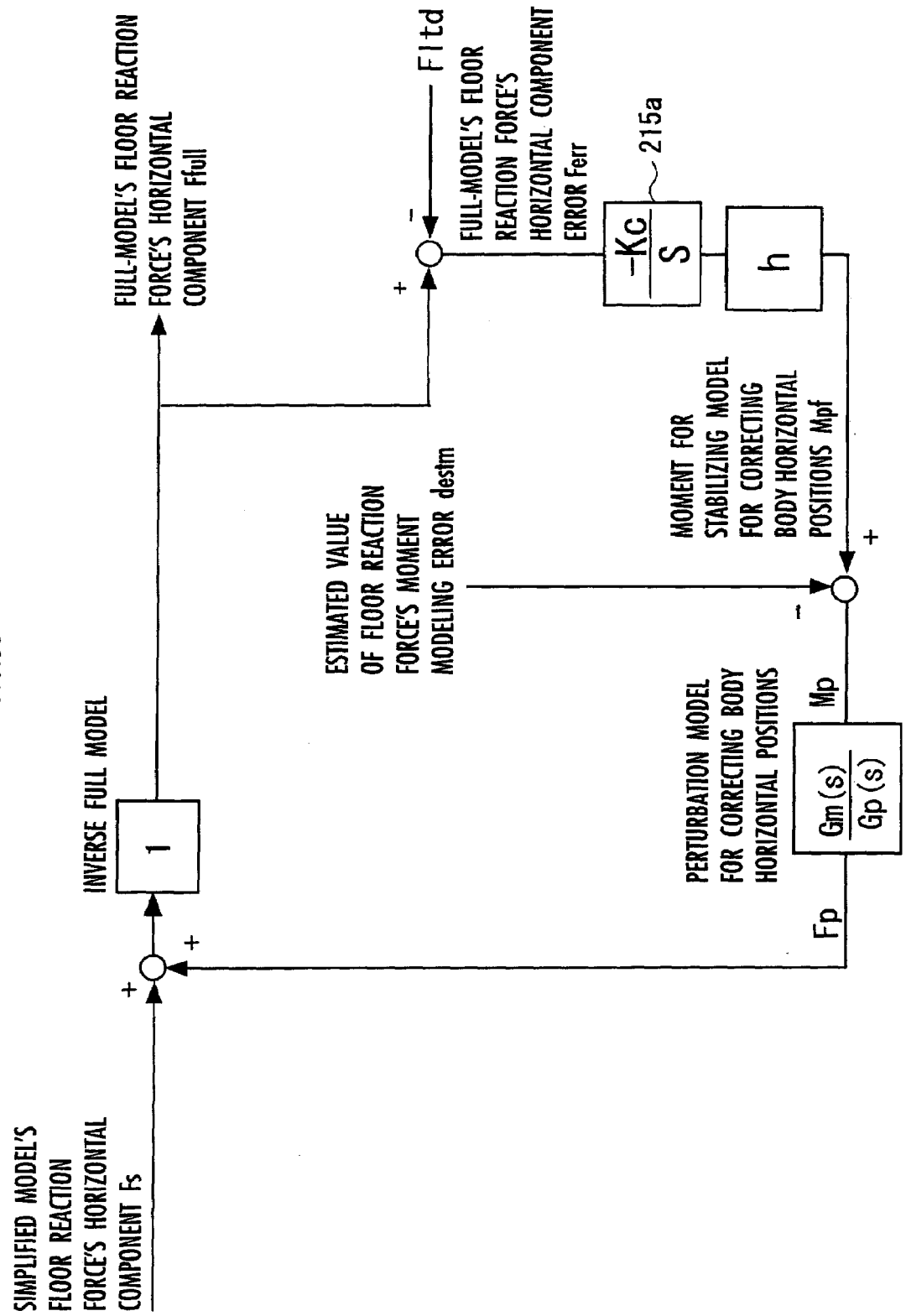

Further transforming FIG. 54 results in FIG. 55.

Gm(S)/Gp(S) in FIG. 55 denotes the transfer function from the horizontal component of the floor reaction force's moment Mp for the perturbation model for correcting body horizontal positions to the floor reaction force's horizontal component Fp. Gm(S)/Gp(S) is derived from the formulas a19 and a20 by eliminating Xc from the formulas and expressed by the following formula.

$$Gm(S)/Gp(S)=1/h*S2/(S2-1/h/mb*Fbz) \quad \text{formula 64}$$

Here, "S2" represents the square of S.

While the perturbation model 202 for correcting body horizontal positions represented by the formula 64 is a diverging system, it has a low time constant of divergence. For example, a robot having a height nearly equal to that of a human being has a time constant of divergence of about 3 [rad/s]. That is, the correcting perturbation model's body horizontal position Xc varies slowly.

Besides, from the formulas a19 and a20, the following formula results.

$$Fp=1/h*Xc*Fbz+1/h*Mp \quad \text{formula 65}$$

As with the correcting perturbation model's body horizontal position Xc, most of the body floor reaction force's vertical component Fbz is typically the third harmonic or lower, assuming the gait cycle as a reference frequency.

Therefore, if the integrator 215a of the Mpf calculator 215 has a sufficiently large gain Kc, the response speed of the closed loop system shown in FIG. 55 is sufficiently higher than the variation frequency of the first term in the right side of the formula 65. Thus, the first term in the right side of the formula 65 can be considered as a drift of the floor reaction force's horizontal component caused by the correcting perturbation model's body horizontal position Xc. Given that the drift is denoted by d1, the formula 65 can be approximated by the following formula.

$$Fp=d1+1/h*Mp \quad \text{formula 66}$$

Figure 56:
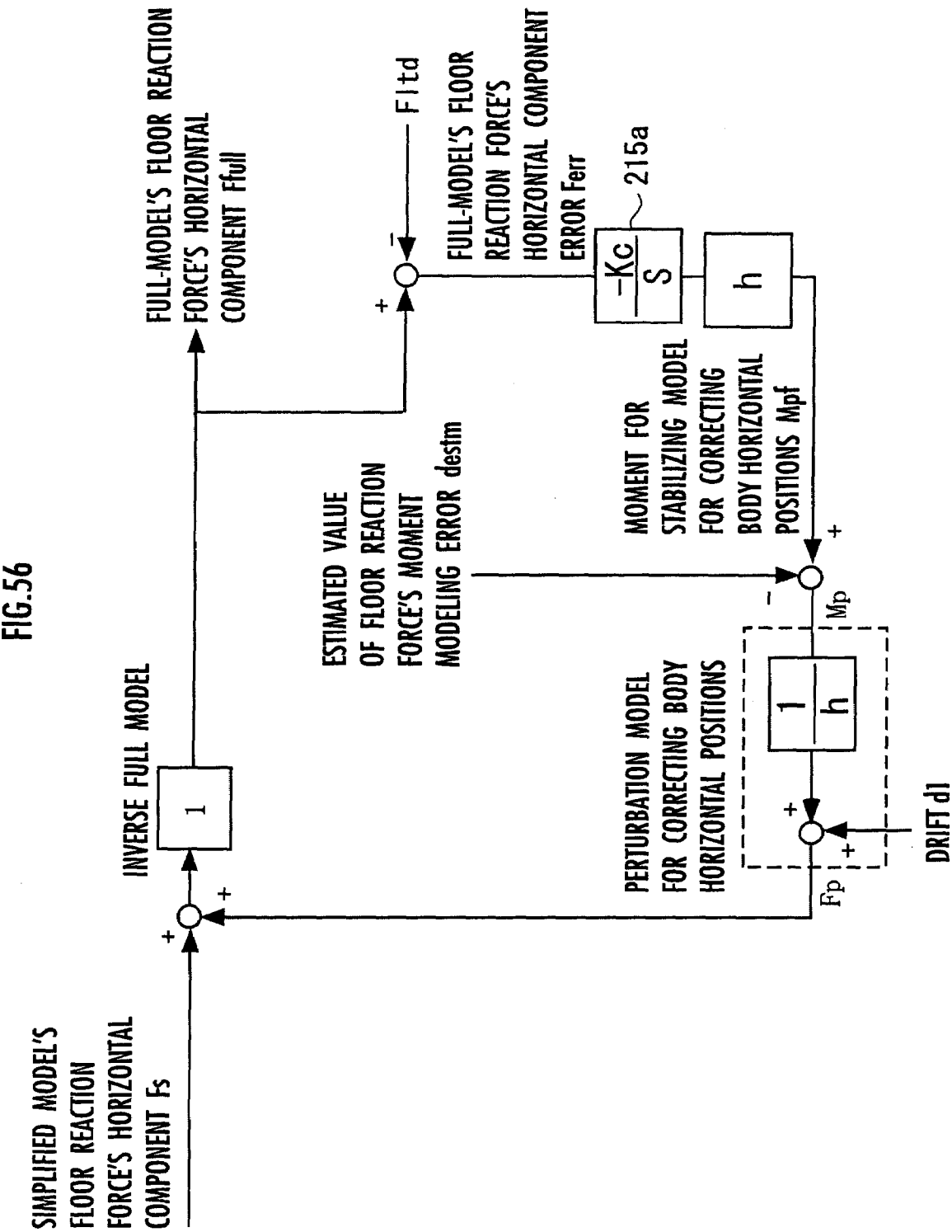

Therefore, FIG. 55 can be transformed to FIG. 56 in an approximate manner.

Now, a full-model's floor reaction force's horizontal component error Ferr is defined by the following formula.

full-model's floor reaction force's horizontal component error Ferr

=full model's floor reaction force's horizontal component Ffull–limited corrected desired floor reaction force's horizontal component Fltd   formula 67

That is, the difference between the full-model's floor reaction force's horizontal component Ffull and the limited corrected desired floor reaction force's horizontal component Fltd is defined as the full-model's floor reaction force's horizontal component error Ferr.

Figure 57:
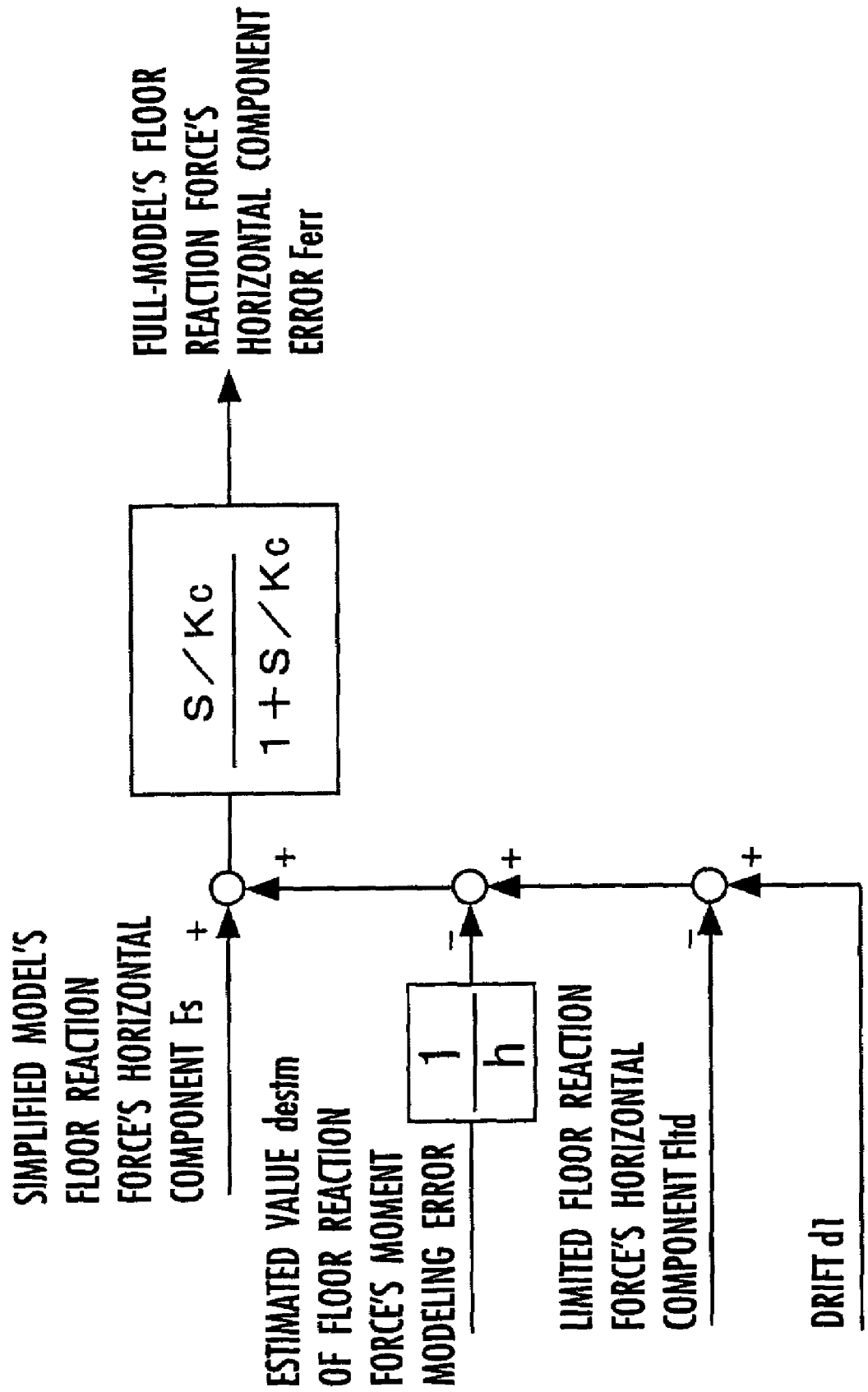

If FIG. 56 is transformed in regard to the full-model's floor reaction force's horizontal component error Ferr, FIG. 57 results.

Thus, the following formula results.

$$Ferr=S/Kc(S/Kc+1)*(Fs-1/h*destm-Fltd+d1) \quad \text{formula 68}$$

That is, the full-model's floor reaction force's horizontal component error Ferr is equivalent to (Fs−1/h*destm−Fltd+d1) having passed through a low cut filter having a cutoff frequency of Kc [rad/s].

Assuming the gait cycle as a reference frequency, most of each term in (Fs−1/h*destm−Fltd+d1) is the third harmonic or lower. Therefore, if the gain Kc is sufficiently large, the full-model's floor reaction force's horizontal component error Ferr is approximately 0.

Thus, the left side of the formula 67 equals to 0, and therefore, the full-model's floor reaction force's horizontal component Ffull substantially agrees with the limited corrected desired floor reaction force's horizontal component Fltd.

The unlimited corrected desired floor reaction force's moment Min is, according to the definition thereof, equal to the full-model's floor reaction force's moment Mfull resulting when the moment Mpf for stabilizing the perturbation model for correcting body horizontal positions agrees with the required value Mpfdmd of the moment for stabilizing the perturbation model for correcting body horizontal positions, and the moment Mrf for stabilizing the perturbation model for correcting body posture angles agrees with the required value Mrfdmd of the moment for stabilizing the perturbation model for correcting body posture angles.

Since the formula 21 always holds in the second embodiment, the value of the full-model's floor reaction force's moment Mltd in the above-described case is determined by substituting Mpfdmd and Mrfdmd for Mpf and Mrf, respectively, in the formula 21. That is, the following formula holds.

$$Mltd = Mpfdmd + Mrfdmd \quad \text{formula 69}$$

As described above, the full-model's floor reaction force's moment Mfull always substantially agrees with the limited corrected desired floor reaction force's moment Mltd. Therefore, the value of the unlimited corrected desired floor reaction force's moment, that is, the full-model's floor reaction force's moment Mfull in the above-described case is determined by the formula 13.

From FIG. 56, the approximate relation described by the following formula is derived.

$$Ffull = 1/h \cdot Mpf + Fs + d1 - 1/h \cdot destm \quad \text{formula 71}$$

If the formula 71 holds at a certain instant, at the instant, the unlimited corrected desired floor reaction force's horizontal component Fin, which is the full-model's floor reaction force's horizontal component Ffull in the case of where the moment Mpf is changed to the required value Mpfdmd of the moment for stabilizing the perturbation model for correcting body horizontal positions, is determined by the following formula.

$$Fin = 1/h \cdot Mpfdmd + Fs + d1 - 1/h \cdot destm \quad \text{formula 72}$$

Since the transfer function from Mpf to (Fs+d1−1/h*destm) includes no feedthrough term, an instantaneous change of the value Mpf to Mpfdmd has no instantaneous effect on the term (Fs+d1−1/h*destm). Therefore, the terms (Fs+d0−1/h*destm) in the formulas 71 and 72 are the same value.

Thus, eliminating the term (Fs+d1−1/h*destm) from the formulas 71 and 72 results in the formula 54.

Now, a case where both the floor reaction force's horizontal component and the horizontal component of the floor reaction force's moment are not limited, that is, a case where Fin=Fltd and Min=Mltd will be described.

Since Fin=Fltd, as can be seen from FIG. 50, the required value Mpfdmd of the moment for stabilizing the perturbation model for correcting body horizontal positions and the moment Mpf for stabilizing the perturbation model for correcting body horizontal positions are related to each other as follows.

$$Mpf = 1/(S/Kc + 1) \cdot Mpfdmd \quad \text{formula 73}$$

That is, the moment Mpf for stabilizing the perturbation model for correcting body horizontal positions equals to the required value Mpfdmd of the moment for stabilizing the perturbation model for correcting body horizontal positions that has passed through a first-order delay low-pass filter having a time constant of 1/Kc. Therefore, if the integral gain is sufficiently large, the moment Mpf for stabilizing the perturbation model for correcting body horizontal positions substantially agrees with the required value Mpfdmd of the moment for stabilizing the perturbation model for correcting body horizontal positions. Thus, the body horizontal position in the perturbation model 202 for correcting body horizontal positions can be appropriately stabilized. Thus, the body horizontal position of the corrected gait can be appropriately prevented from diverging.

A digitization according to a backward difference method results in the following formula.

$$\text{current-time } Mpf = \text{last-time } Mpf + (\Delta T/(T+\Delta T)) \cdot (Mpfdmd - \text{last-time } Mpf) \quad \text{formula 74}$$

Here, "T" denotes a time constant, and T=1/Kc.

Therefore, in particular, if the value Kc increases infinitely (if the time constant T is reduced to 0), the moment Mpf for stabilizing the perturbation model for correcting body horizontal positions precisely agrees with the required value Mpfdmd of the moment for stabilizing the perturbation model for correcting body horizontal positions.

In addition, since Fin=Fltd and Min=Mltd, considering the fact that the required value Mpfdmd of the moment for stabilizing the perturbation model for correcting body horizontal positions substantially agrees with the moment Mpf for stabilizing the perturbation model for correcting body horizontal positions as described above, the following formula holds (in an approximate manner) as can be seen from FIG. 50.

$$Mrf = Mrfdmd \quad \text{formula 75}$$

That is, the moment Mrf for stabilizing the perturbation model for correcting body posture angles exactly or substantially agrees with the required value Mrfdmd of the moment for stabilizing the perturbation model for correcting body posture angles. Thus, the body posture angle in the perturbation model 203 for correcting body posture angles can be appropriately stabilized. Thus, the body posture angle of the corrected gait can be appropriately prevented from diverging.

Finally, a case where at least one of the floor reaction force's horizontal component and the horizontal component of the floor reaction force's moment is limited, that is, a case where Fin≠Fltd or Min≠Mltd will be described.

In this case, as described earlier concerning the limiter means, the limiter means (limitation processor 211) preferentially makes the moment Mrf for stabilizing the perturbation model for correcting body posture angles agree with the required value Mrfdmd of the moment for stabilizing the perturbation model for correcting body posture angles as closely as possible. Therefore, at least the correcting perturbation model's body posture angle θc can be preferentially stabilized to the extent possible, and then, the correcting perturbation model's body horizontal position Xc can be stabilized as appropriately as possible.

As described above, according to the second embodiment, the corrected desired movement according to the simplified model gait corrected using the perturbation models 202 and 203 is input to the inverse full model 201, and the floor reaction force calculated by the inverse full model 201 is adopted as the corrected desired floor reaction force. Therefore, the corrected gait comprising the corrected desired movement (including the corrected desired body position/posture and the like) and the corrected desired floor reaction force (including the corrected desired floor reaction force's horizontal component and the corrected desired horizontal component of the floor reaction force's moment) is generated so as to satisfy the dynamical equilibrium condition (that the horizontal component of the moment applied about the desired ZMP by the resultant force of gravity and the inertial force is 0).

Furthermore, there is provided a feedback loop which includes the perturbation models 202 and 203 for correcting the body horizontal position and body posture angle, respectively, corrects the desired body horizontal position and the desired body posture angle of the simplified model gait based on the outputs of the perturbation models, and receives the manipulating quantities to be sent to the perturbation models 202 and 203 so that the limited corrected desired floor reaction force's horizontal component Fltd and the limited corrected desired floor reaction force's moment Mltd, which are output from the limiter means (limitation processor 211), agree with the corrected desired floor reaction force's horizontal component and the corrected desired horizontal component of the floor reaction force's moment, respectively. In addition, the limiter means (limitation processor 201) provides the limited corrected desired floor reaction force's horizontal component Fltd and the limited corrected desired floor reaction force's moment Mltd which don't exceed their respective allowable ranges (the floor reaction force's horizontal component allowable range and the ZMP allowable range). Therefore, the corrected desired floor reaction force's horizontal component and the corrected desired horizontal component of the floor reaction force's moment are prevented from exceeding their respective allowable ranges, and a corrected gait having a high stability margin and hardly causing slipping is provided.

In addition, there are used the control laws for determining required values of the manipulating quantities that are to be input or additionally input to the perturbation models 202 and 203 to stabilize the perturbation models 202 and 203, the limiter means provides the limited corrected desired floor reaction force's horizontal component Fltd and the limited corrected desired floor reaction force's moment Mltd which fall within their respective allowable ranges, and the manipulating quantities to be input to the perturbation models 202 and 203 are determined to be as close as possible to the required values thereof determined by the control laws. Therefore, the stability of the perturbation models 202 and 203 are enhanced, and the corrected gait is prevented from diverging.

In addition, stabilization of the body posture angle (stabilization of the perturbation model for correcting body posture angles) is given a higher priority than stabilization of the body horizontal position (stabilization of the perturbation model for correcting body horizontal positions) in the case where at least one of the limited corrected desired floor reaction force's horizontal component Fltd and the limited corrected desired floor reaction force's moment Mltd may exceed the allowable ranges if the required values of the manipulating quantities determined by the control laws themselves are input to the perturbation models 202 and 203. Therefore, the stability of the body posture angle is enhanced, and the gait is corrected to provide a more natural posture.

Now, associations of the second embodiment described above with the present invention will be described. The second embodiment is associated with the first to tenth and sixteenth to twenty-second implementations of the present invention (except for the seventeenth implementation and the implementation(s) based essentially on the seventeenth implementation. The same holds true for the following description unless the seventeenth implementation is mentioned in particular). In this case, the allowable range setting means according to the first to tenth and sixteenth to twenty-second implementations is associated with the processings in steps S030 and S036 in the flowchart in FIG. 13, and regarding the translation floor reaction force's horizontal component and the ZMP (true ZMP) as limitation-target quantities, the allowable ranges thereof are set. In addition, the provisional instantaneous value determining means according to the first to tenth and sixteenth to twenty-second implementations is associated with the processing in step S032 (calculation of the simplified model gait's instantaneous values) in the flowchart in FIG. 13. In this case, in particular, the instantaneous value of the body position/posture, the instantaneous value of the floor reaction force's horizontal position, the desired ZMP, and the instantaneous value of the horizontal component of the floor reaction force's moment about the desired ZMP (=0) are determined as provisional instantaneous values. The model calculation means according to the first to tenth and sixteenth to twenty-second implementations is associated with the processings of determining the full-model's floor reaction force's horizontal component Ffull and the full-model's floor reaction force's moment Mfull as model floor reaction force instantaneous values using the inverse full model 201, which is a dynamics model (in particular, processing of determining Mfull). In addition, the desired instantaneous value determining means according to the first to tenth and sixteenth to twenty-second implementations is associated with the processing in step S038 in the flowchart in FIG. 13. In this case, the full-model's floor reaction force's moment Mfull is equivalent to the difference between the model floor reaction force instantaneous value and the provisional instantaneous value of the desired floor reaction force. As the desired instantaneous value of the desired floor reaction force in the third implementation, the corrected desired horizontal component of the floor reaction force's moment or corrected desired floor reaction force's horizontal component in the case where the desired ZMP is the point of application is determined. However, in this case, according to the sixteenth implementation, the correcting perturbation model's body horizontal position Xc and the correcting perturbation model's body posture angle θc are additionally input to the inverse full model 201 as correction quantities for the provisional instantaneous values of the desired movement. According to the twenty-second implementation, the corrected desired horizontal component of the floor reaction force's moment and the corrected desired floor reaction force's horizontal component are obtained as outputs (model floor reaction force instantaneous value) of the inverse full model 210.

Furthermore, the second embodiment includes the perturbation model 202 for correcting body horizontal positions and the perturbation model 203 for correcting body posture angles, which are perturbation models in the fourth to tenth and eighteenth to twenty-second implementations (except for the implementation(s) based essentially on the seventeenth implementation). In this case, as perturbation model manipulating quantities, the moment Mp for the perturbation model for correcting body horizontal positions and the moment Mr for the perturbation model for correcting body posture angles are determined, and input to the perturbation models 202 and 203, thereby determining the correcting perturbation model's body horizontal position Xc and the correcting perturbation model's body posture angle θc as correction quantities for the desired movement. In addition, the output of the integrator 217a (input to the Mp calculator 214) which is determined depending on the full model's floor reaction force's moment Mfull (which is equivalent to the difference between the model floor reaction force instantaneous value and the provisional instantaneous value of the desired floor reaction force) is involved as a first manipulating quantity component of the perturbation model manipulating quantity, and the moment Mpf for stabilizing the perturbation model for correcting the body horizontal position and the moment Mrf for stabilizing the perturbation model for correcting body posture angles (which equals to Mr in the second embodiment) are involved as second manipulating quantity components of the perturbation model manipulating quantity. In addition, the required value Mpfdmd of the moment for stabilizing the perturbation model for correcting body horizontal positions and the required value Mrfdmd of the moment for stabilizing the perturbation model for correcting body posture angles are used as required values of the perturbation model manipulating quantities. In addition, as estimated values of the limitation-target quantities in the eighteenth to twentieth implementations, the unlimited corrected desired floor reaction force's moment Min and the unlimited corrected desired floor reaction force's horizontal component Fin are determined by the Min calculator 209 and the Fin calculator 210, respectively, and as limitation-target quantities having been limited, the limited corrected desired floor reaction force's moment Mltd and the limited corrected desired floor reaction force's horizontal component Fltd are determined by the limitation processor 211. Besides, the "predetermined part" of the robot according to the eighth implementation refers to the body 24 of the robot 1.

As in the first embodiment, the horizontal component of the floor reaction force's moment used in the second embodiment may be appropriately converted into a ZMP using the desired floor reaction force's vertical component.

In addition, the seventeenth implementation involves no required value for the perturbation models, and the embodiment in this case can be provided by setting both the values Mpfdmd and Mrfdmd in the second embodiment to 0. Thus, the embodiment concerning the seventeenth implementation and the implementation (s) based essentially thereon is provided. Associations of this embodiment with the seventeenth implementation or the like are the same as the associations concerning the second embodiment.

Now, a third embodiment of the present invention will be described. A correction method for a device according to the third embodiment is of a full model feedback type. Furthermore, the method uses the inverse dynamics full model (inverse full model), corrects an input of the simplified model gait and uses no perturbation model.

Figure 58:
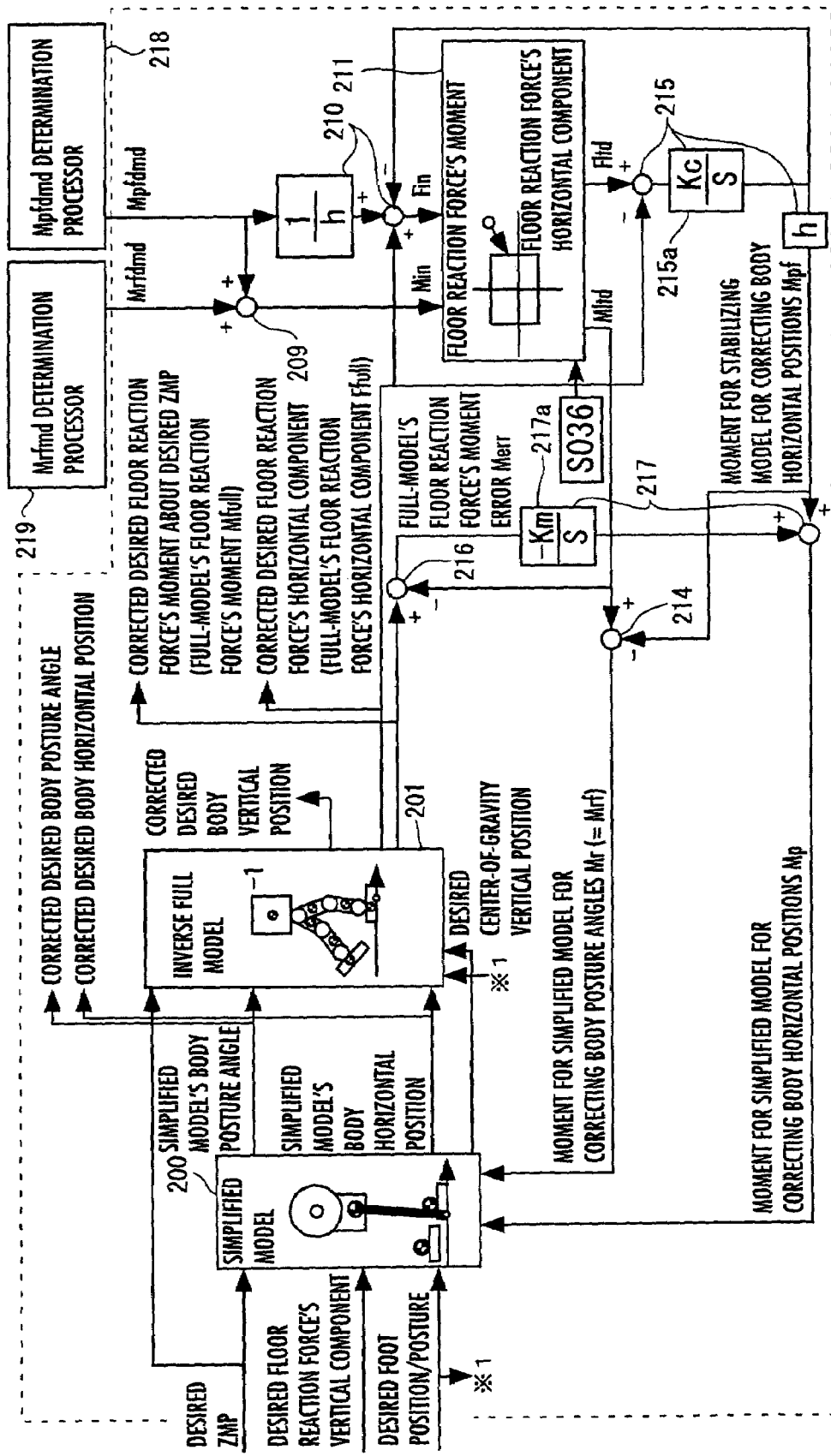
FIG. 58 is a functional block diagram showing a gait correction method according to a third embodiment of the present invention.

FIG. 58 is a functional block diagram for illustrating an operation of the device according to the third embodiment, specifically, the gait correction method in step S038 in the flowchart in FIG. 13. In FIG. 58, same functional sections as those in FIG. 50 concerning the second embodiment are assigned the same reference numerals as those in FIG. 50.

In the description of this embodiment, instead of the term "required value Mpfdmd of the moment for stabilizing the perturbation model for correcting body horizontal positions", the term "required value Mpfdmd of the body horizontal position stabilizing moment" is used. This is because this embodiment uses no perturbation model, and the moment Mpfdmd is used for stabilizing the body horizontal position of the simplified model 200. Similarly, instead of the term "required value Mrfdmd of the moment for stabilizing the perturbation model for correcting body posture angles", the term "required value Mrfdmd of the body posture angle stabilizing moment" is used. Similarly, the term "body horizontal position stabilizing moment Mpf" is used instead of the term "moment Mpf for stabilizing the perturbation model for correcting body horizontal positions", the term "body posture angle stabilizing moment Mrf" is used instead of the term "moment Mrf for stabilizing the perturbation model for correcting body posture angles", the term "simplified model's body posture angle correcting moment Mr" is used instead of the term "moment Mr for the perturbation model for correcting body posture angles", and the term "simplified model's body horizontal position correcting moment Mp" is used instead of the term "moment Mp for the perturbation model for correcting body horizontal positions".

However, the simplified model 200 shown in FIG. 58 is not simply a dynamics model but represents the process from steps S010 to S034 in FIG. 13 described above, that is, calculation (determination) of the simplified model gait's instantaneous values. In the processing of calculation (determination) of the current time gait's instantaneous values (simplified model gait's instantaneous values) in step S032, after the gait's instantaneous values are generated in such a manner that no horizontal component of the floor reaction force's moment is produced about the desired ZMP (the corrected desired horizontal component of the floor reaction force's moment is 0) as described concerning the first embodiment, a perturbation movement in the body rotation mode which causes the simplified model's body posture angle correcting moment Mr (last time value) which is equivalent to the moment Mr for the perturbation model for correcting body posture angles described concerning the second embodiment is added thereto, and a perturbation movement in the body translation mode which causes the simplified model's body horizontal position correcting moment Mp (last time value) which is equivalent to the moment Mp for the perturbation model for correcting body horizontal positions described concerning the second embodiment is added thereto. Thus, the instantaneous gait values output from the simplified model 200 are corrected.

More specifically, in the processing in step S032 in FIG. 13 according to this embodiment, in step S914 in FIG. 37 which is a subroutine processing thereof, a body horizontal acceleration (d2Xb/dt2) is determined based on an assumption that the second term in the right side is equal to Mp (last time value), that is, based on a formula represented as Mp=mf*(Zb−Zzmp)*(d2Xb/dt2), the body horizontal acceleration (d2Xb/dt2) is added to the body horizontal acceleration determined by the simplified model 200 as a perturbation component, and the resulting body horizontal acceleration is integrated two times with respect to a period from the start of the current time gait to the present time t, thereby determining the instantaneous value of the body horizontal position at the present time t. Besides, in step S914 in FIG. 37, a body posture angular acceleration (d2θb/dt2) determined based on an assumption that the seventh term in the right side of the formula a10 is equal to Mr (last time value), that is, based on a formula represented as Mr=J*d2θb/dt2 is added to the body posture angular acceleration determined by the simplified model 200 as a perturbation component, and the resulting body posture angular acceleration is integrated two times with respect to a period from the start of the current time gait to the present time t, thereby determining the instantaneous value of the body posture angle at the present time t.

In FIG. 58, the sections following the simplified model 200 are associated with the processing in step S038. The points other than the processings in steps S032 and S038 are the same as those in the first embodiment, and therefore, descriptions thereof are omitted. In the following, the processing in step S038 will be described in detail with reference to FIG. 58.

In step S038, first, as the corrected desired body horizontal position (final desired instantaneous value of the body horizontal position at the time t), the simplified model's body horizontal position corrected based on the simplified model's body horizontal position correcting moment Mp (specifically, last time value in the control cycle including the time (t−Δt)) in step S030 as described above is output. In addition, as the corrected desired body posture angle (final desired instantaneous value of the body posture angle at the time t), the simplified model's body posture angle corrected based on the simplified model's body posture angle correcting moment Mr (specifically, last time value in the control cycle including the time (t−Δt)) in step S030 as described above is output.

That is, the corrected desired body horizontal position and the corrected desired body posture angle are determined by the formulas 100 and 101, respectively.

corrected desired body horizontal position=simplified model's body horizontal position    formula 100 corrected desired body posture angle=simplified model's body posture angle    formula 101

Then, the instantaneous values of the movement variables including the desired center-of-gravity position, the desired foot position/posture and the desired arm posture for the simplified model gait determined as described above, the corrected desired body horizontal position (that is, simplified model's body horizontal position) and the corrected desired body posture angle (that is, simplified model's body posture angle), and the instantaneous value of the desired ZMP are input to the inverse dynamics full model (inverse full model) 201, thereby calculating the floor reaction force's horizontal component and the horizontal component of the floor reaction force's moment about the desired ZMP which are in balance with the movement represented by the input movement variables (that is, which are produced for the movement by the inverse full model 201). In the following, as in the second embodiment, the floor reaction force's horizontal component and the floor reaction force's moment thus calculated are referred to as a full-model's floor reaction force's horizontal component Ffull and a full-model's floor reaction force's moment Mfull, respectively.

As in the second embodiment, the full-model's floor reaction force's horizontal component Ffull and the full-model's floor reaction force's moment Mfull are output as a corrected desired floor reaction force's horizontal component (final desired instantaneous value of the floor reaction force's horizontal component at the time t) and a corrected desired horizontal component of the floor reaction force's moment (final desired instantaneous value of the horizontal component of the floor reaction force's moment at the time t), respectively.

Since the perturbation model for correcting body posture angles and the perturbation model for correcting body horizontal positions are not used in this embodiment, processings associated with the control laws for the perturbation model for correcting body horizontal positions and the perturbation model for correcting body posture angles are different from those according to the second embodiment as described later.

Except for that, after the processings, the same processings as the processings for determining the moment Mr for the perturbation model for correcting body posture angles and the moment Mp for the perturbation model for correcting body horizontal positions in the second embodiment are performed until the time to determine the simplified model's body posture angle correcting moment Mr and the simplified model's body horizontal position correcting moment Mp. That is, the Min calculator 209, the Fin calculator 210, the limitation processor 211 (limiter means), the Mpf calculator 215, the Merr calculator 216, the Mrf calculator 217 (=Mr calculation unit) and the Mp calculator 214 performs the same processings as those in the second embodiment.

The simplified model's body posture angle correcting moment Mr and the simplified model's body horizontal position correcting moment Mp are used as last time values when determining (generating) the simplified model gait's instantaneous values in the next time control cycle (time t+Δt).

The other configurations and processings are the same as those in the second embodiment.

In the following, a method of determining the required value Mrfdmd of the body posture angle stabilizing moment will be described. In this embodiment, the value Mrfdmd is determined in the Mrfdmd determinator 218 in the following manner, for example.

That is, the required value Mrfdmd of the body posture angle stabilizing moment may be determined in such a manner that the corrected desired body posture angle follows the reference body posture angle, for example, as with the control law 207 for the perturbation model for correcting body posture angles.

Alternatively, the required value Mrfdmd of the body posture angle stabilizing moment may always be set to 0. However, there is a possibility that the body posture angle diverge, and therefore, the body posture angle has to be prevented from diverging by adjusting a gait parameter (ZMPrec pattern, for example) of the next step.

Now, a method of determining the required value Mpfdmd of the body horizontal position stabilizing moment will be described. In this embodiment, the value Mpfdmd is determined in the Mpfdmd determinator 219 in the following manner, for example.

When the robot is moving, unlike the body posture angle, the simplified model's body horizontal position cannot be made to follow, or converge to, a arbitrarily set reference body position, because the dynamical equilibrium condition has to be satisfied.

Thus, at least when the robot is moving, the required value of the body horizontal position stabilizing moment Mpfdmd is always set to 0. As described above, the corrected desired horizontal component of the floor reaction force's moment about the desired ZMP substantially agrees with the required value Mpfdmd of the body horizontal position stabilizing moment, and therefore, in this case, the corrected desired horizontal component of the floor reaction force's moment about the desired ZMP is always 0. However, since the body horizontal position tends to diverge, the body horizontal position has to be prevented from diverging by adjusting a gait parameter of the next step (for example, by adjusting the ZMP correction quantity pattern described concerning FIG. 39 in such a manner that the body horizontal position is connected to that of the normal gait).

When the robot stands upright, as with the body posture angle, a reference body horizontal position may be set, and the required value Mpfdmd of the body horizontal position stabilizing moment may be determined so that the corrected desired body position converges to the reference body horizontal position.

For example, the required value Mpfdmd of the body horizontal position stabilizing moment may be determined by the following formula.

$Mpfdmd=Kpb*$(corrected desired body horizontal position−reference body horizontal position)

$+Kvb*$corrected desired body horizontal velocity    formula 110

Here, the corrected desired body velocity is a time differential value of the corrected desired body position. "Kpb" and "Kpv" denote gains.

In this embodiment, the simplified model's body horizontal position correcting moment Mp additionally input to the simplified model 200 is determined in such a manner that the full model's floor reaction force's horizontal component Ffull (=corrected desired floor reaction force's horizontal component) that is output from the inverse full model 201 doesn't exceed the floor reaction force's horizontal component allowable range for gait correction. Therefore, when determining the current time gait's instantaneous values in step S032 in FIG. 13, in the processing in step S912 in FIG. 37, the body horizontal acceleration and the body posture angular acceleration are not necessarily required to be determined so as to prevent the floor reaction force's horizontal component Fx from exceeding the floor reaction force's horizontal component allowable range. Therefore, the processing in step S912 may be performed by assuming that Fx is always equal to Fxtmp (Fx=Fxtmp) in the processing from steps S1006 to S1012 in FIG. 38.

Now, associations of the third embodiment described above with the present invention will be described. The third embodiment is associated with the twenty-third to twenty-sixth implementations of the present invention. In this case, the allowable range setting means according to the twenty-third to twenty-sixth implementations is associated with the processings in steps S030 and S036 in the flowchart in FIG. 13, and regarding the translation floor reaction force's horizontal component and the ZMP (true ZMP) as limitation-target quantities, the allowable ranges thereof are set. In addition, the desired floor reaction force provisional instantaneous value determining means according to the twenty-third to twenty-sixth implementations is associated with part of the processing in step S032 in the flowchart in FIG. 13 (specifically, processings in steps S900 and S902 in FIG. 37, that is, calculation of the instantaneous values of the desired floor reaction force's vertical component and the desired ZMP). The first model calculation means according to the twenty-third to twenty-sixth implementations is associated with the processings of determining the instantaneous values (provisional instantaneous values) of the body position/posture in steps S912 and S914 in FIG. 37 using the simplified model 200 as a first dynamics model. The second model calculation means according to the twenty-third to twenty-sixth implementations is associated with the processings of determining the full-model's floor reaction force's horizontal component Ffull and the full-model's floor reaction force's moment Mfull as model floor reaction force instantaneous values using the inverse full model 201 as a dynamics model-(in particular, processing of determining Mfull). In addition, the first model input correcting means according to the twenty-third to twenty-sixth implementations is associated with the processing in step S038 in the flowchart in FIG. 13 (except for the calculation for the inverse full model 201). In this case, the full-model's floor reaction force's moment Mfull is equivalent to the difference between the model floor reaction force instantaneous value and the provisional instantaneous value of the desired floor reaction force. In addition, the simplified model's body horizontal position correcting moment Mp and the simplified model's body posture angle correcting moment Mr are determined as correction quantities of the desired floor reaction force and additionally input to the simplified model 200, which is the first dynamics model. Then, inputs to the inverse full model 201 which is the second dynamics model (that is, outputs of the simplified model 200) are determined in terms of desired instantaneous values of the desired movement (corrected desired body horizontal position, corrected desired posture or the like) According to the twenty-fifth implementation, the corrected desired floor reaction force's moment and the corrected desired horizontal component of the floor reaction force's horizontal component, which are outputs of the inverse full model 201, are obtained as desired instantaneous values of the desired floor reaction force. Furthermore, the first correction quantity component according to the twenty-sixth implementation is the output of the integrator 217a, and the second correction quantity component is the body horizontal position stabilizing moment Mpf and the body posture angle stabilizing moment Mrf (which equals to Mr in the third embodiment). Furthermore, in the third embodiment, the required value Mpfdmd of the body horizontal position stabilizing moment and the required value Mrfdmd of the body posture angle stabilizing moment are used as required values of the correction quantities of the desired floor reaction force. In addition, as estimated values of the limitation-target quantities in the twenty-sixth implementation, the unlimited corrected desired floor reaction force's moment Min and the unlimited corrected desired floor reaction force's horizontal component Fin are determined by the Min calculator 209 and the Fin calculator 210, respectively, and as limitation-target quantities having been limited, the limited corrected desired floor reaction force's moment Mltd and the limited corrected desired floor reaction force's horizontal component Fltd are determined by the limitation processor 211.

As in the first embodiment, the horizontal component of the floor reaction force's moment used in the third embodiment may be appropriately converted into a ZMP using the desired floor reaction force's vertical component.

Figure 59:
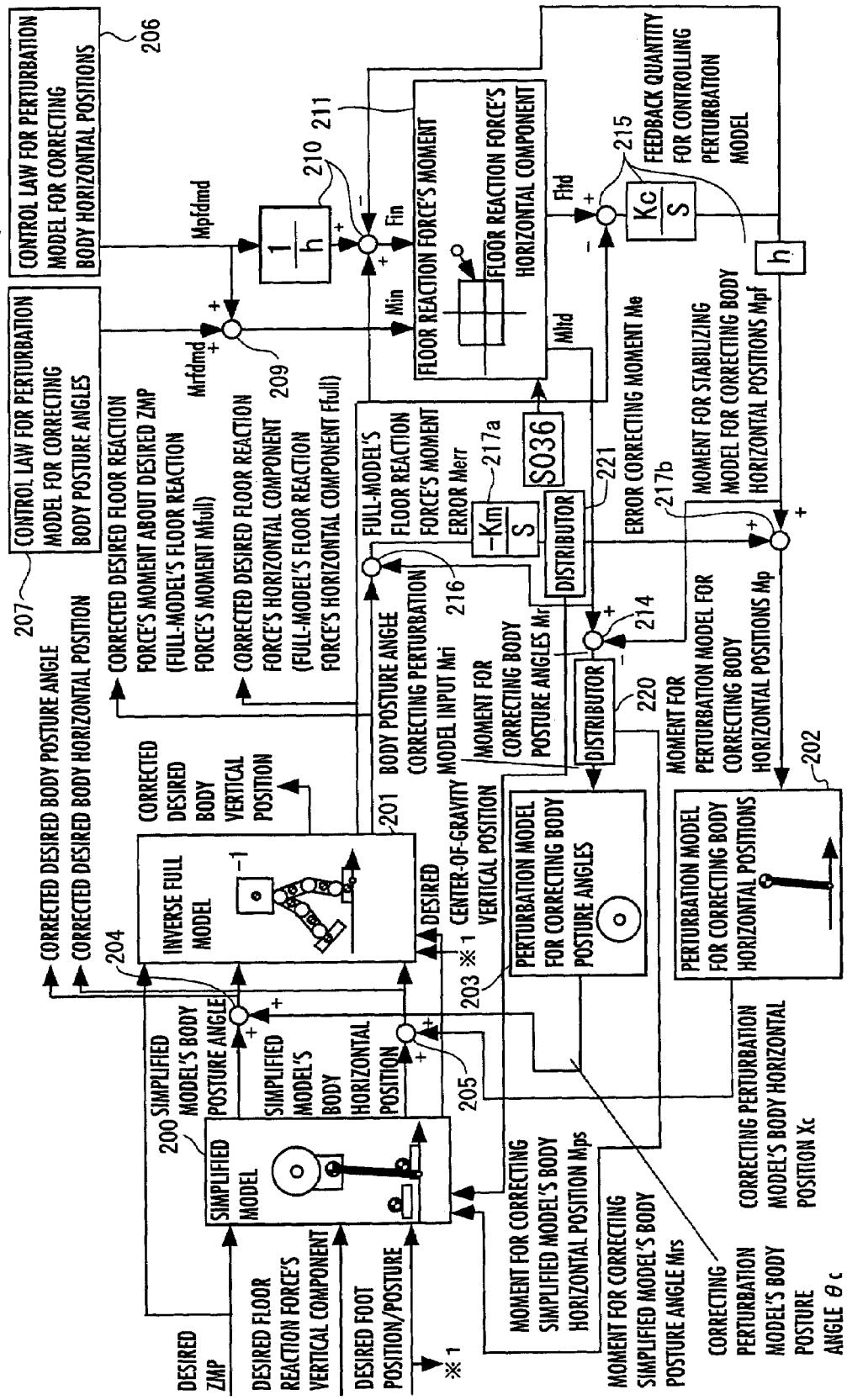
FIG. 59 is a functional block diagram showing a gait correction method according to a fourth embodiment of the present invention.

Now, a fourth embodiment of the present invention will be described. A correction method for a device according to the fourth embodiment is a combination of the methods according to the second and third embodiments. FIG. 59 is a functional block diagram for illustrating an operation of the device according to the fourth embodiment of the present invention, specifically, the gait correction method in step S038 in the flowchart in FIG. 13. In FIG. 59, same functional sections as those in the second and third embodiments are assigned the same reference numerals as those in FIGS. 57 and 58.

According to the fourth embodiment, the perturbation model 202 for correcting body horizontal positions and the perturbation model 203 for correcting body posture angles are used. In addition, two distributors 220 and 221 are used.

The distributors 220 and 221 are one-input two-output transfer blocks and determine one of the outputs according to the input (for example, determine one of the outputs by performing, on the input, a signal processing concerning frequency characteristics, dead-band characteristics, saturation characteristics or the like) and determine the other output in such a manner that the sum of the two outputs exactly or substantially agrees with the input.

The distributor 220 receives the body posture angle correcting moment Mr, which is the difference between the limited corrected desired floor reaction force's moment Mltd and the moment Mpf for stabilizing the perturbation model for correcting body horizontal positions (that is, output of the Mr calculator 214) and provides a body posture angle correcting perturbation model input Mri that is to be input to the perturbation model 203 for correcting body posture angles and a simplified model's body posture angle correcting moment Mrs that is to be input to the simplified model 200. The body posture angle correcting perturbation model input Mri and the simplified model's body posture angle correcting moment Mrs are determined (output) in such a manner that the sum of the body posture angle correcting perturbation model input Mri and the simplified model's body posture angle correcting moment Mrs agrees with the body posture angle correcting moment Mr.

More specifically, the body posture angle correcting perturbation model input Mri is determined in accordance with the body posture angle correcting moment Mr. For example, the body posture angle correcting perturbation model input Mri is determined by performing a signal processing having dead band characteristics, saturation characteristics or frequency characteristics on the body posture angle correcting moment Mr. In addition, the simplified model's body posture angle correcting moment Mrs is determined by subtracting the body posture angle correcting perturbation model input Mri from the body posture angle correcting moment Mr. More specifically, according to this embodiment, the distributor 220 outputs a low-frequency component (direct-current component) obtained by passing the input (body posture angle correcting moment Mr) through a low-pass filter as the simplified model's body posture angle correcting moment Mrs and outputs a component obtained by subtracting Mrs from the input (body posture angle correcting moment Mr) as the body posture angle correcting perturbation model input Mri, for example. In this case, the simplified model's body posture angle correcting moment Mrs, which is a low-frequency component (direct-current component), has dead band characteristics, so that the moment Mrs is kept at a predetermined value (0, for example) if the output of the low-pass filter falls within a predetermined range centered on the predetermined value.

The body posture angle correcting perturbation model input Mri output from the distributor 220 is input to the perturbation model 203 for correcting body posture angles, and the perturbation model 203 for correcting body posture angles determines the correcting perturbation model's body posture angle θc.

The simplified model's body posture angle correcting moment Mrs, which is the other output of the distributor 220, is input to the simplified model 200. This is equivalent to input of the simplified model's body posture angle correcting moment Mr to the simplified model 200 in the third embodiment shown in FIG. 58.

To the distributor 221, a value obtained by multiplying the full-model's floor reaction force's moment error Merr by the gain Km, integrating the resulting value by the integrator 217a, and inverting the sign of the resulting value is input. The input is equivalent to a value obtained by inverting the sign of the estimated floor reaction force's moment modeling error value destm described concerning the second embodiment.

As with the distributor 220, the distributor 221 separates the input into a simplified model's body horizontal position correcting moment Mps that is to be input to the simplified model 200 and an error correcting moment Me that is to be input to the perturbation model 202 for correcting body horizontal positions. More specifically, the error correcting moment Me is determined in accordance with the output of the integrator 217a. For example, the error correcting moment Me is determined by performing a signal processing having dead band characteristics, saturation characteristics or frequency characteristics on the output of the integrator 217a (input to the distributor 220). In addition, the simplified model's body horizontal position correcting moment Mps is determined by subtracting the error correcting moment Me from the output of the integrator 217a. More specifically, according to this embodiment, the distributor 221 outputs a low-frequency component (direct-current component) obtained by passing the input (output of the integrator 217a) through a low-pass filter as the simplified model's body horizontal position correcting moment Mps and outputs a component obtained by subtracting Mps from the input (output of the integrator 217a) as the error correcting moment Me, for example. In this case, the simplified model's body horizontal position correcting moment Mps, which is a low-frequency component (direct-current component), has dead band characteristics, so that the moment Mps is kept at a predetermined value (0, for example) if the output of the low-pass filter falls within a predetermined range centered on the predetermined value.

The moment Mp for the perturbation model for correcting body horizontal positions is determined by the Mp calculator 217b adding the moment Mpf for stabilizing the perturbation model for correcting body horizontal positions to the error correcting moment Me, which is an output of the distributor 221. The moment Mp for the perturbation model for correcting the body horizontal position is input to the perturbation model 202 for correcting body horizontal positions, and the perturbation model 202 for correcting body horizontal positions determines the correcting perturbation model's body horizontal position Xc.

The simplified model body horizontal position correcting moment Mps, which is the other output of the distributor 221, is input to the simplified model 200. This is equivalent to input of the simplified model's body horizontal position correcting moment Mp to the simplified model 200 in the third embodiment shown in FIG. 58.

As in the third embodiment, in calculation (determination) of simplified model gait instantaneous values, the simplified model 200 first generates the gait's instantaneous values in such a manner that no horizontal component of the floor reaction force's moment is produced about the desired ZMP, and then, corrects the gait's instantaneous values by adding thereto a perturbation movement in the body rotation mode which causes the simplified model's body posture angle correcting moment Mrs (last time value) and adding thereto a perturbation movement in the body translation model which causes the simplified model's body horizontal position correcting moment Mps (last time value).

The other configurations and processings are the same as those in the second or third embodiment. More specifically, the processings by the calculators 204, 205, the Merr calculator 216, the control law 207 for the perturbation model for correcting body posture angles, the control law 206 for the perturbation model for correcting body horizontal positions, the Min calculator 209, the Fin calculator 210, the limitation processor 211 and the Mpf calculator 215 are the same as those in the second embodiment.

In this embodiment, as in the third embodiment described above, when determining the current time gait's instantaneous values in step S032 in FIG. 13, in the processing in step S912 in FIG. 37, the body horizontal acceleration and the body posture angular acceleration are not necessarily required to be determined so as to prevent the floor reaction force's horizontal component Fx from exceeding the floor reaction force's horizontal component allowable range. Therefore, the processing in step S912 may be performed by assuming that Fx is always equal to Fxtmp (Fx=Fxtmp) in the processing from steps S1006 to S1012 in FIG. 38.

Since the sum of the outputs agrees with the input in the distributors 220, 221, as in the second embodiment, the corrected desired horizontal component of the floor reaction force's moment (full-model's floor reaction force's moment Mfull) agrees with the limited corrected desired floor reaction force's moment Mltd, and the corrected desired floor reaction force's horizontal component (full-model's floor reaction force's horizontal component) agrees with the limited corrected desired floor reaction force's horizontal component Fltd. Therefore, the limiter means (limitation processor 211) applies limitations to the limited corrected desired floor reaction force's moment Mltd and the limited corrected desired floor reaction force's horizontal component Fltd to prevent them from exceeding their respective allowable ranges, thereby generating an appropriate gait (corrected gait) that does not exceed the allowable range, as in the first to third embodiments.

One of the outputs of each of the distributors 220, 221 may be set to 0, and the other be made to agree with the input.

If the simplified model's body posture angle correcting moment Mrs output from the distributor 220 is set to 0, and the simplified model's body horizontal position correcting moment Mps output from the distributor 221 is set to 0, the same effect as in the second embodiment can be provided (substantially the same configuration as in the second embodiment is provided).

If the body posture angle correcting perturbation model input Mri output from the distributor 220 is set to 0, and the error correcting moment Me output from the distributor 221 is set to 0, the same effect as in the third embodiment can be provided (substantially the same configuration as in the third embodiment is provided).

That is, the system according to the fourth embodiment includes the systems according to the second and third embodiments.

Alternatively, the simplified model's body posture angle correcting moment Mrs output from the distributor 220 may be set to 0, and the error correcting moment Me output from the distributor 221 be set to 0. In this case, the perturbation model for correcting body posture angles can be omitted.

Alternatively, the body posture angle correcting perturbation model input Mri output from the distributor 220 may be set to 0, and the simplified model's body horizontal position correcting moment Mps output from the distributor 221 be set to 0.

Alternatively, the sum of the error correcting moment Me and the moment Mpf for stabilizing the perturbation model for correcting body horizontal positions may be input to a third distributor (not shown), and one of the outputs of the third distributor may be input to the perturbation model for correcting body horizontal positions, and the other output may be added to the simplified model's body horizontal position correcting moment Mps. In this case, the simplified model's body horizontal position correcting moment Mps output from the distributor 221 may be set to 0. That is, the distributor 221 may be omitted, and a value obtained by multiplying the full-model's floor reaction force's moment error Merr by the gain Km, integrating the resulting value, inverting the sign of the resulting value and adding the resulting value to the moment Mpf for stabilizing the perturbation model for correcting body horizontal positions may be input to the third distributor.

Now, associations of the fourth embodiment described above with the present invention will be described. The fourth embodiment is associated with the twenty-third to twenty-fifth and twenty-seventh to thirty-ninth implementations of the present invention (except for the thirty-fifth implementation and the implementation(s) based essentially on the thirty-fifth implementation. The same holds true for the following description unless the thirty-fifth implementation is mentioned in particular). In this case, the allowable range setting means according to the twenty-third to twenty-fifth and twenty-seventh to thirty-ninth implementations is associated with the processings in steps S030 and S036 in the flowchart in FIG. 13, and regarding the translation floor reaction force's horizontal component and the ZMP (true ZMP) as limitation-target quantities, the allowable ranges thereof are set. In addition, the desired floor reaction force provisional instantaneous value determining means according to the twenty-third to twenty-fifth and twenty-seventh to thirty-ninth implementations is associated with part of the processing in step S032 in the flowchart in FIG. 13 (specifically, processings in steps S900 and S902 in FIG. 37, that is, calculation of the instantaneous values of the desired floor reaction force's vertical component and the desired ZMP). The first model calculation means according to the twenty-third to twenty-fifth and twenty-seventh to thirty-ninth implementations is associated with the processings of determining the instantaneous values (provisional instantaneous values) of the body position/posture in steps S912 and S914 in FIG. 37 using the simplified model 200 as a first dynamics model. The second model calculation means according to the twenty-third to twenty-fifth and twenty-seventh to thirty-ninth implementations is associated with the processings of determining the full-model's floor reaction force's horizontal component Ffull and the full-model's floor reaction force's moment Mfull as model floor reaction force instantaneous values using the inverse full model 201, which is a second dynamics model (in particular, processing of determining Mfull). In addition, the first model input correcting means according to the twenty-third to twenty-fifth and twenty-seventh to thirty-ninth implementations is associated with the processing in step S038 in the flowchart in FIG. 13 (except for the calculation for the inverse full model 201). In this case, the full-model's floor reaction force's moment Mfull is equivalent to the difference between the model floor reaction force instantaneous value and the provisional instantaneous value of the desired floor reaction force. In addition, the simplified model's body horizontal position correcting moment Mps and the simplified model's body posture angle correcting moment Mrs are determined as correction quantities of the desired floor reaction force and additionally input to the simplified model 200, which is the first dynamics model. Then, inputs to the inverse full model 201 which is the second dynamics model are determined in terms of desired instantaneous values of the desired movement (corrected desired body horizontal position, corrected desired posture or the like). According to the twenty-fifth implementation, the corrected desired horizontal component of the floor reaction force's moment and the corrected desired floor reaction force's horizontal component, which are outputs of the inverse full model 201, are obtained as desired instantaneous values of the desired floor reaction force. Furthermore, as the processing by the second model input correcting means according to the twenty-seventh implementation, the correcting perturbation model's body horizontal position Xc and the correcting perturbation model's body posture angle θc are determined and additionally input to the inverse full model 201, which is the second dynamics model, as correction quantities for the desired movement.

According to the fourth embodiment, the perturbation model 201 for correcting the body horizontal position and the perturbation model 203 for correcting body posture angles are used as perturbation models according to the twenty-eighth and twenty-ninth implementations, and the distributors 220 and 221 are used as distribution means. As floor reaction force manipulating quantities to be input to the distributors 220 and 221, the output of the integrator 217a and the body posture angle correcting moment Mr are used. In addition, as required values of the floor reaction force manipulating quantities according to the twenty-ninth and thirtieth implementations, the required value Mpfdmd of the body horizontal position stabilizing moment and the required value Mrfdmd of the body posture angle stabilizing moment are used. Furthermore, according to the thirty-sixth implementation, in particular, the output of the integrator 217a is used as a first manipulating quantity component of the floor reaction force manipulating quantity, and the moment Mpf for stabilizing the perturbation model for correcting body horizontal positions and the moment Mrf for stabilizing the perturbation model for correcting body posture angles (which is equal to the body posture angle correcting moment Mr input to the distributor 220 in the fourth embodiment) are used as a second manipulating quantity component.

The first correction quantity component according to the twenty-sixth implementation corresponds to the output of the integrator 217a, and the second correction quantity component corresponds to the body horizontal position stabilizing moment Mpf and the body posture angle stabilizing moment Mrf (which equals to Mr in the fourth embodiment). Furthermore, in the fourth embodiment, the required value Mpfdmd of the body horizontal position stabilizing moment and the required value Mrfdmd of the body posture angle stabilizing moment are used as required values of the correction quantities of the desired floor reaction force. In addition, as estimated values of the limitation-target quantities in the twenty-sixth implementation, the unlimited corrected desired floor reaction force's moment Min and the unlimited corrected desired floor reaction force's horizontal component Fin are determined by the Min calculator 209 and the Fin calculator 210, respectively, and as limitation-target quantities having been limited, the limited corrected desired floor reaction force's moment Mltd and the limited corrected desired floor reaction force's horizontal component Fltd are determined by the limitation processor 211. Besides, the "predetermined part" of the robot according to the thirty-second implementation refers to the body 24 of the robot 1.

The horizontal component of the floor reaction force's moment used in the fourth embodiment may be appropriately converted into a ZMP using the desired floor reaction force's vertical component, as in the first embodiment.

In addition, the thirty-fifth implementation involves no required value of the floor reaction force manipulating quantity, and the embodiment in this case can be provided by setting both the values Mpfdmd and Mrfdmd in the fourth embodiment to 0. Thus, the embodiment concerning the thirty-fifth implementation and the implementation(s) based essentially thereon is provided. Associations of this embodiment with the thirty-fifth implementation or the like are the same as the associations concerning the fourth embodiment.

Figure 60:
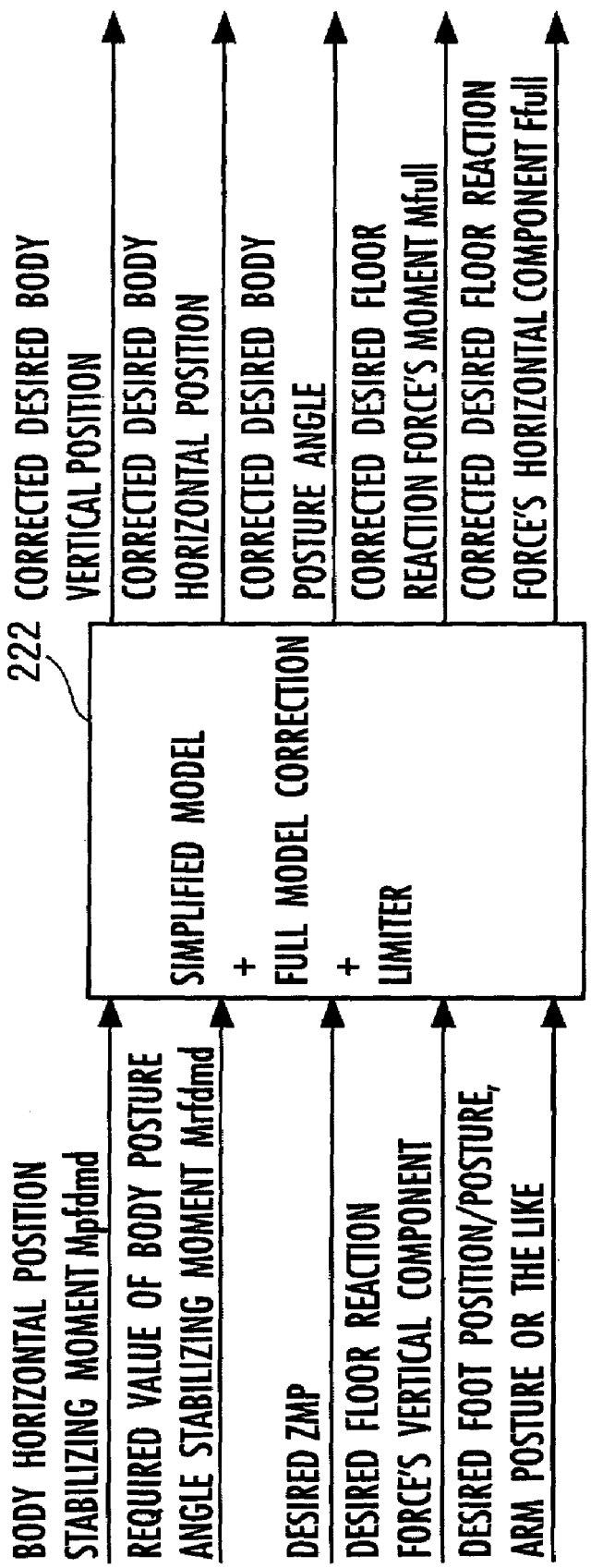
FIG. 60 is a diagram for illustrating a forward dynamics model according to a fifth embodiment of the present invention.

Now, a fifth embodiment of the present invention will be described. In the functional block diagram (FIG. 58) for illustrating the gait correction method according to the third embodiment, the part defined by the dotted line (part excluding the Mrfdmd determination processor 219 and the Mpfdmd determination processor 218) constitutes a forward dynamics full model which receives the required value Mpfdmd of the body horizontal position stabilizing moment, the required value Mrfdmd of the body posture angle stabilizing moment, the desired ZMP, the desired floor reaction force's vertical component, the desired foot position/posture, and a movement state of another part, such as the desired arm posture, and outputs the corrected desired body vertical position, the corrected desired body horizontal position, the corrected desired body posture angle, the corrected desired horizontal component of the floor reaction force's moment (about the desired ZMP) and the corrected desired floor reaction force's horizontal component. Thus, this model is referred to as a pseudo forward dynamics full model and denoted by reference numeral 222. The pseudo forward dynamics full model 222 (that is, the part defined by the dotted line in FIG. 58) is represented as a functional block having an input/output relationship as shown in FIG. 60.

A gait correction method of a device according to the fifth embodiment uses the pseudo forward dynamics full model 222, rather than the inverse dynamics full model (inverse full model) 201 used in the first to fourth embodiments, as a forward dynamics full model.

Figure 61:
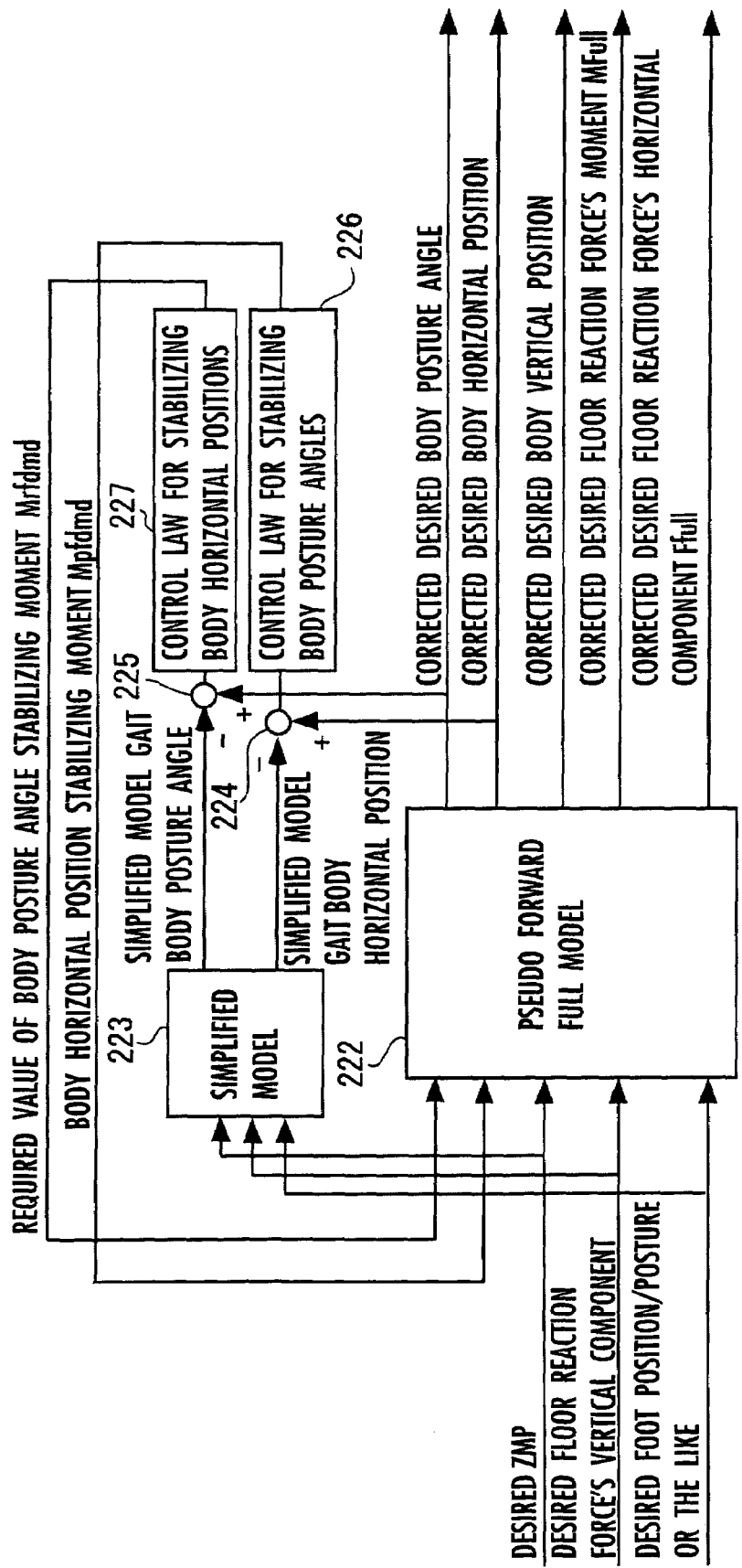
FIG. 61 is a functional block diagram showing a gait correction method according to the fifth embodiment of the present invention.

FIG. 61 is a functional block diagram for illustrating an operation of the device according to the fifth embodiment, specifically, the gait correction method in step S038 in the flowchart in FIG. 13. A simplified model 223 shown in FIG. 61 is a second simplified model which is different from the simplified model 200 in the pseudo forward dynamics full model 222 according to this embodiment. The second simplified model 223, which has the same function as the simplified model 200 described above in this embodiment, is not simply a dynamics model but represents the process from steps S010 to S034 in FIG. 13 described above, that is, calculation (determination) of the simplified model gait's instantaneous values. Therefore, in FIG. 61, the sections other than the simplified model 223 are associated with the processing in step S038. In actual, the simplified model 223 is required only to determine the instantaneous values of the body posture angle and the body horizontal position, and is not necessarily required to perform all the processings from step S010 to step S034 in FIG. 34.

In the fifth embodiment, the points other than the processing in step S038 are the same as those in the first embodiment, and therefore, descriptions thereof are omitted. In the following, the processing in step S038 will be described in detail with reference to FIG. 61.

In the fifth embodiment, as shown in FIG. 61, the gait generation device 100 has the pseudo forward dynamics full model 222 and the second simplified model 223, and the differences of body horizontal position and body posture angle between a gait generated using the second simplified model 223 and a gait calculated using the pseudo forward dynamics full model 222 are determined by the calculators 224 and 225. Then, in accordance with the differences, the required value Mpfdmd of the body horizontal position stabilizing moment and the required value Mrfdmd of the body posture angle stabilizing moment are determined according to a feedback control law, such as PID, in such a manner that these differences converge to 0. That is, according to the control law 226 for stabilizing the body horizontal position, which is a feedback control law, the value Mpfdmd is determined in accordance with the difference between the body horizontal position determined by the simplified model 223 and the body horizontal position determined by the pseudo forward full model 222. Furthermore, according to the control law 227 for stabilizing the body posture angle, which is a feedback control law, the value Mrfdmd is determined in accordance with the difference between the body posture angle determined by the simplified model 223 and the body posture angle determined by the pseudo forward full model 222. Then, the determined values Mpfdmd and Mrfdmd are fed back to the pseudo forward dynamics full model and input thereto. That is, instead of the outputs of the Mpfdmd determining processor 218 and the Mrfdmd determining processor 219 according to the third embodiment shown in FIG. 58, the output (Mpfdmd) of the control law 226 for stabilizing the body horizontal position and the output (Mrfdmd) of the control law 227 for stabilizing the body posture angle, respectively, are input to the pseudo forward full model 222 represented by the part defined by the dotted line in FIG. 58.

Furthermore, as the final desired instantaneous values for the current time gait, the gait generation device 100 outputs the desired ZMP, the desired floor reaction force's vertical component, the desired foot position/posture, the desired arm posture and the like, which are inputs to the pseudo forward dynamics full model 222, and the corrected desired body vertical position, the corrected desired body horizontal position, the corrected desired body posture angle, the corrected desired floor reaction force's horizontal component and the corrected desired horizontal component of the floor reaction force's moment, which are outputs from the pseudo forward dynamics full model.

Now, associations of the fifth embodiment described above with the present invention will be described. The fifth embodiment is associated with the fortieth and forty-first implementations of the present invention. While the fifth embodiment is associated with the forty-second implementation, this will be described later. The allowable range setting means according to the fortieth and forty-first implementations is associated with the processings in steps S030 and S036 in the flowchart in FIG. 13, and, regarding the translation floor reaction force's horizontal component and the ZMP (true ZMP) as limitation-target quantities, the allowable ranges thereof are set. In addition, the desired floor reaction force provisional instantaneous value determining means according to the fortieth and forty-first implementations is associated with part of the processing in step S032 in the flowchart in FIG. 13 (specifically, processings in steps S900 and S902 in FIG. 37, that is, calculation of the instantaneous values of the desired floor reaction force's vertical component and the desired ZMP). In addition, the second model calculation means according to the fortieth and forty-second implementations is associated with the calculation for the pseudo forward full model 222 in FIG. 61 described above, that is, the processing performed by the section defined by the dotted line in FIG. 58 described concerning the third embodiment. In addition, the first model calculation means according to the fortieth and forty-second implementations is associated with the processing of the simplified model 223 in FIG. 61 described above. Both the models 222 and 223 output the body posture angle and the body horizontal position as the provisional instantaneous values for the desired movement. Since the pseudo forward full model 222 performs the processing for the part defined by the dotted line in FIG. 58 described concerning the third embodiment, the horizontal component of the floor reaction force's moment and the floor reaction force's horizontal component output from the pseudo forward full model 222 fall within their respective allowable ranges. In addition, the manipulating quantity calculation means according to the fortieth and forty-first implementations is associated with the processings of the control law 227 for stabilizing the body posture angle and the control law 226 for stabilizing the body horizontal position in FIG. 61 described above, and according to the control laws 227 and 226, the required value Mrfdmd of the body posture angle stabilizing moment and the required value Mpfdmd of the body horizontal position stabilizing moment are determined as floor reaction force manipulating quantities. Furthermore, the model input correcting means according to the fortieth and forty-first implementations is associated with additional input of the values Mrfdmd and Mpfdmd to the pseudo forward full model 222, which is a second dynamics model, in the fifth embodiment. Besides, the "predetermined part" of the robot according to the forty-first implementation refers to the body 24 of the robot 1.

In the fifth embodiment, the value Mpfdmd is determined using the body horizontal position. However, the value Mpfdmd may be determined by bringing close to 0 the difference between the centers of gravity of the robot 1 determined by the pseudo forward full model 222 and the simplified model 223 according to a feedback control law, such as a PI control law. In addition, the horizontal component of the floor reaction force's moment used in the fifth embodiment may be appropriately converted into a ZMP using the desired floor reaction force's vertical component, as in the first embodiment.

Furthermore, the fifth embodiment is associated with the forty-second implementation of the present invention. The forty-second implementation is based essentially on the twenty-sixth implementation associated with the third embodiment, and the third model calculation means according to the forty-second implementation is associated with the processing of the simplified model 223 in FIG. 61 described above. And, the values Mrfdmd and Mpfdmd determined by the control law 227 for stabilizing the body posture angle and the control law 226 for stabilizing the body horizontal position, respectively, are used as required value in the forty-second implementation.

Besides the fifth embodiment, there are various types of methods using the forward dynamics full model (forward full model), such as one previously proposed by the applicants in Japanese Patent Application No. 2001-122621. If, for each of these methods, the full model is replaced with the pseudo forward dynamics full model, and a control law for stabilizing the body posture angle is additionally provided, there can be provided a full model correction method which takes the ZMP allowable range and the floor reaction force's horizontal component allowable range into consideration.

Generally speaking, a method using a forward dynamics full model is such a method that uses a forward dynamics full model and a simplified model and determines the differences of body horizontal position and/or body posture angle between the gaits generated using the simplified model and the forward dynamics full model. Then, based on at least one of the determined differences, a manipulating quantity is determined so as to make the difference converge to 0, the manipulating quantity is fed back (input) to at least one of the simplified model and the forward dynamics full model, and a gait containing the input and output of the forward dynamics full model is generated as a corrected gait.

As the pseudo forward full model 222, instead of the full model gait generation device (gait correction method) according to the third embodiment, one according to another embodiment may be used. However, in the case where the perturbation models 202 and 203 are used (first, second and fourth embodiments), there is a possibility that displacements in the perturbation models 202 and 203 be excessive. In such a case, each time generation of a gait for one step (current time gait) is completed, the displacements in the perturbation models 202 and 203 may be added to the simplified model 200 to initialize the perturbation models 202 and 203.

In addition, the manipulating quantity (required value Mpfdmd of the body horizontal position stabilizing moment or manipulating quantity to be fedback to the simplified model 200) may be determined based on the difference of center-of-gravity horizontal position, rather than the difference of body horizontal position. Alternatively, the manipulating quantity may be determined based on both the difference of body horizontal position and the difference of center-of-gravity horizontal position.

As a dynamics model of the robot 1 for determining the normal gait parameters for generating the simplified model gait, determining the current-time gait parameters or generating the instantaneous values for the current time gait (that is, a process of receiving a variable concerning the floor reaction force, such as the desired ZMP and generating a body position or posture that satisfies the dynamical equilibrium condition or a limitation condition concerning the allowable value of the floor reaction force's horizontal component or the like), the pseudo forward dynamics full model may be used. In this case, if the required value Mpfdmd of the moment for stabilizing the body horizontal position is set to 0, the horizontal component of the moment about the desired ZMP is 0.

This allows the instantaneous values for the gait at each point in time that satisfy the dynamical equilibrium condition and the limitation condition to be calculated without using a searching method, and thus, the amount of calculation is reduced significantly.

One of the floor reaction force's horizontal component allowable range and the ZMP allowable range may be neglected or eliminated (that is, the allowable range and the processing in the limitation processor 211 related to the allowable range may be omitted), or one of the allowable ranges may be set so wide that it can substantially be neglected.

Furthermore, the allowable ranges may be varied with the condition of the floor surface or the gait mode.

For example, when the robot walks on a slippery floor surface, the floor reaction force horizontal allowable range is set narrow, and the ZMP allowable range is set wide or neglected, thereby generating a gait that avoids slipping.

Besides, when the robot ascends (descends) stairs with a narrow depth or walks on tiptoe (with a small floor-contact surface), the floor reaction force's horizontal component allowable range is set wide or neglected, and the ZMP allowable range is set narrow, thereby generating a gait having a high stability margin.

When the robot runs, as in the embodiments described above, the floor reaction force's horizontal component allowable range has to be appropriately set in accordance with the floor reaction force's vertical component.

According to the detailed description of the limiter means (limitation processor 211), in the embodiments described above, the ZMP allowable range is set separately for the back-and-forth direction (X-axis direction) and the sideward direction (Y-axis direction) for the simplicity of calculation. However, if the ZMP allowable range is represented by relational formulas for the back-and-forth direction (X-axis direction) and the sideward direction in accordance with the supporting polygon, a more appropriate gait with a higher stability margin can be generated. For example, the ZMP allowable range may be represented by simultaneous inequalities comprising one or more inequalities as follows.

$$a11*X \text{ component of ZMP} + a12*Y \text{ component of ZMP} + a13 \geq 0$$

$$a21*X \text{ component of ZMP} + a22*Y \text{ component of ZMP} + a23 \geq 0 \quad \text{formula 300}$$

In this formula, characters a11 and the like denote constants.

Accordingly, the allowable range of the horizontal component of the floor reaction force's moment for the corrected gait is represented by simultaneous inequalities, instead of the formula 33.

Furthermore, in the embodiments described above, the floor reaction force's horizontal component allowable range is also set separately for the back-and-forth direction (X-axis direction) and the sideward direction (Y-axis direction) for the simplicity of calculation. However, again, if the floor reaction force's horizontal component allowable range is represented by relational formulas for the back-and-forth direction and the sideward direction, a gait that avoids slipping can be generated.

For example, the allowable range may be a so-called friction circle as described by the following formula.

(X component of floor reaction force's horizontal component)*(X component of floor reaction force's horizontal component)

+(Y component of floor reaction force's horizontal component)* (Y component of floor reaction force's horizontal component)

$$\leq (ka*\mu*Fz)*(ka*\mu*Fz) \quad \text{formula 301}$$

Here, Fz denotes the desired floor reaction force's vertical component, μ denotes a friction coefficient, and ka denotes a positive constant equal to or smaller than 1.

However, in the case where the ZMP allowable range and the floor reaction force's horizontal component allowable range are represented by the relational formulas for the back-and-forth direction and the sideward direction as described above, the movement on the sagittal plane and the movement on the lateral plane have to be determined in parallel so as to satisfy the allowable ranges simultaneously or alternately.

In gait generation using the simplified model 200, the floor reaction force's horizontal component allowable range may be neglected or set so wide that it can substantially be neglected. In this case, there is no need to vary the body posture angle to avoid exceeding the floor reaction force's horizontal component allowable range, and thus, the desired body posture angle generated can be kept agreeing with the reference body posture angle (target of convergence of the desired body posture angle). This prevents the behavior of the body posture angle from being complicated, and therefore, the behavior can be readily predicted, and the gait parameters (not diverging) that assure gait generation using the simplified model 200 and continuous stability of the gait can be readily determined. The simplified model gait generated in this way may be an unstable one that doesn't adequately satisfy the dynamical equilibrium condition or one that easily causes slipping. However, as described above, the gait can be corrected using the full model 201 or 222 to provide a gait with a higher stability margin that avoids slipping.

Furthermore, when the floor reaction force's vertical component is small, the simplified model 200 may be adapted to primarily satisfy the floor reaction force's horizontal component allowable range, neglecting the desired ZMP. For example, for the floating period in the running gait, the gait may be generated by assuring simply that the total center-of-gravity horizontal acceleration is 0, neglecting the floor reaction force's moment about the desired ZMP.

As in the embodiments described above, the simplified model gait generated in this way can also be corrected using the full model 201 or 222 to provide a gait with a higher stability margin which avoids slipping.

For the perturbation model 202 for correcting body horizontal positions, the translation force's vertical component of the resultant force of gravity and the inertial force applied to the legs 2, 2 can be approximated by gravity applied to the legs 2, 2, neglecting the inertial force applied thereto.

In the embodiments described above, the body material particle for the perturbation model 202 for correcting body horizontal positions makes a vertical movement in accordance with the body floor reaction force's vertical component Fbz. However, the vertical position of the body material particle may be approximated by a constant height by neglecting the vertical movement of the body material particle. This is because, in running, the variation of (vertical) distance between the body position and the floor is typically 10% or lower. However, in this case also, the behavior of the perturbation model 202 for correcting body horizontal positions is preferably determined assuming that a virtual vertical constraint force in balance with the body floor reaction force's vertical component Fbz is applied to the body material particle in the perturbation model 202 for correcting body horizontal positions.

In the process of generating the simplified model gait according to the embodiments described above, the body posture restoring moment ZMP-converted value ZMPrec, which is the ZMP-converted value of the body posture restoring moment that produces the body posture angle acceleration for returning the body posture angle to its initial value, is generated. However, the algorithm for calculating the moment may be used as the control law for the perturbation model for correcting body posture angles, and the calculated moment may be used as the required value Mrfdmd of the body posture angle stabilizing moment.

Incidentally, the body posture restoring moment or the body posture restoring moment ZMP-converted value (ZMPrec) is generated in a pattern of a previously determined function (time function), such as a trapezoidal pattern as described above, when the floor reaction force's horizontal component allowable range and the ZMP allowable range (allowable range of the horizontal component of the floor reaction force's moment) are sufficiently wide. Therefore, the body posture restoring moment or the body posture restoring moment ZMP-converted value is used, as it is, as the moment Mrf for stabilizing the perturbation model for correcting body posture angles (body posture angle stabilizing moment Mrf) without being limited by the limiter means and serves to vary the body posture angular acceleration of the simplified model. In addition, unlike normal linear feedback, convergence of the body posture angle doesn't take infinite time, and by generating an appropriate ZMPrec pattern, the body posture angle can be settled to a reference or desired body posture angle in a finite time.

As for the control law for the perturbation model for correcting body horizontal positions, as with the determination of the body posture restoring moment in the generation process of the simplified model gait described above, the required value Mpfdmd of the moment for stabilizing the body horizontal position may be generated in a pattern of a previously determined function (time function), such as a trapezoidal pattern, when the floor reaction force's horizontal component allowable range and the ZMP allowable range (allowable range of the horizontal component of the floor reaction force's moment) are sufficiently wide. Therefore, the required value Mpfdmd of the moment for stabilizing the body horizontal position is used, as it is, as the moment Mpf for stabilizing the perturbation model for correcting body horizontal positions (body horizontal position stabilizing moment Mpf) without being limited by the limiter means and serves to vary the body horizontal acceleration of the simplified model 200.

Instead of integration (integrators shown in the block diagrams) used in gait correction, another feedback control law, such as PI control, may be used.

For example, as the control law for converging the full-model's floor reaction force's moment error Merr to 0, another control law, such as PI control, may be used instead of the integrator 217a.

Similarly, as a control law that receives a value obtained by subtracting the full-model's floor reaction force's horizontal component Ffull from the limited corrected desired floor reaction force's horizontal component Fltd and outputs a product of the inverse number of the body translation mode floor reaction force ratio h and the moment Mpf for stabilizing the perturbation model for correcting body horizontal positions, another control law, such as PI control, may be used instead of the integrator 215a.

The gains used in the embodiments described above, for example, the gain Km of the integrator 217a, the gain Kc of the integrator 215a, or gains of feedback control laws, such as the control law 206 for the perturbation model for correcting body horizontal positions, may not be a constant value. For example, the gains may be varied in accordance with the floor reaction force's horizontal component allowable range, the ZMP allowable range, the point in time in the gait or the like.

If the body translation mode floor reaction force ratio h cannot be determined in an analysis manner as shown by the formula a14, returning to the definition of the formula a7, the acceleration of the body horizontal position Xb in the dynamics model is brought into slight perturbation, and a ratio between the perturbations of the floor reaction force's moment My and the floor reaction force's horizontal component Fx is determined and the ratio may be adopted as the body translation mode floor reaction force ratio h.

Alternatively, although the precision is slightly reduced, the average of the values of the body translation mode floor reaction force ratio h for a standard gait is previously determined, and the average value may be used.

In the above description, when the unlimited corrected desired floor reaction force's moment Min doesn't fall within the allowable range of the horizontal component of the floor reaction force's moment or unlimited corrected desired floor reaction force's horizontal component Fin doesn't fall within the floor reaction force's horizontal component allowable range, the limiter means (limitation processor 211) determines the values Fltd and Mltd so as to satisfy the formulas 35, 36, 37, 38 and 41, to provide a value ΔMp2 with a minimum absolute value and to provide a value ΔF with a minimum absolute value. However, the following formula III may be used instead of the formula 41. Here, character c denotes a predetermined value.

$$\Delta M = \Delta F^* c + \Delta Mp2 \qquad \text{formula 111}$$

As the value c becomes larger exceeding the body translation mode floor reaction force ratio h, the correcting perturbation model's body horizontal position is more preferentially stabilized than the correcting perturbation model's body posture angle.

In the second, third and fourth embodiment, since the full-model's floor reaction force's moment Mfull substantially agree with the limited corrected desired floor reaction force's moment Mltd, the limited corrected desired floor reaction force's moment Mltd may be output as the corrected desired horizontal component of the floor reaction force's moment, instead of the full-model's floor reaction force's moment Mfull.

In addition, since the full-model's floor reaction force's horizontal component Ffull substantially agrees with the limited corrected desired floor reaction force's horizontal component Fltd, the limited corrected desired floor reaction force's horizontal component Fltd may be output as the corrected desired floor reaction force's horizontal component, instead of the full-model's floor reaction force's horizontal component Ffull.

In the first to fourth embodiments, the simplified model 200 is used to generate the gait instantaneous values to be input to the inverse full model 201 to correct the gait. However, the gait may be corrected by inputting a table concerning the gait to the full model.

As a method of calculating, in the limiter means (limitation processor 211), the unlimited corrected desired floor reaction force's horizontal component Fin and the moment Mpf for stabilizing the perturbation model for correcting body horizontal positions (body horizontal position stabilizing moment) from the required value Mpfdmd of the correcting perturbation model stabilizing moment (required value of the body horizontal position stabilizing moment), the full-model's floor reaction force's horizontal component Ffull, the moment Mpf for stabilizing the perturbation model for correcting body horizontal positions (body horizontal position stabilizing moment), the full-model's floor reaction force's horizontal component Ffull, the limited corrected desired floor reaction force's horizontal component Fltd and the like, a method of estimating a bias estimated value may be used which is proposed in the PCT patent application (named "control system" and related to a limitation function) filed by the applicants on Dec. 24, 2002. This method and the method performed in the limiter means in embodiments of the present invention can be approximately replaced with each other as described in the PCT patent application.

The corrected desired body vertical position may be determined in such a manner that the difference between the desired total center-of-gravity vertical position that satisfies the desired floor reaction force's vertical component and the total center-of-gravity vertical position of the full model gait (full-model total center-of-gravity vertical position) converges to 0.

Figure 62:
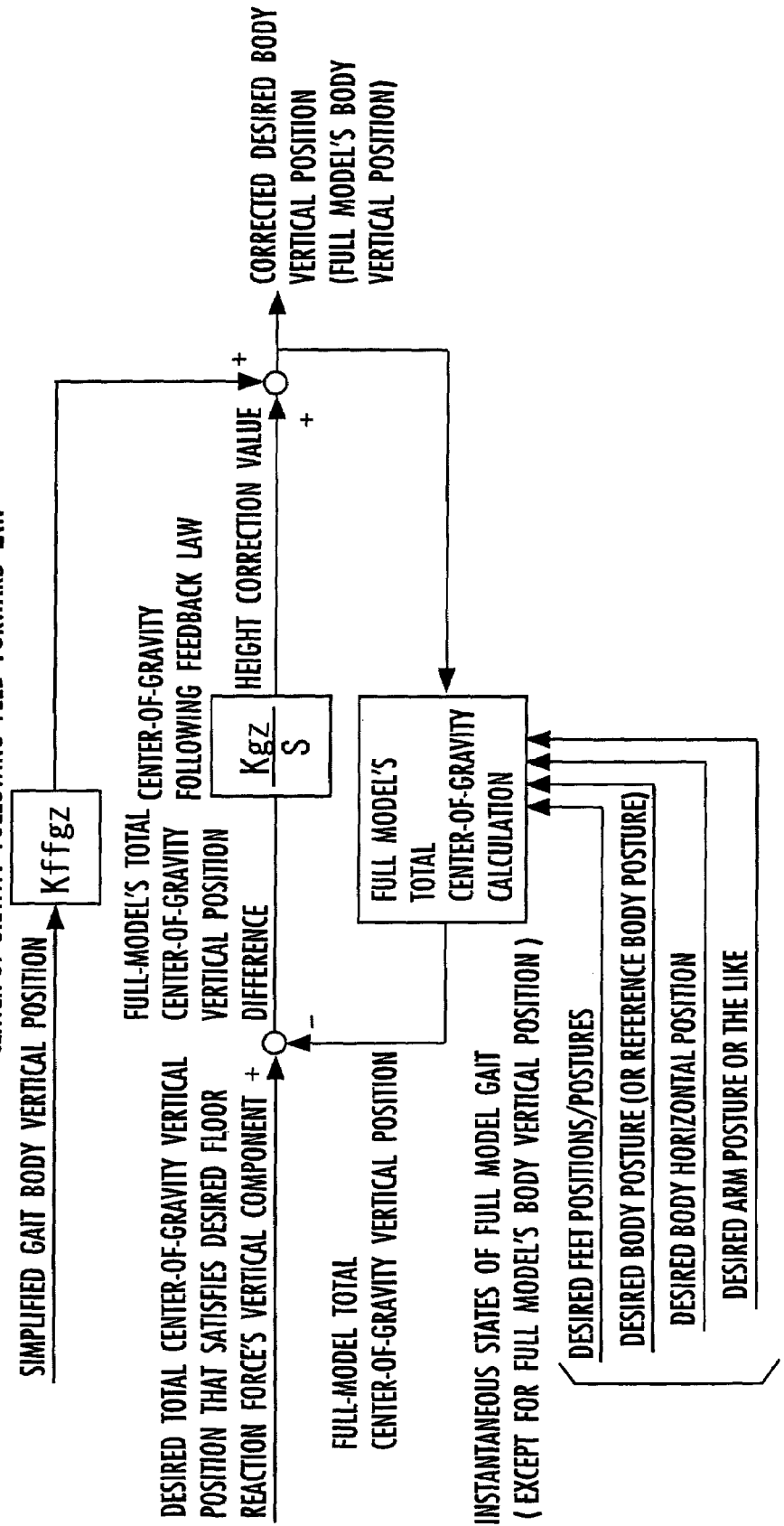
FIG. 62 is a functional block diagram showing a different method of correcting the body vertical position of the robot.

A process of determining the corrected desired body vertical position according to the method is shown in the functional block diagram in FIG. 62. Now, with reference to FIG. 62, this process will be described. Using the full model, the total center-of-gravity vertical position (referred to as a full-model total center-of-gravity vertical position, hereinafter) is determined based on the instantaneous values of the corrected gait. In addition, the difference between the desired total center-of-gravity vertical position that satisfies the desired floor reaction force's vertical component and the full-model total center-of-gravity vertical position determined as described above (full-model total center-of-gravity vertical position difference) is multiplied by a predetermined gain Kgz, and the resulting value is integrated to calculate a height correction value. Then, the body vertical position determined using the simplified model is multiplied by a predetermined feed forward gain Kffgz, and the sum of the resulting value and the height correction value is determined as the full-model's body vertical position (that is, the corrected desired body vertical position).

The feed forward gain Kffgz is a predetermined value ranging from 0 to 1. The corrected desired body vertical position may be determined by assuming the feed forward gain Kffgz is 0, that is, without taking into consideration the simplified model gait's body vertical position. In this case, the height correction value agrees with the corrected desired body vertical position.

Since the floor reaction force's vertical component is proportional to the sum of the total center-of-gravity vertical acceleration and the gravitational acceleration of the robot 1, a parameter concerning the total center-of-gravity vertical acceleration trajectory of the robot 1 may be explicitly set as a gait parameter, instead of the floor reaction force's vertical component trajectory. The two are substantially the same. Furthermore, instead of the floor reaction force's vertical component trajectory, a parameter concerning the vertical acceleration trajectory of a part whose behavior resembles that of the total center-of-gravity trajectory of the robot 1 may be set explicitly. For example, in the case where the mass of the legs 2, 2 is adequately smaller than the mass of the body 24, the body vertical acceleration trajectory and the total center-of-gravity vertical acceleration trajectory of robot 1 are substantially the same or proportional to each other. Therefore, the body vertical acceleration trajectory may be used instead of the floor reaction force's vertical component trajectory.

Similarly, since floor reaction force's horizontal component and the total center-of-gravity horizontal acceleration of the robot are proportional to each other, the total center-of-gravity horizontal acceleration of the robot and the allowable range thereof may be used instead of the floor reaction force's horizontal component and the allowable range thereof in the embodiments described above. Furthermore, a parameter concerning the horizontal acceleration trajectory of a part whose behavior resembles that of the total center-of-gravity horizontal trajectory of the robot may be set explicitly. For example, in the case where the mass of the legs 2, 2 is adequately smaller than the mass of the body 24, the body horizontal acceleration trajectory and the total center-of-gravity horizontal acceleration trajectory of the robot 1 are substantially the same or proportional to each other. Therefore, the body horizontal acceleration and the allowable range thereof may be used instead of the floor reaction force's horizontal component and the allowable range thereof.

Furthermore, in gait generation when the robot 1 moves on an inclined surface, instead of the floor reaction force's horizontal component allowable range and the allowable range of the total center-of-gravity acceleration's horizontal component, the allowable range of a floor-surface-parallel component (component parallel to the floor surface) of the translation floor reaction force, that is, the allowable range of the friction force, or the allowable range of a component parallel to the floor surface of the total center-of-gravity acceleration (which is proportional to the friction force if the gravitational component thereof is excluded) may be set. For example, as for a case of setting the allowable range of the floor-surface-parallel component of the translation floor reaction force (friction force) (the same holds true for a case of setting the allowable range of the floor-surface-parallel component of the total center-of-gravity acceleration), assuming that the inclination angle of the floor surface with respect to the horizontal surface is denoted by $\theta f$ (where $\theta f$ is positive when the surface is inclined downwardly in the travel direction of the robot), the friction force is represented by the following formula c72. Thus, in the case where a gait is generated according to the same algorithm as that in the embodiments described above, the friction force allowable range is converted into the floor reaction force's horizontal component allowable range using the formula c72, thereby setting the floor reaction force's horizontal component allowable range. In this case, as the floor reaction force's vertical component in the formula c72, the desired floor reaction force's vertical component may be used.

friction force=floor reaction force's horizontal
component*cos ($\theta f$)–floor reaction force's vertical component*sin ($\theta f$)　　　　　formula c72

In order for the floor reaction force's horizontal component and the horizontal component of the floor reaction force's moment about the desired ZMP to have adequate values, two movement modes, that is, the body rotation mode and the body translation mode are used in the embodiments described above. However, another movement mode may be used.

Figure 63:
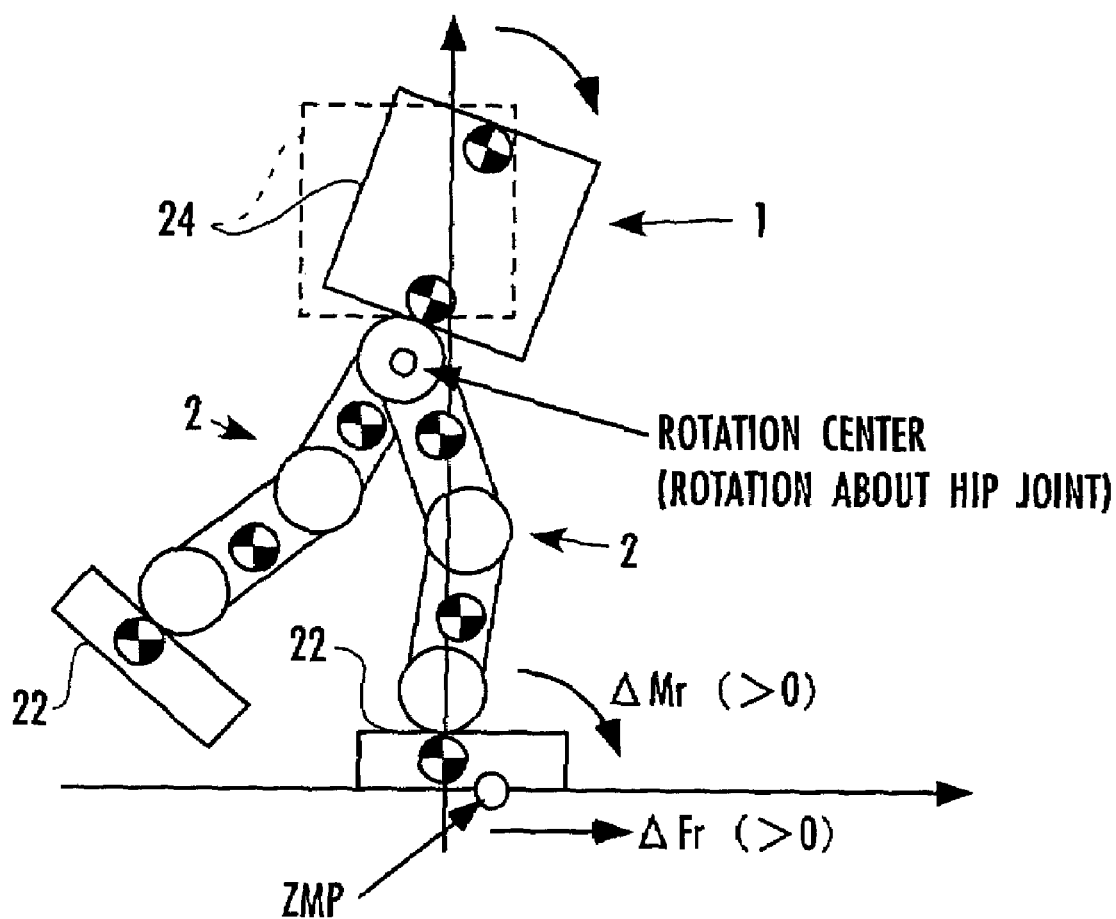
FIG. 63 is a diagram showing another movement mode of the robot.

For example, as shown in FIG. 63, if the body posture is rotated about the hip joint of the robot 1, the total center of gravity, as well as the angular momentum about the total center of gravity, varies. Combining (synthesizing) this movement with the movement in the body translation mode by a predetermined ratio results in substantially the same movement in the body rotation mode, and no floor reaction force's horizontal component occurs. Therefore, if this mode is regarded as the body rotation mode, a gait similar to those in the embodiments described above can be generated according to the algorithm in the embodiments.

Therefore, there is no need to have at least one movement mode that produces no floor reaction force's horizontal component. This is because any floor reaction force's horizontal component and horizontal component of the floor reaction force's moment about the desired ZMP can be produced for any combination of movement modes as in the example described above, as far as the two movement modes produce the floor reaction force's horizontal component and the horizontal component of the floor reaction force's moment about the desired ZMP in different ratios.

In addition, a movement mode concerning something other than body posture may be used. However, a movement mode should be chosen in which a minimum displacement produces a large floor reaction force's horizontal component or horizontal component of the floor reaction force's moment about the desired ZMP.

For example, a movement mode in which the left and right arms are swung in the same rotational direction, or a movement mode in which the position of a foot not in contact with the floor (floating in the air) is brought into perturbation may be used. However, in the case where the free leg trajectory is brought into perturbation, the amount of perturbation should be reduced to approximately 0 by the time immediately before landing to avoid varying the landing position.

Alternatively, three or more movement modes may be used.

In this case, at least two of the chosen movement modes have to be ones that produce the floor reaction force's horizontal component and the horizontal component of the floor reaction force's moment about the desired ZMP in different ratios. Otherwise, in general, the simultaneous equations would have no solutions.

Furthermore, preferably, a movement mode that varies the horizontal component of the floor reaction force's moment about the desired ZMP significantly and doesn't vary so largely the floor reaction force's horizontal component is combined with a movement mode that varies the floor reaction force's horizontal component significantly and doesn't vary so largely the horizontal component of the floor reaction force's moment about the desired ZMP.

In other words, preferably, a movement mode that varies the angular momentum adequately and doesn't vary so largely the total center of gravity is combined with a movement mode that varies the total center of gravity adequately and doesn't vary so largely the angular momentum. This is because the displacements of the movement modes are reduced.

As the simplified model described above, models other than the dynamics models used in the embodiments, such as those described below, may be used.

1) A nonlinear model in which material particles are provided for a plurality of links as shown in FIG. 12 (multi-mass model).

2) A three-material-particle model disclosed in Japanese Patent Application No. 2000-352011 filed by the applicants.

3) A one-material particle model in which only the body has a mass.

4) A model which neglects the moment of the inertial force caused by an angular momentum variation about the total center of gravity.

5) A separate-type model which has a partial model representing a relationship between the resultant force of gravity and the inertial force (or the floor reaction force) and the body translation movement and a partial model representing a relationship between the resultant force and the body rotation movement. For example, the material particles shown in FIG. 11 constitute the partial model representing a relationship between the resultant force and the body translation movement, and the flywheel shown in FIG. 11 constitutes the partial model representing a relationship between the resultant force and the body rotation movement.

As a full model, in principal, a dynamics model having a higher approximation precision higher than the simplified model is preferably used. However, a dynamics model having an approximation precision nearly equal to that of the simplified model may be used.

In addition, the processings involved in generation of the simplified model gait may be performed using only one model, or different models may be used for the different processings involved in generation of the simplified model gait. For example, since the normal gait is generated only to determine the final state of the current time gait, the required dynamics precision of the normal gait is lower than that of the current time gait. Therefore, for example, while the simplified model (model consisting of three material particles and a flywheel) shown in FIG. 11 is used in generation of the current time gait, in generation of the normal gait (in particular, steps S408 and S412 in FIG. 22), a dynamics model which consists of the body material particle 24$m$ corresponding to the body 24 and the flywheel FH, neglecting the masses of the legs 2, 2 (that is, a model consisting of one material particle and a flywheel, which results from eliminating the leg material particles 2$m$, 2$m$ from the model in FIG. 11) may be used. In generation of the normal gait in this case, in the embodiments described above, the processings in steps S408 and S412 in FIG. 22 are performed assuming that the mass of the leg material particles 2$m$, 2$m$ is 0. This allows calculation amount involved in the normal gait generation to be significantly reduced.

In the embodiments described above, the block diagrams, the flowcharts and the algorithms may be altered into equivalent ones by changing the sequence of calculations. In addition, a low-pass filter may be inserted appropriately.

While the embodiments of the present invention has been described concerning a two-legged mobile robot, the present invention can be applied to a legged robot having three or more legs.

INDUSTRIAL APPLICABILITY

As described above, the present invention is effective in generating a gait with which a legged mobile robot, such as a two-legged mobile robot, can move smoothly in a variety of gait modes.

The invention claimed is:

1. A gait generation device for generating a desired gait for a legged mobile robot that moves by operating a plurality of legs extending from a body, comprising:
   allowable range setting means for setting an allowable range of a limitation-target quantity, the limitation-target quantity being at least any of a horizontal component of a translation floor reaction force or a floor-surface-parallel component of a translation floor reaction force applied to the robot or a horizontal component of a total center-of-gravity acceleration or a floor-surface-parallel component of a total center-of-gravity acceleration of the robot and a horizontal component of a floor reaction force moment or a ZMP;
   provisional instantaneous value determining means for determining provisional instantaneous values of a desired movement and a desired floor reaction force of said desired gait;
   model calculating means that inputs at least the provisional instantaneous value of said desired movement to a dynamics model to determine a model floor reaction force instantaneous value as an output of the dynamics model, the dynamics model representing a relationship between a movement and a floor reaction force of said robot; and
   desired instantaneous value determining means for correcting the provisional instantaneous value of said desired movement to determine a desired instantaneous value of the desired movement based on at least the difference between the model floor reaction force instantaneous value and the provisional instantaneous value of said desired floor reaction force and said allowable range,
   wherein the desired instantaneous value determining means corrects the provisional instantaneous value of said desired movement in such a manner that said limitation-target quantity which corresponds to the instantaneous value of the floor reaction force substantially in balance with, in said dynamics model, the resultant force of an inertial force and gravity applied to the robot caused by the desired instantaneous value of the desired movement falls within said allowable range.

2. The gait generation device for a legged mobile robot according to claim 1, wherein model floor reaction force instantaneous values determined by said model calculating means include at least a model value of the horizontal component of the floor reaction force moment or the ZMP, provisional instantaneous values of said desired floor reaction force determined by said provisional instantaneous value determining means include at least a provisional desired instantaneous value of the horizontal component of the floor reaction force moment or the ZMP, and said difference used by said desired instantaneous value determining means is the difference between said model value of the horizontal component of the floor reaction force moment or the ZMP and the provisional desired instantaneous value of the horizontal component of the floor reaction force moment or the ZMP.

3. The gait generation device for a legged mobile robot according to claim 1, wherein said desired instantaneous value determining means determines, as the desired instantaneous value of the desired floor reaction force, the instantaneous value of the floor reaction force substantially in balance with, in said dynamics model, the resultant force of an inertial force and gravity applied to the robot caused by the desired instantaneous value of the desired movement.

4. The gait generation device for a legged mobile robot according to claim 1, wherein said desired instantaneous value determining means comprises: a perturbation model that represents a relationship between a perturbation movement and a perturbation floor reaction force of said robot;
   means for determining a perturbation model manipulating quantity for manipulating the perturbation floor reaction force of said perturbation model based on at least said difference and said allowable range;
   means for determining a correction quantity for said desired movement by inputting the determined perturbation model manipulating quantity to said perturbation model; and
   means for determining a desired instantaneous value of said desired movement by correcting the provisional instantaneous value of said desired movement with the correction quantity.

5. The gait generation device for a legged mobile robot according to claim 4, further comprising:
   means for determining a required value of said perturbation model manipulating quantity in accordance with at least a state quantity of said perturbation model,
   wherein said means for determining a perturbation model manipulating quantity determines the perturbation model manipulating quantity to be input to said perturbation model based on said difference, said allowable range and said required value.

6. The gait generation device for a legged mobile robot according to claim 5, further comprising:
   means for successively determining the required value of said perturbation model manipulating quantity according to a feedback control law in accordance with a deviation of said state quantity of the perturbation model from a desired value of the state quantity.

7. The gait generation device for a legged mobile robot according to claim 5, wherein said perturbation model manipulating quantity comprises a first manipulating quantity component that is determined according to at least said difference and a second manipulating quantity component that is determined based on at least said required value and said allowable range, and
   said means for determining a perturbation model manipulating quantity comprises: means for determining an estimated value of said limitation-target quantity corresponding to the desired instantaneous value of the desired movement that is determined if said second manipulating quantity component which is made to agree with said required value and said first manipulating quantity component are input to said perturbation model;
   means for determining a limited limitation-target quantity by comparing the determined estimated value of the limitation-target quantity with said allowable range and limiting the limitation-target quantity within the allowable range based on the result of comparison; and means for determining said second manipulating quantity component based on at least the limited limitation-target quantity.

8. The gait generation device for a legged mobile robot according to claim 7, wherein said perturbation model is a model that involves a translation movement of the body of the robot and a posture varying movement of the body of the robot, said limitation-target quantity comprising the horizontal component of the translation floor reaction force or the floor-surface-parallel component of the translation floor reaction force applied to the robot or the horizontal component of the total center-of-gravity acceleration or the floor-surface-parallel component of the total center-of-gravity acceleration of the robot and the horizontal component of the floor reaction force moment or the ZMP, and said means for determining a limited limitation-target quantity determines each limited limitation-target quantity in such a manner that the variation of a manipulation quantity component of said second manipulating quantity component which is associated with said body posture varying movement from said required value is reduced to a minimum, and the variation of the limited limitation-target quantity from said estimated value is reduced to a minimum.

9. The gait generation device for a legged mobile robot according to claim 7, wherein said limitation-target quantity comprises the horizontal component of the translation floor reaction force or the floor-surface-parallel component of the translation floor reaction force or the horizontal component of the total center-of-gravity acceleration or the floor-surface-parallel component of the total center-of-gravity acceleration of the robot, and said means for determining a perturbation model manipulating means determines the estimated value of said limitation-target quantity using, as said model floor reaction force instantaneous value, the instantaneous value of the horizontal component of the translation floor reaction force or the instantaneous value of the floor-surface-parallel component of the translation floor reaction force determined by said dynamics model.

10. The gait generation device for a legged mobile robot according to claim 7, wherein said desired instantaneous value determining means determines the floor reaction force associated with said limited limitation-target quantity as the desired instantaneous value of said desired floor reaction force.

11. The gait generation device for a legged mobile robot according to claim 5, wherein said desired instantaneous value determining means comprises means for additionally inputting a correction quantity for said desired movement to said dynamics model, and said perturbation model manipulating quantity comprises a first manipulating quantity component that is determined according to at least said difference and a second manipulating quantity component that is determined based on at least said required value and said allowable range, and said means for determining a perturbation model manipulating quantity comprises: means for determining an estimated value of said limitation-target quantity corresponding to the model floor reaction force instantaneous value that is output from said dynamics model if said second manipulating quantity component which is made to agree with said required value and said first manipulating quantity component are input to said perturbation model;

means for determining a limited limitation-target quantity by comparing the determined estimated value of the limitation-target quantity with said allowable range and limiting the limitation-target quantity within the allowable range based on the result of comparison; and means for determining said second manipulating quantity component based on at least the limited limitation-target quantity.

12. The gait generation device for a legged mobile robot according to claim 11, wherein said perturbation model is a model that involves a translation movement of the body of the robot and a posture varying movement of the body of the robot, said limitation-target quantity comprising the horizontal component of the translation floor reaction force or the floor-surface-parallel component of the translation floor reaction force applied to the robot or the horizontal component of the total center-of-gravity acceleration or the floor-surface-parallel component of the total center-of-gravity acceleration of the robot and the horizontal component of the floor reaction force moment or the ZMP, and said means for determining a limited limitation-target quantity determines each limited limitation-target quantity in such a manner that the variation of a manipulation quantity component of said second manipulating quantity components which is associated with said body posture varying movement from said required value is reduced to a minimum, and the variation of the limited limitation-target quantity from said estimated value is reduced to a minimum.

13. The gait generation device for a legged mobile robot according to claim 11, wherein said second manipulating quantity components include said horizontal component of the floor reaction force moment or the ZMP and said differences include at least the difference concerning the horizontal component of the floor reaction force moment or ZMP, and said means for determining a perturbation model manipulating quantity comprises means for determining said first manipulating quantity component in such a manner that, the horizontal component of the floor reaction force moment or ZMP concerning said differences is substantially equal to the horizontal component of the floor reaction force moment or ZMP of said second manipulating quantity components.

14. The gait generation device for a legged mobile robot according to claim 11, wherein said limitation-target quantity comprises the horizontal component of the translation floor reaction force or the floor-surface-parallel component of the translation floor reaction force or the horizontal component of the total center-of-gravity acceleration or the floor-surface-parallel component of the total center-of-gravity acceleration of the robot, and said means for determining a perturbation model manipulating quantity means determines the estimated value of said limitation-target quantity using, as said model floor reaction force instantaneous value, the instantaneous value of the horizontal component of the translation floor reaction force or the instantaneous value of the floor-surface-parallel component of the translation floor reaction force determined according to said dynamics model.

15. The gait generation device for a legged mobile robot according to claim 4, wherein said perturbation model is a model that involves a plurality of perturbation movements having different perturbation ratios between the horizontal component of the translation floor reaction force and the horizontal component of the floor reaction force moment to said perturbation movement, said perturbation model manipulating quantity comprises a plurality of kinds of manipulating quantity associated with the respective perturbation movements, and said correction quantity for the desired movement comprises a plurality of kinds of correction quantity associated with the respective perturbation movements.

16. The gait generation device for a legged mobile robot according to claim 15, wherein said plurality of perturbation movements comprise a translation movement of the body of said robot and a posture varying movement in which the posture of a predetermined part of the robot is varied while keeping the center of gravity of the robot substantially unchanged.

17. The gait generation device for a legged mobile robot according to claim 15, wherein said plurality of perturbation movements comprise a translation horizontal movement of the body of said robot and a posture varying movement of the body of the robot.

18. The gait generation device for a legged mobile robot according to claim 15, wherein said limitation-target quantity is composed of a horizontal component of a translation floor reaction force or a floor-surface-parallel component of a translation floor reaction force applied to the robot or a horizontal component of a total center-of-gravity acceleration or a floor-surface-parallel component of a total center-of-gravity acceleration of the robot and a horizontal component of a floor reaction force moment or a ZMP.

19. The gait generation device for a legged mobile robot according to claim 4, wherein said perturbation model manipulating quantity comprises a first manipulating quantity component that is determined according to at least said difference and a second manipulating quantity component that is determined based on at least said allowable range, and
said means for determining a perturbation model manipulating quantity comprises: means for determining an estimated value of said limitation-target quantity corresponding to the desired instantaneous value of the desired movement that is determined if only said first manipulating quantity component is input to said perturbation model;
means for determining a limited limitation-target quantity by comparing the determined estimated value of the limitation-target quantity with said allowable range and limiting the limitation-target quantity within the allowable range based on the result of comparison; and
means for determining said second manipulating quantity component based on at least the limited limitation-target quantity.

20. The gait generation device for a legged mobile robot according to claim 19, wherein said limitation-target quantity comprises the horizontal component of the translation floor reaction force or the floor-surface-parallel component of the translation floor reaction force or the horizontal component of the total center-of-gravity acceleration or the floor-surface-parallel component of the total center-of-gravity acceleration of the robot, and
said means for determining a perturbation model manipulating means determines the estimated value of said limitation-target quantity using, as said model floor reaction force instantaneous value, the instantaneous value of the horizontal component of the translation floor reaction force or the instantaneous value of the floor-surface-parallel component of the translation floor reaction force determined by said dynamics model.

21. The gait generation device for a legged mobile robot according to claim 19, wherein said desired instantaneous value determining means determines the floor reaction force associated with said limited limitation-target quantity as the desired instantaneous value of said desired floor reaction force.

22. The gait generation device for a legged mobile robot according to claim 4, wherein said desired instantaneous value determining means comprises means for additionally inputting a correction quantity for said desired movement to said dynamics model, and said perturbation model manipulating quantity comprises a first manipulating quantity component that is determined according to at least said difference and a second manipulating quantity component that is determined based on at least said allowable range, and
said means for determining a perturbation model manipulating quantity comprises: means for determining an estimated value of said limitation-target quantity corresponding to the model floor reaction force instantaneous value that is output from said dynamics model if only said first manipulating quantity component is input to said perturbation model;
means for determining a limited limitation-target quantity by comparing the determined estimated value of the limitation-target quantity with said allowable range and limiting the limitation-target quantity within the allowable range based on the result of comparison; and
means for determining said second manipulating quantity component based on at least the limited limitation-target quantity.

23. The gait generation device for a legged mobile robot according to claim 22, wherein said second manipulating quantity components include said horizontal component of the floor reaction force moment or the ZMP and said differences include at least the difference concerning the horizontal component of the floor reaction force moment or ZMP, and
said means for determining a perturbation model manipulating quantity comprises means for determining said first manipulating quantity component in such a manner that, the horizontal component of the floor reaction force moment or ZMP concerning said differences is substantially equal to the horizontal component of the floor reaction force moment or ZMP of said second manipulating quantity components.

24. The gait generation device for a legged mobile robot according to claim 22, wherein said limitation-target quantity comprises the horizontal component of the translation floor reaction force or the floor-surface-parallel component of the translation floor reaction force or the horizontal component of the total center-of-gravity acceleration or the floor-surface-parallel component of the total center-of-gravity acceleration of the robot, and
said means for determining a perturbation model manipulating quantity means determines the estimated value of said limitation-target quantity using, as said model floor reaction force instantaneous value, the instantaneous value of the horizontal component of the translation floor reaction force or the instantaneous value of the floor-surface-parallel component of the translation floor reaction force determined according to said dynamics model.

25. The gait generation device for a legged mobile robot according to claim 1, characterized in that said desired instantaneous value determining means comprises: means for additionally inputting a correction quantity for correcting the provisional instantaneous value of said desired movement to said dynamics model; and means for determining said correction quantity in such a manner that said limitation-target quantity associated with said model floor reaction force instantaneous value is substantially kept at a value within said allowable range and said difference is stabilized.

26. The gait generation device for a legged mobile robot according to claim 25, wherein said desired instantaneous value determining means determines said model floor reaction force instantaneous value as the desired instantaneous value of said desired floor reaction force.

27. A gait generation device for generating a desired gait for a legged mobile robot that moves by operating a plurality of legs extending from a body, comprising:

allowable range setting means for setting an allowable range of a limitation-target quantity, the limitation-target quantity being at least any of a horizontal component of a translation floor reaction force or a floor-surface-parallel component of a translation floor reaction force applied to the robot or a horizontal component of a total center-of-gravity acceleration or a floor-surface-parallel component of a total center-of-gravity acceleration of the robot and a horizontal component of a floor reaction force moment or a ZMP;

desired floor reaction force's provisional instantaneous value determining means for successively determining, of a desired movement and a desired floor reaction force of said desired gait, at least a provisional instantaneous value of the desired floor reaction force;

first model calculating means that inputs at least the provisional instantaneous value of the desired floor reaction force to a first dynamics model to determine a provisional instantaneous value of the desired movement as an output of the first dynamics model, the first dynamics model representing a relationship between a movement and a floor reaction force of said robot;

second model calculating means that inputs at least the provisional instantaneous value of said desired movement to a second dynamics model to determine a model floor reaction force instantaneous value as an output of the second dynamics model, the second dynamics model representing a relationship between a movement and a floor reaction force of said robot; and first model input correcting means that determines a correction quantity of said desired floor reaction force based on at least the difference between the model floor reaction force instantaneous value and the provisional instantaneous value of said desired floor reaction force and said allowable range in such a manner that said limitation-target quantity corresponding to said model floor reaction force instantaneous value that is output from said second dynamics model falls within said allowable range and additionally inputs the determined correction quantity to said first dynamics model, wherein the desired instantaneous value of said desired movement is determined based on at least the input to said second dynamics model.

28. The gait generation device for a legged mobile robot according to claim 27, wherein model floor reaction force instantaneous values determined by said second model calculating means include at least a model value of the horizontal component of the floor reaction force moment or the ZMP, the provisional instantaneous values of said desired floor reaction force determined by said provisional instantaneous value determining means include at least a provisional desired instantaneous value of the horizontal component of the floor reaction force moment or the ZMP, and said difference used by said first model input correcting means is the difference between said model value of the horizontal component of the floor reaction force moment or the ZMP and the provisional desired instantaneous value of the horizontal component of the floor reaction force moment or the ZMP.

29. The gait generation device for a legged mobile robot according to claim 27, wherein said desired instantaneous value determining means determines said model floor reaction force instantaneous value output from said second dynamics model as the desired instantaneous value of said desired floor reaction force.

30. The gait generation device for a legged mobile robot according to claim 27, further comprising:

means for determining a required value of the correction quantity of said desired floor reaction force, wherein the correction quantity of said desired floor reaction force determined by said first model input correcting means comprises a first correction quantity component that is determined according to at least said difference and a second correction quantity component that is determined based on at least said required value and said allowable range, said first model input correcting means comprises: means for determining an estimated value of said limitation-target quantity corresponding to the model floor reaction force instantaneous value that is output from said second dynamics model if said second correction quantity component which is made to agree with said required value and said first correction quantity component are additionally input to said first dynamics model;

means for determining a limited limitation-target quantity by comparing the determined estimated value of the limitation-target quantity with said allowable range and limiting the limitation-target quantity within the allowable range based on the result of comparison; and means for determining said second correction quantity component based on at least the limited limitation-target quantity.

31. The gait generation device for a legged mobile robot according to claim 27, further comprising:

second model input correcting means that determines a correction quantity for said desired movement based on at least said difference and said allowable range, and additionally inputs the determined correction quantity to said second dynamics model.

32. The gait generation device for a legged mobile robot according to claim 31, further comprising:

a perturbation model that represents a relationship between a perturbation movement and a perturbation floor reaction force of said robot;

means for determining a floor reaction force manipulating quantity based on at least said difference and said allowable range; and distributor means for separating the determined floor reaction force manipulating quantity into a correction quantity of said desired floor reaction force that is to be input to said first dynamics model and a perturbation model manipulating quantity that is to be input to said perturbation model, wherein said second model input correcting means determines the correction quantity for said desired movement by inputting said perturbation model manipulating quantity to said perturbation model.

33. The gait generation device for a legged mobile robot according to claim 32, further comprising:
means for determining a required value of said floor reaction force manipulating quantity in accordance with at least a state quantity of said perturbation model, wherein said means for determining a floor reaction force manipulating quantity determines the floor reaction force manipulating quantity to be supplied to said distributor means based on said difference, said allowable range and said required value.

34. The gait generation device for a legged mobile robot according to claim 33, further comprising:
means for successively determining the required value of said floor reaction force manipulating quantity according to a feedback control law in accordance with a deviation of said state quantity of the perturbation model from a desired value of the state quantity.

35. The gait generation device for a legged mobile robot according to claim 33, wherein said floor reaction force manipulating quantity comprises a first manipulating quantity component that is determined according to at least said difference and a second manipulating quantity component that is determined based on at least said required value and said allowable range, and
said means for determining a floor reaction force manipulating quantity comprises: means for determining an estimated value of said limitation-target quantity corresponding to the model floor reaction force instantaneous value that is output from said second dynamics model if said second manipulating quantity component which is made to agree with said required value and said first manipulating quantity component are input to said distributor means;
means for determining a limited limitation-target quantity by comparing the determined estimated value of the limitation-target quantity with said allowable range and limiting the limitation-target quantity within the allowable range based on the result of comparison; and
means for determining said second manipulating quantity component based on at least the limited limitation-target quantity.

36. The gait generation device for a legged mobile robot according to claim 35, wherein said perturbation model is a model that involves a translation movement of the body of the robot and a posture varying movement of the body of the robot, said limitation-target quantity comprising the horizontal component of the translation floor reaction force or the floor-surface-parallel component of the translation floor reaction force applied to the robot or the horizontal component of the total center-of-gravity acceleration or the floor-surface-parallel component of the total center-of-gravity acceleration of the robot and the horizontal component of the floor reaction force moment or the ZMP, and
said means for determining a limited limitation-target quantity determines each limited limitation-target quantity in such a manner that the variation of a manipulation quantity component of said second manipulating quantity components which is associated with said body posture varying movement from said required value is reduced to a minimum, and the variation of the limited limitation-target quantity from said estimated value is reduced to a minimum.

37. The gait generation device for a legged mobile robot according to claim 35, wherein said second manipulating quantity components include said horizontal component of the floor reaction force moment or the ZMP and said differences include at least the difference concerning the horizontal component of the floor reaction force moment or ZMP, and
said means for determining a perturbation model manipulating quantity comprises means for determining said first manipulating quantity component in such a manner that, the horizontal component of the floor reaction force moment or ZMP concerning said differences is substantially equal to the horizontal component of the floor reaction force moment or ZMP of said second manipulating quantity components.

38. The gait generation device for a legged mobile robot according to claim 35, wherein said limitation-target quantity comprises said horizontal component of the translation floor reaction force or the floor-surface-parallel component of the translation floor reaction force or the horizontal component of the total center-of-gravity acceleration or the floor-surface-parallel component of the total center-of-gravity acceleration of the robot, and
said means for determining a floor reaction force manipulating means determines the estimated value of said limitation-target quantity using, as said model floor reaction force instantaneous value, the instantaneous value of the horizontal component of the translation floor reaction force or the instantaneous value of the floor-surface-parallel component of the translation floor reaction force determined by said dynamics model.

39. The gait generation device for a legged mobile robot according to claim 32, wherein said perturbation model is a model that involves a plurality of perturbation movements having different perturbation ratios between the horizontal component of the translation floor reaction force and the horizontal component of the floor reaction force moment to said perturbation movement, said floor reaction force manipulating quantity comprises a plurality of kinds of manipulating quantity associated with the respective perturbation movements, and said correction quantity for the desired movement determined by said second model input correcting means comprises a plurality of kinds of correction quantity associated with the respective perturbation movements.

40. The gait generation device for a legged mobile robot according to claim 39, wherein said plurality of perturbation movements comprise a translation movement of the body of said robot and a posture varying movement in which the posture of a predetermined part of the robot is varied while keeping the center of gravity of the robot substantially unchanged.

41. The gait generation device for a legged mobile robot according to claim 39, wherein said plurality of perturbation movements comprise a translation horizontal movement of the body of said robot and a posture varying movement of the body of the robot.

42. The gait generation device for a legged mobile robot according to claim 39, wherein said limitation-target quantity is composed of a horizontal component of a translation floor reaction force or a floor-surface-parallel component of a translation floor reaction force applied to the robot or a horizontal component of a total center-of-gravity acceleration or a floor-surface-parallel component of a total center-of-gravity acceleration of the robot and a horizontal component of the floor reaction force moment or a ZMP.

43. The gait generation device for a legged mobile robot according to claim 32, wherein said floor reaction force manipulating quantity comprises a first manipulating quantity component that is determined according to at least said difference and a second manipulating quantity component that is determined based on at least said allowable range, and said means for determining a floor reaction force manipulating quantity comprises: means for determining an estimated value of said limitation-target quantity corresponding to the model floor reaction force instantaneous value that is output from said second dynamics model if only said first manipulating quantity component is input to said distributor means;

means for determining a limited limitation-target quantity by comparing the determined estimated value of the limitation-target quantity with said allowable range and limiting the limitation-target quantity within the allowable range based on the result of comparison; and means for determining said second manipulating quantity component based on at least the limited limitation-target quantity.

44. The gait generation device for a legged mobile robot according to claim 43, wherein said second manipulating quantity components include said horizontal component of the floor reaction force moment or the ZMP and said differences include at least the difference concerning the horizontal component of the floor reaction force moment or ZMP, and said means for determining a perturbation model manipulating quantity comprises means for determining said first manipulating quantity component in such a manner that, the horizontal component of the floor reaction force moment or ZMP concerning said differences is substantially equal to the horizontal component of the floor reaction force moment or ZMP of said second manipulating quantity components.

45. The gait generation device for a legged mobile robot according to claim 43, wherein said limitation-target quantity comprises said horizontal component of the translation floor reaction force or the floor-surface-parallel component of the translation floor reaction force or the horizontal component of the total center-of-gravity acceleration or the floor-surface-parallel component of the total center-of-gravity acceleration of the robot, and said means for determining a floor reaction force manipulating means determines the estimated value of said limitation-target quantity using, as said model floor reaction force instantaneous value, the instantaneous value of the horizontal component of the translation floor reaction force or the instantaneous value of the floor-surface-parallel component of the translation floor reaction force determined by said dynamics model.

46. The gait generation device for a legged mobile robot according to claim 30, further comprising:

third model calculating means that inputs at least the provisional instantaneous value of said desired floor reaction force to a third dynamics model, which represents a relationship between a movement and a floor reaction force of said robot, to determine a third provisional instantaneous value of the desired movement as an output of the third dynamics model, wherein said means for determining a required value of the correction quantity of said desired floor reaction force determines said required value based on the difference between said determined desired instantaneous value of said desired movement and said third provisional instantaneous value of said desired movement in such a manner that the difference is close to 0.

47. A gait generation device for generating a desired gait for a legged mobile robot that moves by operating a plurality of legs extending from a body, comprising:

allowable range setting means for setting an allowable range of a limitation-target quantity, the limitation-target quantity being at least any of a horizontal component of a translation floor reaction force or a floor-surface-parallel component of a translation floor reaction force applied to the robot or a horizontal component of a total center-of-gravity acceleration or a floor-surface-parallel component of a total center-of-gravity acceleration of the robot and a horizontal component of the floor reaction force moment or a ZMP;

desired floor reaction force's provisional instantaneous value determining means for successively determining, of a desired movement and a desired floor reaction force of said desired gait, at least a provisional instantaneous value of the desired floor reaction force;

first model calculating means that inputs at least the provisional instantaneous value of the desired floor reaction force to a first dynamics model to determine a first provisional instantaneous value of the desired movement as an output of the first dynamics model, the first dynamics model representing a relationship between a movement and a floor reaction force of said robot; and second model calculating means that inputs at least the provisional instantaneous value of said desired floor reaction force to a second dynamics model, which represents a relationship between a movement and a floor reaction force of said robot, to determine a second provisional instantaneous value of the desired movement as an output of the second dynamics model in such a manner that said limitation-target quantity corresponding to the floor reaction force instantaneous value that is, in said second dynamics model, substantially in balance with the resultant force of the inertial force and center-of-gravity applied to the robot caused by the second provisional instantaneous value of the desired movement falls within said allowable range;

manipulating quantity calculating means for determining the floor reaction force manipulating quantity based on at least the difference between the first provisional instantaneous value and the second provisional instantaneous value of said desired movement in such a manner that the difference is close to 0; and model input correcting means for additionally inputting the floor reaction force manipulating quantity to at least any one of said first dynamics model and said second dynamics model, wherein the second provisional instantaneous value of said desired movement is determined as the desired instantaneous value of the desired movement.

48. The gait generation device for a legged mobile robot according to claim 47, wherein differences between the first provisional instantaneous value and the second provisional instantaneous value of said desired movement include a difference of the position of a predetermined part of said robot, or include a difference of the position of the center of gravity of the robot and a difference of the posture of a predetermined part of the robot.

* * * * *